US005846063A

United States Patent [19]

Lakic

[11] Patent Number: 5,846,063

[45] Date of Patent: Dec. 8, 1998

[54] MINIATURE UNIVERSAL PUMP AND VALVE FOR INFLATABLE LINERS

[76] Inventor: Nikola Lakic, 45-191 Elm St., Indio, Calif. 92201

[21] Appl. No.: 781,531

[22] Filed: Jan. 9, 1997

Related U.S. Application Data

[63] Continuation-in-part of Ser. No. 284,894, Aug. 2, 1994, abandoned, which is a continuation of Ser. No. 907,755, Jun. 29, 1992, abandoned, which is a continuation of Ser. No. 754,059, Sep. 3, 1991, abandoned, which is a continuation-in-part of Ser. No. 636,603, Dec. 31, 1990, abandoned, which is a continuation-in-part of Ser. No. 539,978, Jun. 18, 1990, abandoned, which is a continuation-in-part of Ser. No. 427,515, Oct. 27, 1989, Pat. No. 5,025,575, which is a continuation-in-part of Ser. No. 323,340, Mar. 14, 1989, Pat. No. 4,991,317, which is a continuation-in-part of Ser. No. 262,749, Oct. 28, 1988, abandoned, which is a continuation-in-part of Ser. No. 230,908, Aug. 11, 1988, Pat. No. 4,941, 271, Ser. No. 177,410, Apr. 4, 1988, Pat. No. 4,845,338, Ser. No. 93,579, Sep. 4, 1987, Pat. No. 4,823,482, and Ser. No. 54,189, May 26, 1987, Pat. No. 4,782,602.

[51] Int. Cl.[6] .............................. F04B 23/00; A43B 13/20

[52] U.S. Cl. .................................. 417/440; 36/29; 36/43; 2/413; 297/199; 297/452.41; 417/435

[58] Field of Search ................................... 36/29, 93, 43, 36/153; 2/413; 297/199, 284.6, 452.41, DIG. 3; 417/472, 440, 435; 92/92

[56] References Cited

U.S. PATENT DOCUMENTS 5,074,765 12/1991 Pekar .
5,257,470 11/1993 Auger et al. .
5,315,715 5/1994 Kronenberger .
5,318,344 6/1994 Wang .
5,353,525 10/1994 Grim .
5,406,661 4/1995 Pekar .
5,480,287 1/1996 Pozzebon .

*Primary Examiner*—Ted Kavanaugh
*Attorney, Agent, or Firm*—Robert E. Strauss

[57] ABSTRACT

There is disclosed a preform for an air pump and relief valve assembly which has an assembly body with a substantially flat bottom and molded entirely of a flexible plastic to form a bulbous extremity on one end of the body and open at its bottom and a relief valve recess adjacent the opposite end of said body and open to a valve port in said bottom wall with at least one, and preferably two, internal passages open to the interior of the bulbous extremity and extending through said assembly body to a second port open at the bottom wall, with a substantially planar base flange extending about said body and peripherally about said bulbous extremity and said relief valve recess. The preform can be sealed to a flat sheet of plastic to complete the pump and relief valve and for this purpose has a transverse tunnel located between said internal passage and the bottom wall. The invention includes a method for assembling and bonding the preform to an inflatable enclosure formed of two sheets of flexible plastic, and the inflatable enclosure with a miniature air pump and relief valve as applied to a lining for apparel and protective shields.

33 Claims, 154 Drawing Sheets

1051 1025 1041 1049 1024 1027 1043 1029 1035 1020 1018 1026 1022 1019 1075 1017 1026

76
74
72
58
70
60
68
56
48
66
52
50

76
74
72
58
60
70
68
82
48
78
80
57

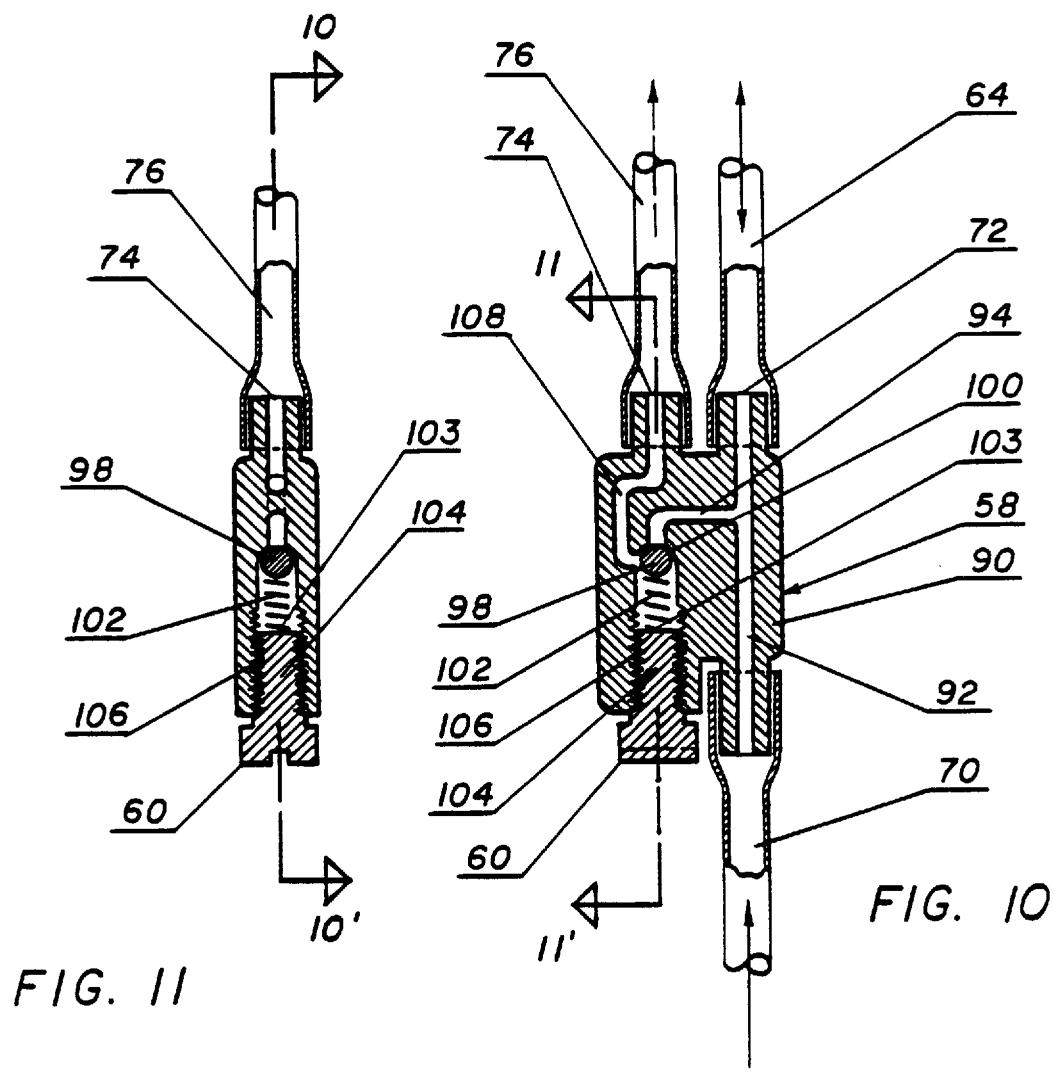
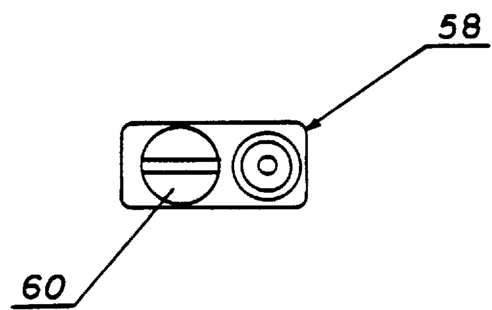
FIG. 12

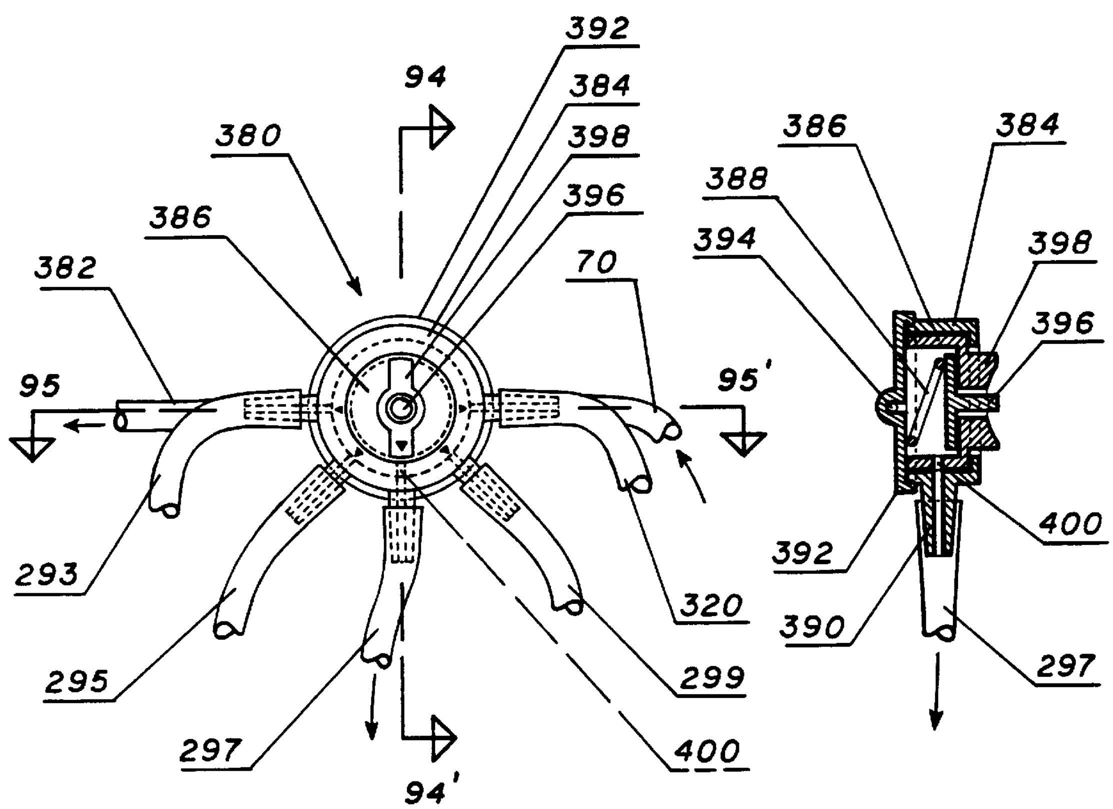
FIG. 93
FIG. 94
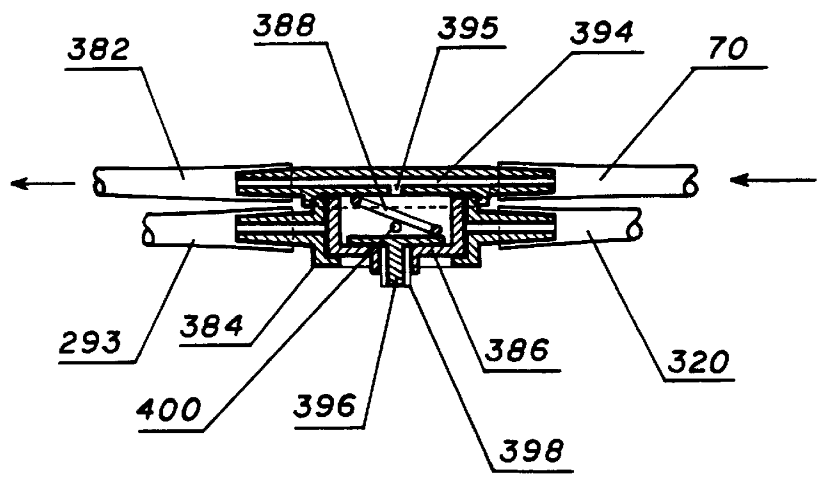
FIG. 95

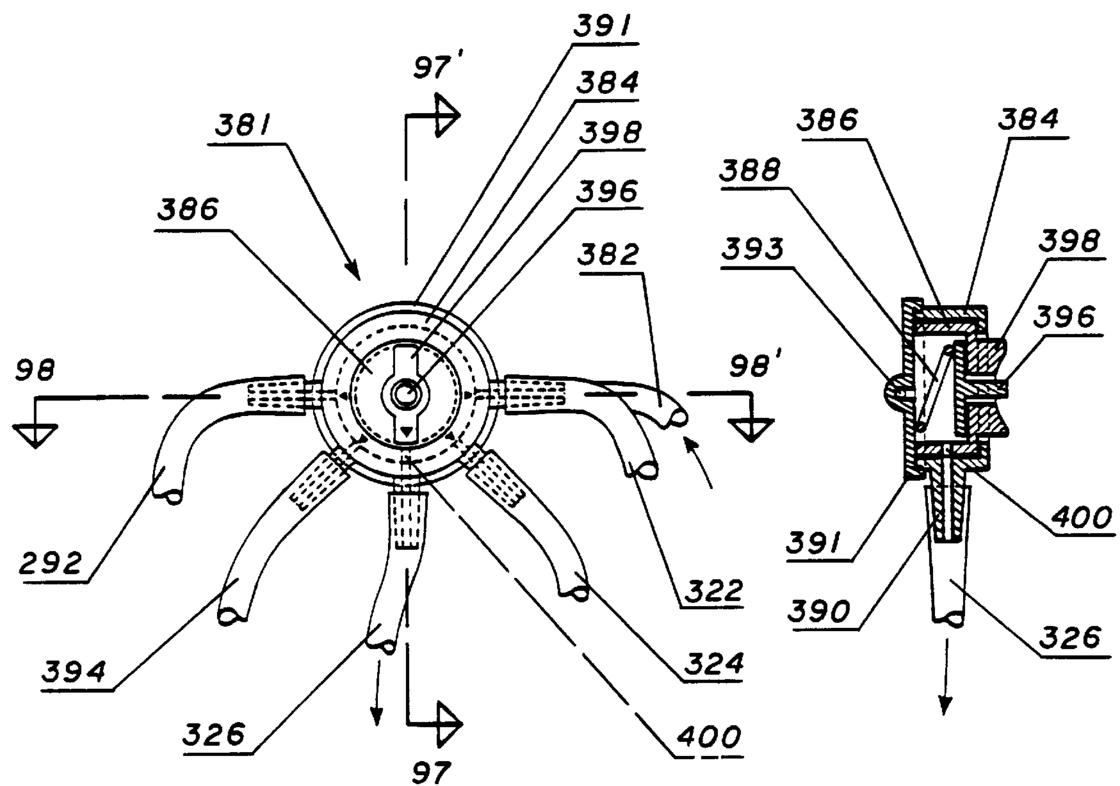
FIG. 96
FIG. 97
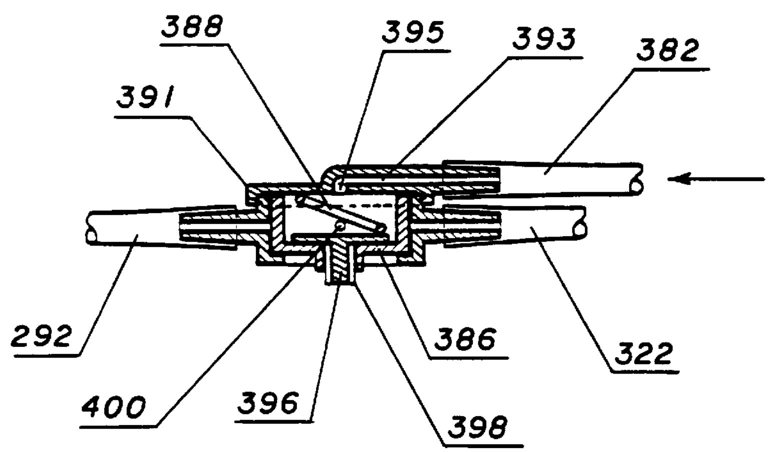
FIG. 98

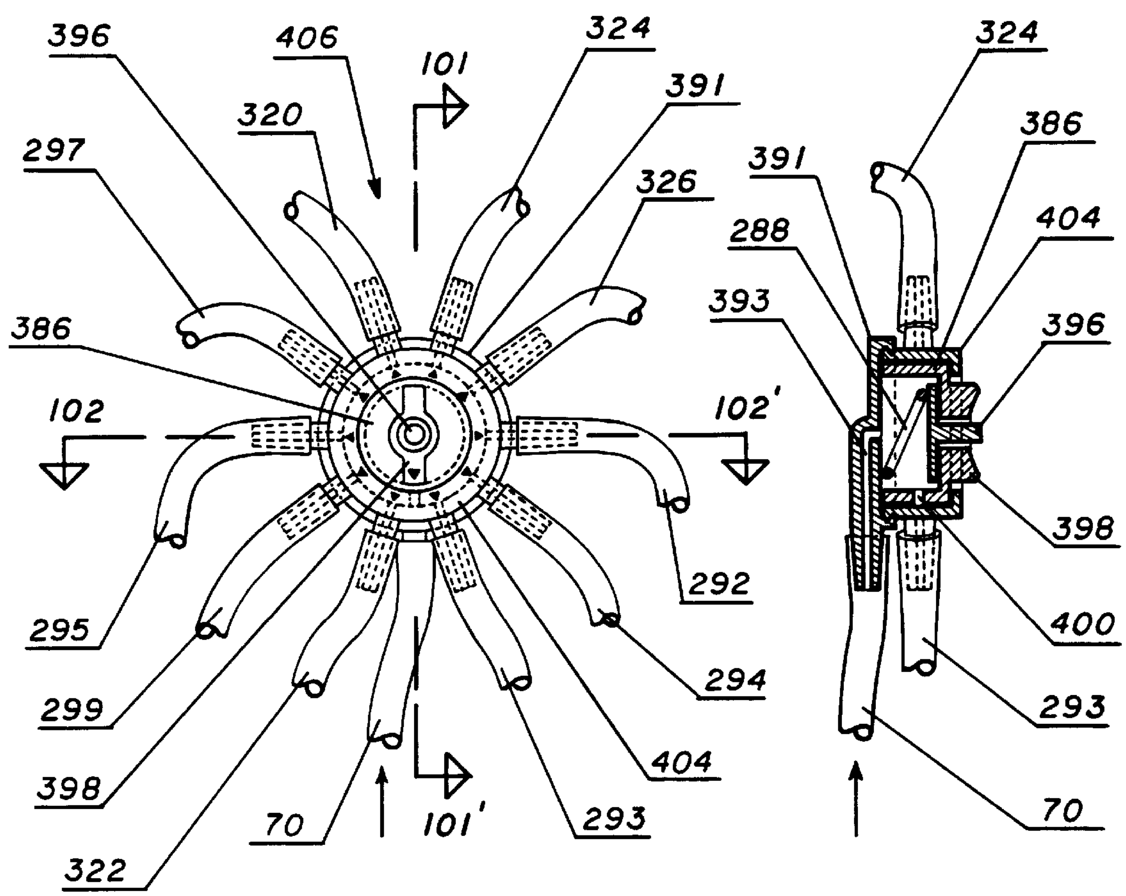
FIG. 100
FIG. 101
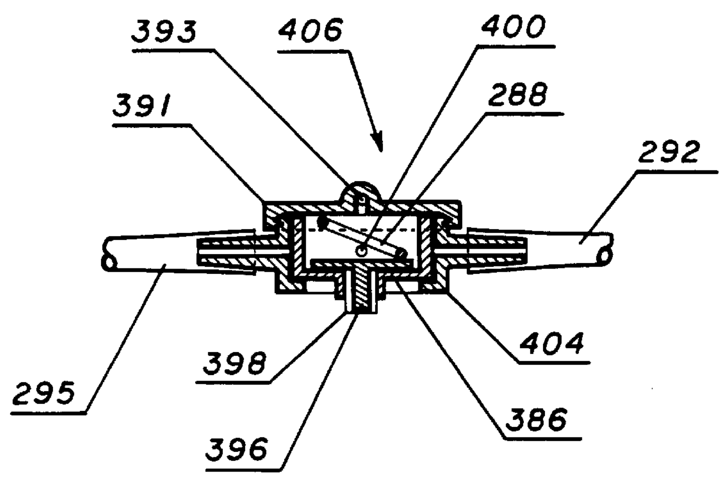
FIG. 102

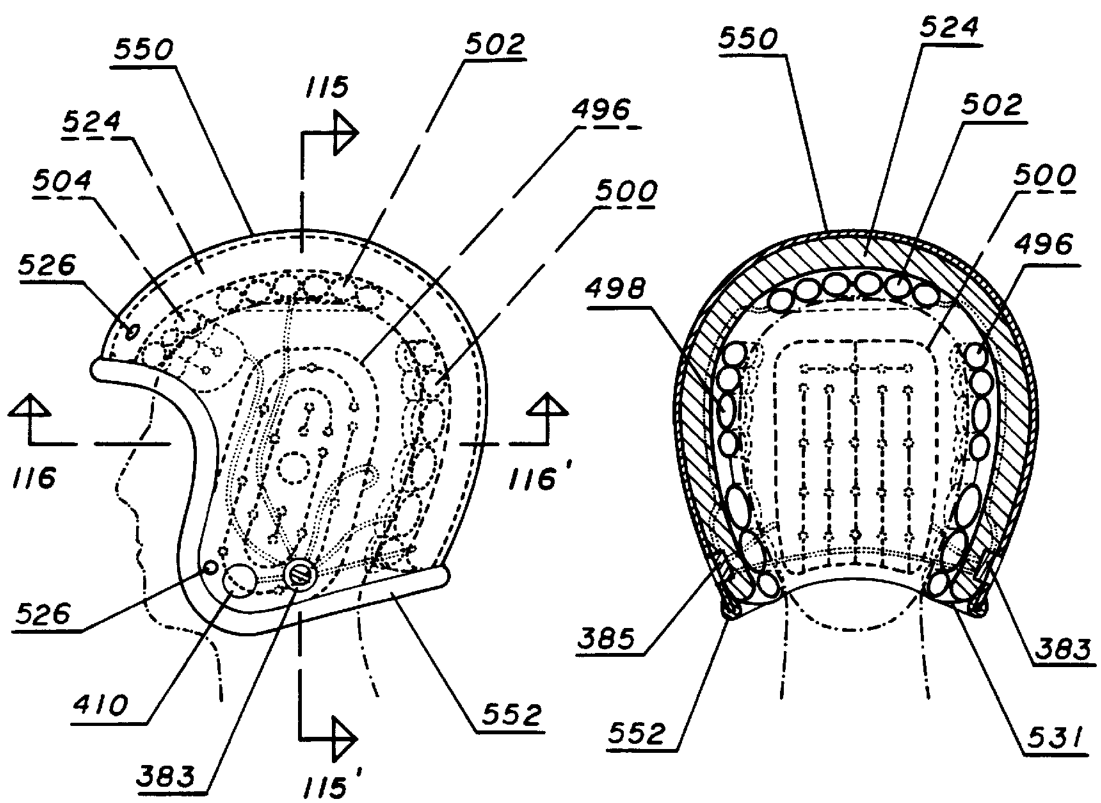
FIG. 114
FIG. 115
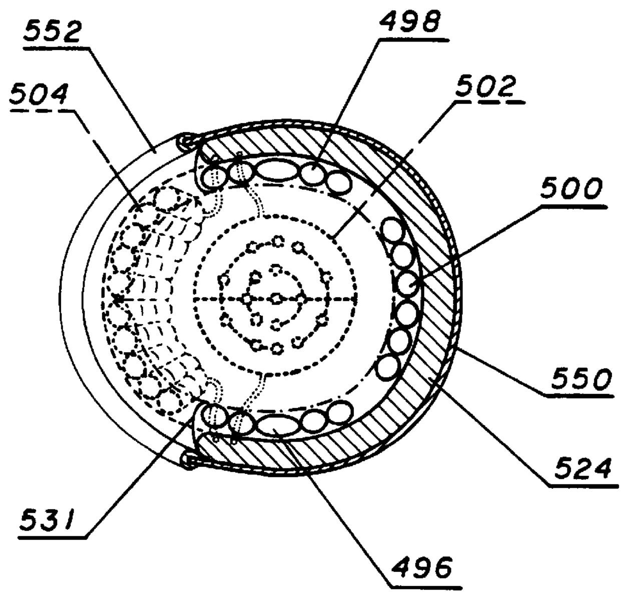
FIG. 116

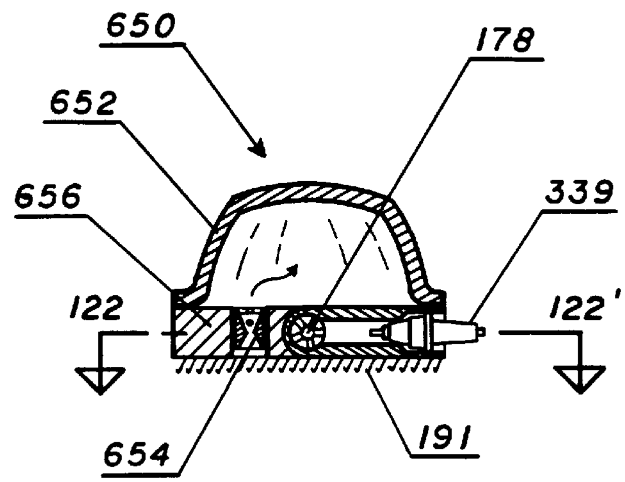
FIG. 123
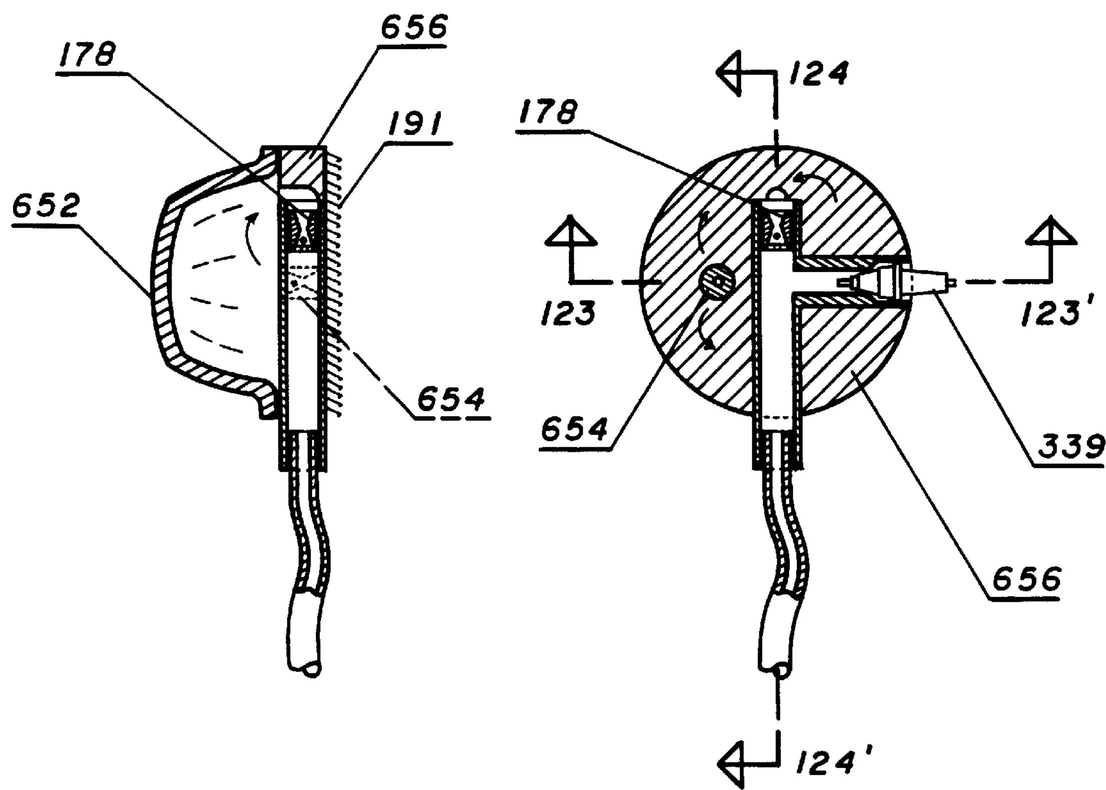
FIG. 124
FIG. 122

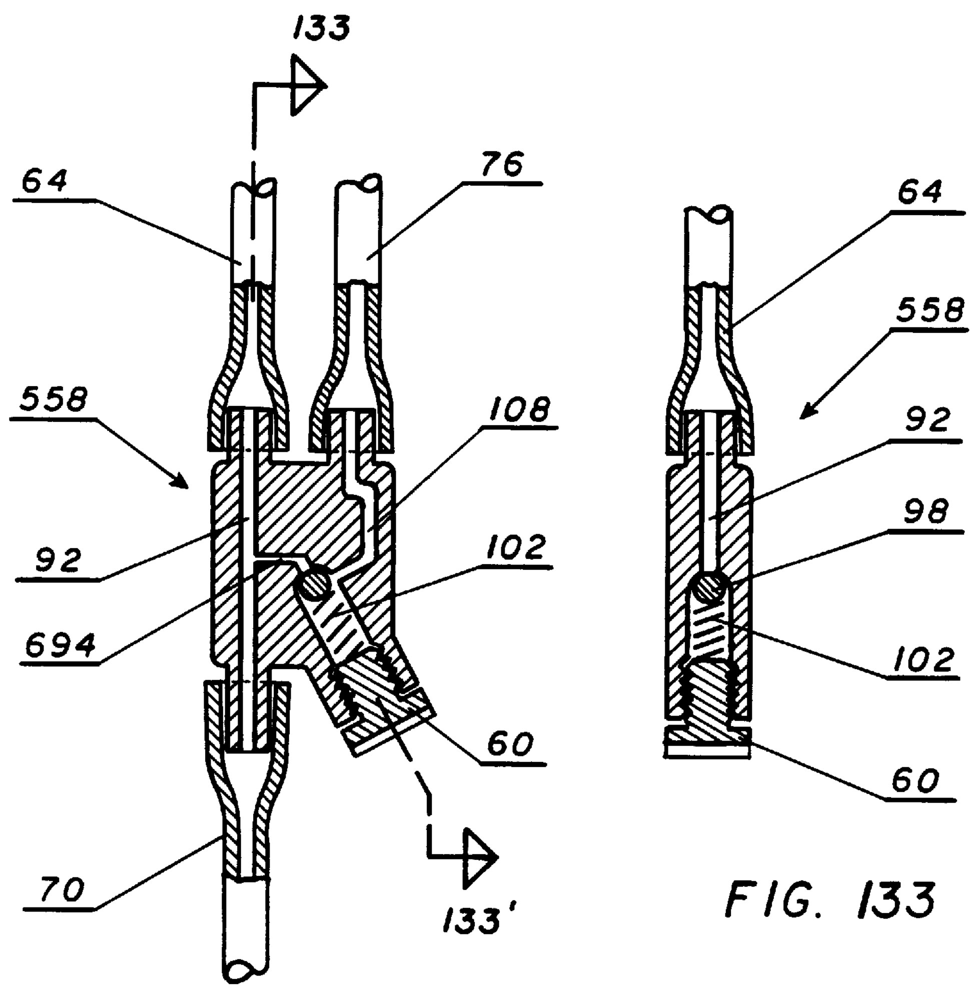
FIG. 132
FIG. 133
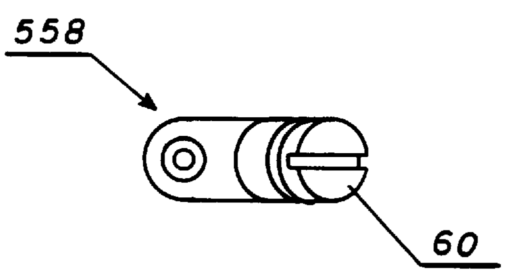
FIG. 134

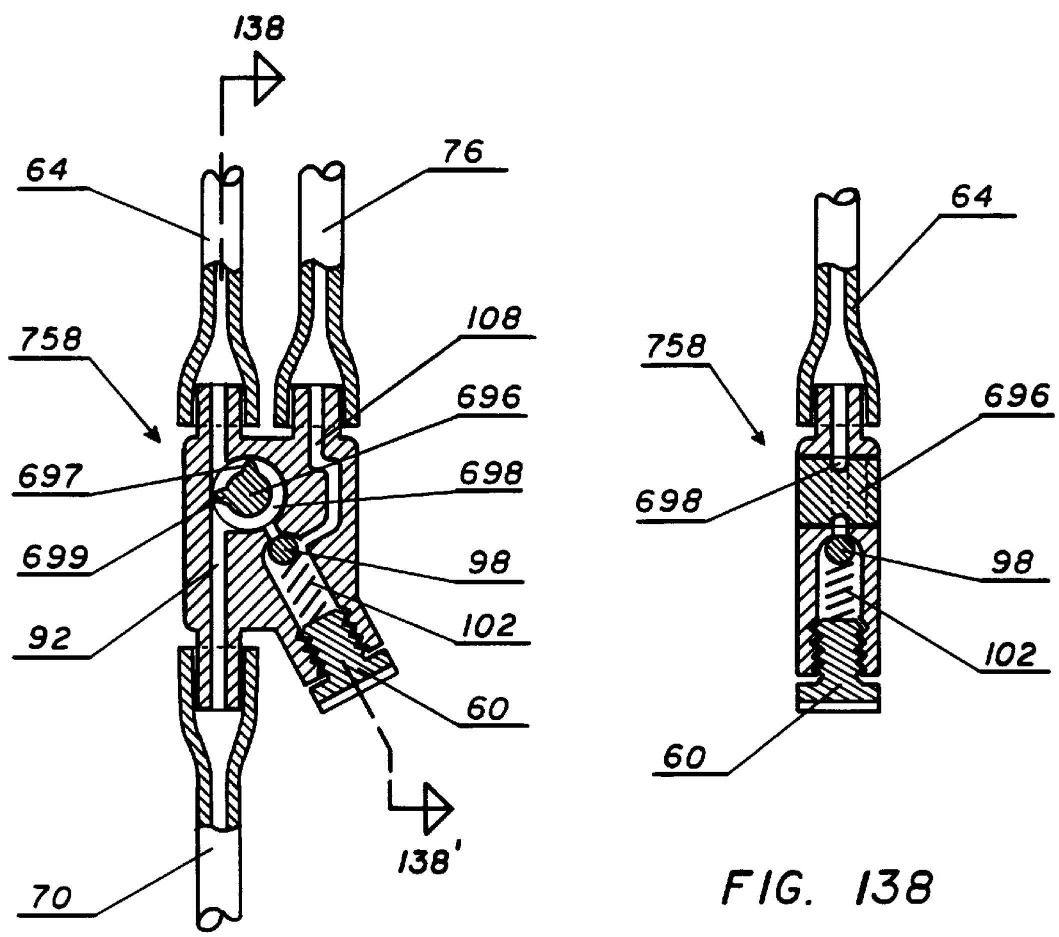
FIG. 138
FIG. 137
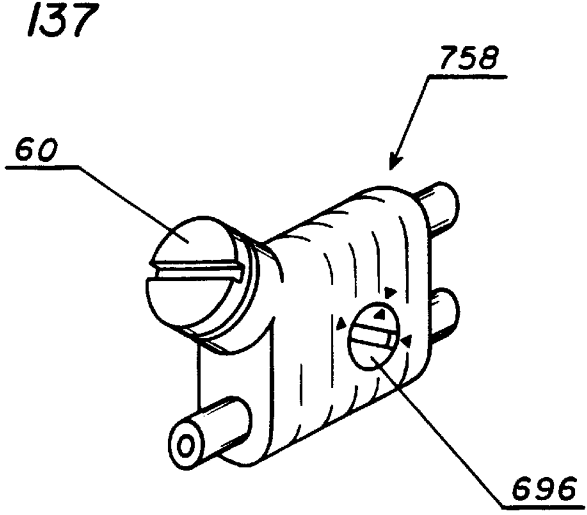
FIG. 139

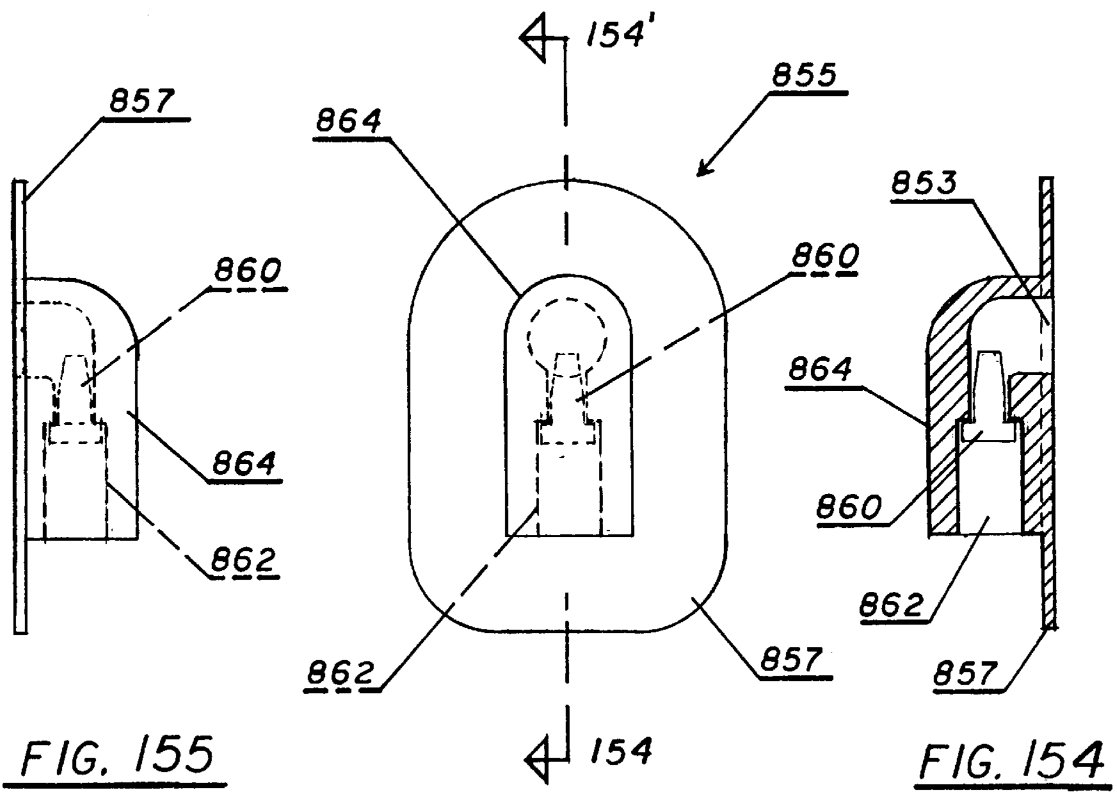
FIG. 155
FIG. 154
FIG. 153
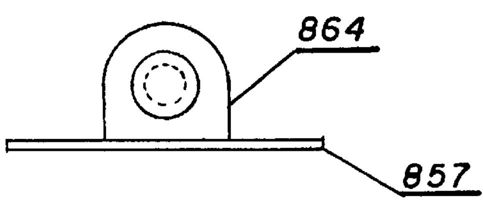
FIG. 156

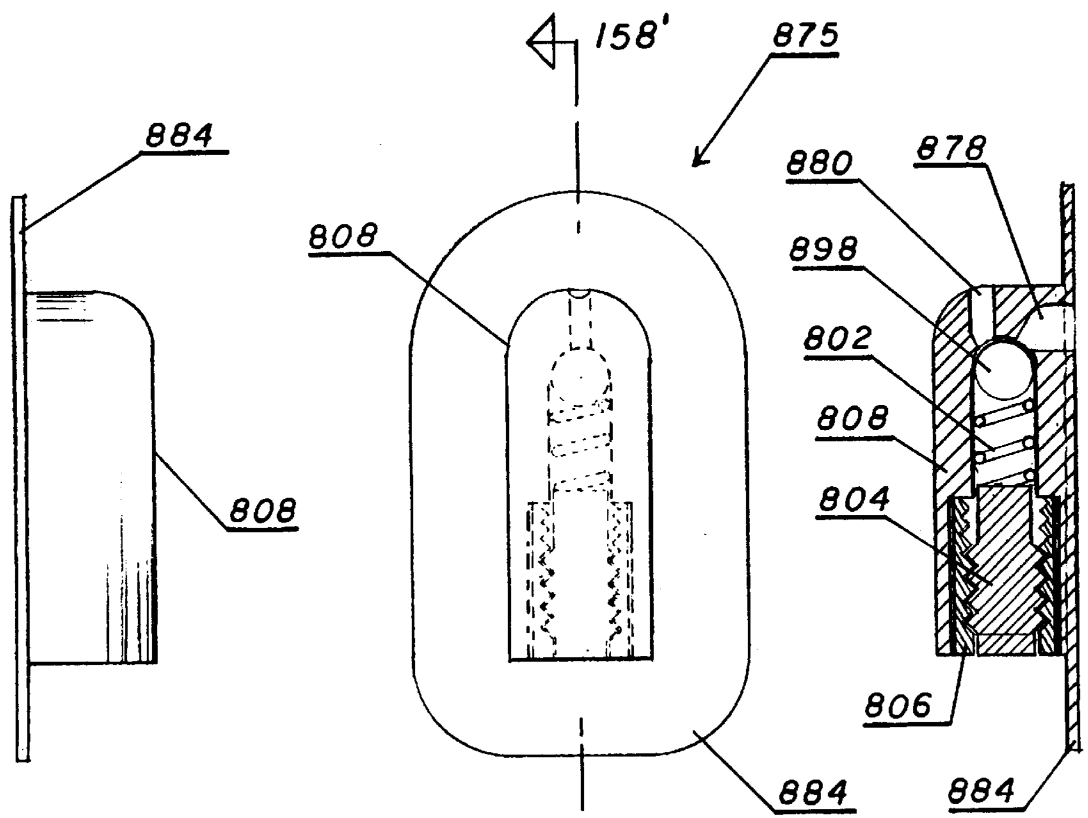
FIG. 159
FIG. 157
FIG. 158
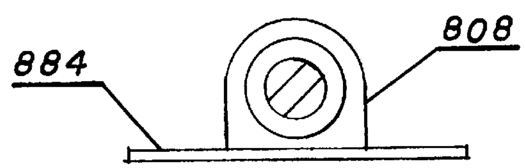
FIG. 160

859
860
861

850
172'
172
775

911
940
860
917
850
918
926

920
940
918
170
171
171'
170'
922
917
926

920
917
785
860
919
934
922
911
940
921
926
814
916
775
777
939
928

936
935
936
937
938

952
178'
962
178

952
958
962
960
956
954
926

960
962
952
948
176
177
177'
176'
922

960
926
936
935
960
958
785
922
960
934
921
948
936
926
937
938
916
939
928
954
919

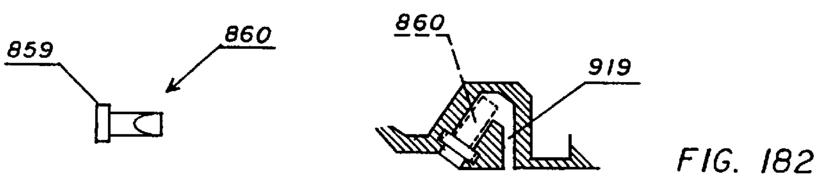
FIG. 183
FIG. 182
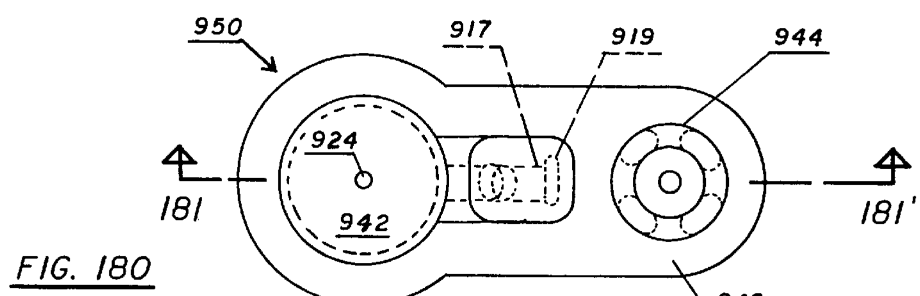
FIG. 180
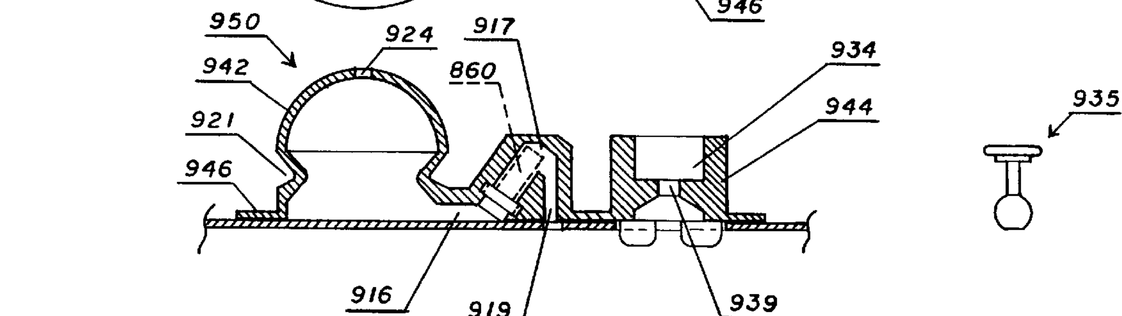
FIG. 181
FIG. 184

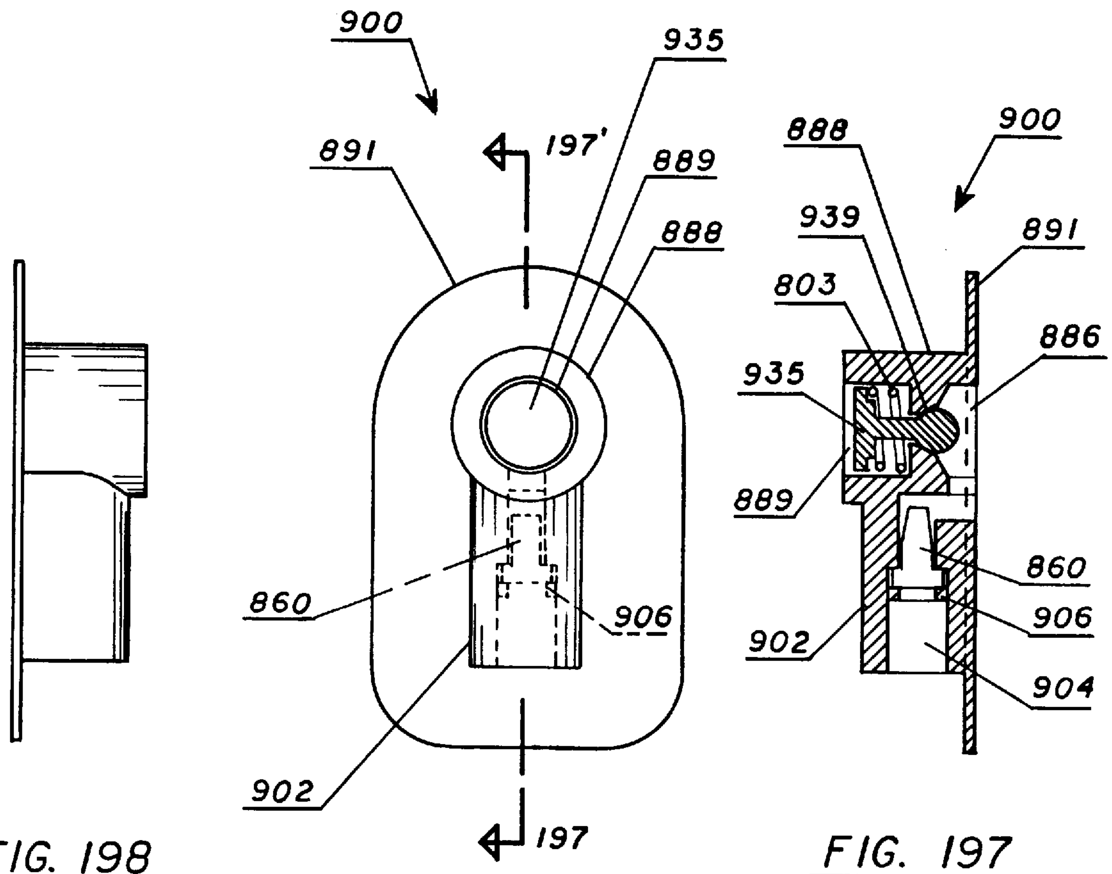
FIG. 198
FIG. 196
FIG. 197
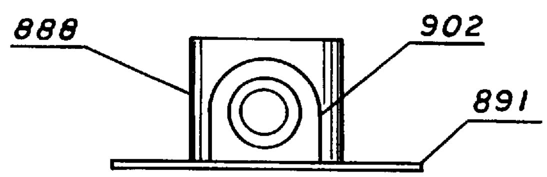
FIG. 199

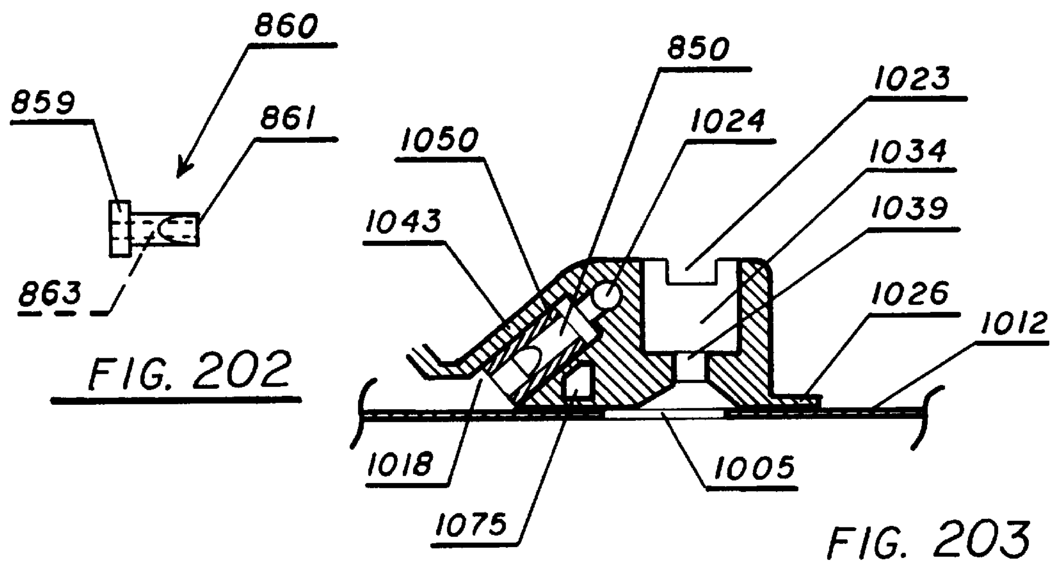
860
859
861
863
FIG. 202
850
1023
1024
1034
1050
1039
1043
1026
1012
1018
1005
1075
FIG. 203
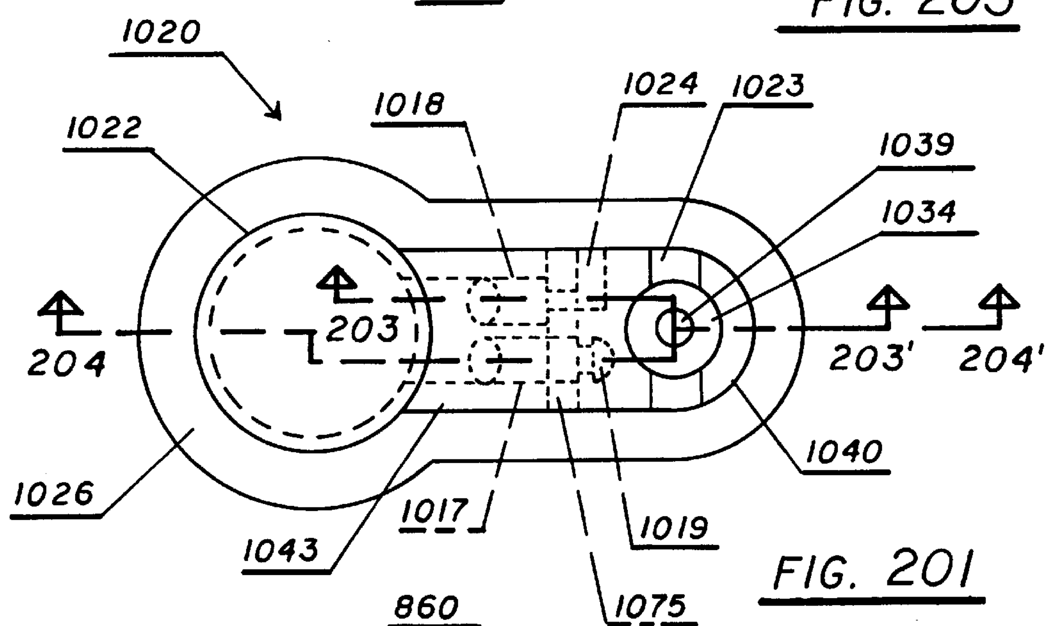
1020
1024
1023
1018
1022
1039
1034
203
204
203'
204'
1040
1026
1017
1019
1043
FIG. 201
1075
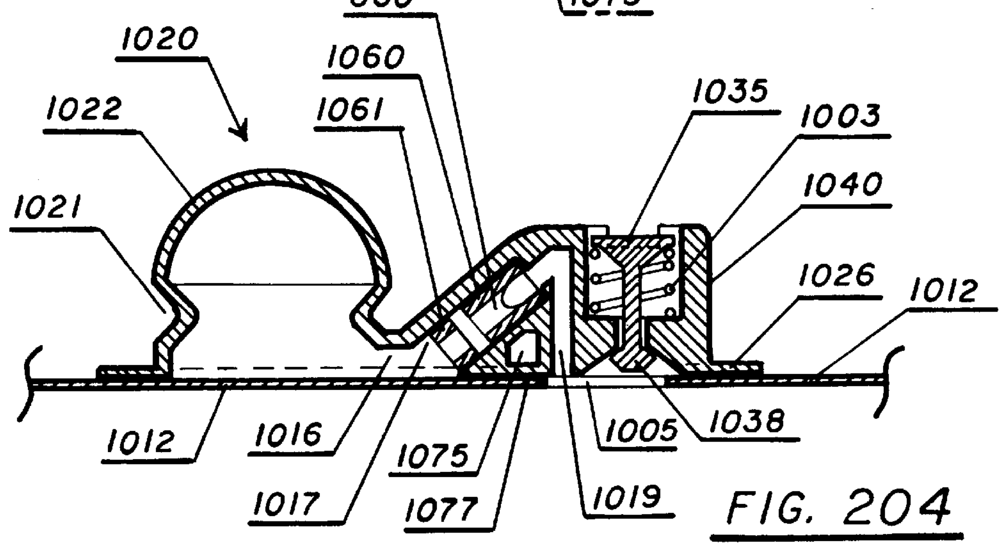
860
1020
1060
1022
1061
1035
1003
1040
1021
1026
1012
1012
1016
1075
1005
1038
1017
1077
1019
FIG. 204

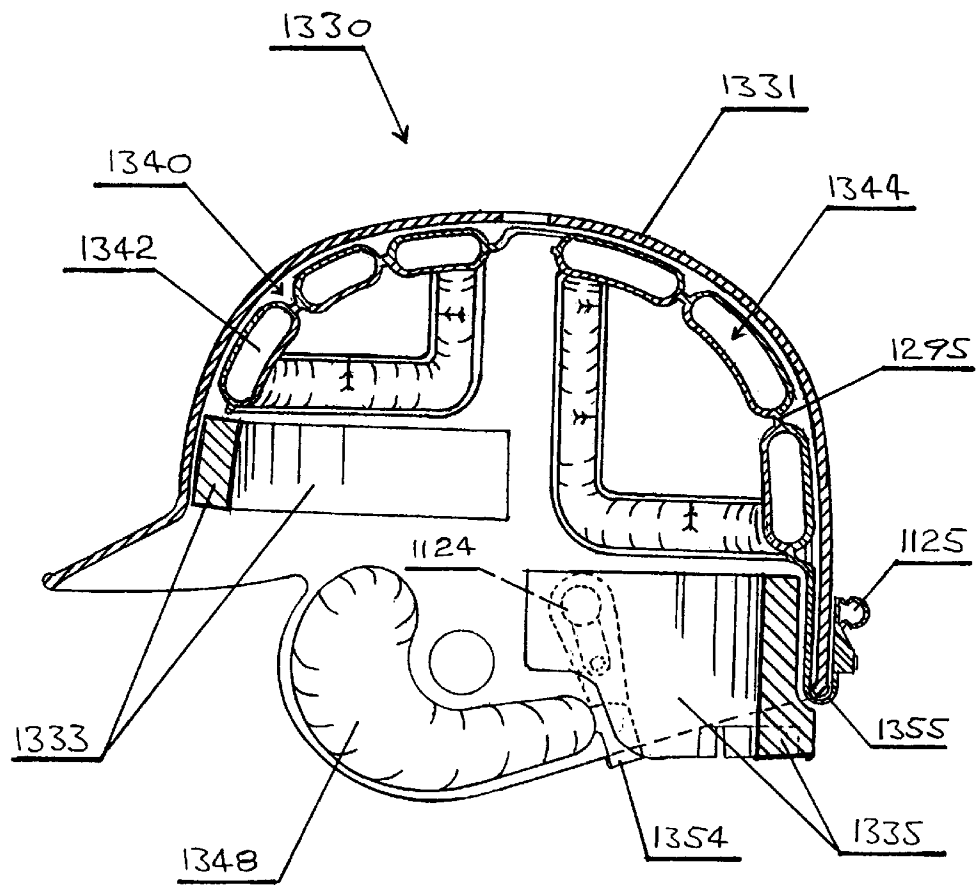
FIG. 239
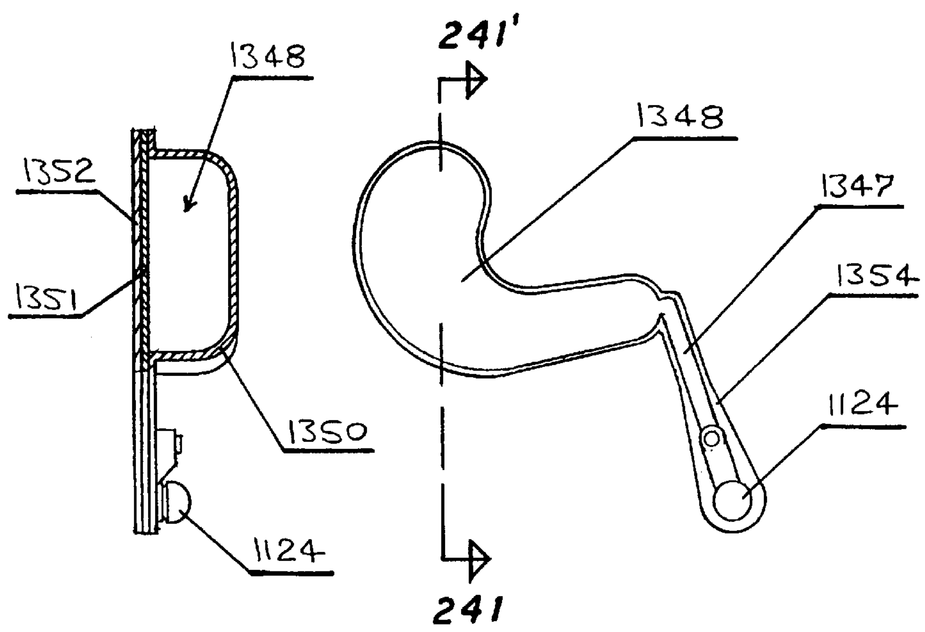
FIG. 241
FIG. 240

1333
1359
1295
1361
1362
1363

1342
1356
1126
1344
1365
1366
1367
1295
1360
1335
1355
1125

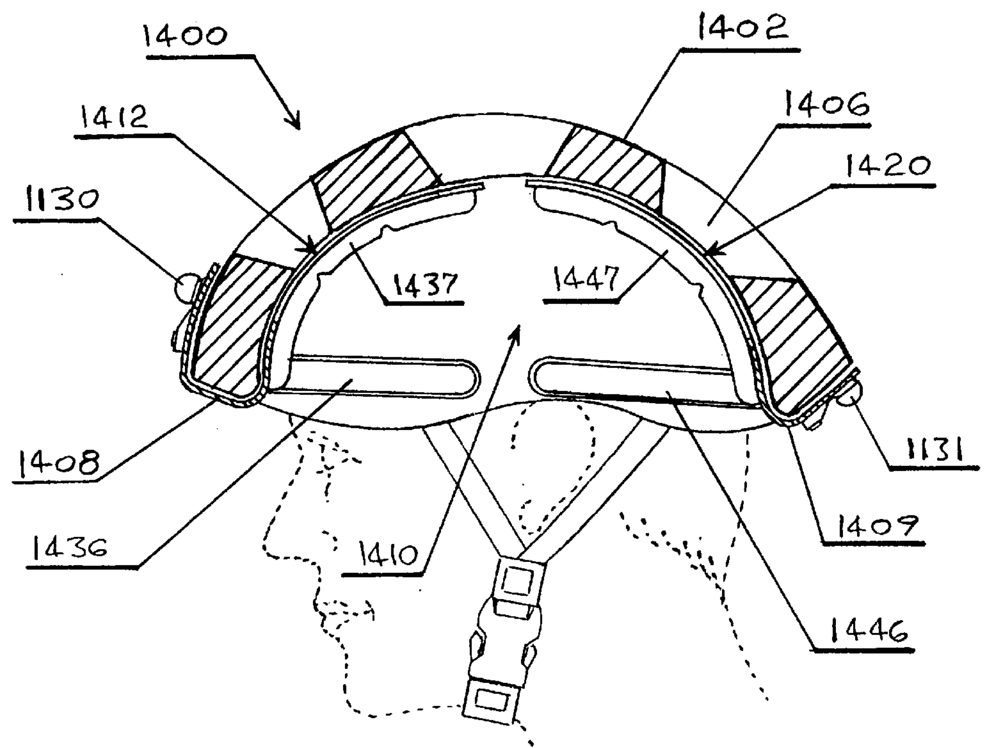
FIG. 249
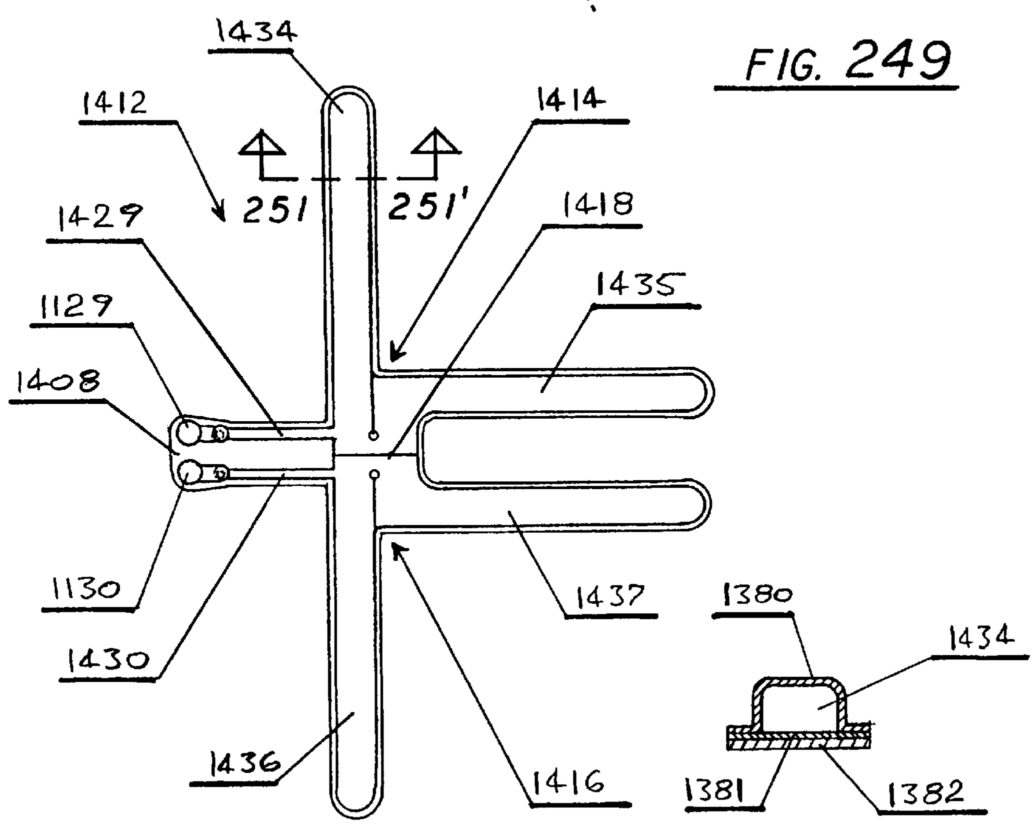
FIG. 250
FIG. 251

MINIATURE UNIVERSAL PUMP AND VALVE FOR INFLATABLE LINERS

RELATIONSHIP TO OTHER APPLICATIONS

This is a continuation-in-part of my Ser. No. 08/284,894, filed on Aug. 2, 1994 now abandoned, which is a continuation of Ser. No. 07/907,755 filed on Jun. 29, 1992 now abandoned which is a continuation of Ser. No. 07/754,059 filed on Sep. 3, 1991 now abandoned, which is a continuation-in-part of my earlier filed application, Ser. No. 07/636,603, filed on Dec. 31, 1990 now abandoned, which is a continuation-in-part of application, Ser. No. 07/539,978, filed on Jun. 18, 1990 now abandoned which is a continuation-in-part of application, Ser. No. 07/427,515, filed on Oct. 27, 1989, now U.S. Pat. No. 5,025,575, which is a continuation-in-part of my prior application, Ser. No. 07/323,340, filed on Mar. 14, 1989, now U.S. Pat. No. 4,991,317, which is c continuation-in-part of my prior application, Ser. No. 07/262,749, filed on Oct. 28, 1988 now abandoned, which is a continuation-in-part of my prior applications Ser. No. 07/230,908, filed on Aug. 11, 1988, now U.S. Pat. No. 4,941,271, and Ser. No. 07/177,410, filed Apr. 4, 1988, now U.S. Pat. No. 4,845,338, and Ser. No. 07/93,579, filed Sep. 4, 1987, now U.S. Pat. No. 4,823,482, and Ser. No. 07/54,189, filed May 26, 1987, now U.S. Pat. 4,782,602.

BACKGROUND OF THE INVENTION

1. Field Of The Invention

This invention relates to a miniature pump and relief valve and, in particular, to the combination of the miniature pump and relief valve with an inflatable lining for wearing apparel such as footwear, headgear and gloves and seats.

2. Brief Statement Of The Prior Art

Inner soles have been provided for shoes and boots which are formed of a compressible, elastic material such as cellular plastic foams, foam rubber, etc. These inner soles have provided only limited shock absorbency, resulting in little or no significant improvement in wearer comfort.

Some prior investigators have provided inner soles with inflated cushions at either the toe and heel areas, and some have provide cushions at both areas with circulation between the two cushions. The cushions have been provided with mechanisms to circulate air and ventilate the shoe or boot during walking activities. Examples of these are: U.K. Patents 2,189,679 and 357,391; U.S. Pat. Nos. 3,180,039, 2,716,293, 1,213,941 and German Patent 3,144,207.

In some foot apparel, notably in ski boots, an outer shell is molded from plastic and is lined with an inner shoe. Adjustment has been made to the tightness of the outer shell and air bags have been provided across the instep region of the shoe, and elsewhere, and have been provided with an air pump to pressure the air bags, thus forcing the foot against the sole and creating a snugness of the fit of the ski boot. U.S. Pat. No. 4,730,403 and German Patent 2,321,817 are representative of these ski boots.

A water-filled inner sole for shoes has recently been marketed under the tradename "Walk On Water". While this is an attempt to increase wearer comfort, water is heavy, non-compressible and the inner sole cannot be adjusted for firmness, and cannot provide shock absorbency. Additionally, water is unsuited for use in freezing climates. Also, a leak will wet the inside of the bootwear, and this inner is not breathable.

Another recently marketed innovation is that disclosed in U.S. Pat. Nos. 4,183,156; 4,340,626 and 4,817,304 in which an inflatable inner sole or sole insert is permanently inflated with halogenated hydrocarbon gases. Since it is impossible to preclude diffusion of gases through the plastic, the inflatable insert or inner sole is acknowledged to experience a rapid increase in pressure shortly after manufacture, followed by a slowly declining pressure, thus failing to provide a stable condition. The pressure of the inflatable member also can not be adjusted by the wearer for varying conditions of use and comfort.

None of the aforementioned prior devices provides a simple, inexpensive solution to comfortable wear and walking in a shoe or boot. The foam inner soles have only a limited value and limited shock absorbency. The remainder of the prior devices, including the pressurization system for ski boots are relatively complex and costly and are often too bulky and cumbersome. Consequently, these devices are not readily acceptable for everyday activities.

Headgear such as helmets for sports, particularly football helmets have been provided with inflatable liners to improve the fit. These liners, however, require use of an extraneous air pump, and have not utilized multiple compartments, nor flexibility in adjustment of air pressure.

OBJECTIVES OF THE INVENTION

It is an objective of this invention to provide a miniature air pump and relief valve assembly which is useful with inflatable linings for apparel and protective gear such as gloves, shoes, seats, helmets and shields or splints.

It is also an objective of this invention to provide a preform useful to form a miniature air pump and relief valve.

It is a further objective of this invention to provide a preform which forms a miniature air pump and relief valve when assembled to an inflatable enclosure formed of flexible plastic sheets.

It is an additional objective of this invention to provide a method for forming a miniature air pump and relief valve in assembly to an inflatable enclosure formed of flexible plastic sheets.

It is an objective of this invention to provide an inflatable lining for apparel and protective gear such as gloves, shoes, seats, helmets and shields or splints with an integral air pump for pressurization.

It is also an objective of this invention to provide the aforementioned inflatable lining with a plurality of compartments which are provided with independent pressure control valves whereby the pressure, and hence softness of the lining of each compartment can be controlled.

It is an added objective of this invention to provide a single valve which can be used to connect, individually, each of the multiple compartments of the lining to the inflation pump, and/or to a pressure relief valve whereby the pressure in each compartment can be separately adjusted and controlled.

It is a further objective of this invention to provide the aforementioned inflatable lining with an inexpensive construction.

It is an additional objective of this invention to provide an inflatable lining which is subdivided into separated sealed chambers, each of which is provided with a pressure control valve, and/or a separate air pump.

It is also a further additional objective of this invention to provide an inflatable lining with an integral air pump which can be operated manually.

It is also a further objective of this invention to provide the inflatable lining of the invention with a valve having a sleeve connector which can be used for the attachment of an extraneous source of a gas under pressure such as an air compressor, compressed gas cartridge, etc.

It is still a further objective of this invention to provide a light weight, shock-absorbing resilient lining which enhances the fit, stability and comfort of the wearing apparel and protective gear to the wearer and customizes the apparel and protective gear to the wearer.

It is also an additional objection of this invention to provide an inflatable inner sole for footwear such as shoes, boots and sandals, having an arch pillow and a contour conforming to the wearer's foot, which preferably will massage the wearer's foot.

It is also a further objective of this invention to provide an inflatable lining which includes an inflatable inner sole.

It is a further objective of the invention to provide the aforementioned lining for footwear with the air pump strategically located such that the normal walking activities will inflate and pressurize the inflatable lining, and if desired, induce forced air circulation through the footwear.

It is a further additional objective of this invention to provide air circulation channels and apertures in the aforementioned inner sole and/or upper lining whereby normal walking activities will force air circulation through the inner sole and footwear.

It is another further additional objective of this invention to provide an inflatable lining for the sole, or uppers, or both, which can be inserted into footwear.

It is another objective of this invention to provide a liner for footwear such as a shoe or boot that provides an inflatable inner sole and an inflatable upper lining which also can be pressured with an air pump and which can provide forced air circulation through a boot.

It is another further objective of this invention to provide a liner for footwear such as a shoe or boot that provides an inflatable upper lining which is pressured with an air pump to a pressure controlled with a pressure relief valve.

It is yet another objective of this invention to provide footwear with an inflatable inner sole having an air pump which has an internal spring to facilitate its pumping action, and to enhance the shock absorbency and resiliency of the footwear.

It is still another objective of this invention to provide the aforementioned air pump with an internal spring which can be replaced to provide adjustable spring force to accommodate varied weights of wearers and special activities.

It is yet another objective of this invention to provide an outer sole which can be inflated to impart a controllable degree of firmness and contact or grip of the outer sole to the ground surface.

It is a still further objective of this invention to provide the inflatable liners and outersoles of this invention as thermal insulation for footwear.

Other and related objectives will be apparent from the following description of the invention.

BRIEF DESCRIPTION OF THE INVENTION

This invention comprises a preform for an air pump and relief valve assembly which has an assembly body with a substantially flat bottom and molded entirely of a flexible plastic to form a bulbous extremity on one end of the body and open at its bottom and a relief valve recess adjacent the opposite end of said body and open to a valve port in said bottom wall with at least one, and preferably two, internal passages open to the interior of the bulbous extremity and extending through said assembly body to a second port open at the bottom wall, with a substantially planar base flange extending about said body and peripherally about said bulbous extremity and said relief valve recess. The preform can be sealed to a flat sheet of plastic to complete the pump and relief valve and for this purpose has a transverse tunnel located between said internal passage and the bottom wall. The invention includes a method for assembling and bonding the preform to an inflatable enclosure formed of two sheets of flexible plastic, and the inflatable enclosure with a miniature air pump and relief valve as applied to a lining for apparel and protective shields.

BRIEF DESCRIPTION OF THE DRAWINGS

The invention will be described with reference to the figures of which:

FIGS. 10, 11 and 12 are views of the adjustable pressure control valve used in the invention;

FIGS. 90 through 99 illustrate footwear with an inflatable upper liner and inflatable inner sole having an air pump in the heel, each with multiple chambers and with two switching valves to connect the chambers to the air pump and/or a pressure control valve;

FIGS. 100 through 102 illustrate alternative constructions for a single switching valve useful with the embodiment shown in perspective view in FIG. 90;

FIGS. 111–117 illustrate the inflatable lining of the invention applied to a helmet;

FIGS. 122 to 124 illustrate an alternative pump which can be used for the seat liner of FIG. 121;

FIGS. 132 to 134 are views of an adjustable pressure control valve similar to that shown in FIGS. 10 to 12

FIG. 135 is a sectional view of an alternative pressure control valve similar to that shown in FIG. 132;

FIG. 136 and 137 show difference positions of the valve member of the control valve shown in FIG. 135;

FIG. 138 is a sectional view along line 138–138' of FIG. 137;

FIG. 139 is a perspective view of the adjustable relief valve shown in FIGS. 135–138;

FIGS. 153–156 are views of the discharge check valve assembly.

FIGS. 157–160 are views of the automatic adjustable relief valve assembly.

FIGS. 180–184 Illustrate another alternative of the pump, check valve and relief valve assembly.

FIGS. 185 and 186 illustrate an alternative inflatable sole insert.

FIGS. 187 and 188 illustrate an alternative inflatable sole insert.

FIGS. 189 and 190 illustrate another alternative of an inflatable sole insert.

FIG. 191 is a sectional view of a flexible bulb.

FIG. 192 illustrates an exploded perspective view of an air pump with the bulb of FIG. 191.

FIG. 193 is a sectional view of an alternative flexible bulb for an air pump.

FIGS. 194 and 195 are exploded perspective views of an air pump with the flexible bulb of FIG. 193.

FIGS. 196–199 are views of the check valve and relief valve assembly which is illustrated in FIGS. 189–195.

FIG. 200 is a perspective view of the washable pouch for any of the previously described inflatable soles.

FIGS. 201–212 illustrate universal miniature pump and relief valve assembly 1020 as one unit, for all inflatables.

FIGS. 201–204 illustrate universal miniature pump and relief valve assembly heat sealed to a flexible plastic sheet 1012.

Figure 205:
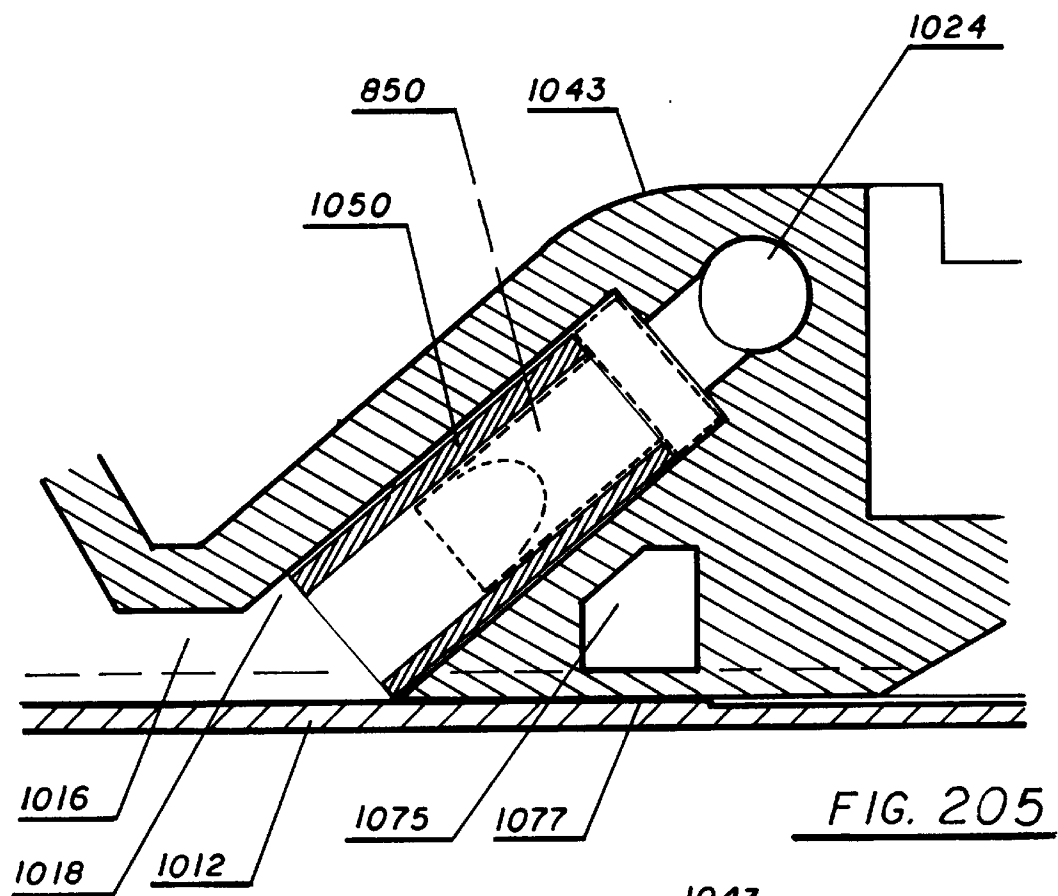
Figure 206:
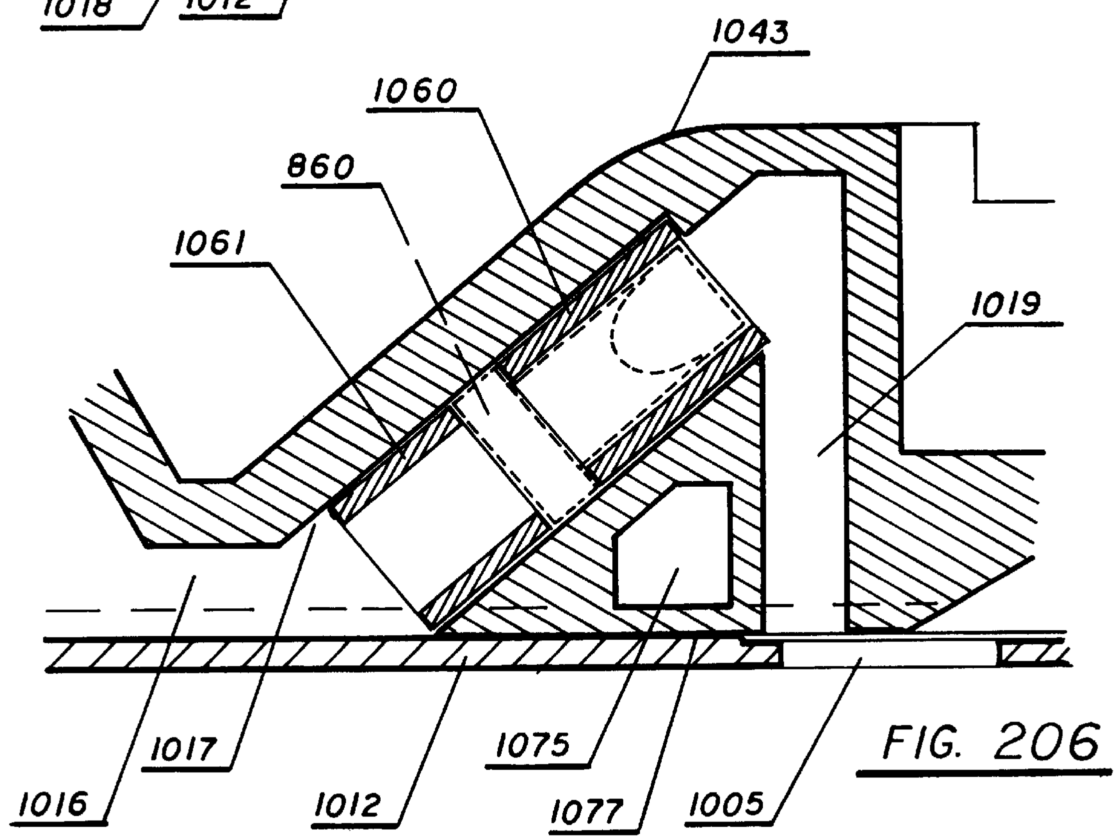

FIGS. 205–206 are enlarged views of a portion of FIGS. 201–204.

Figure 207:
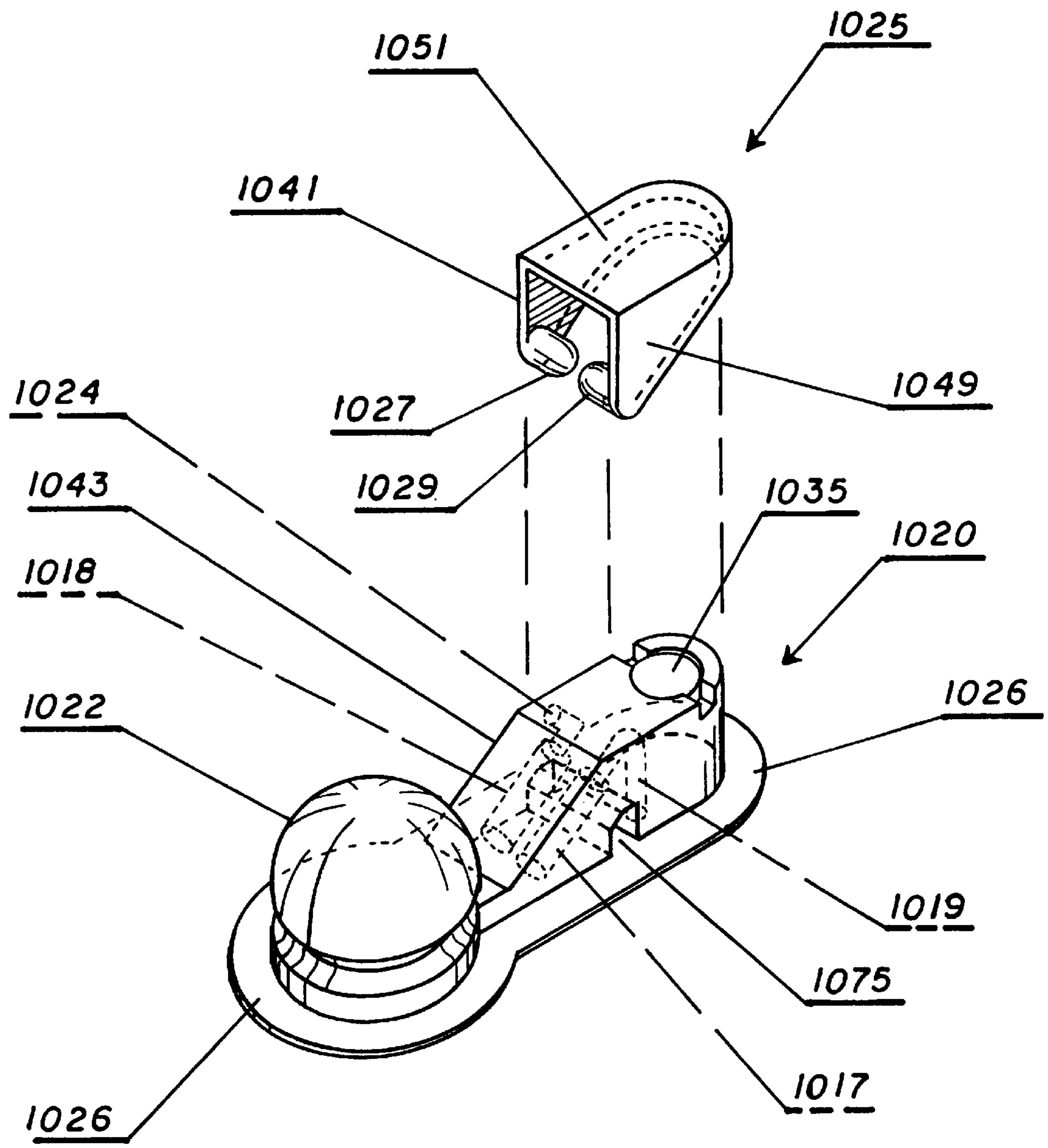

FIG. 207 is an exploded perspective view of the universal miniature pump and relief valve assembly and cover.

Figure 208:
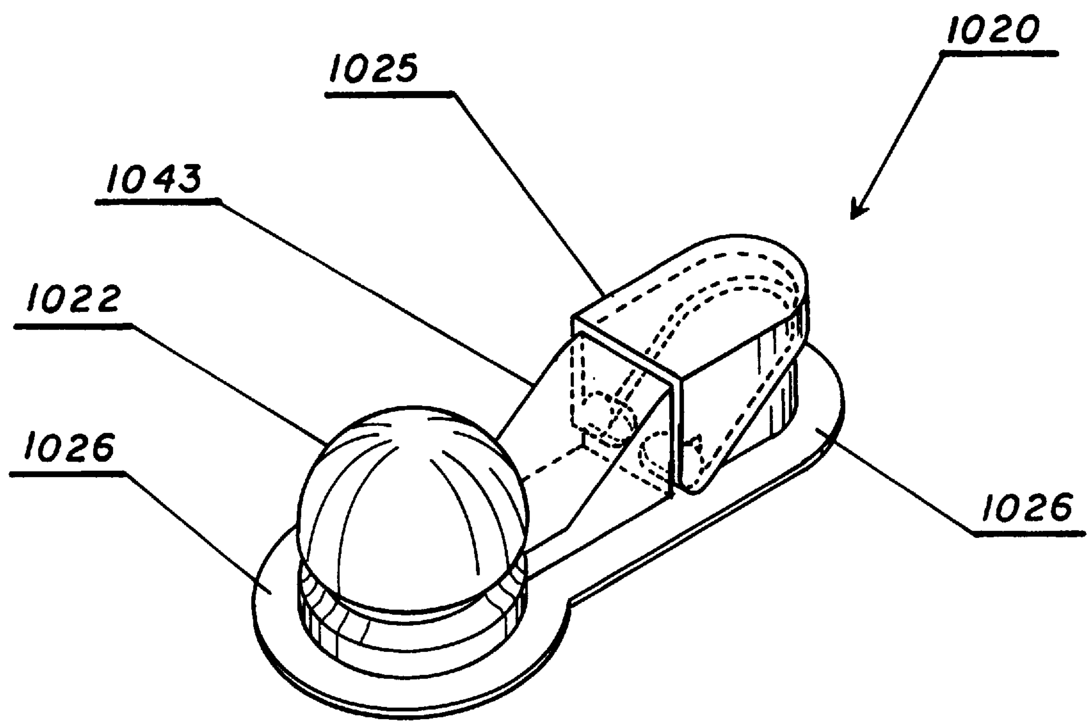

FIG. 208 is a perspective view of the assembled universal miniature pump and relief valve assembly.

Figure 209:
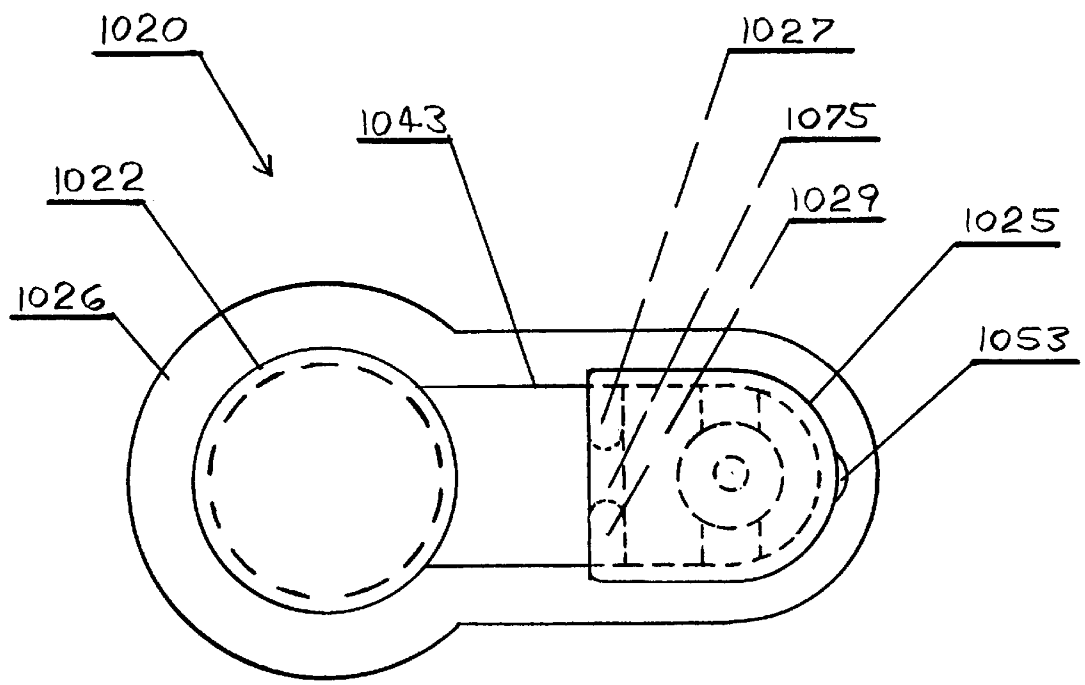

FIG. 209 is a plan view of the universal miniature pump and relief valve assembly.

Figure 210:
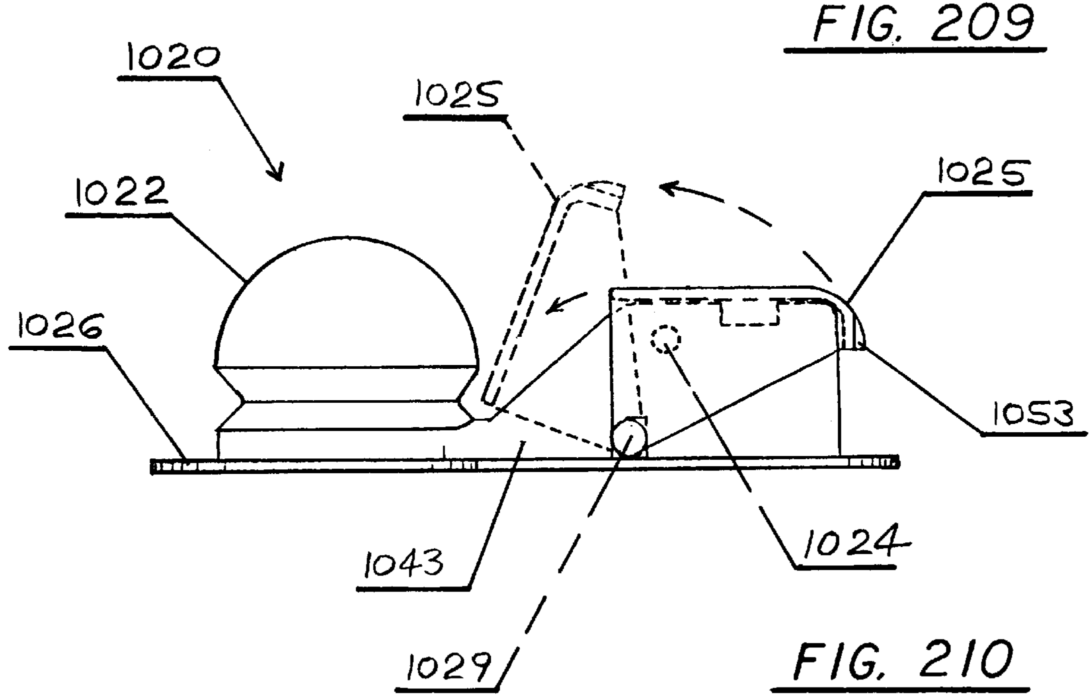

FIG. 210 is a side view of the universal miniature pump and relief valve assembly.

Figure 211:
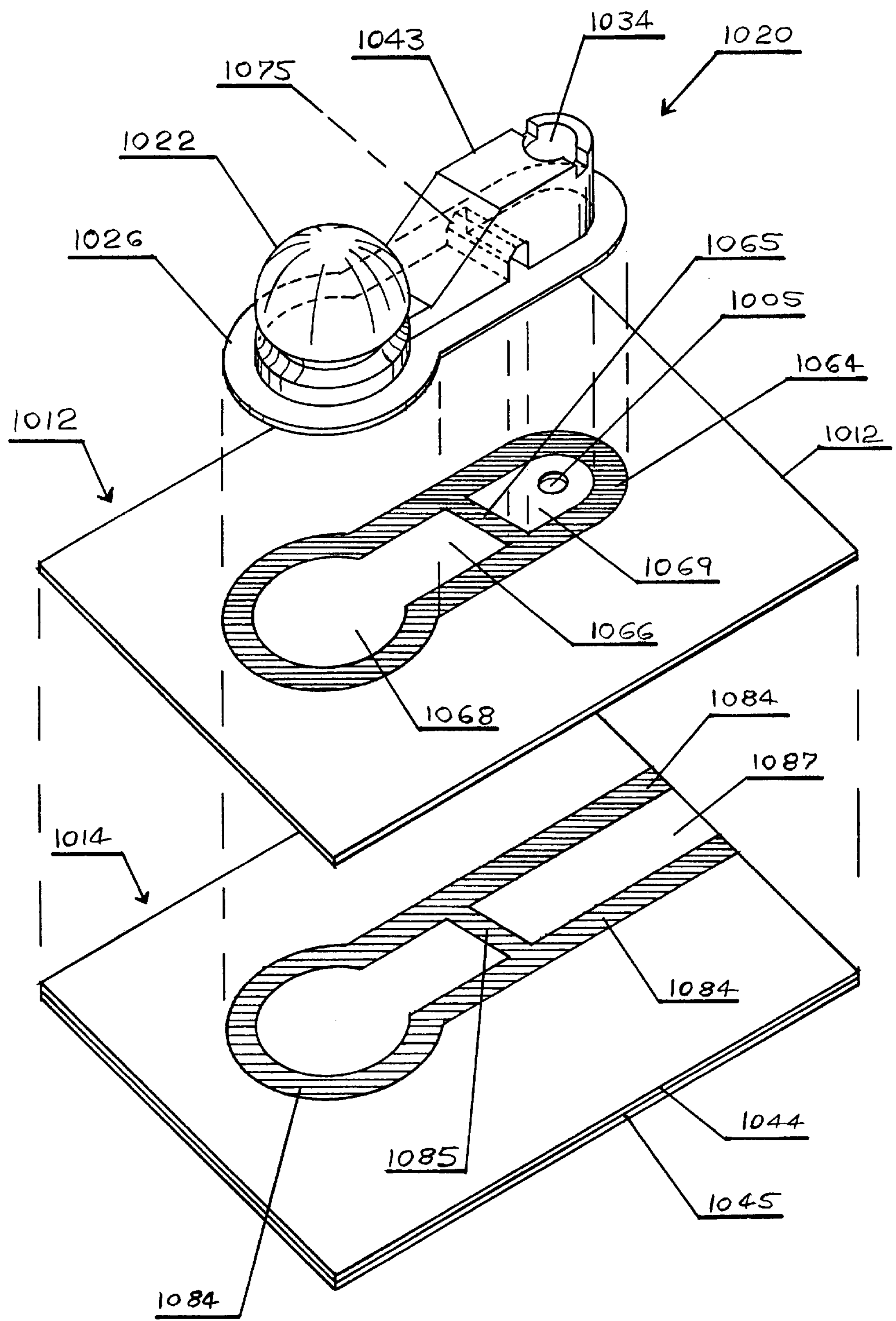

FIG. 211 is a perspective exploded view of the universal miniature pump and relief valve assembly and the first and second flexible plastic sheets of the inflatable liner.

Figure 212:
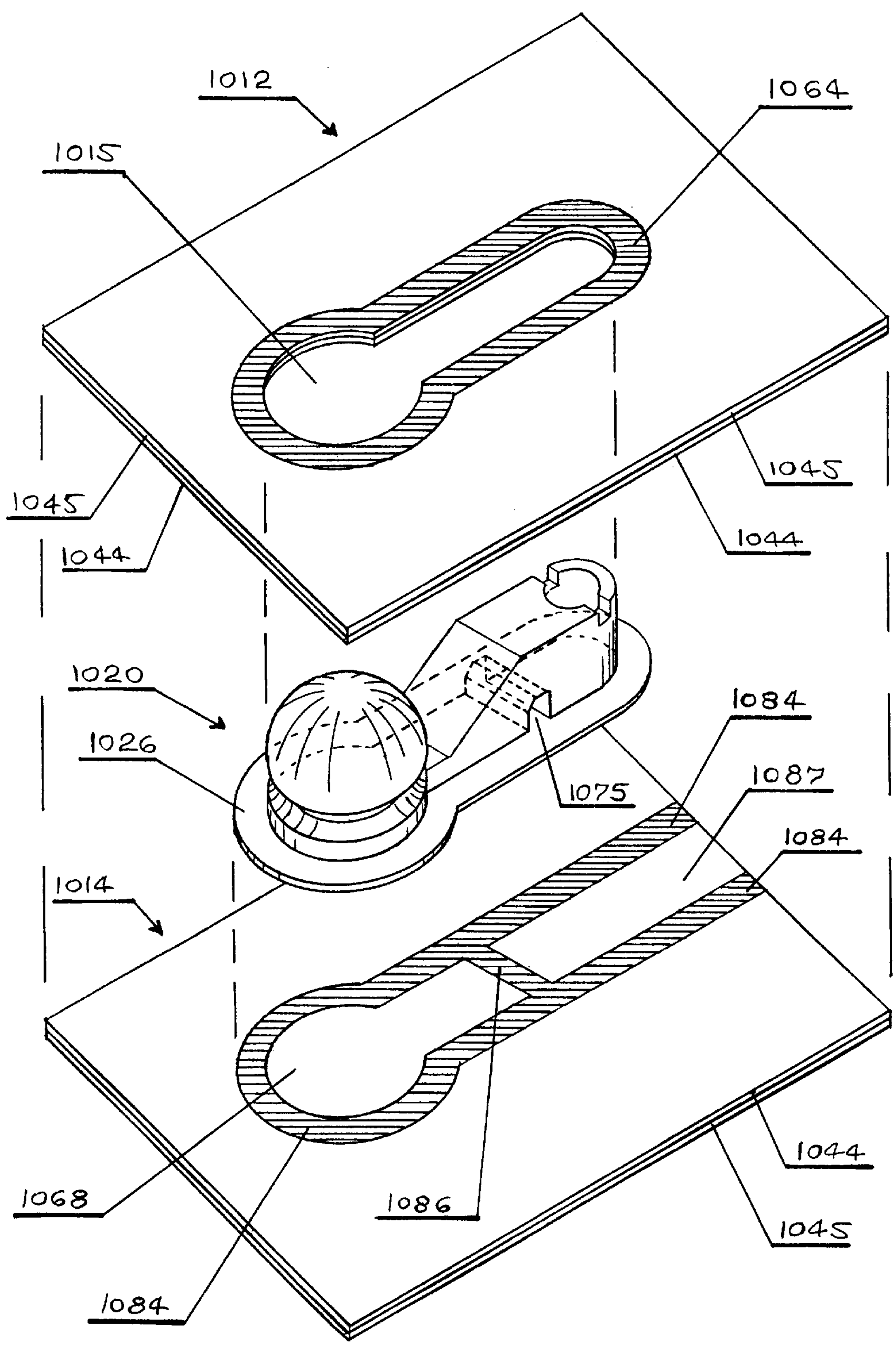

FIG. 212 is a perspective exploded view of an alternative assembly of the universal miniature pump and relief valve assembly 1020, and first and second flexible plastic sheets of the inflatable liner.

Figure 213:
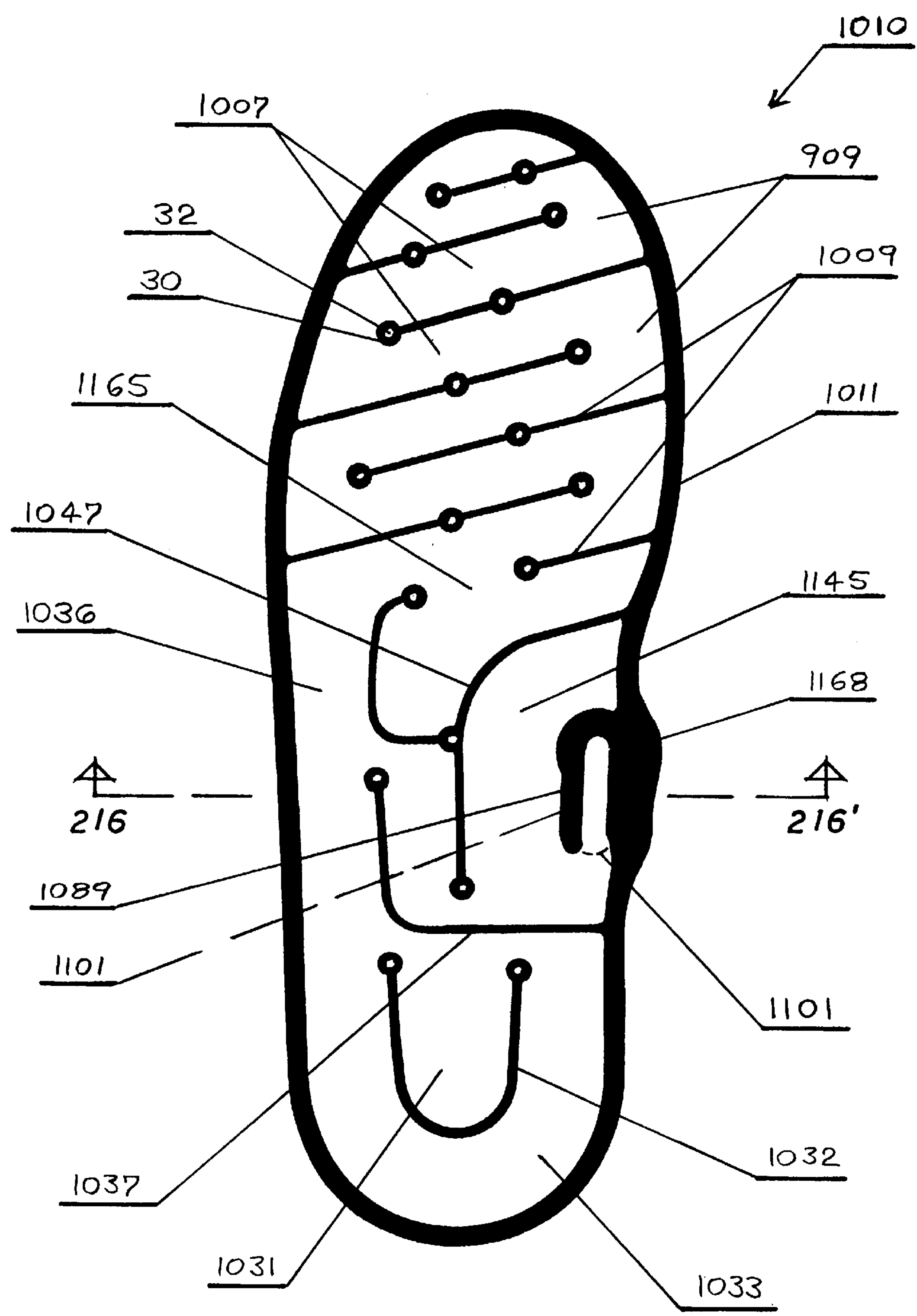

FIG. 213 illustrates an inflatable sole insert for footwear with the miniature pump and valve of the invention.

Figure 214:
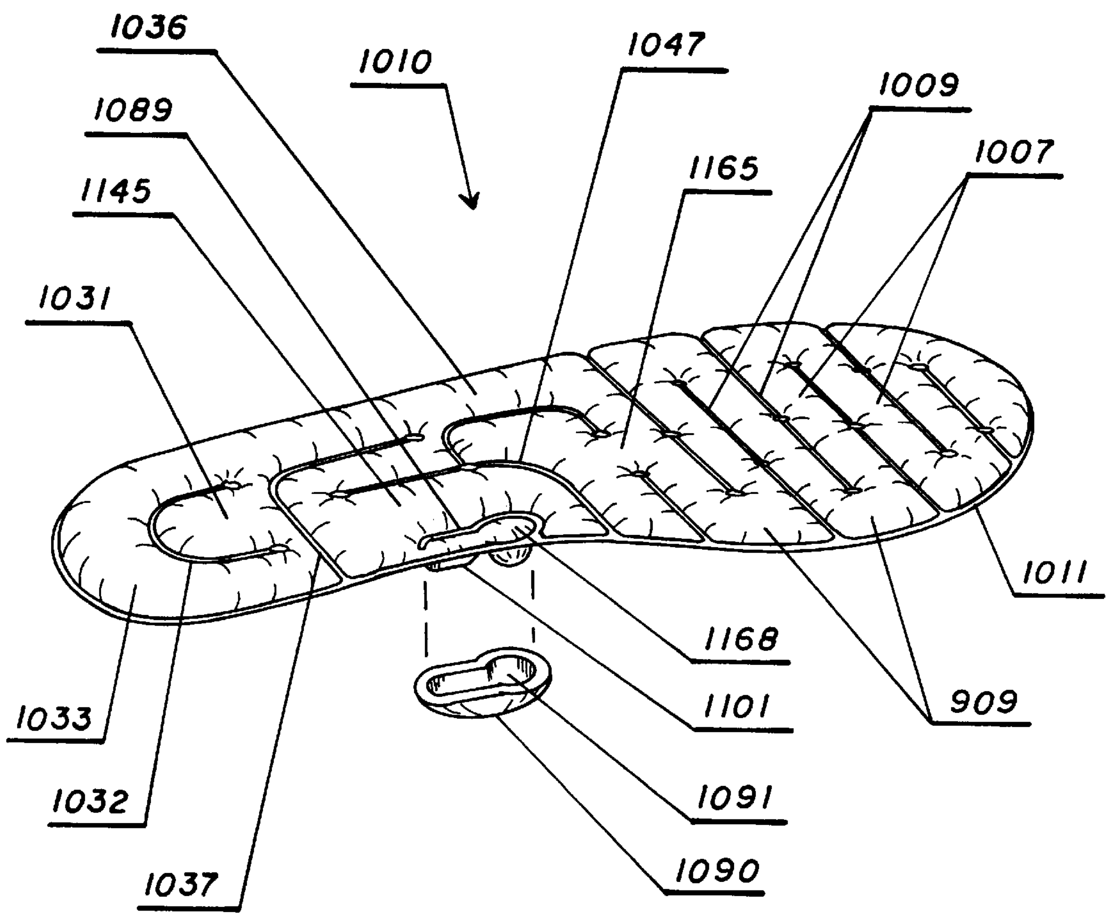

FIG. 214 is a perspective view of the inflatable insole shown in FIG. 213.

Figure 185:
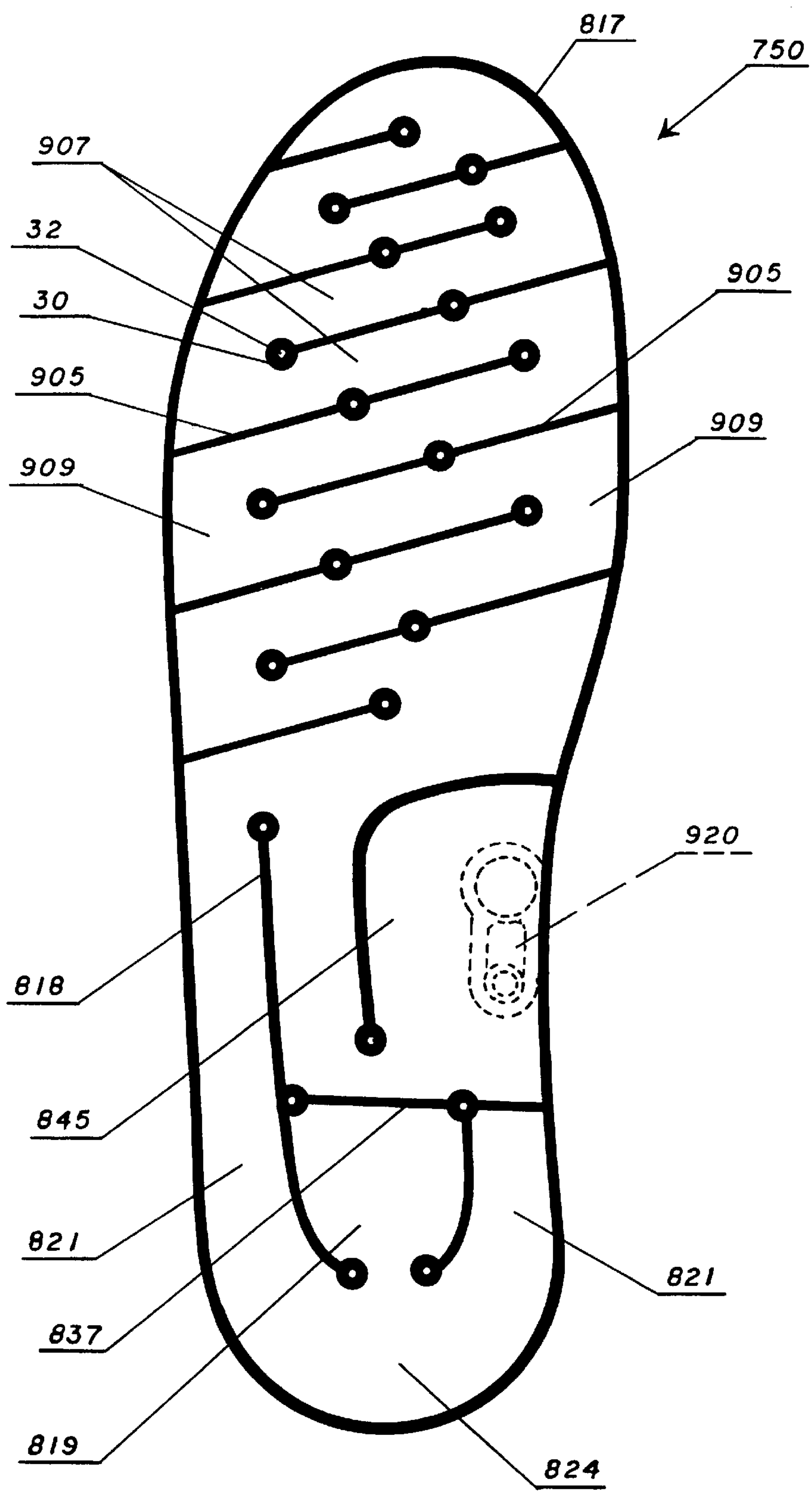
Figure 215:
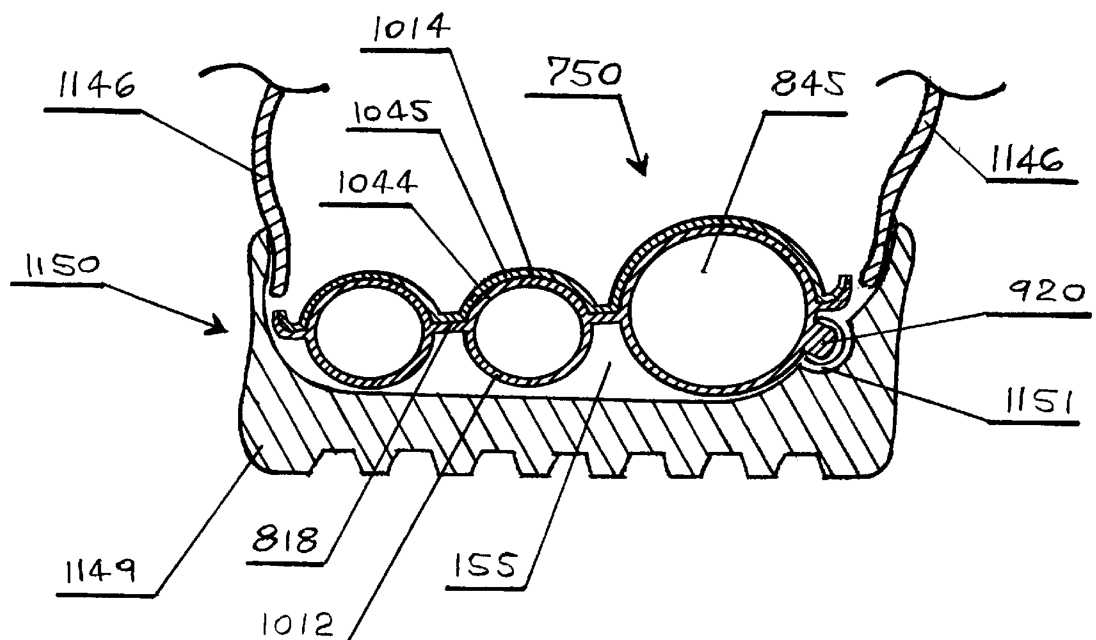

FIG. 215 is a sectional view of the inflatable sole of FIG. 185 inserted in footwear.

Figure 216:
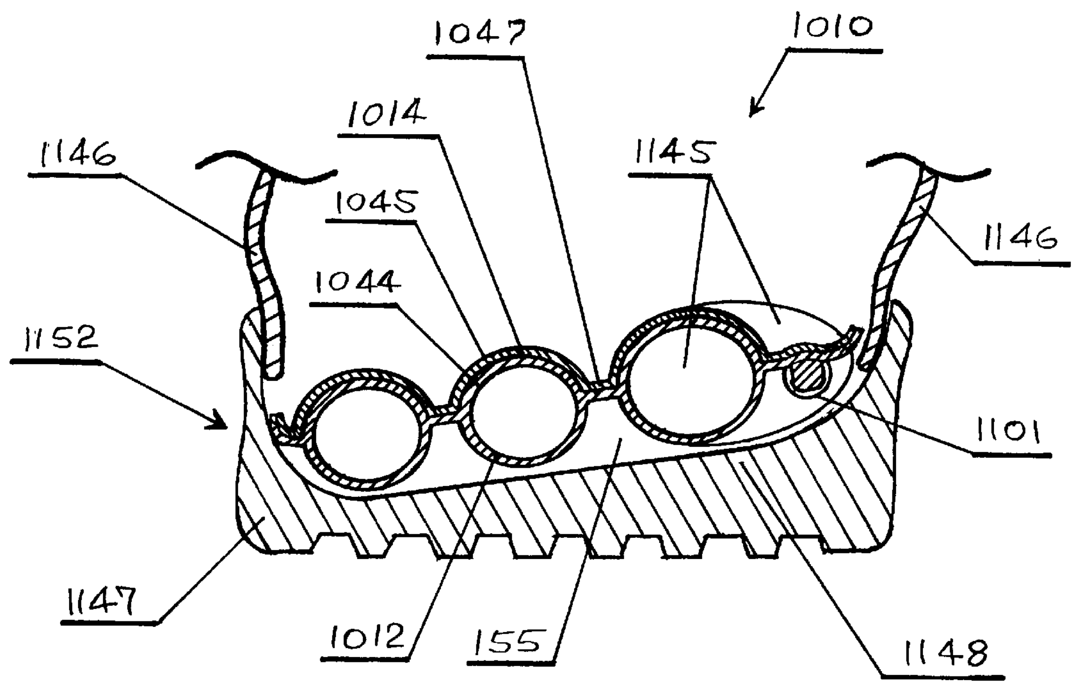

FIG. 216 is a sectional view of the alternative inflatable sole shown in FIG. 213 inserted in footwear.

Figure 217:
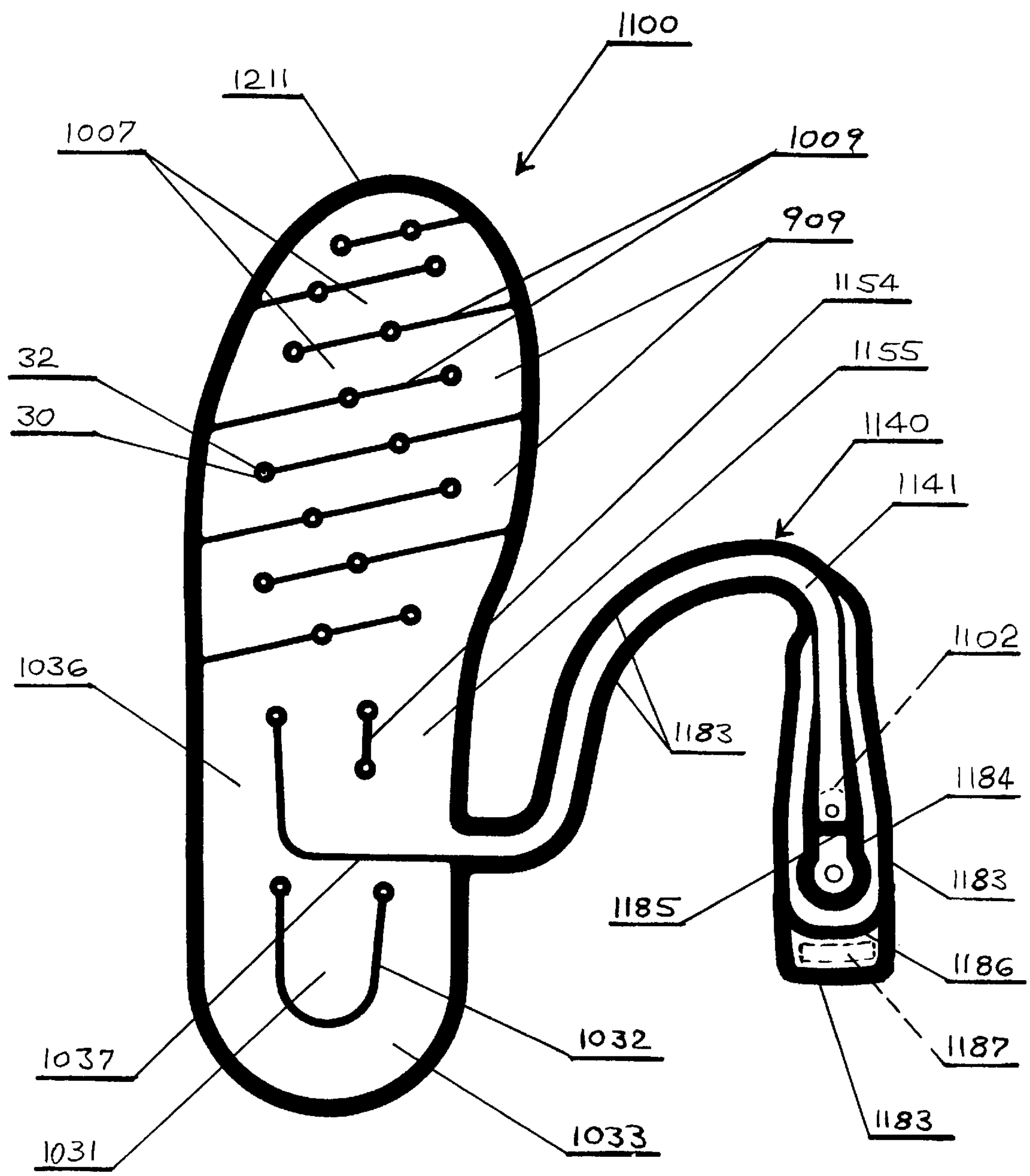

FIG. 217 illustrates an alternative inflatable sole in combination with the miniature pump and relief valve.

Figure 218:
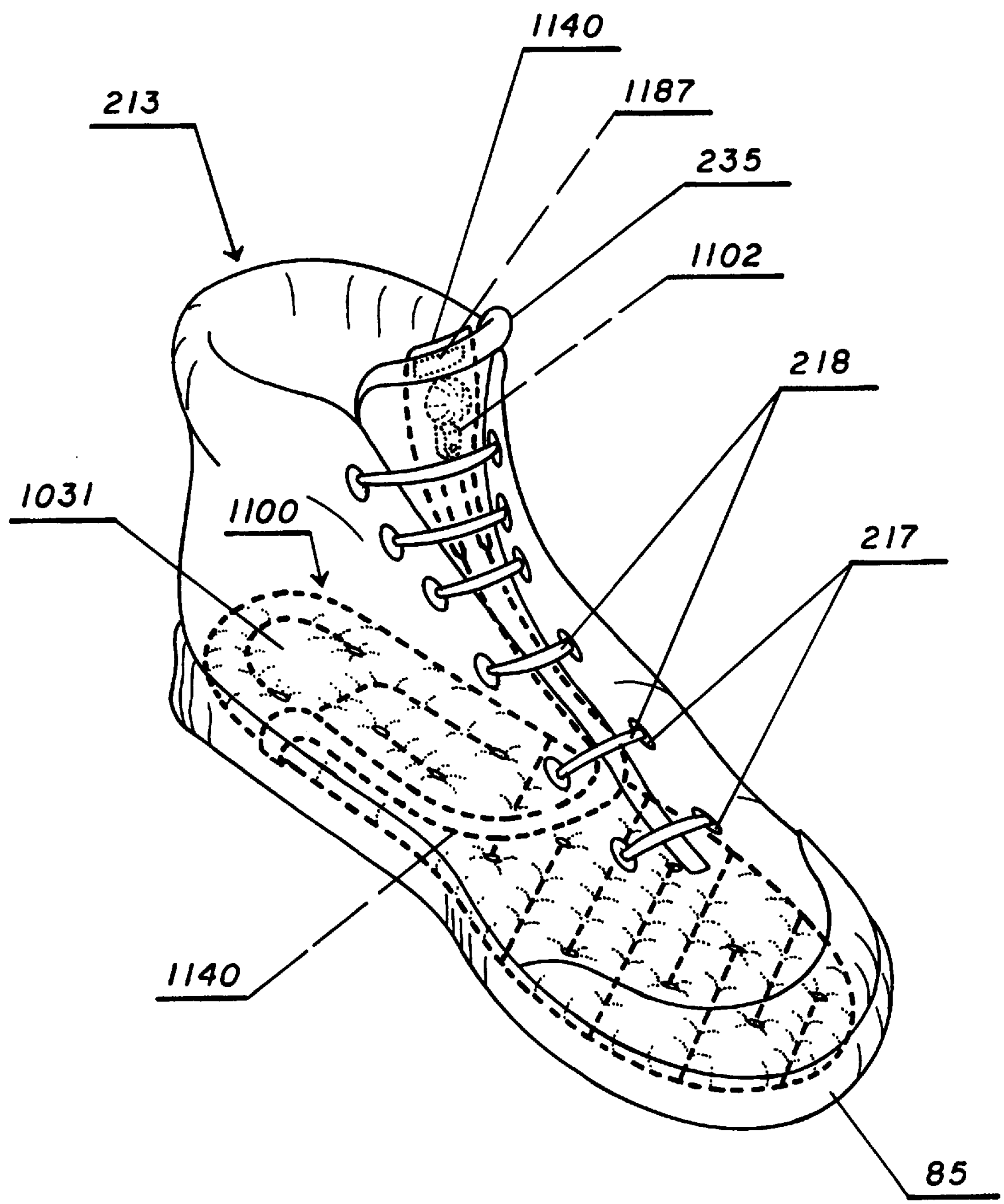

FIG. 218 is a perspective view of an inflatable sole combination shown in FIG. 217.

Figure 219:
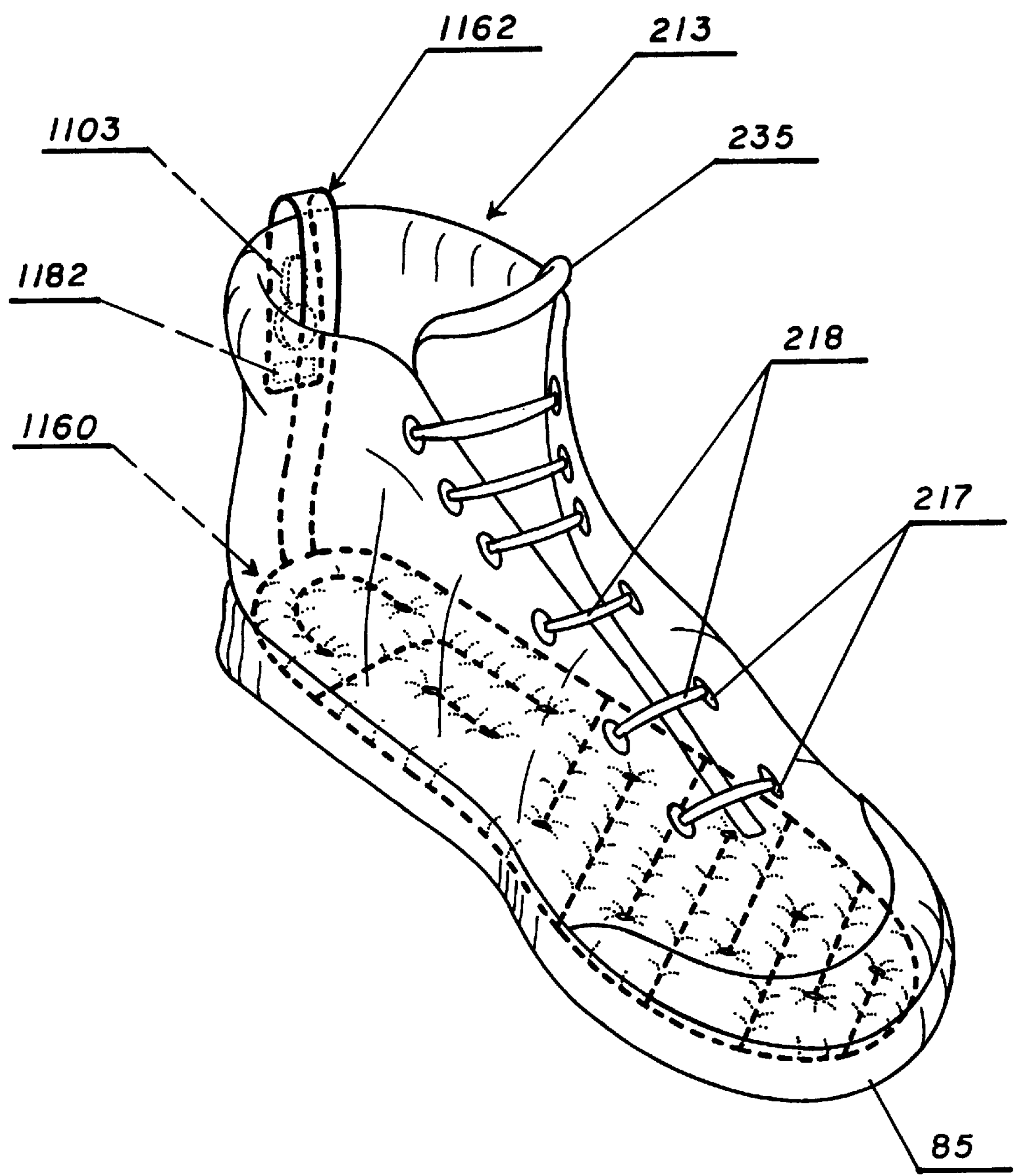
Figure 220:
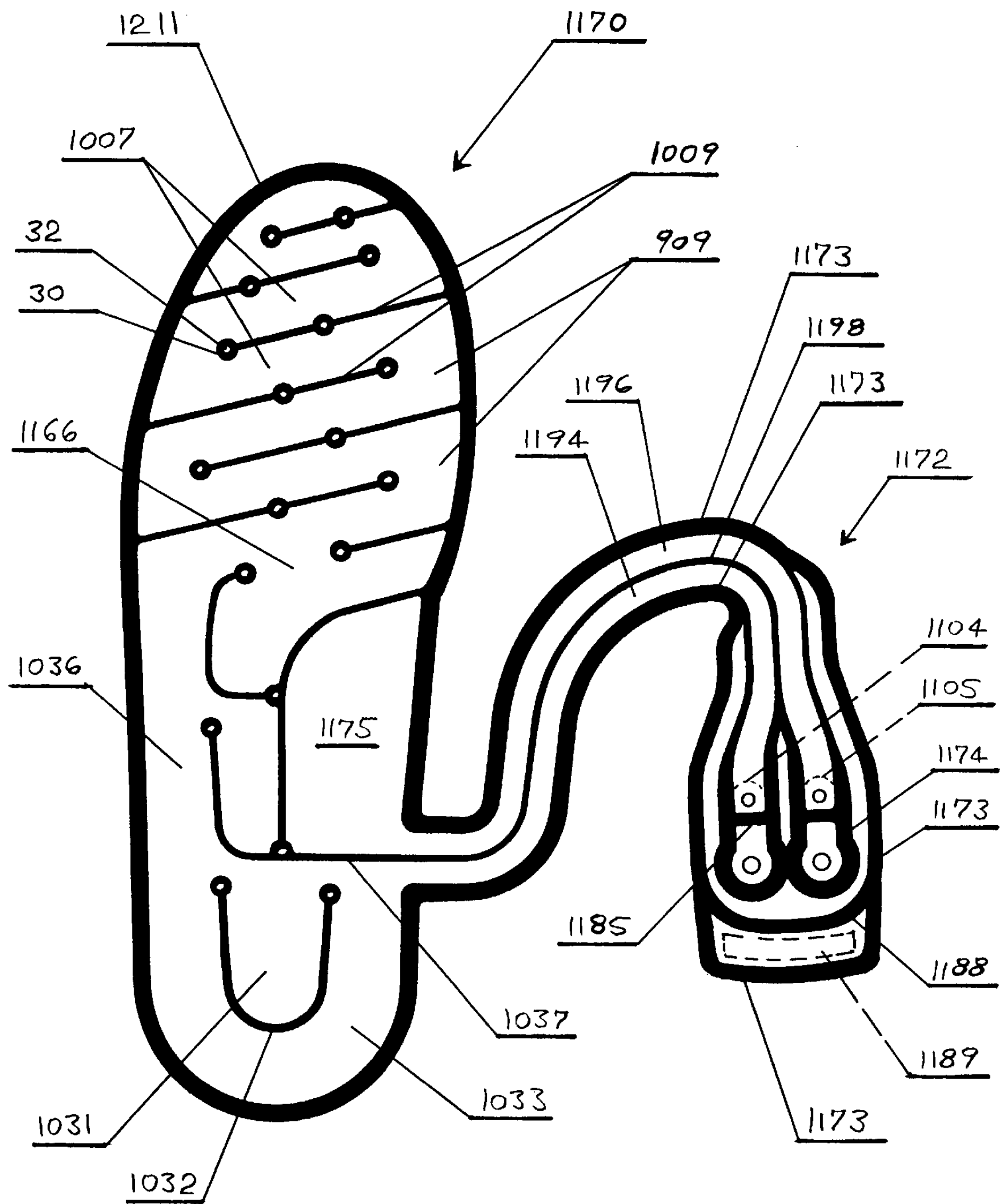

FIG. 219 is a perspective view of an alternative inflatable sole similar to that shown in FIG. 218. FIG. 220 illustrates an alternative inflatable sole similar to those shown in FIGS. 217 and 218.

Figure 221:
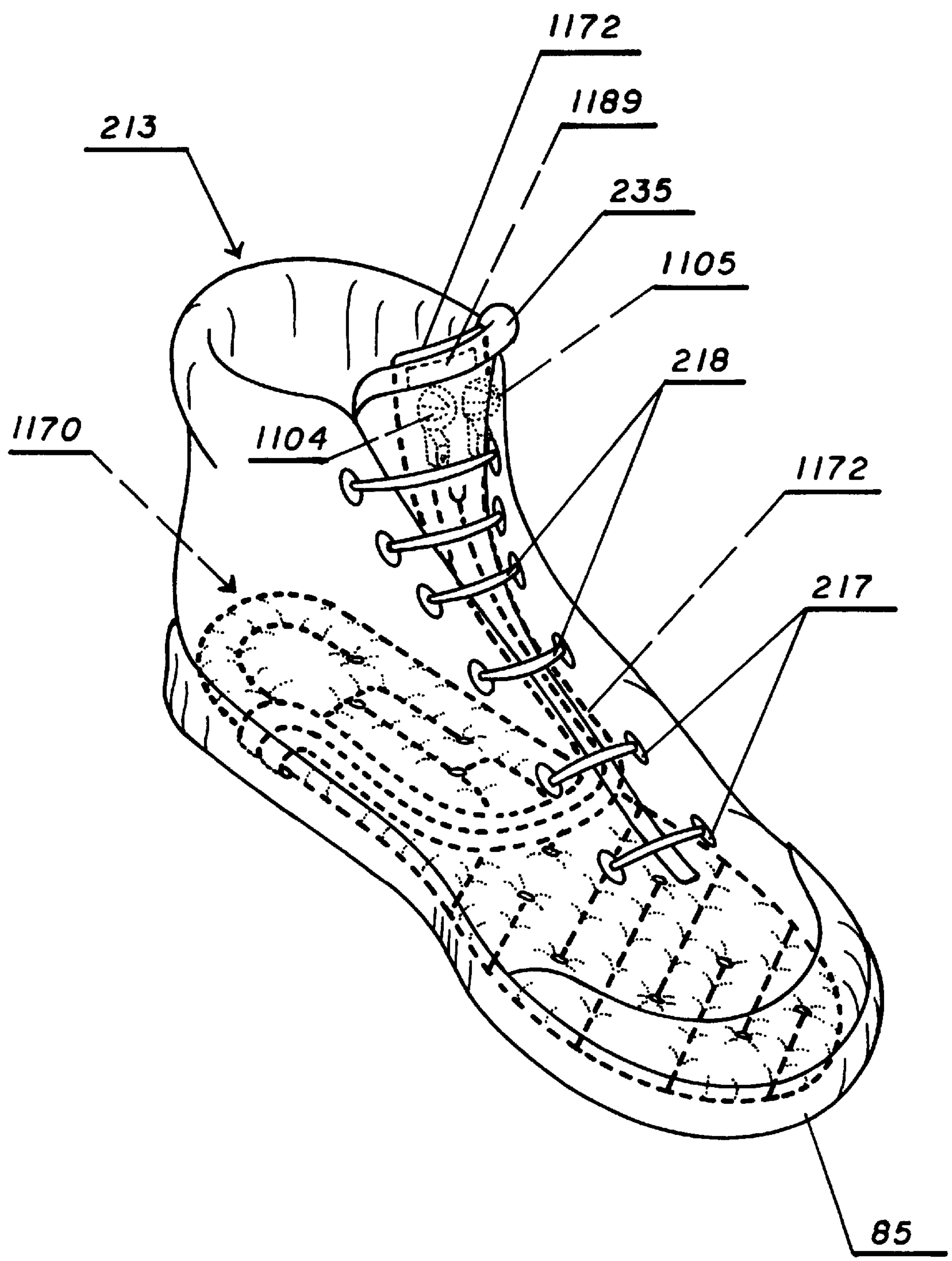

FIG. 221 is a perspective view of the inflatable sole shown in FIG. 220 inserted in footwear.

Figure 222:
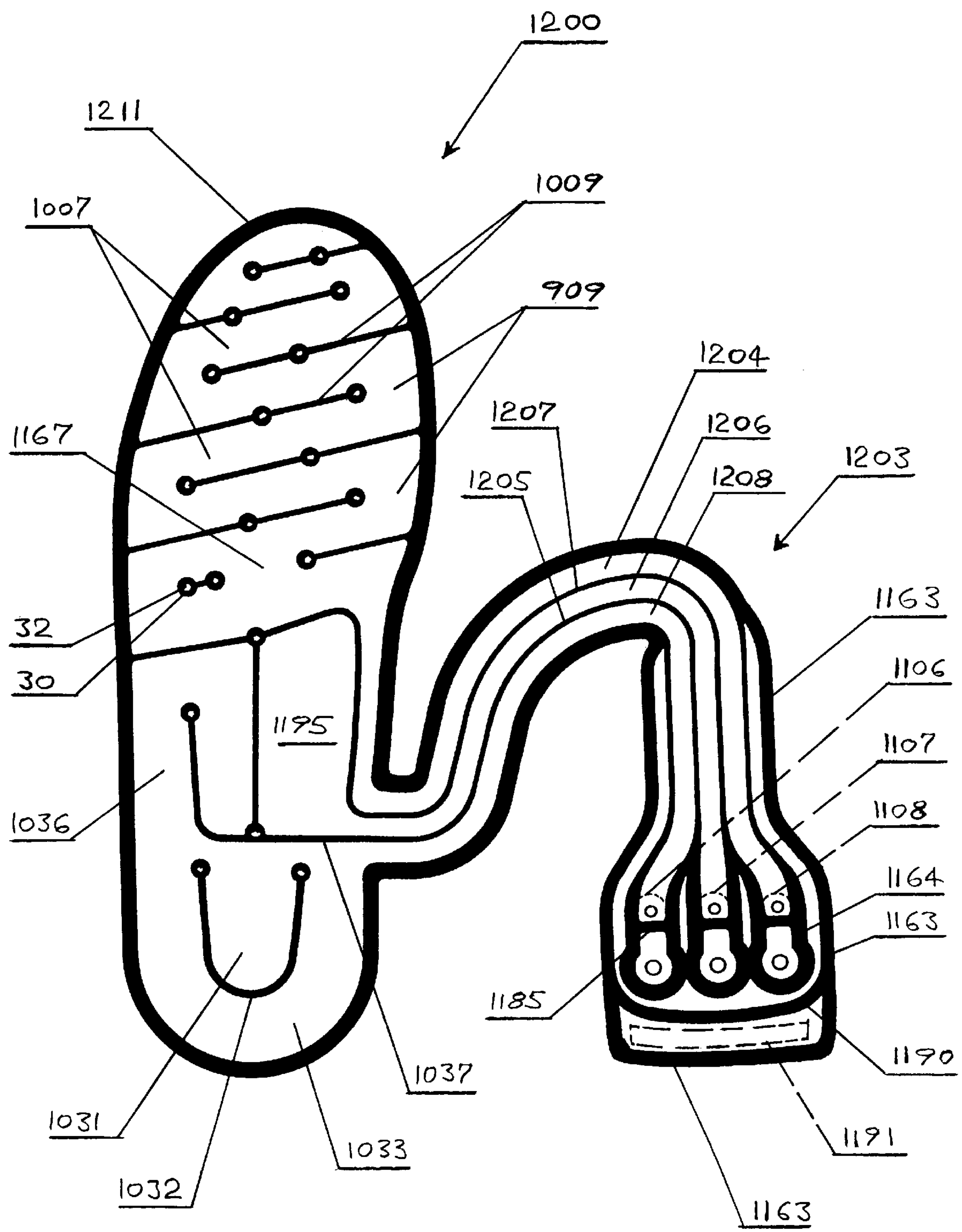

FIG. 222 illustrate an alternative inflatable sole 1200 similar to those shown in FIGS. 217–221.

Figure 223:
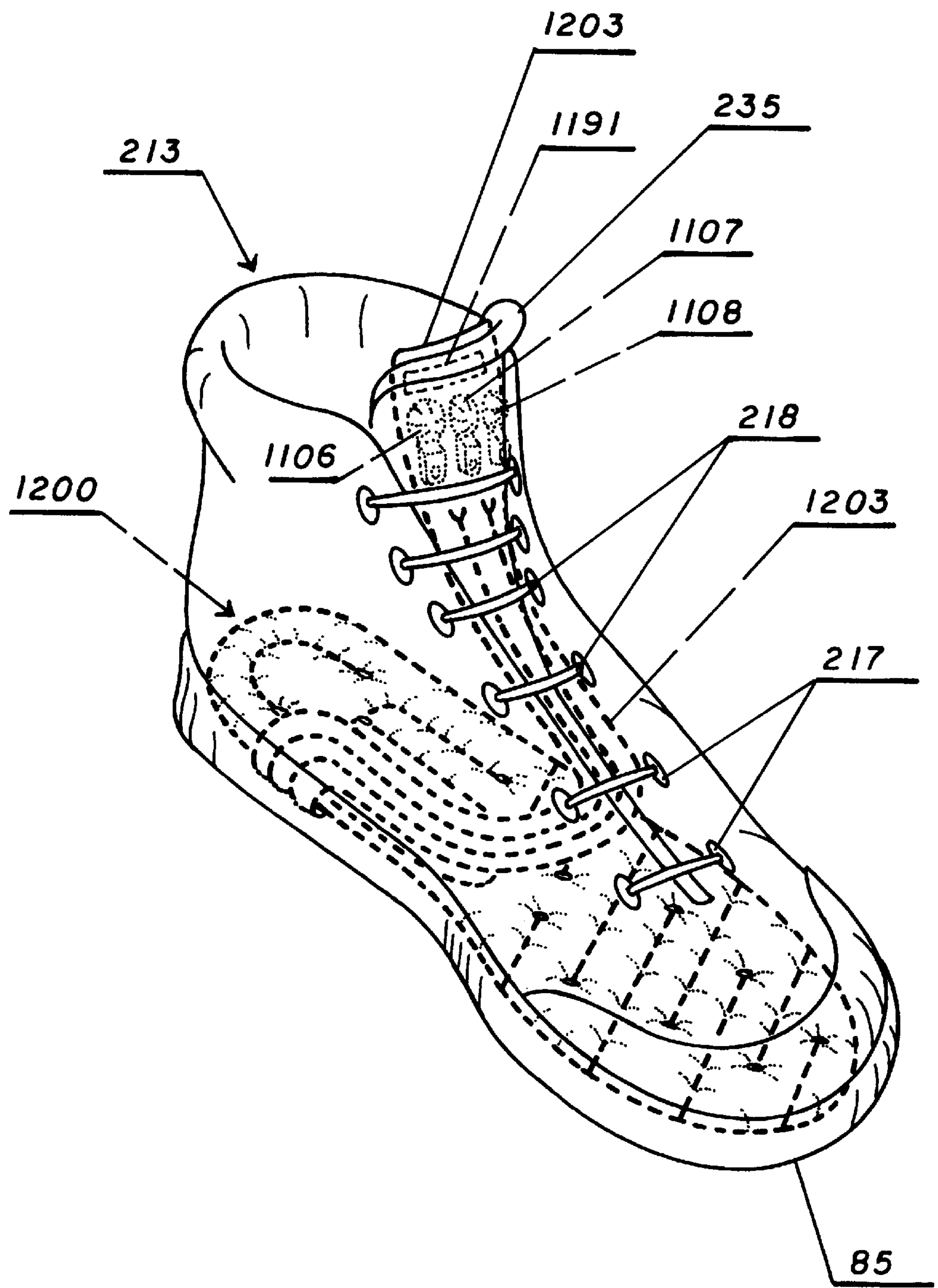

FIG. 223 is a perspective view of the inflatable sole shown in FIG. 222 inserted in footwear.

Figure 224:
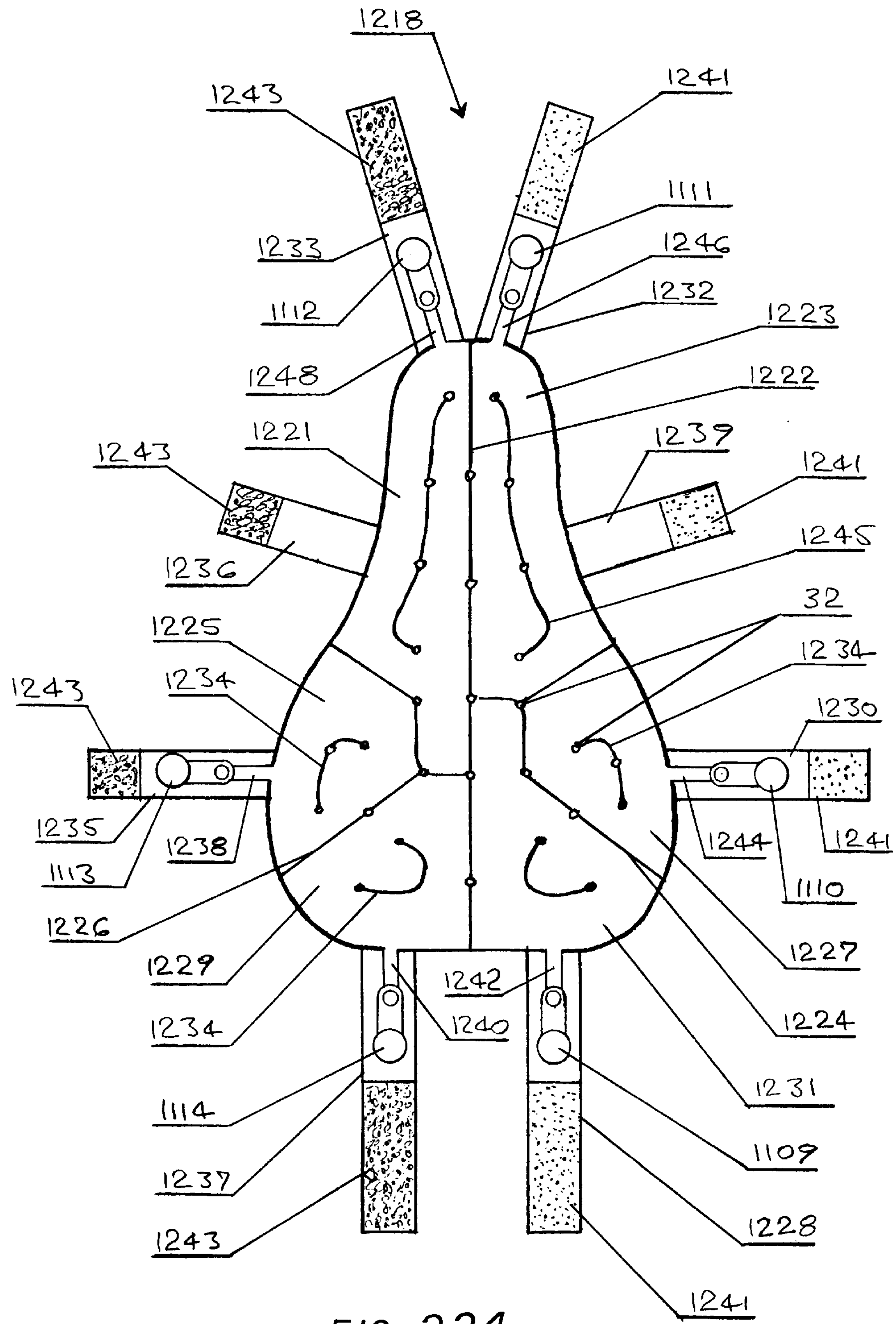

FIG. 224 is a plan view of an inflatable bicycle seat in combination with the inflatable pump and relief valve invention.

Figure 225:
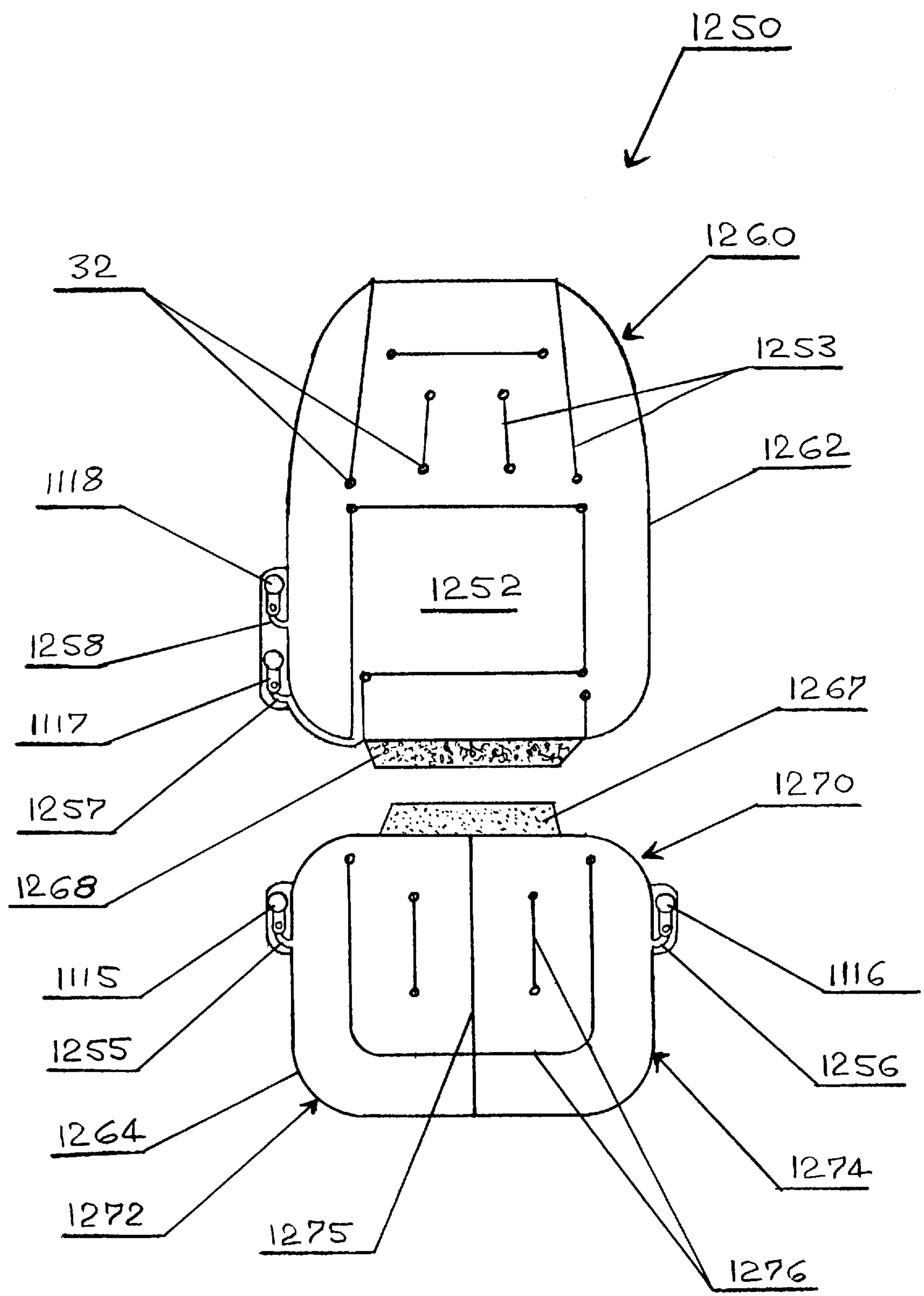

FIG. 225 illustrates an inflatable back and seat support with the inflatable pump and relief valve of the invention.

Figure 226:
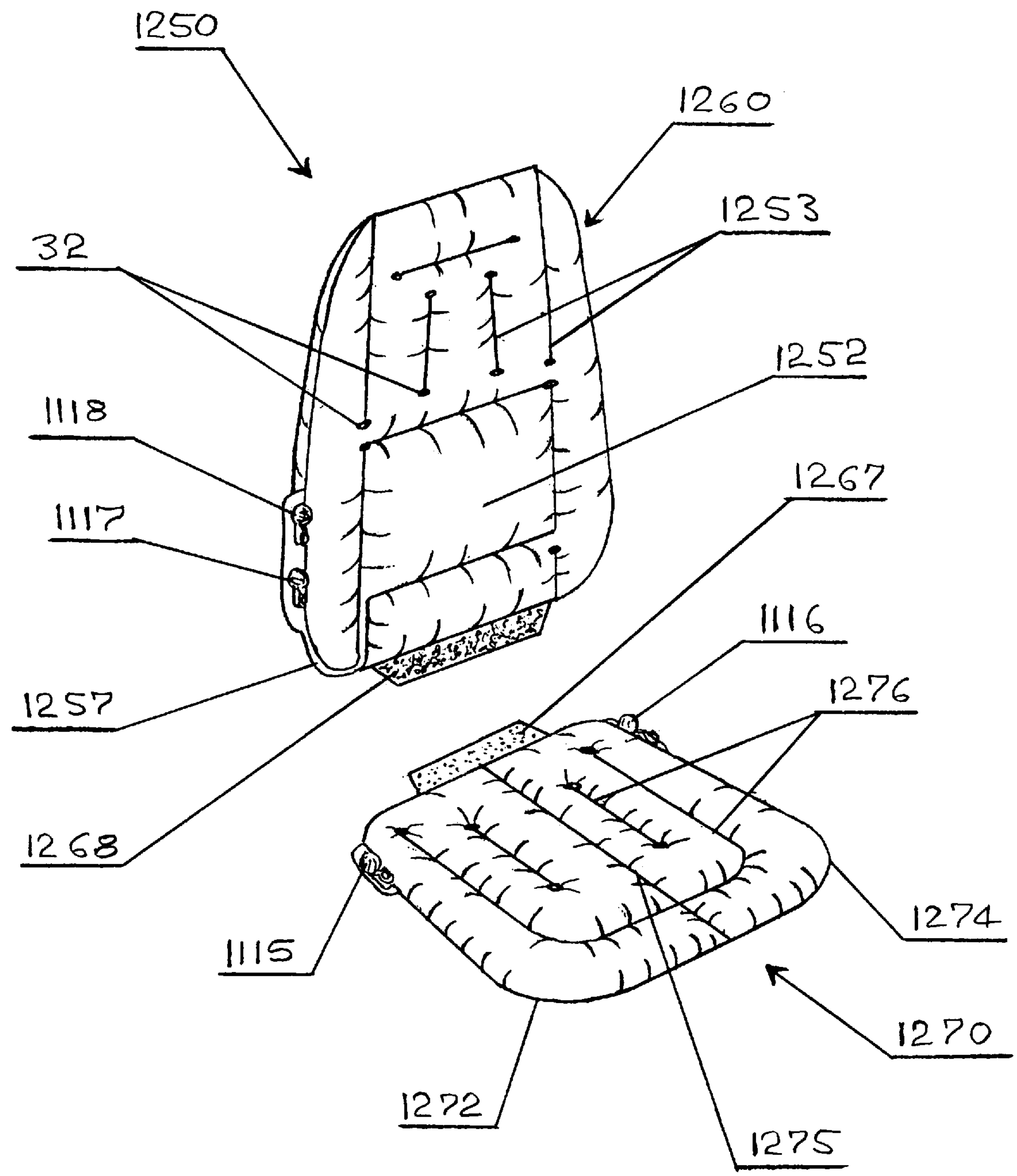

FIG. 226 is a perspective view of an inflatable back and seat support assembly shown in FIG. 225.

Figure 227:
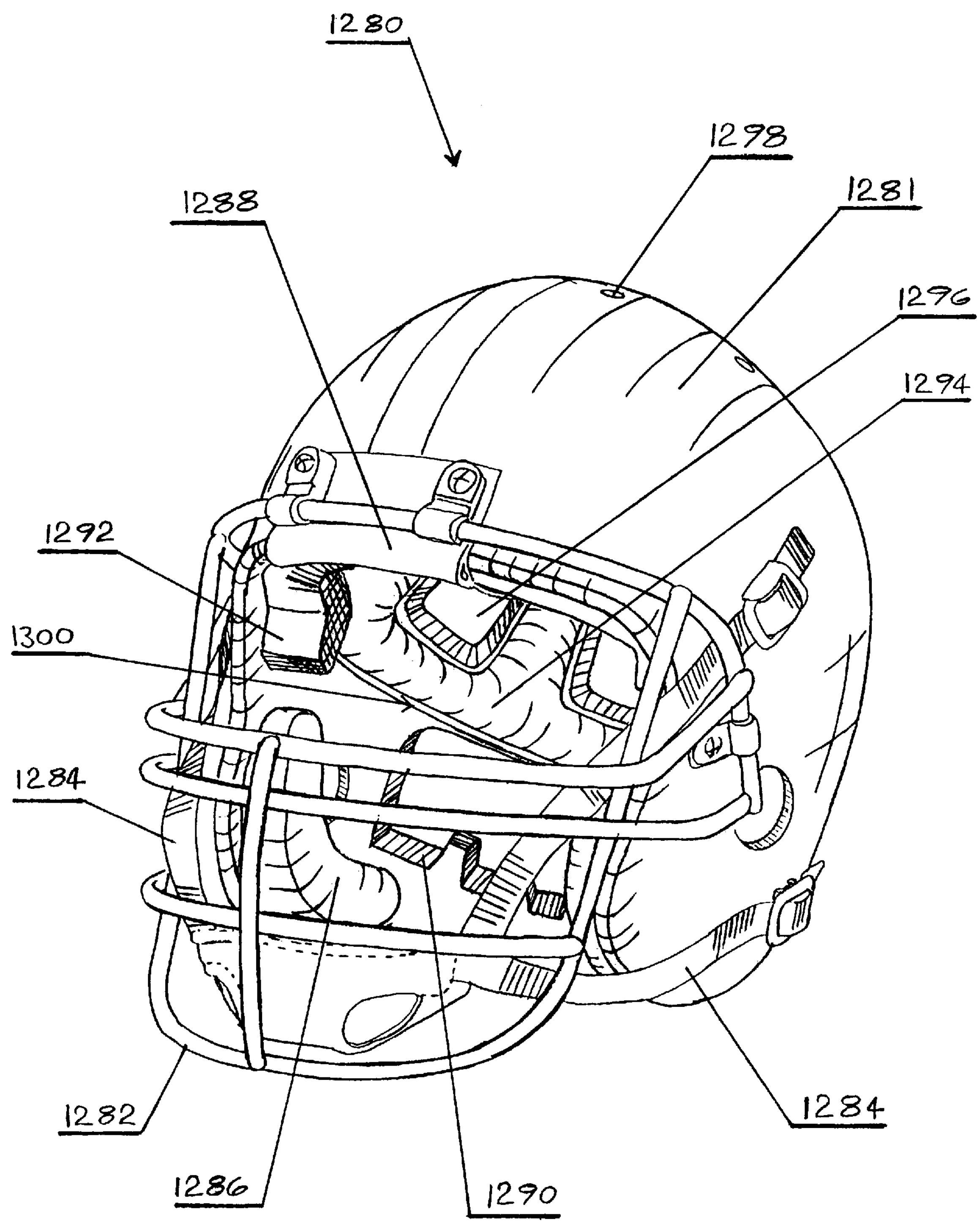

FIG. 227 is a perspective view of a football helmet with an inflatable liner.

Figure 228:
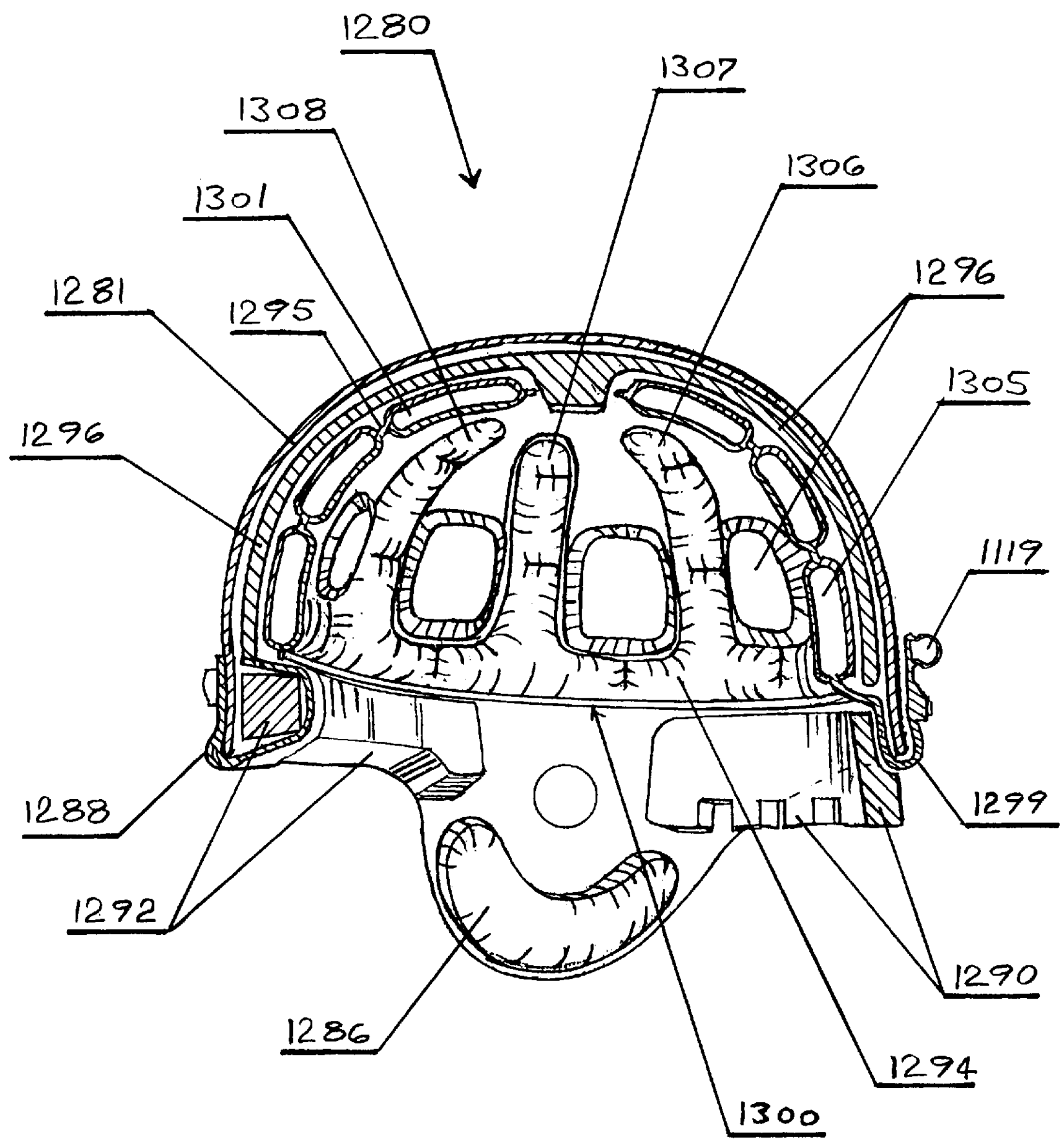

FIG. 228 is a sectional view of the helmet shown in FIG. 227 in combination with the miniature pump and relief valve of the invention.

Figure 229:
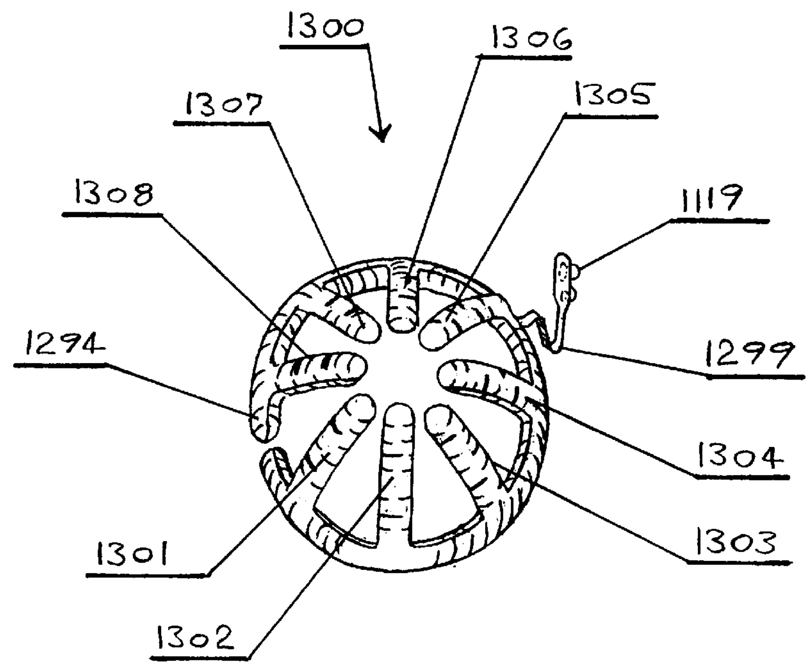

FIG. 229 is a perspective view of an inflatable liner for a helmet with the miniature pump and relief valve of the invention.

Figure 230:
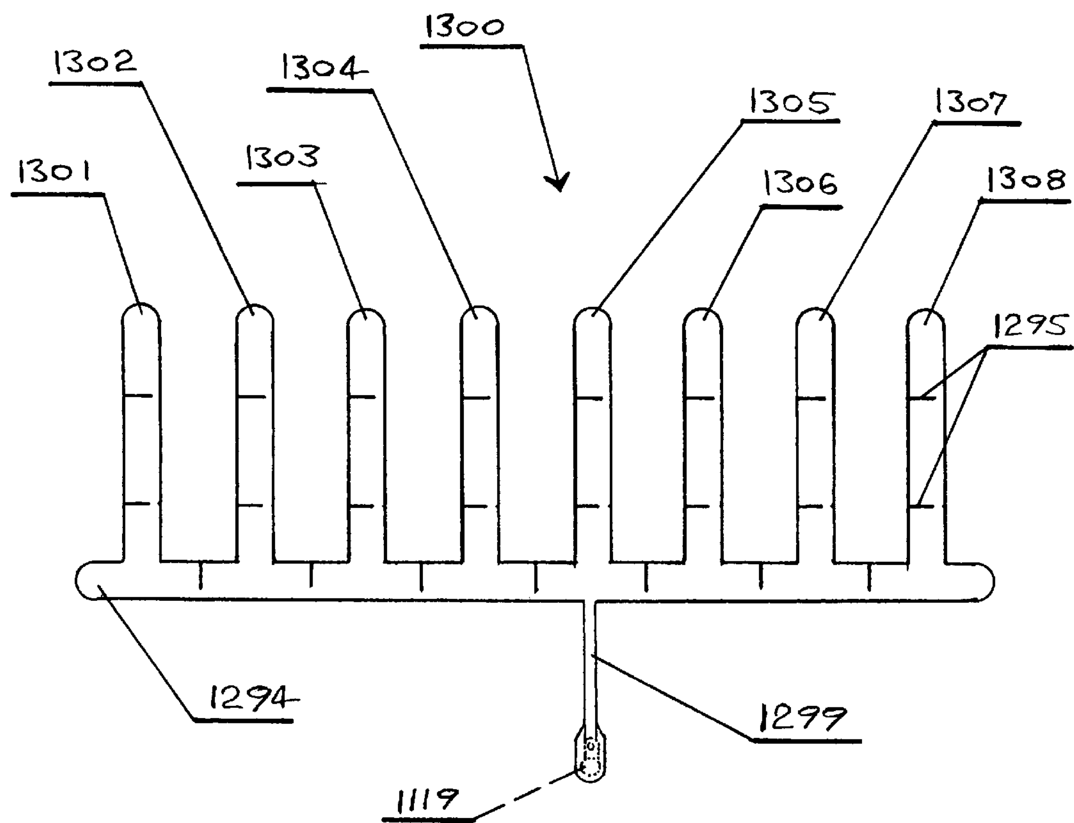

FIG. 230 is a plan view of the inflatable liner of FIG. 229 in an unfolded configuration.

Figure 231:
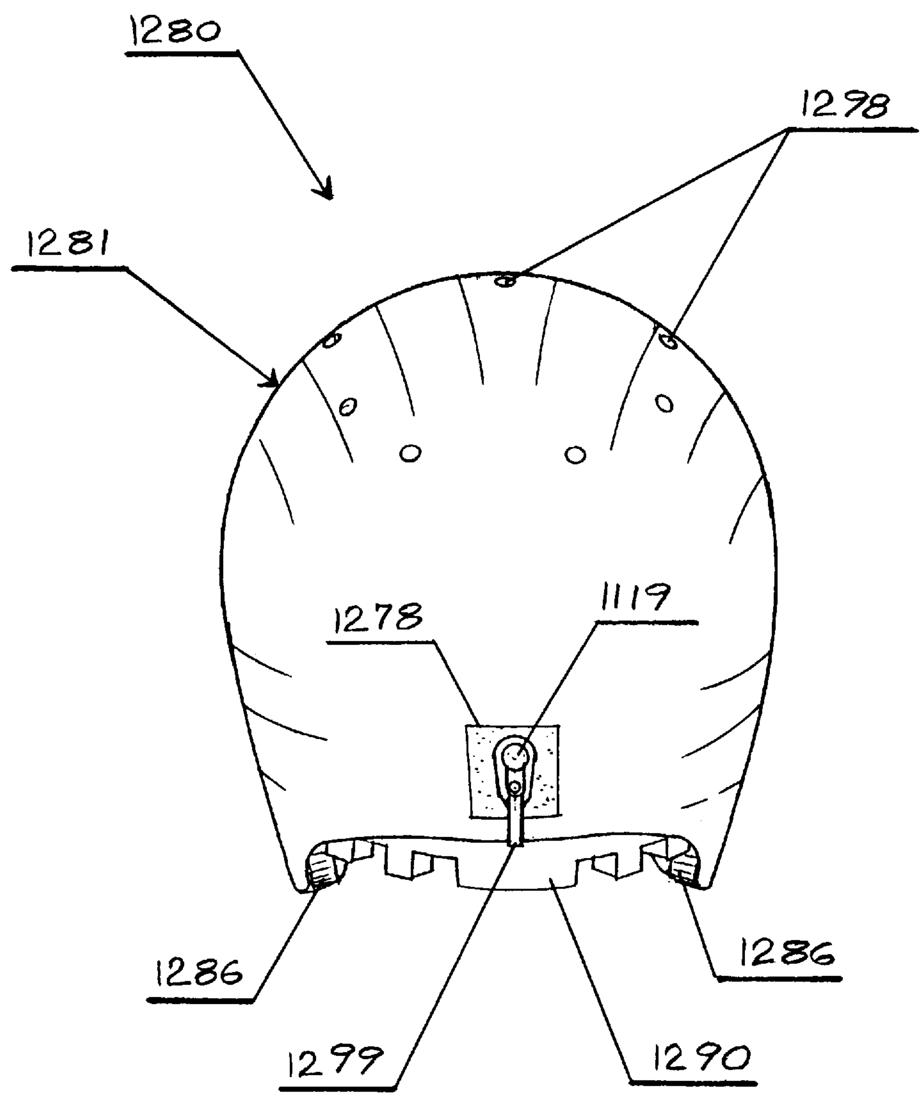

FIG. 231 is a rear view of the helmet shown in FIG. 228.

Figure 232:
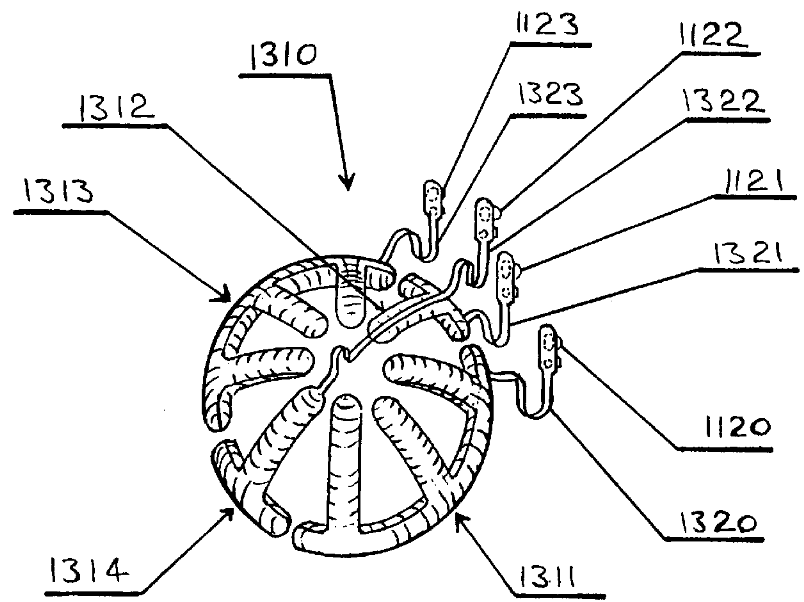

FIG. 232 is a perspective view of an inflatable liner for a helmet with a plurality of miniature pumps and relief valves.

Figure 233:
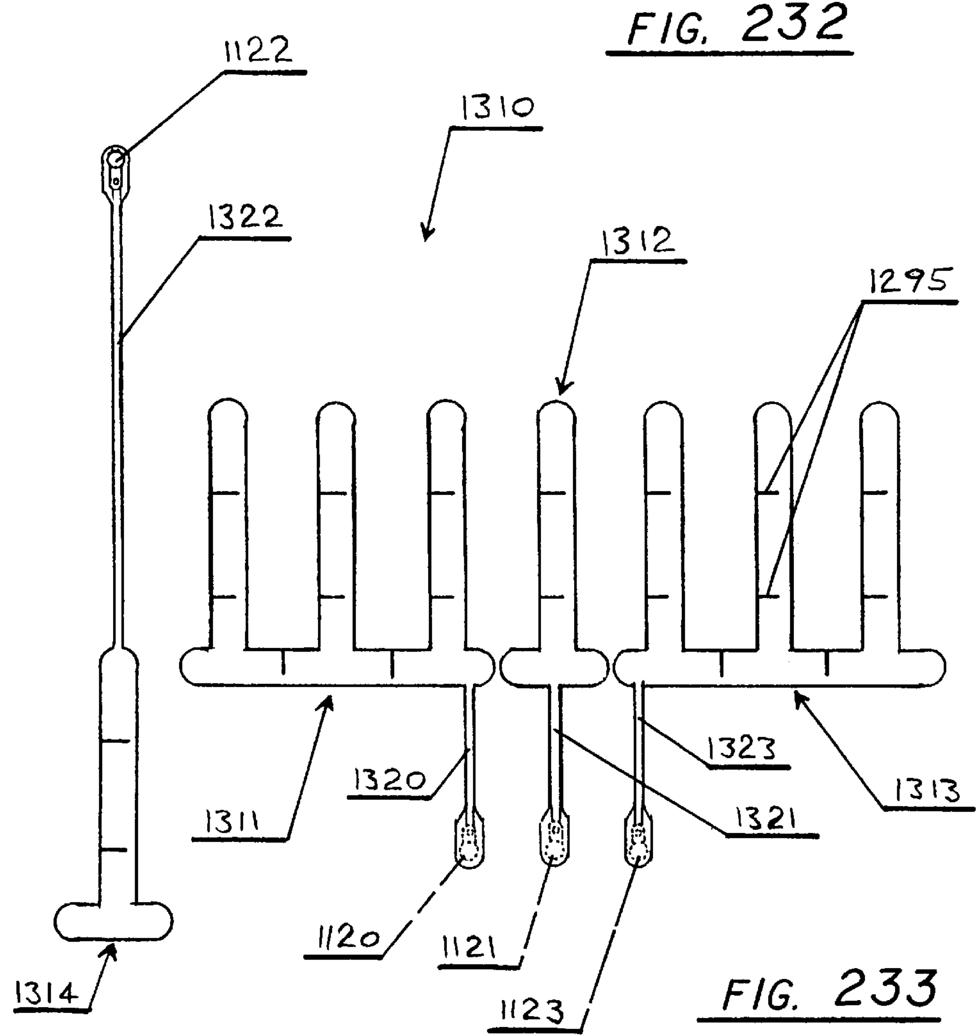

FIG. 233 is a plan view of the inflatable liner shown in FIG. 232 in an unfolded configuration.

Figure 234:
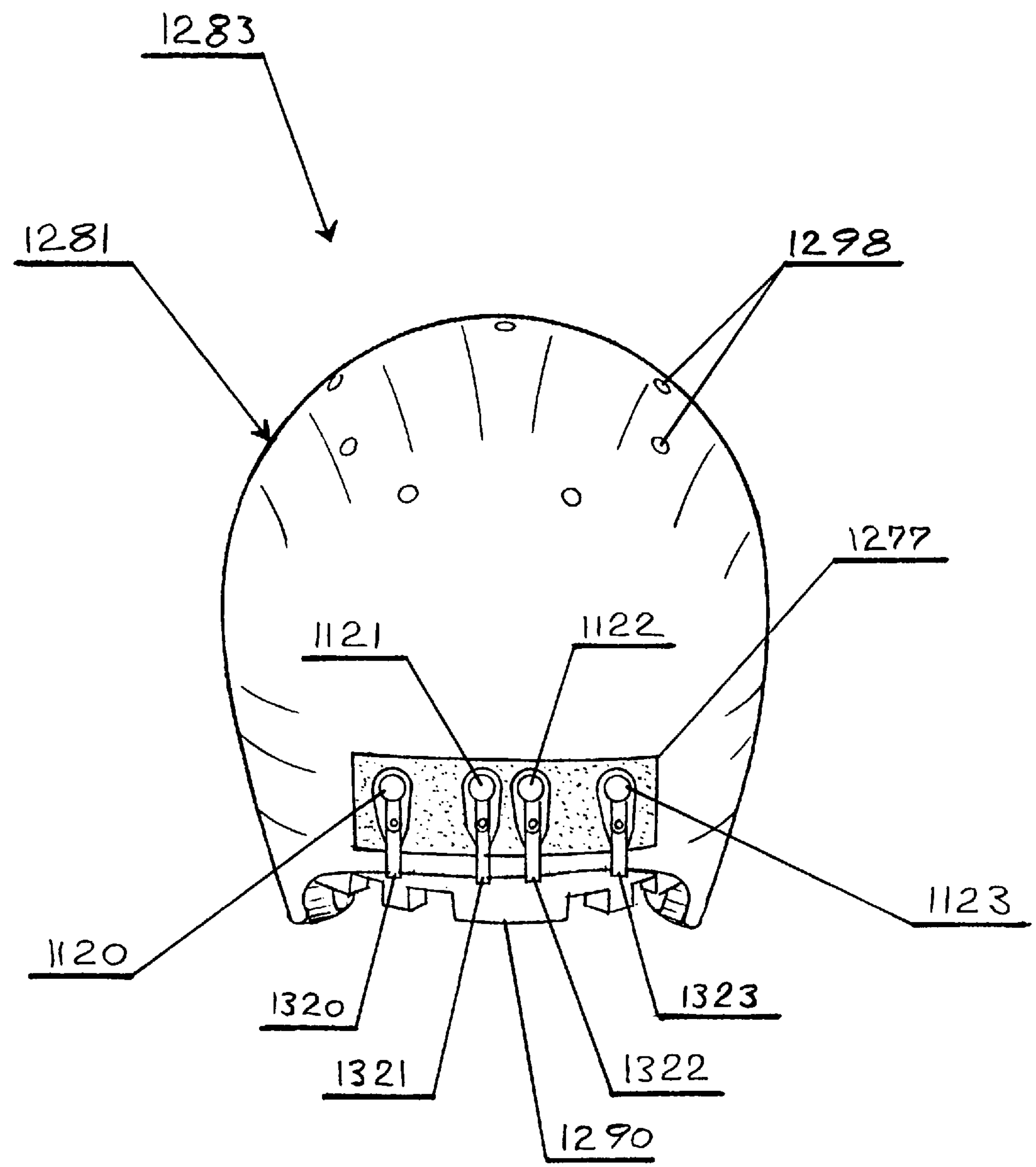

FIG. 234 is a rear view of a helmet with the inflatable liner of FIG. 233.

Figure 235:
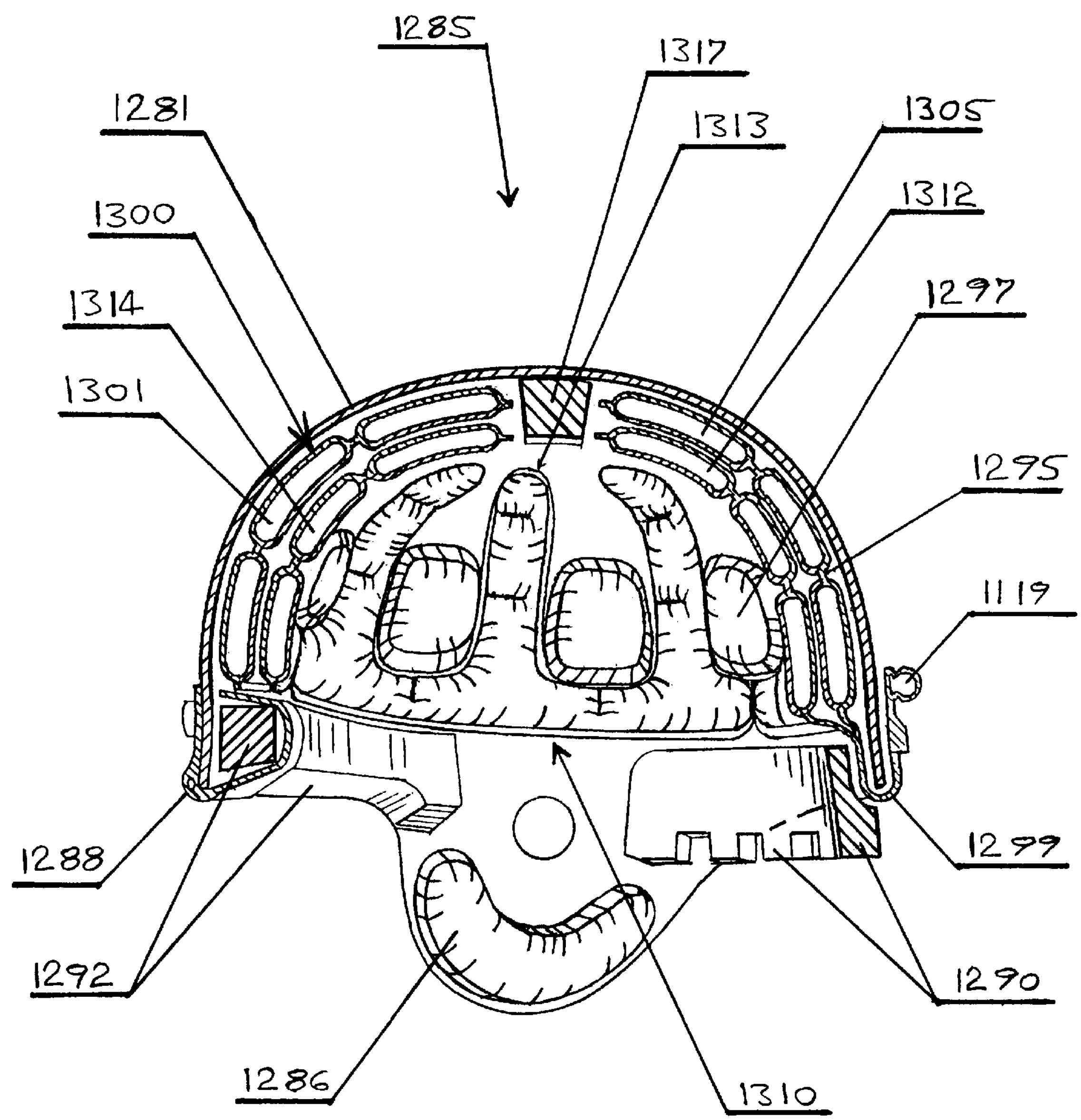

FIG. 235 is a sectional view of an alternative inflatable lining in a sports helmet.

Figure 236:
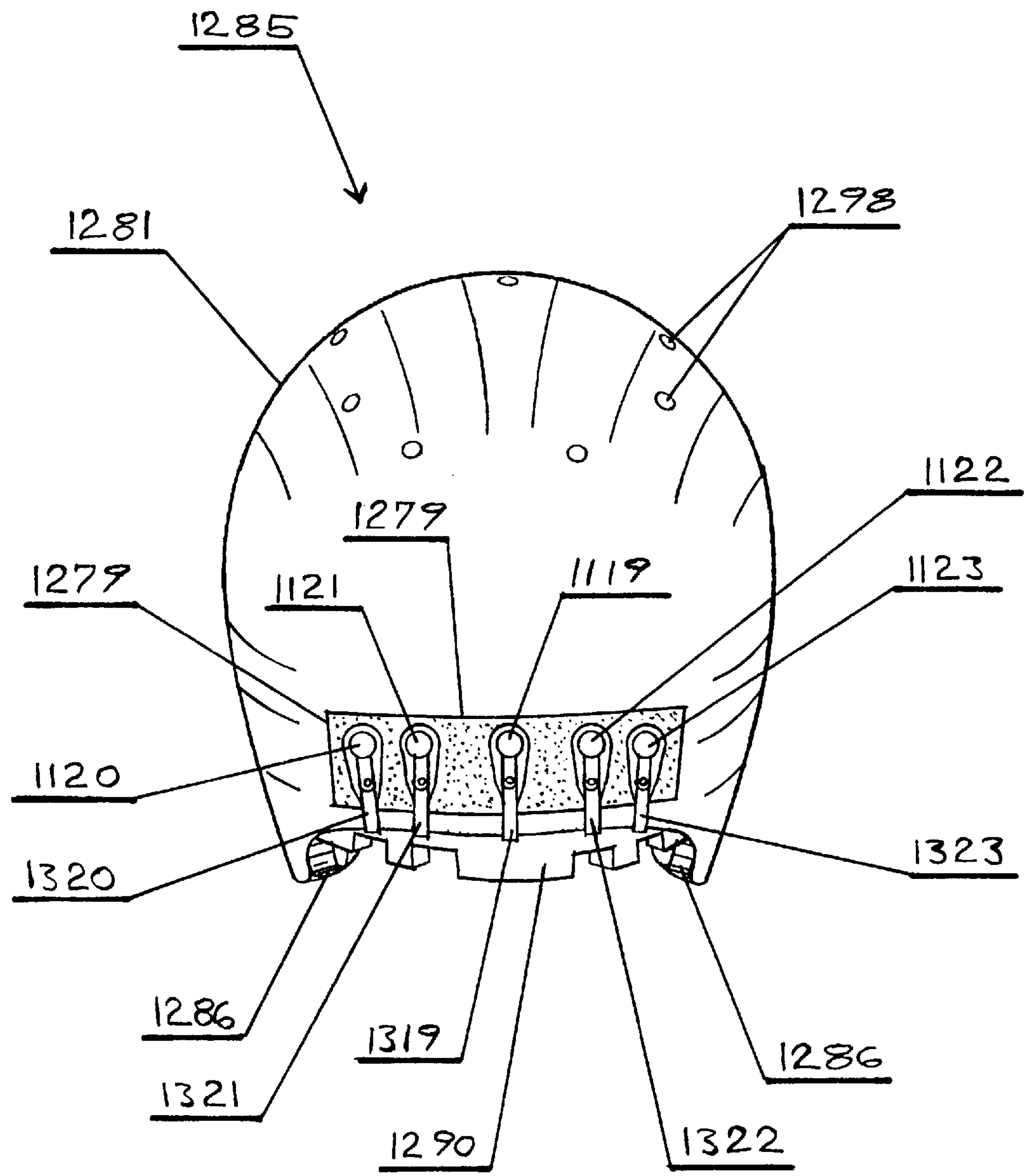

FIG. 236 is a rear view of the helmet shown in FIG. 235.

Figure 237:
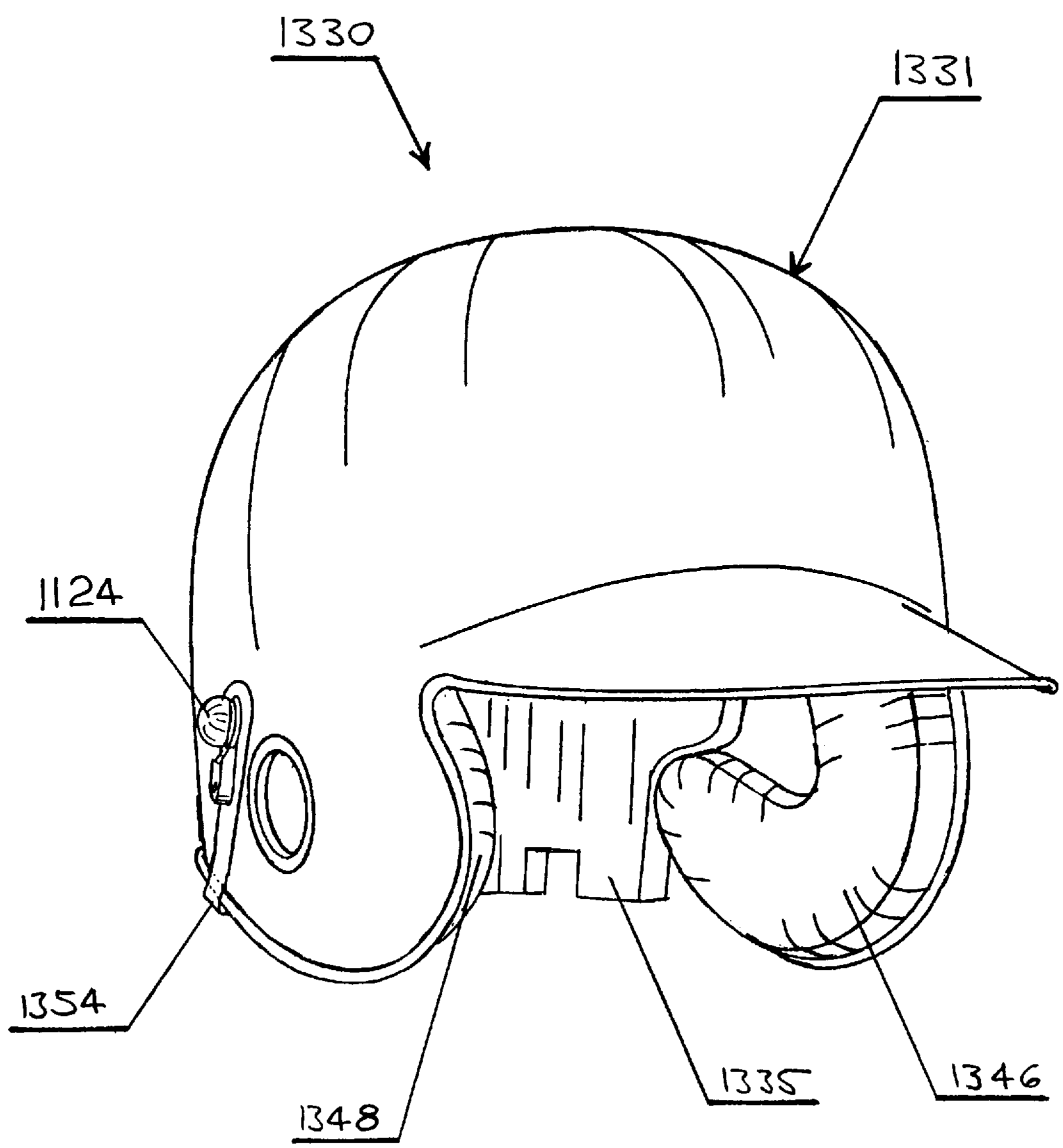

FIG. 237 is a perspective view of a baseball helmet with an inflatable lining and the miniature pump and relief valve of the invention.

Figure 238:
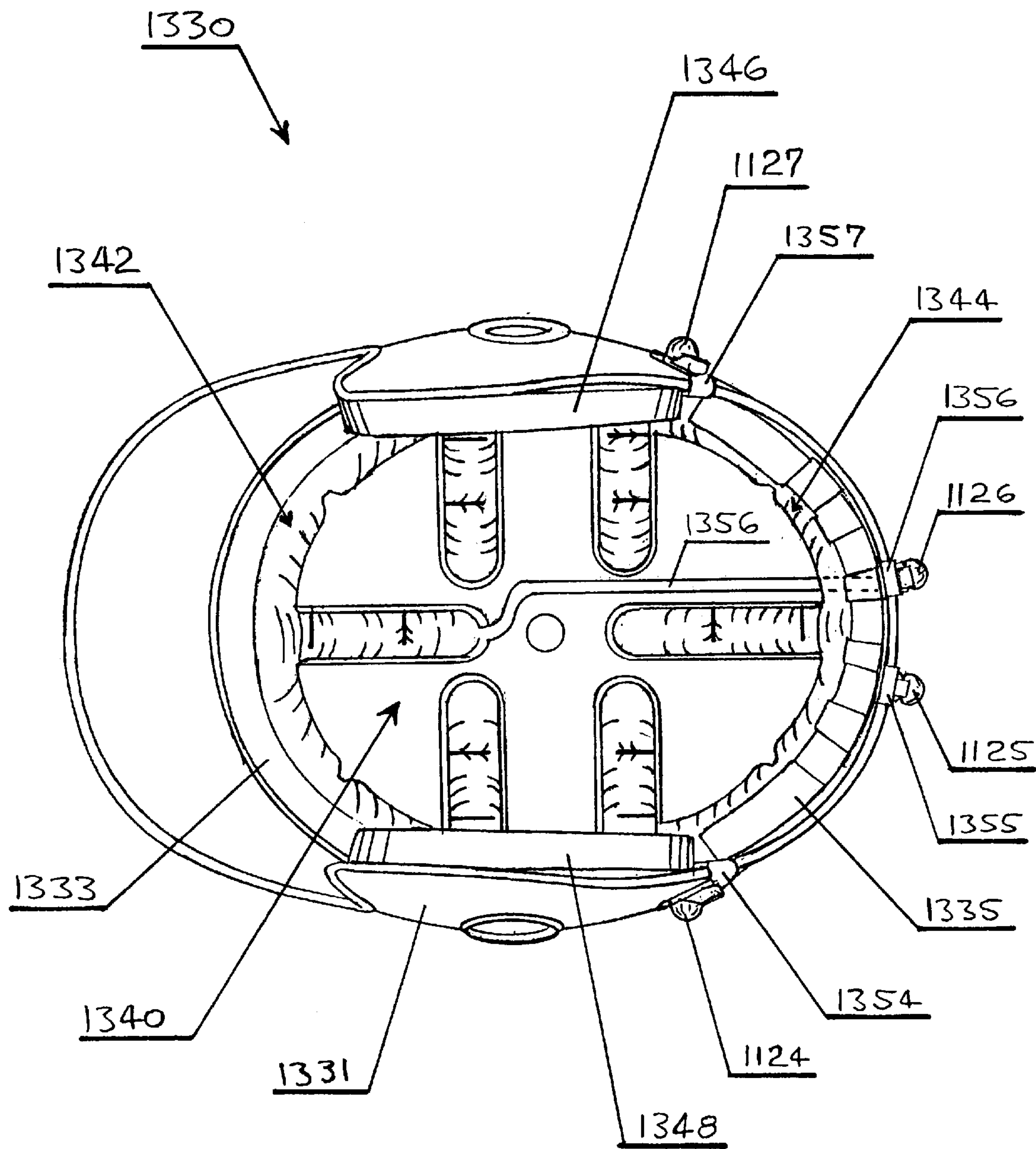

FIG. 238 is a view of the inside of the baseball helmet shown in FIG. 237.

FIG. 239 is a sectional view of the baseball helmet shown in FIGS. 237 and 238.

FIG. 240 is a plan view of an inflatable jaw pad 1348 for the baseball helmet shown in FIGS. 237–239.

FIG. 241 is a sectional view along line 241–241' of FIG. 240.

Figures 242, 243:
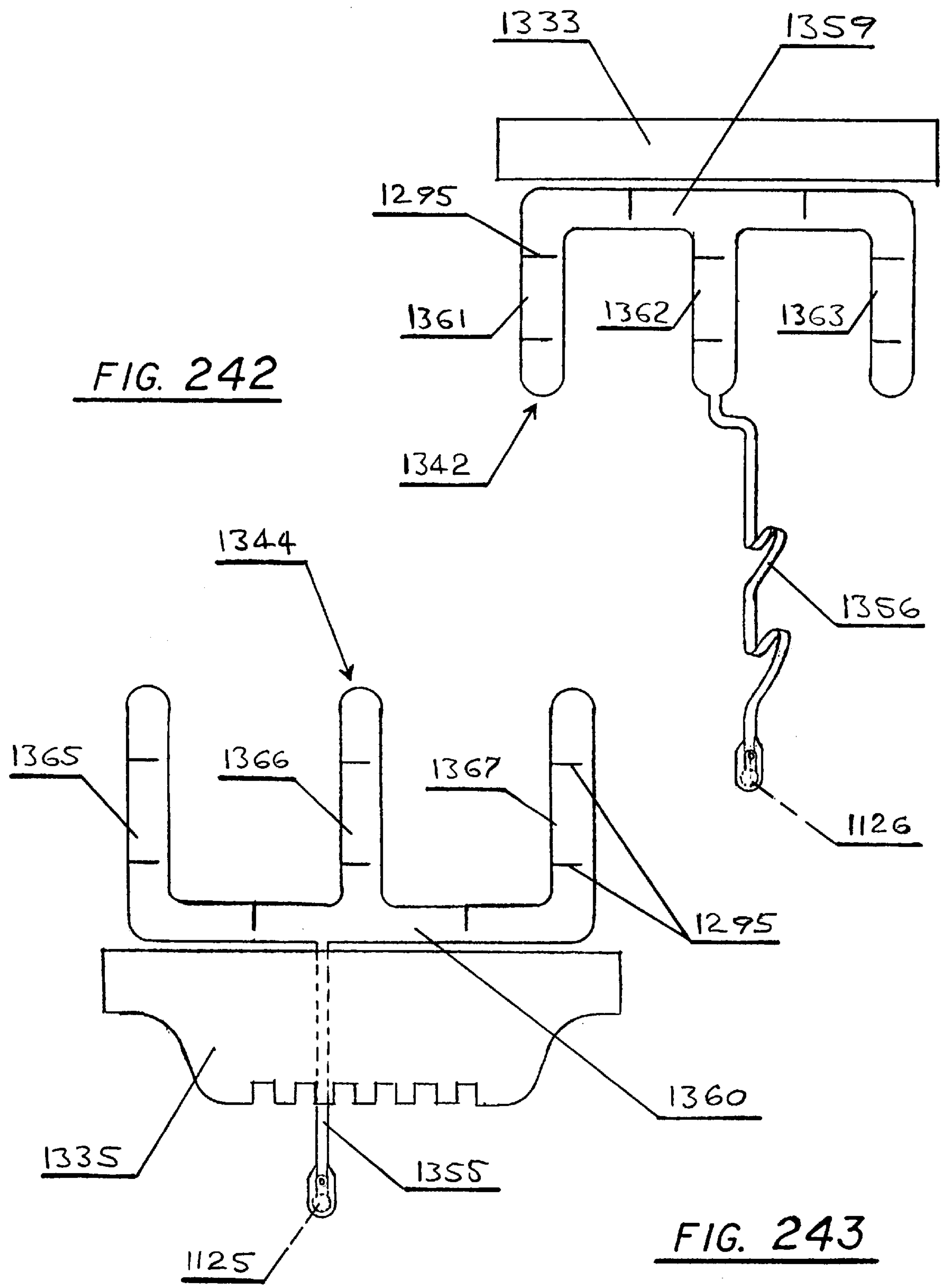

FIG. 242 is a plan view of an unfolded inflatable front liner for the baseball helmet shown in FIGS. 237–239.

FIG. 243 is a plan view of an unfolded inflatable rear liner for the baseball helmet shown in FIGS. 237–239.

Figure 244:
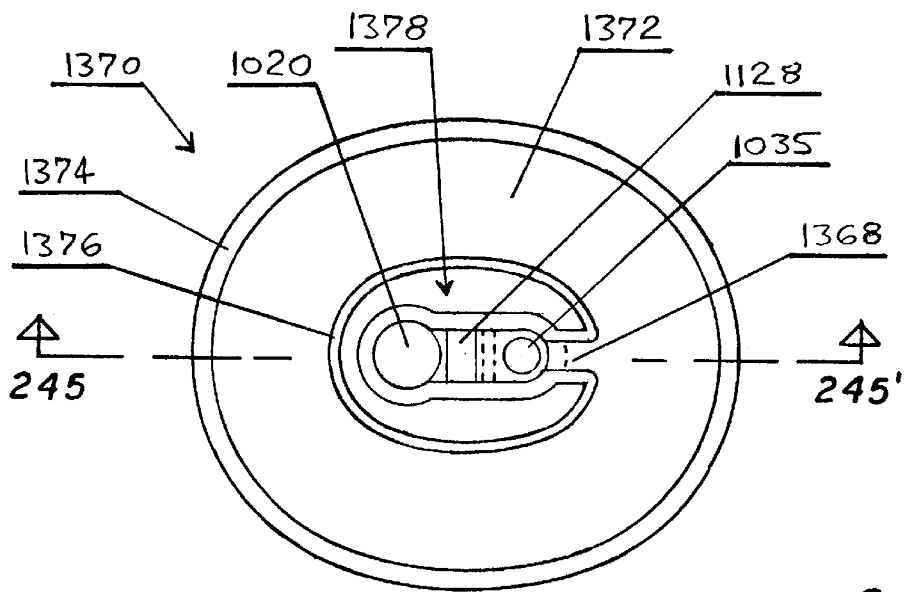
Figure 245:
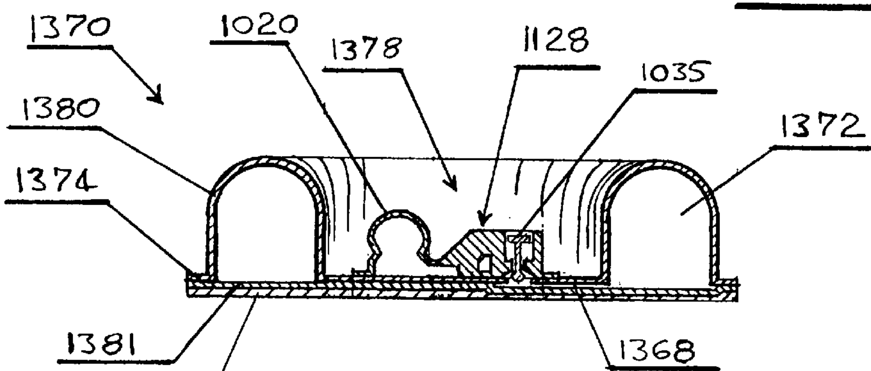
Figure 246:
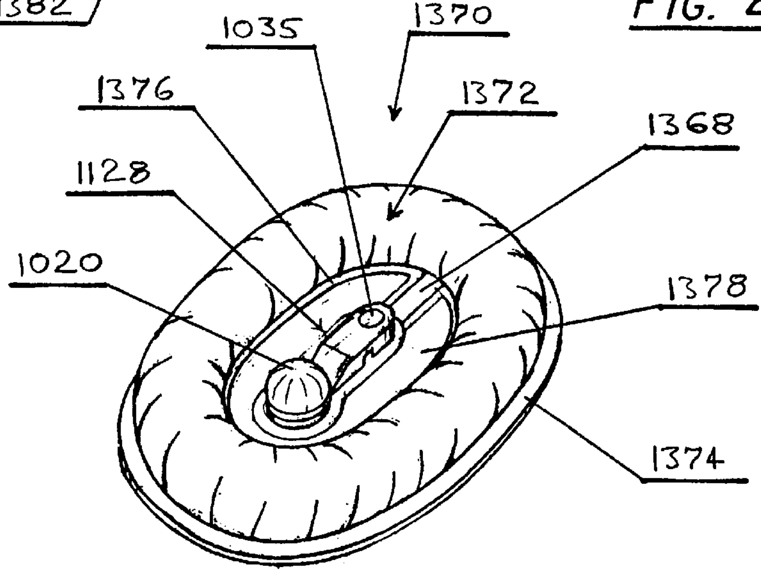

FIGS. 244–246 illustrate an inflatable multipurpose pad in combination with the miniature pump and relief valve of the invention.

Figure 247:
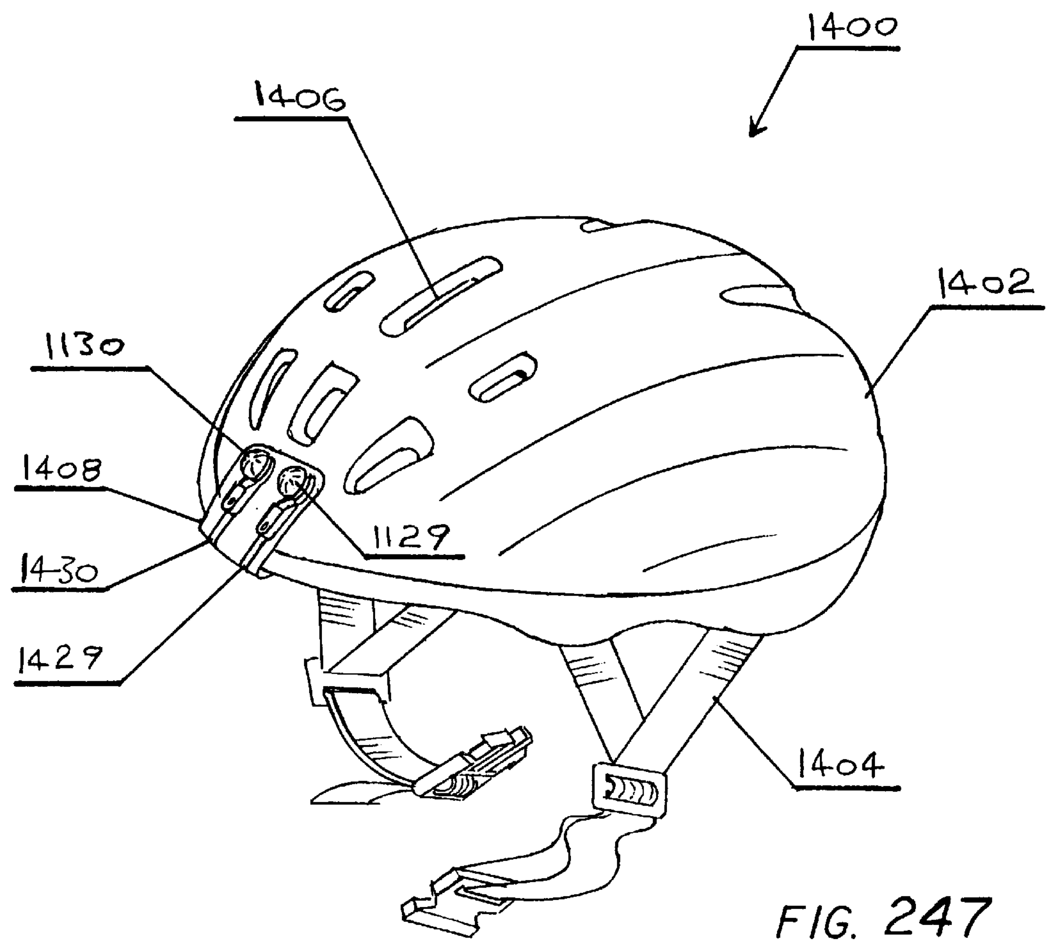
Figure 248:
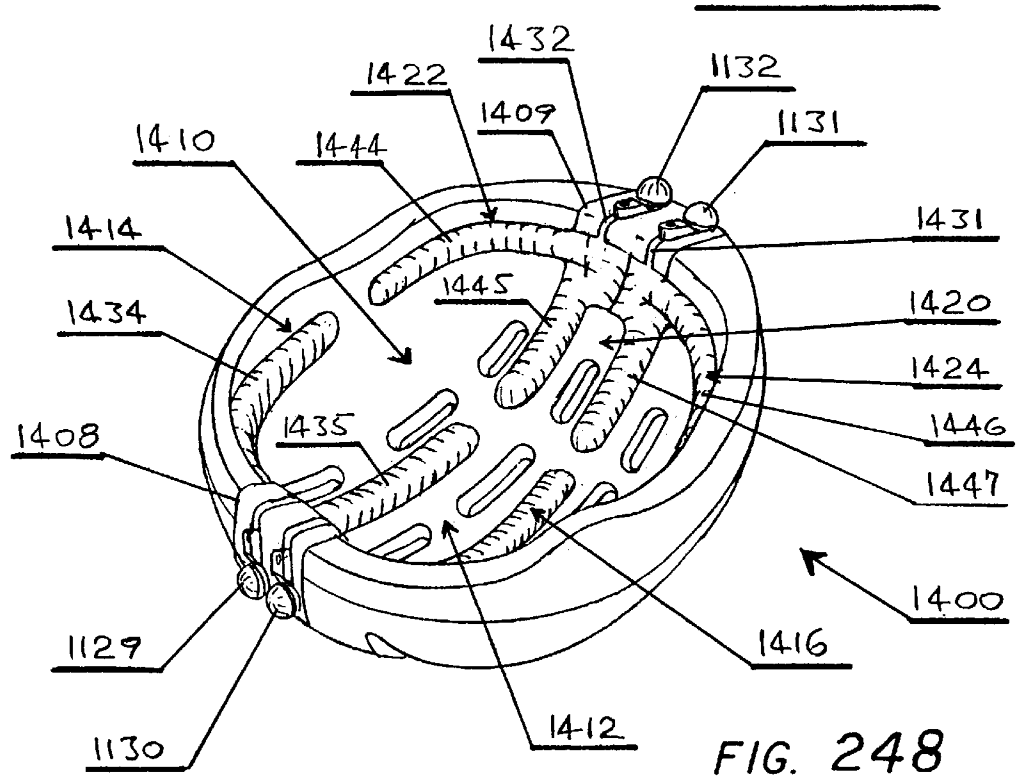

FIG. 247 is a perspective view of a bicycle helmet having an inflatable liner in combination with the miniature pump and relief valve invention. FIG. 248 is a perspective view of the underside of the bicycle helmet shown in FIG. 247.

FIG. 249 is a sectional view of the bicycle helmet shown in FIGS. 247 and 248.

FIG. 250 is a plan view of the inflatable liner for the bicycle helmet of FIGS. 247 and 248, in its unfolded configuration.

FIG. 251 is a sectional view along line 251–251' of FIG. 250.

DETAILED DESCRIPTION OF THE INVENTION

Figure 1:
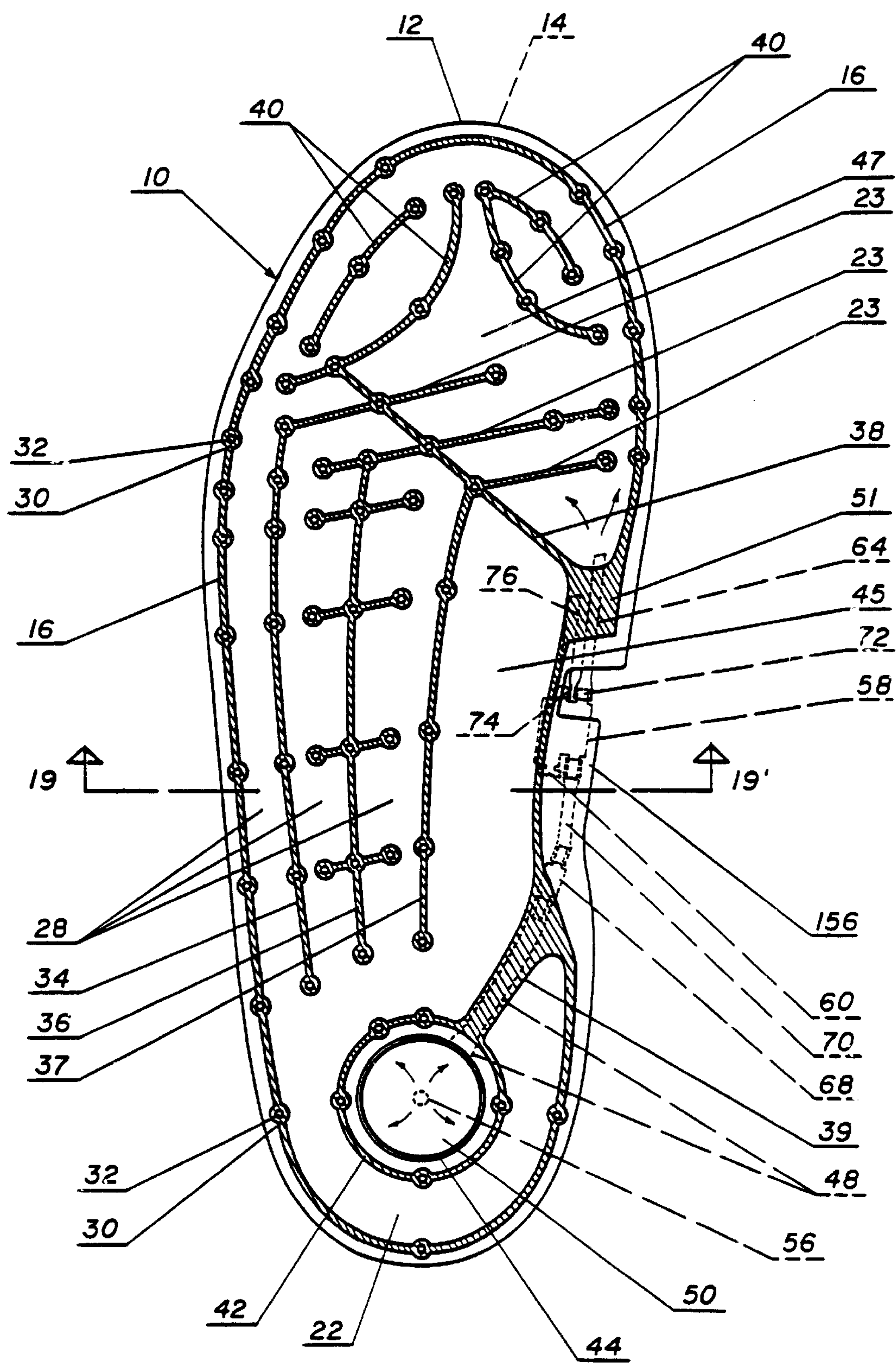
FIG. 1 is a plan view of an inflatable inner sole with a pump and adjustable relief valve.

Referring now to FIG. 1, the inflatable insole 10 of the invention is shown in plan view. The inner sole 10 is formed by a first sheet 12 and a coextensive second sheet 14 of substantially the same shape and size. The first and second sheets 12 and 14 are bonded together in a continuous peripheral seam 16 that extends about the toe, the lateral side of the inner sole 10, the heel and medially about the instep. The seams are shown in the figures as cross hatched areas. This is intended to show seamed areas only and not to represent sectional views.

The first and second sheets 12 and 14 are preferably plastic and most preferably are thermoplastic, so that conventional heat sealing can be used for forming the seams. The most preferred thermoplastic material is polyurethane, however, other suitable materials include ethylene, and ethylene vinyl acetate copolymers, polyethylene, polypropylene, polyvinyl chloride, etc. Natural or synthetic rubber can also be used.

The first sheet 12 and second sheet 14 are also bonded together with a plurality of discontinuous seams 34, 36 and 37 which form tubular, interconnecting passageways 28 through the inner sole 10. The spacing between adjacent seams controls the size (diameter) of the passageways 28. Also, unseamed expanses will form air pillows such as the arch pillow 45 and toe pillow 47. The size and space of the pillows can easily be varied during manufacture to adapt the inner sole to the particular shoe. Thus, if intended to fit conventional shoes with integral arch supports, the arch pillow can be reduced in size. It can also be enlarged for use with shoes having flat or near flat soles, to provide an arch support, the firmness of which can be regulated by adjustment of the air pressure within the inner sole.

Preferably, the seams have a plurality of through perforations or apertures 32 which extend entirely thorough the first and second sheets 12 and 14 and are entirely surrounded by a seamed area 30. For this purpose, the seams can be expanded to provide an annular seam area 30 that entirely surrounds each circular aperture 32 through the first and second plastic sheets. Each seam and seamed channels along the first and second sheets, described with reference to FIGS. 19–21, and the apertures 32 establish communication between the channels above and below the inner sole 10.

As illustrated, the instep is provided with several longitudinal discontinuous seams 34, 36 and 37 which extend to a generally transverse discontinuous seam 38 that subdivides the instep from the toe of the inner sole 10. The toe is also subdivided into tubular passageways by additional discontinuous seams such as 40. Seams 23 are provided transversely across the area between the toe and instep to improve the flexing of the inner sole 10 in this area. The spacing, size and number of these discontinuous seams can be varied greatly, as desired, to provide the maximum comfort and convenience to the wearer of a shoe fitted with the inflatable inner sole.

At the heel of the inflatable inner sole 10, a continuous loop seam 42 is provided, preferably as a circle surrounding a circular aperture 44 which extends through the first and second plastic sheets. The circular aperture 44 receives the air pump 50 of the invention. The air pump 50 has an inlet port along its bottom surface with a flapper valve 56 (described in greater deal hereinafter) and is functional to discharge air through an integral flexible tube 48 toward pressure control valve 58. The flexible tube 48 is placed beneath a wide seam 39, lying in the channel formed on the undersurface of the inner sole 10 by seam 39. Check valve 68 is also connected between tube 48 and flexible tube 70 which is connected to the pressure control valve 58.

The pressure control valve 58, also described in greater detail hereinafter, has a manual adjustment knob 60 for the controlled fixed adjustability of the pressure within the inflatable inner sole 10. The pressure control valve 58 has a discharge port 72 which is connected to a flexible tube 64 that extends through the continuous peripheral seam 16 and discharges directly into the sealed interior chamber between the first and second plastic sheets, preferably into the toe of the inflatable inner sole.

Figure 2:
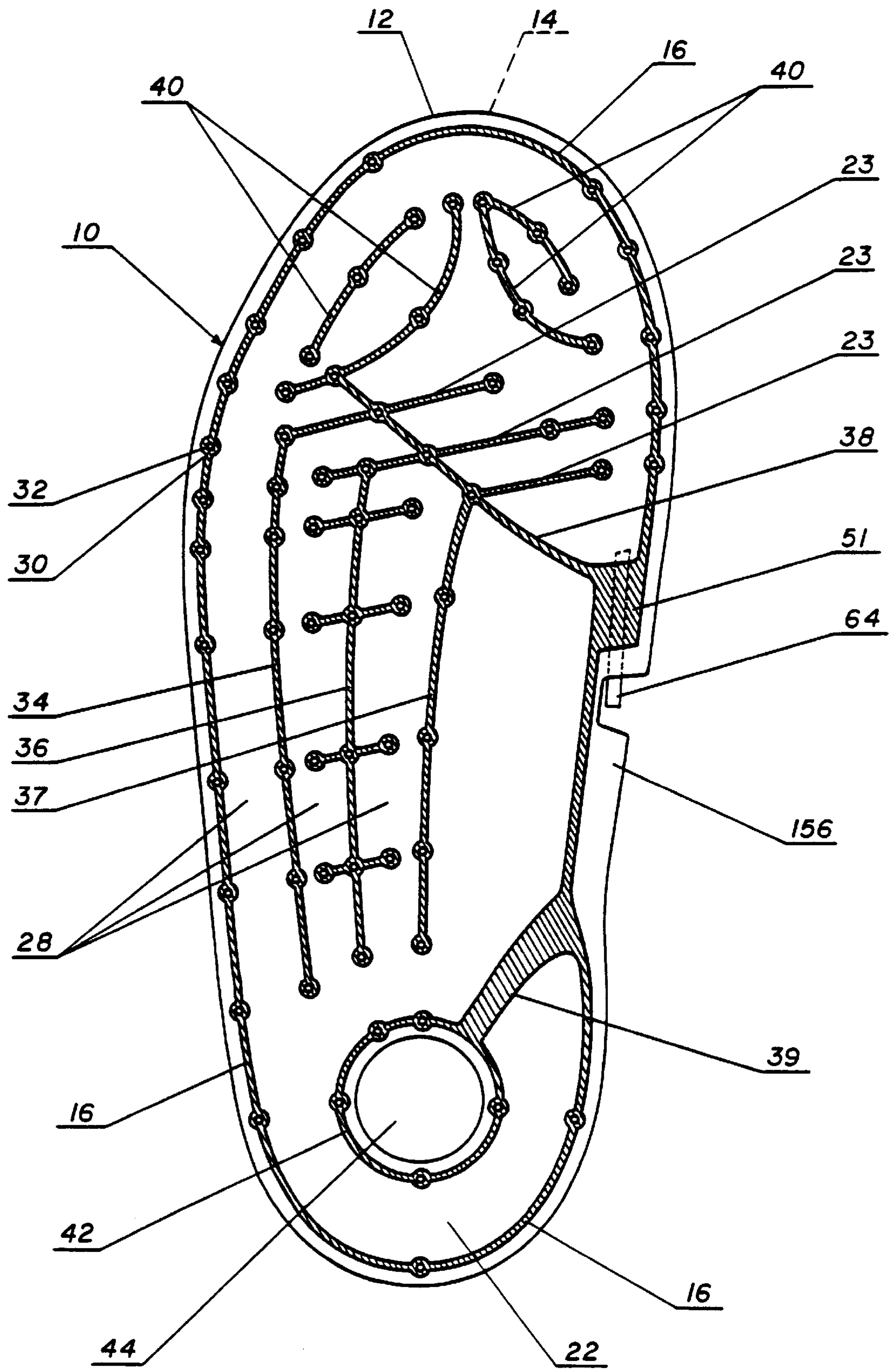
FIG. 2 is a view of the inner sole of FIG. 1 without the air pump and pressure relief valve.

Referring now to FIG. 2, there is illustrated a plan view of the inflatable inner sole 10 without the pressure relief valve and the air pump. As there illustrated, the flexible tube 64 which communicates through the peripheral seam 16 is permanently positioned in the inflatable liner.

Figures 3, 4:
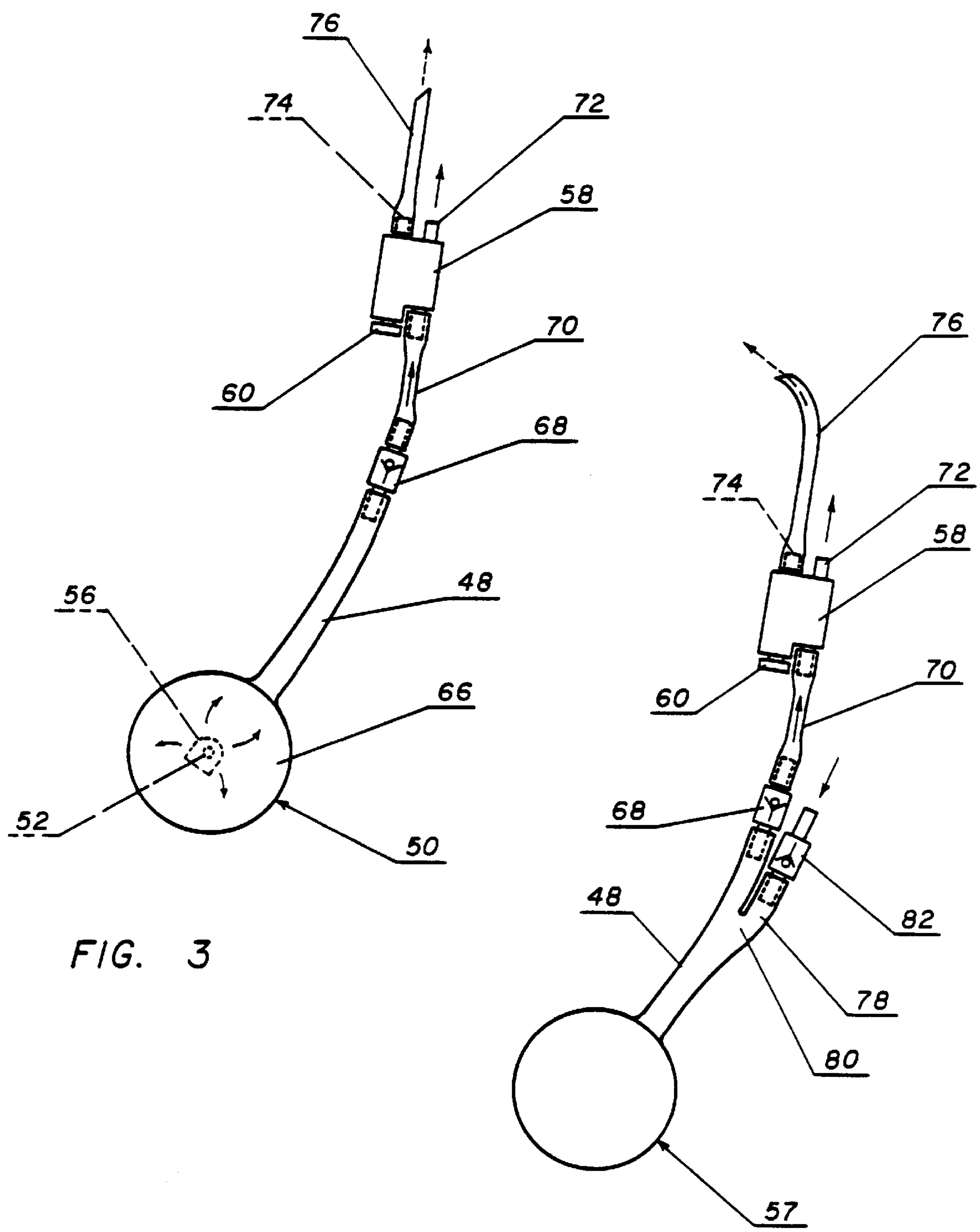
FIG. 3 illustrates the pump and relief valve assembly which is used with the inflatable inner sole of FIG. 1.
FIG. 4 illustrates an alternative air pump and relief valve assembly for the use with the inflatable inner sole of FIG. 1.

Referring to FIG. 3, there is illustrated a plan view of the air pump 50 and pressure control valve 58 used in the inflatable inner sole shown in FIG. 1. As there illustrated, the air pump 50 comprises a generally flat, flexible, resilient bulb 66 that has an internal flapper valve 56 that seals an inlet port, aperture 52, in its bottom wall. The air pump is integrally connected to a flexible tube 48 that discharges through a check valve 68 and into a short flexible tube 70 which is connected to the pressure relief valve 58. The pressure relief valve 58 has two discharge ports 72 and 74. Discharge port 72 is in direct communication to the flexible tube 64 that discharges into the toe of the inflatable liner 10, while discharge port 74 is connected to a short flexible tube 76 that discharges externally of the inflatable liner 10. As shown in FIG. 1, tube 76 is preferably placed beneath a wide seamed area 51, lying within the channel formed in the undersurface of the inner sole 10, thereby directing the excess air through these channels where it will flow upwardly through the apertures 32 of the inner sole 10. This establishes a forced air circulation in the shoe. Alternatively, the excess air could be vented to the outside of the shoe. Access to the second port 74 is controlled by the internal pressure regulation of the valve 58 which is fixedly adjustable by the adjustment knob 60.

FIG. 4 illustrates an alternative embodiment of an air pump 57 used in the invention. In the embodiment shown in FIG. 4, the flapper valve and inlet port in the bottom surface of the bulb has been removed and an inlet port 78 is provided in a Y-branch 80 of flexible tubing which is connected to a check valve 82 to serve as a fresh air inlet to the system. The remainder of the structure is substantially as described with reference to FIG. 3.

Figure 5:
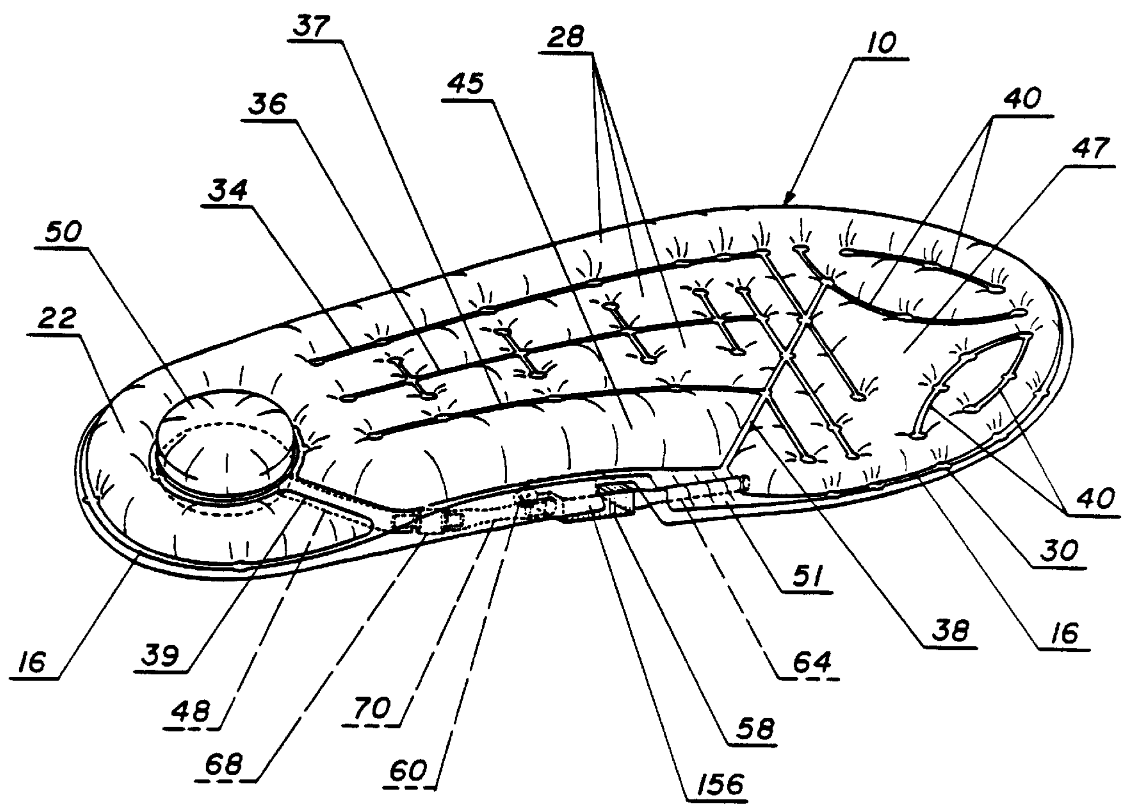
FIG. 5 is a perspective view of the inflatable inner sole of FIG. 1.

The inflatable inner sole 10 of FIG. 1 is shown in perspective view in FIG. 5. The circular aperture 44 at the heel which houses the air pump 50, and the tubular passageways which are formed between the discontinuous seams of the inner sole are apparent in this illustration. Also, the size and position of the pressure control valve 58 and adjustment knob 60 can be seen in the illustration.

Figure 6:
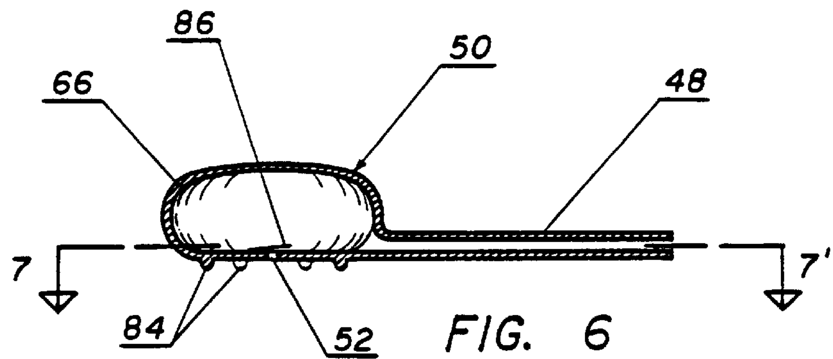
FIGS. 6 and 7 are sectional elevational and plan views of the pump used in the inner sole of FIG. 1.
Figure 7:
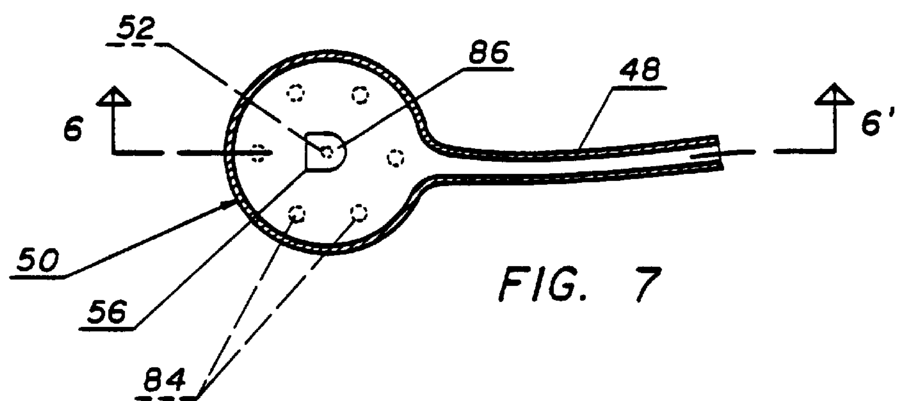

Referring now to FIGS. 6 and 7, the structure of the air pump 50 shown in FIG. 1 will be described in greater detail. FIG. 6 is a sectional view through the air pump 50 and illustrates that the air pump 50 is provided with a plurality of protrusions 84 on the undersurface of its bottom wall to permit free air passage beneath its undersurface. The bottom wall of the air pump is perforated with a single aperture 52 to provide an inlet port to the interior of the air pump and a single flap 86 of flexible plastic extends over this aperture and is hinged at one side edge thereof to function as a flapper valve 56.

Figure 8:
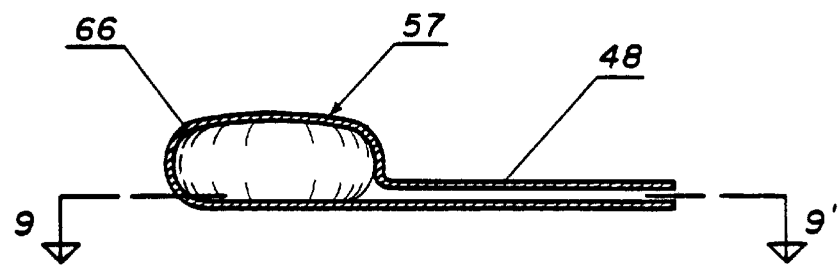
FIGS. 8 and 9 are sectional elevational and plan views of the alternative pump shown in FIG. 4.
Figure 9:
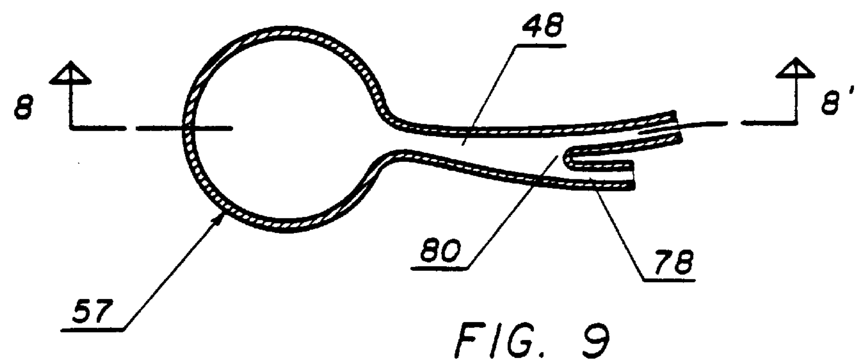

Referring now to FIGS. 8 and 9, the alternative air pump 57 which is shown in FIG. 4 has no protrusions on its bottom wall and does not have the aperture 52 in its bottom wall and the flapper valve 56, as these functions are supplied by the externally mounted check valve 82, previously described with reference to FIG. 4.

FIGS. 10 through 12 illustrate the pressure control valve 58. The pressure control valve 58 has a housing 90 with a single through longitudinal passage 92 that is intersected by a lateral passage 94 which communicates with a pressure valve. The pressure valve has a ball 98 as its valve member that is seated against a valve seat 100 of the lateral passage 94. The ball 98 is resiliently biased to a normally closed position by a coil spring 102 that has a spring stop 103 on the end of a threadable plug 104 that is received in an internally threaded bore 106 that opens into the lateral passage 94. By threadable adjustment of the plug 104, the tension of the spring 102 which compression the ball 98 against the valve seat 100 can be fixedly adjusted, thereby controlling the degree of pressure required to lift the ball off the valve seat. The internally threaded bore has a discharge passage 108 that communicates upstream of the pressure valve and that discharges through a discharge port 74 into the flexible tube 76.

Figure 13:
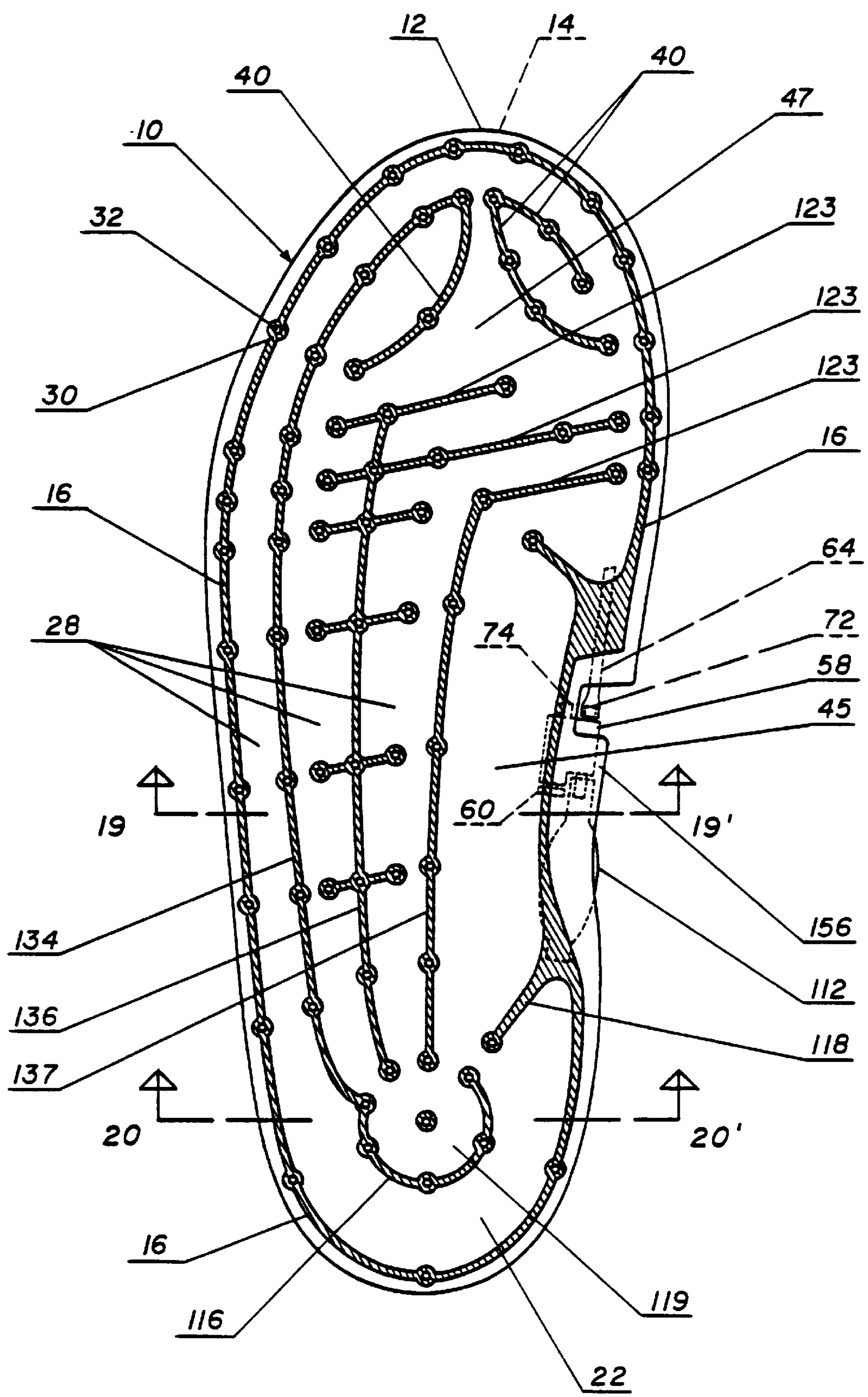
FIG. 13 is a plan view of an alternative inflatable inner sole with a hand pump and pressure relief valve.
Figure 14:
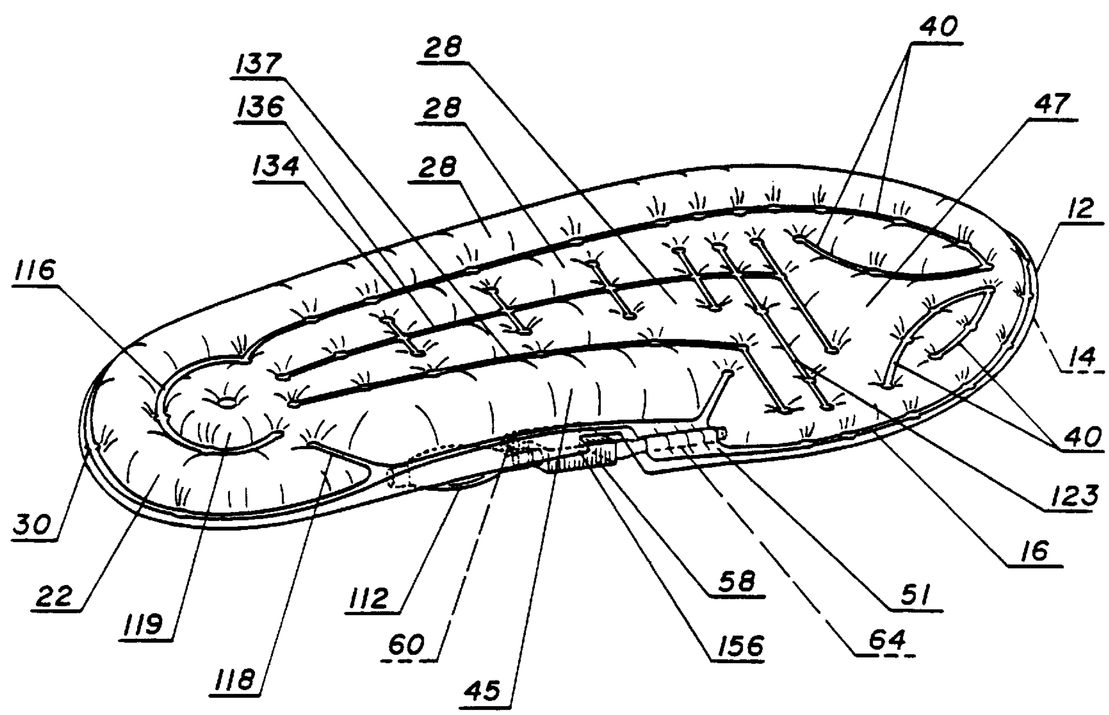
FIG. 14 is a perspective view of the inner sole, hand pump and pressure relief valve shown in FIG. 13.
Figure 20:
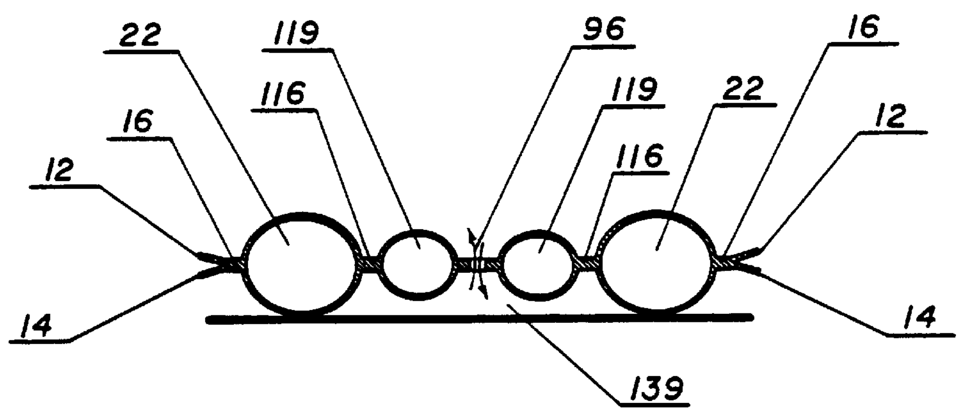
FIG. 20 is a sectional view along line 20–20' of FIGS. 13, 22 and 29.

Referring now to FIGS. 13 and 14, an alternative embodiment of the inflatable inner sole is shown in plan view. This embodiment is shown in perspective view in FIG. 14. The first sheet 12 and the second sheet 14 are bonded together with a continuous peripheral seam 16 extending entirely about these two sheets and forming a sealed interior chamber. A flexible tube 64 is molded in the seam. The flexible tube 64 is connected to a pressure regulation valve 58 and to a manually operated air pump 112. These elements are shown in greater detail in FIGS. 15–18. The air pump 112 is positioned medially of the inner sole 10 in a position where it can be manipulated by hand to permit pressurization of the inflatable inner sole. At this location, the hand pump doesn't contact or abrade the wearer's foot. As with the previous embodiment, the inflatable inner sole shown in FIG. 13 has a plurality of discontinuous seams 134, 136 and 137 that are spaced at preselected locations across its surface. Preferably a first seam 134 extends from the toe, laterally to the heel. At the heel, a semi-circular seam 116 is provided with a medially extending discontinuous seam 118 which extends to the peripheral seam 16, and two additional longitudinal seams 136 and 137 extend from the heel across the instep to the toe of the inner sole. A plurality of transverse seams such as 123 are provided to provide for laterally extending tubular passageways between the first and second sheets. These transverse seams 123 impart a flexing capability to the inner sole 10. An arch pillow 45 and a toe pillow 47 are also provided. Referring to FIG. 20, the enclosed space 139 which lies beneath the seam 116 and tubular passage 119 will collapse when the wearer's weight is placed on the area about seam 116 and will flex into the illustrated configuration when the wearer's weight is removed. The result is that the enclosed space 139 continuously varies in volume during walking, and thus functions as an air blower to induce flow of air down the channels beneath the insole and through the apertures 32.

Figure 15:
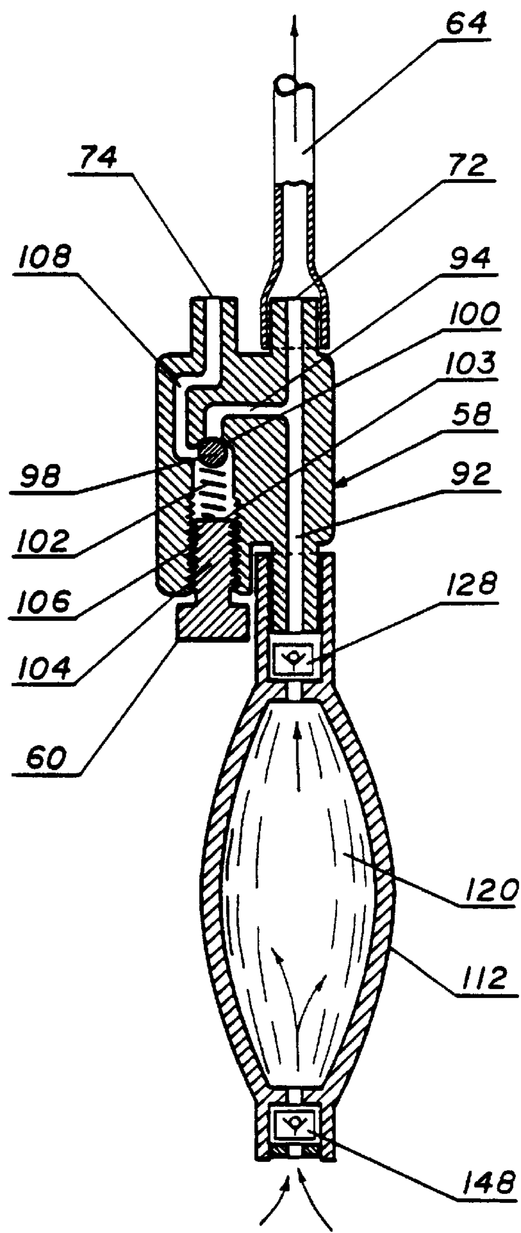
FIG. 15 is a sectional plan view of the air pump used in the embodiment shown in FIG. 13.

Referring now to FIGS. 15 through 18, the subassembly of the pressure regulation valve 58 and air pump 112 will be described. As shown in FIG. 15, the pressure regulation valve 58 is substantially the same as previously described with reference to FIGS. 10–12. The air pump 112, however, is a generally ovaloid, flexible and resilient bulb 120 which is placed laterally against the inside ankle of the wearer of the shoe. At its opposite ends, the air pump 112 is provided with check valves which can be of varied design and configuration.

Figure 16:
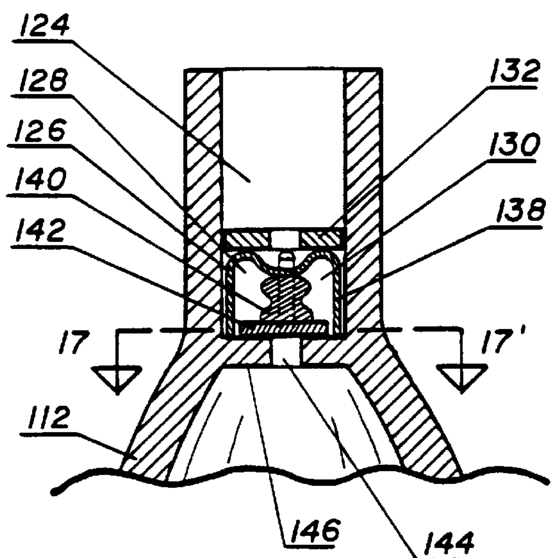
FIGS. 16 and 18 are sectional elevational views of the check valves of the pump of FIG. 15.
Figure 17:
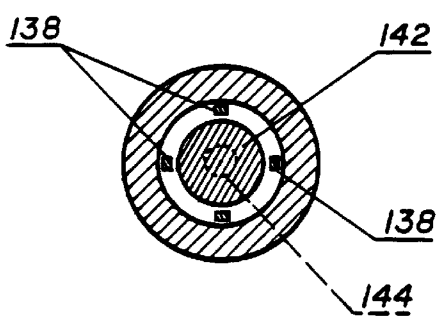
FIG. 17 is a view along line 17–17' of FIG. 16.

FIG. 16 illustrates a suitable discharge check valve 128 which has a valve chamber 130 formed by a washer 132 placed across the discharge passageway 124 of the air pump 112. A support spider 126 with vertical legs 138 is placed within the chamber 130 and supports at its center a valve member formed by resilient plug 140 and a flat disc 142 that seats against a port 144 in the bottom wall 146 of the valve chamber 130.

Figure 18:
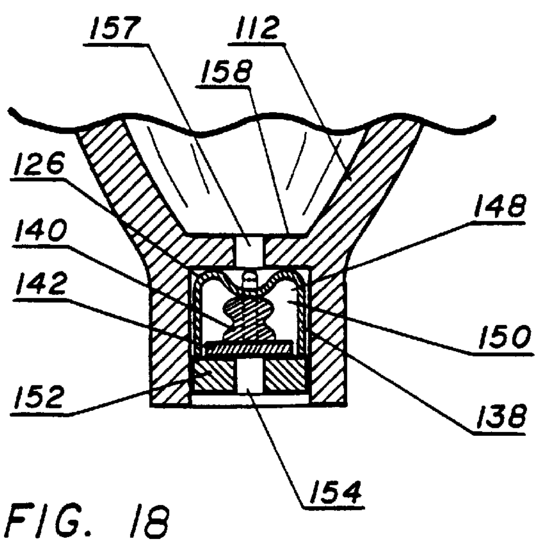

Referring now to FIG. 18, substantially the same valve configuration is used to provide an inlet check valve 148 of the air pump 112. The air pump 112 has an inlet valve chamber 150 with an annular disc 152 which extends across the chamber 150. This disc is fixedly secured within the chamber. A spider member 126 with support legs 138 is provided within the chamber and positions from its center a resilient valve plug 140 with a disc 142 that seats against a port 154 in the annular disc 152 and functions as the valve member of the inlet valve. The bottom wall 158 of the flexible resilient bulb 120 has a port 157 which communicates with the valve chamber 150.

Figure 19:
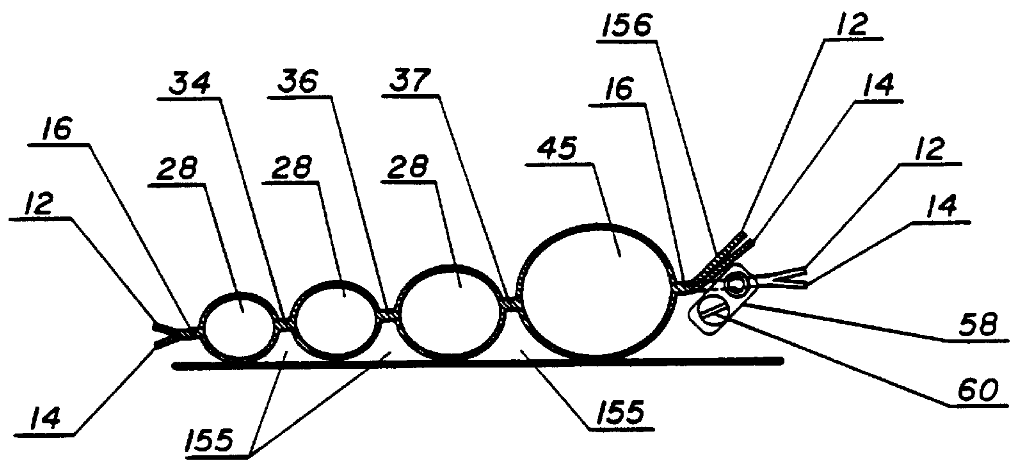
FIG. 19 is a sectional view along line 19–19' of FIGS. 1 and 13.

As previously mentioned, the various seams between the first and second plastic sheet form tubular passageways when the inner sole is inflated. FIG. 19 is a sectional view along line 19–19' of FIGS. 1 and 13, and illustrates the inflated shape or contour of the inner sole. As there illustrated, the peripheral seam 16 secures the upper sheet 12 and second sheet 14 together while the discontinuous inner seams 34, 36 and 37 form generally tubular passageways 28 and arch pillow 45. As there illustrated, the first sheet 12 and second sheet 14 are also shown beyond peripheral seam 16. Also, they could be cut flush with peripheral seam 16, except at the area which forms flap 156. Seam 16 can be made sufficiently wide to provide a seaming or bonding area to secure the inner sole to the footwear.

FIG. 19 also shows that the pressure control valve 58 in the assembly is located beneath an upwardly folded flap 156 of the first and second plastic sheets, thereby avoiding any rubbing contact between the valve 58 and the wearer's foot. Also, the valve could be increased by a soft fabric or sponge layer (not shown). Also, as previously mentioned, the seams form coextensive channels 155 which are indented into the undersurface of the inner sole 10. These channels 155 interconnect in a communicating network on the pattern of the seams shown in FIGS. 1 or 13. This network forms a distributor for forced air circulation in a shoe fitted with the inner sole 10.

FIG. 20 is a sectional view along line 20–20' of FIGS. 13. 22 and 29. As there illustrated, the semi-circular seam 116 forms annular tubular passageways 119 and 22 of substantial dimensions at the heel. As previously mentioned, apertures 32 are provided through the seams between the first and second sheets at various locations and air and/or moisture passes through the apertures as shown by the arrowhead lines 96.

Figure 21:
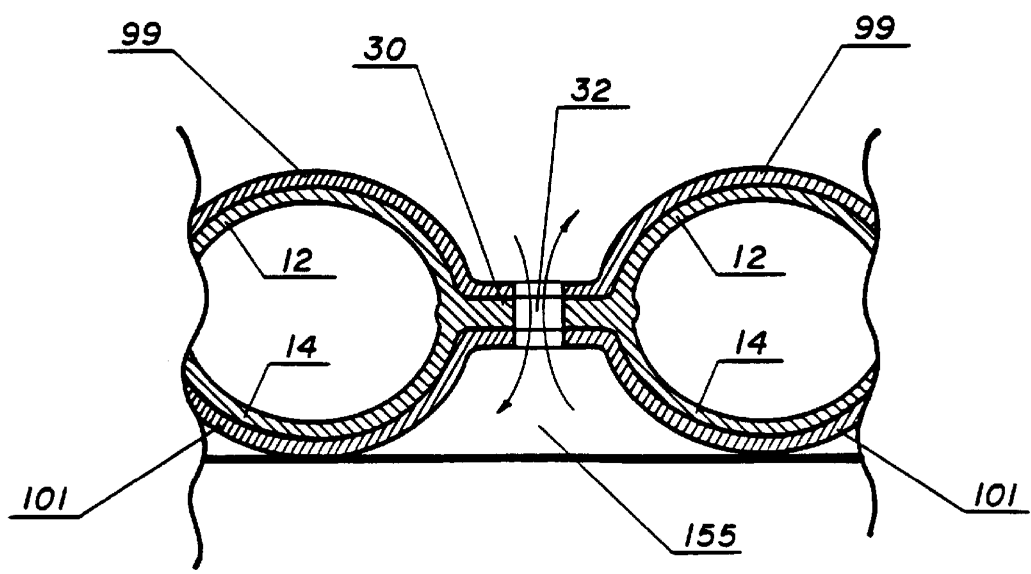
FIG. 21 is an enlarged sectional view through an aperture of an alternative embodiment having a lining about the inner sole.

FIG. 21 is a sectional view through a typical aperture 32. The seam between the first sheet 12 and second sheet 14 welds these sheets into a homogeneous band. In a preferred embodiment, the sheets 12 and 14 can be covered by outer layers 99 and 101 of fabric, plastic, foam, etc., to enhance the comfort of the inner sole 10. Also, if desired, the outer layer 101 can be an insulation layer, e.g., a reflective insulating film such as a film of polypropylene between aluminum foil sheets specially for boot liner FIG. 30 to keep heat inside the liner.

Figure 22:
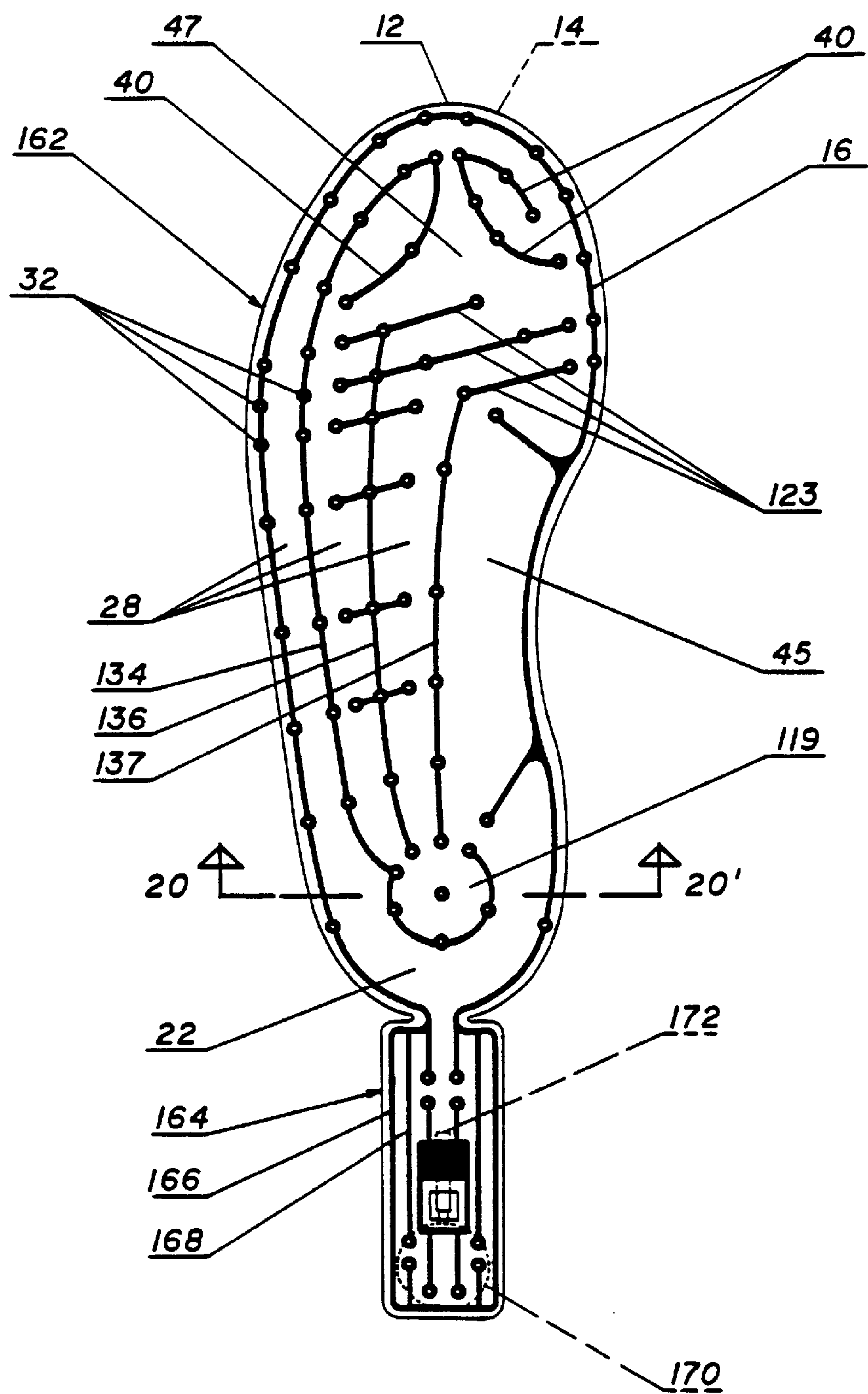
FIG. 22 is a plan view of an alternative inflatable inner sole having an inflatable side flap at its heel.

Referring now to FIG. 22, there is illustrated an inflatable inner sole 162 which has substantially the same construction as that previously described with reference to FIG. 13, however, this inflatable inner sole also has a side flap 164 at its heel. The flap 164 is folded flat and shown in plan view. As there illustrated, both the first and second plastic sheets are provided with rearwardly extending generally rectangular shaped flaps that are sealed together with a peripheral continuous seam 166 that is preferably continuous with the peripheral seam 16 about the inner sole. Additionally, a plurality of longitudinal seams 168 are provided within the side flap 164 to provide a plurality of internal passageways therein. These seams are closely spaced to provide thin or narrow passageways so that the thickness of the inflated flap will not be excessive. The side flap 164 also supports the air pump 170 generally indicated by the broken lines which discharges through a flexible tube 172. Tube 172 is permanently secured in flap 164.

Figure 24:
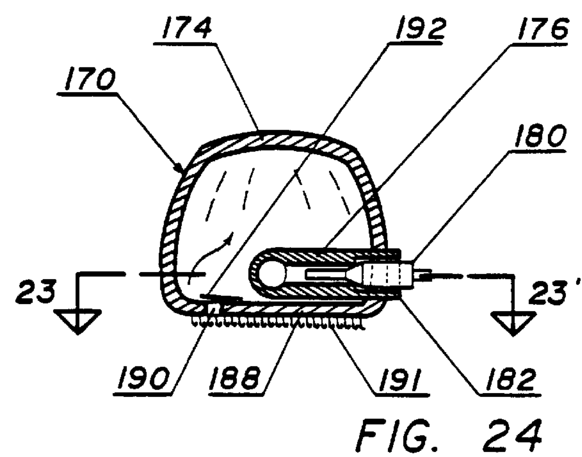
FIG. 24 is a sectional elevational view along line 24–24' of FIG. 23.
Figure 25:
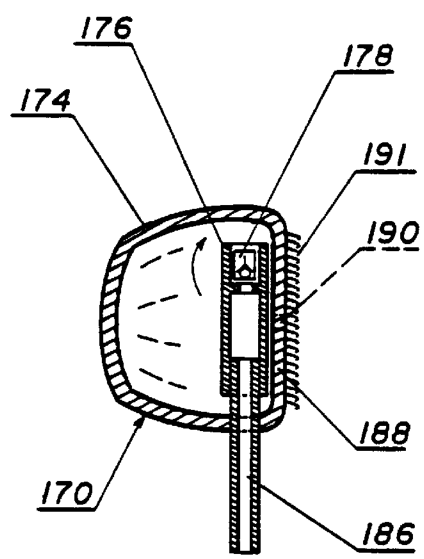
FIG. 25 is a sectional elevational view along line 25–25' of FIG. 23.
Figure 23:
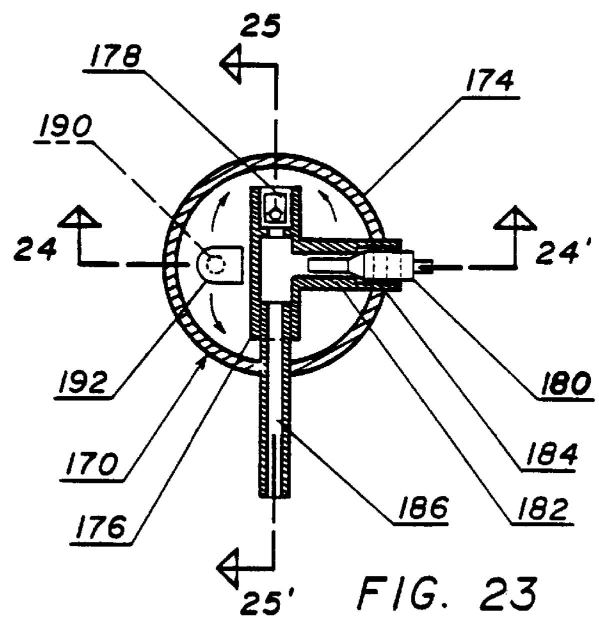
FIG. 23 is a sectional plan view along line 23–23' of FIG. 24, showing the hand pump used in the alternative inflatable inner sole of FIGS. 22, 29 and 30.

The air pump 170 which is used in the embodiment of FIG. 22 is generally illustrated in sectional views in FIGS. 23 through 25. FIG. 23 is a plan view of the air pump and shows a generally circular flexible bulb 174 which has a tubular tee 176 internally received within the bulb 174. Tee 176 contains the discharge check valve 178 and the release valve 180 for the pump. The base leg 182 of the tee 176 extends through the sidewall 184 of the bulb 174 of the pump and receives a conventional pressure release valve 180 such as available commercially as a tire valve core part No. 7595, from Schrader Automotive, Inc. Nashville, Tenn. The other end of the tee 176 is internally contained in the bulb 170 and houses a small check valve 178 that is directed to prevent fluid flow into the bulb 170. This valve receives air from the bulb 170 and discharges the air into the tee 176 for passage through the flexible tube 172 to the inflatable inner sole. Preferably, a Velcro band 191 is attached to the undersurface of wall 188 to secure the pump to flap 164.

The third end of the tee 176 receives tube 186 which connects to flexible tube 172, previously described. The bottom wall 188 of the bulb 174 also has an inlet port in the form of an aperture 190 with a flapper valve 192 hinged along one side on its internal bottom surface to serve as the inlet valve. If desired, the bulb 174 can be formed with a thick base, and the tee 176 can be incorporated in the base. In this application, the flapper valve 192 can be substituted with a mechanical check valve such as 178, shown in FIGS. 26 and 27.

Figure 26:
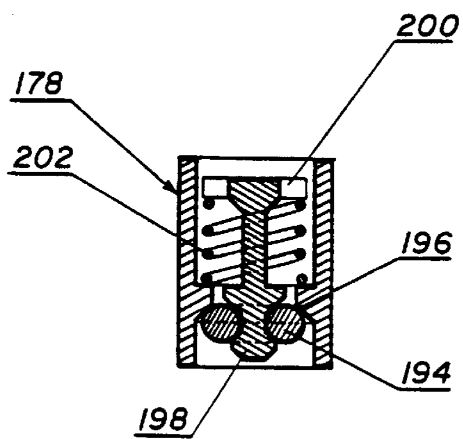
FIGS. 26 and 27 are sectional views through the check valves used in the pump of FIGS. 23–25.
Figure 27:
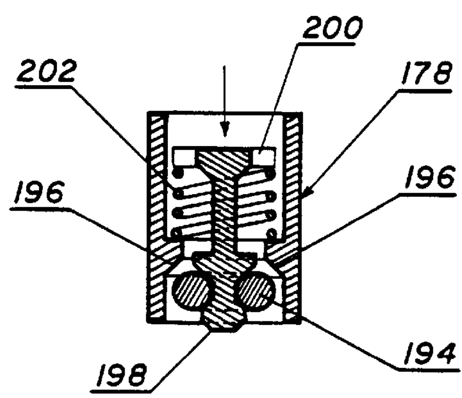

The mechanical check valve 178 used for the air pump is shown in FIGS. 26 and 27. In FIG. 26, the check valve 178 is shown in its closed position with the valve member in the form of an O-ring 194 being resiliently biased against the valve seat 196 by the valve stem 198 that is dependent at its upper end from a disc 200 that serves as a retainer to capture the compression coil spring 202 between the retainer and the bottom surface of the valve chamber. When the air is discharged into the tee 176, the air dislodges the valve member against the tension of resilient spring 202, permitting air to flow into the tee 176 and through the flexible tube 172 to the inflatable inner sole, as shown in FIG. 27.

Figure 28:
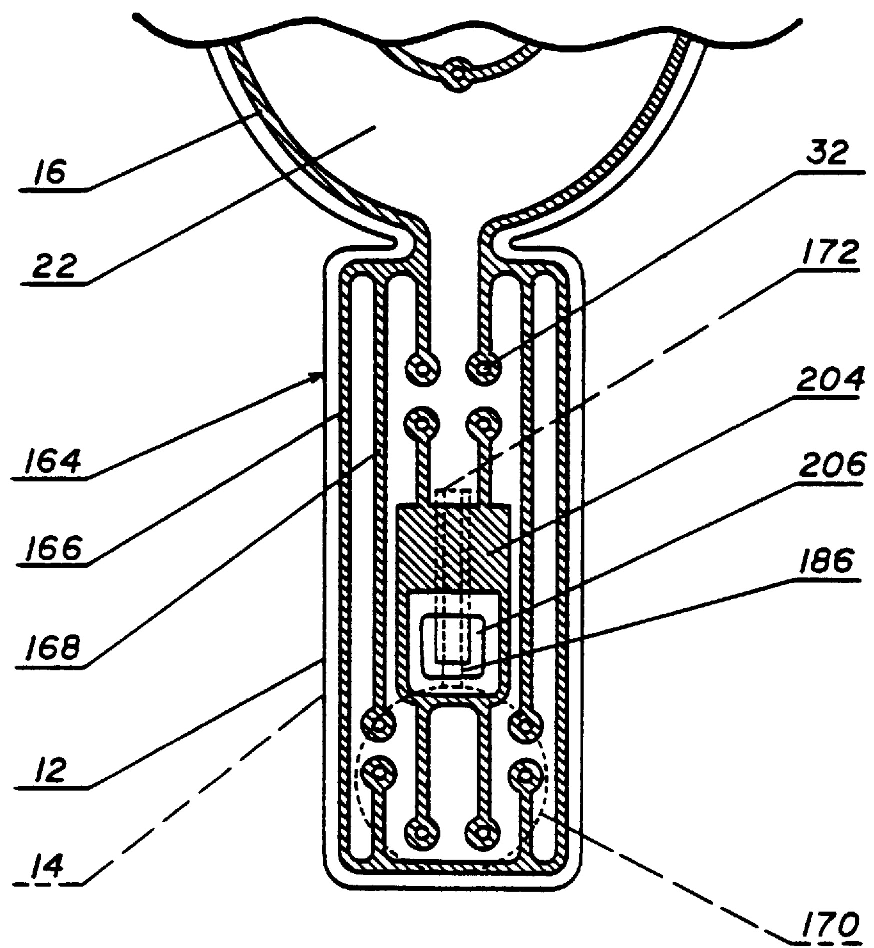
FIG. 28 is an enlarged plan view of the inflatable side flap located at the heel of the inflatable inner sole shown in FIG. 22.

Referring now to FIG. 28, there is illustrated an enlarged view of the side flap 164 of the inner sole. The flexible discharge tube 172 extends through a center seamed area 204 which is sufficiently large to provide security and support for the tube and the assembly of the air pump 170 shown in FIGS. 23 through 25. The air pump 170 is shown by the broken line. An opening 206 through flap 164 provides access to permit securing the pump 170 to the flexible tube 172. This mounting also biases the flexible resilient bulb of air pump 170 against the flap 164.

Figure 29:
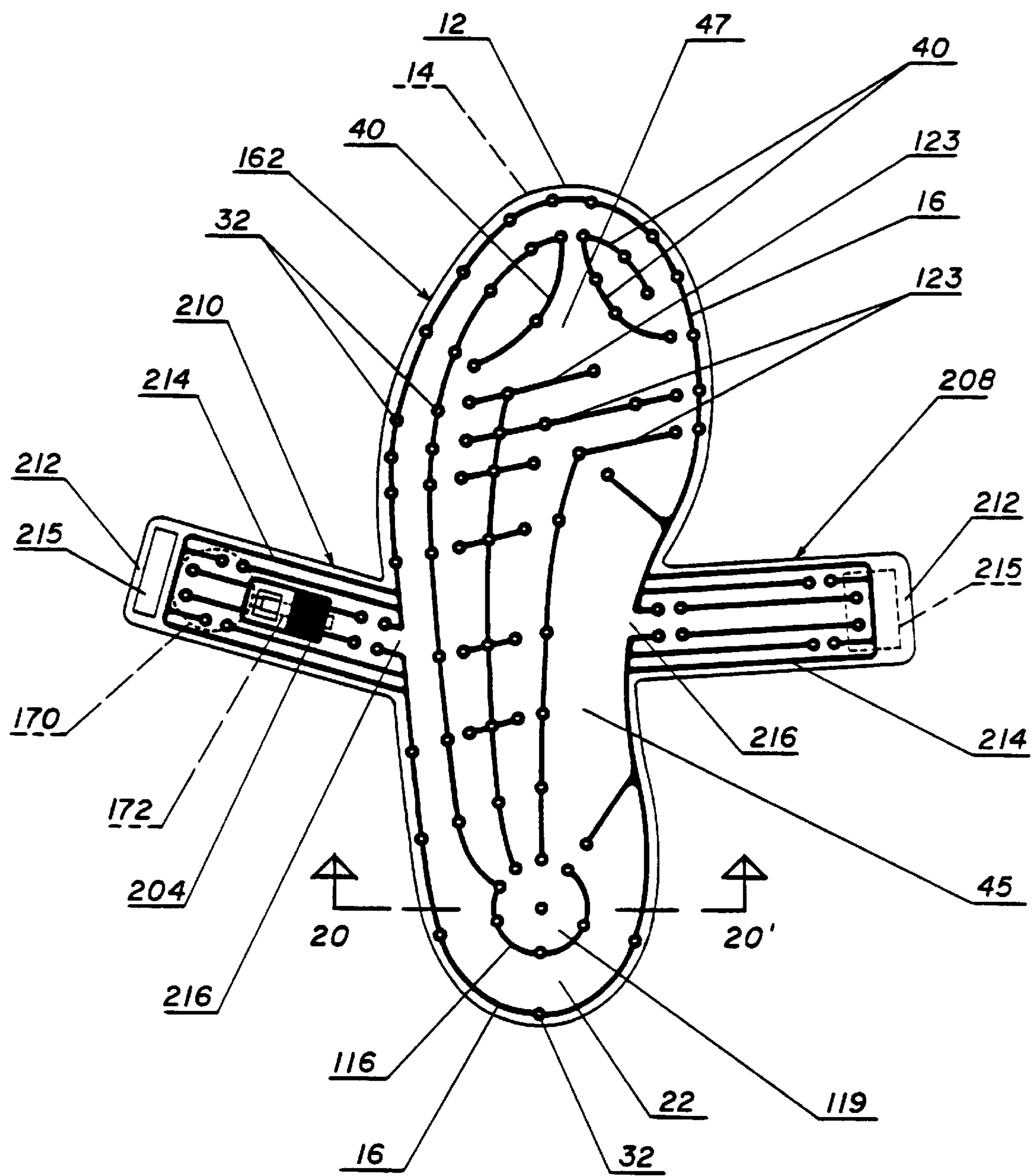
FIG. 29 is a plan view of an alternative inflatable inner sole with medial and lateral inflatable flaps which fold over the instep of the shoe.

The inflatable inner sole 10, alternatively, be provided with one or more side flaps such as the medial side flap 208 and the lateral side flap 210 shown in FIG. 29. Preferably these side flaps are of sufficient length and are located at the instep to permit folding over the instep of a wearer's foot and these side flaps can be attached together, preferably by providing bands 212 which carry hook-fabric attachments 215 such as Velcro, at each of their ends so that they will be fastened together when folded over the wearer's foot. Each of the side flaps is provided with a peripheral seam 214 that forms a sealed interior chamber which communicates through an opening 216 in the peripheral seam 16 of the inflatable inner sole whereby the side flaps 208 and 210 are also inflated. The inner sole can be secured to the footwear by stitching or cementing seam 16 to the inside sole of the footwear and, where appropriate, to the inside of the uppers of the footwear.

One side flap, 210, carries the air pump 170 shown in broken line. The pump is previously described with reference to FIGS. 23 through 25. The pump discharges into a flexible tube 172 that is also secured within a central sealed area 204 between the first and second plastic sheets. Preferably, the air pump is located at the instep area of the shoe where the air pump will be readily accessible for hand operation. For this application, an opening can be provided on the upper part of the outer shoe.

Figure 30:
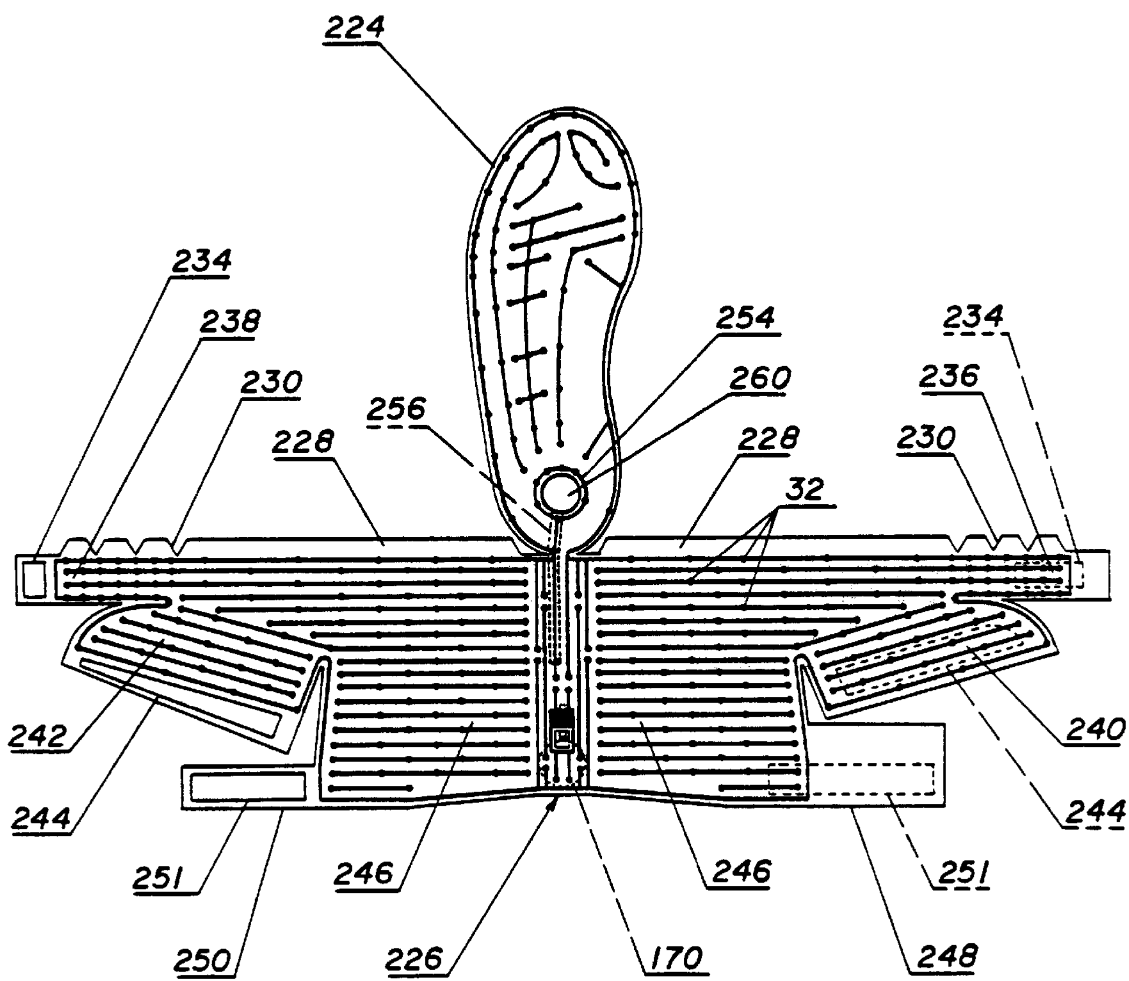
FIG. 30 is an inflatable boot liner which has an air pressurization and forced air circulation system.

Referring now to FIG. 30, there is illustrated an inflatable inner sole 224 which is integral with an inflatable liner for the entire upper region of a boot. The inner sole 224 is shown in a simplified view, it could include all the elements and features previously described. For this purpose, the inner sole 224 has, at the rear of its heel portion, an integral flap 226 that extends laterally and medially a sufficient distance to permit the flap 226, when folded vertically to extend entirely about the toe of the inner sole. Preferably this large flap forms a liner for the upper of the boot. The flap 226 has a coextensive tab 228 which can fold beneath the inner sole and also can be glued to the inner sole. As the tab must be formed about the curved toe, this co-extensive tab can have a plurality of V-shaped notches 230 to permit folding about this curved surface without forming creases. The vertical flap 226 is provided with a plurality of fabric attachment bands 234 such as Velcro to secure its opposite ends 236 and 238. Thus, a band of Velcro is provided at the medial end 236 of flap 226, and a co-acting Velcro band is placed on the opposite side of the flap 226 on its lateral end 238, thereby permitting the ends of the flap 226 to be secured together when wrapped about the toe of the inner sole. Preferably flaps 240 and 242 are provided at the medial and lateral sides of the instep to fit over the instep of the boot and each of these flaps also is provided with a co-extensive Velcro band 244 on its opposite sides whereby the flaps can be folded over the instep of the wearer and secured together with the bands of Velcro attachment fabric. The upper portion of the ankle area 246 of the flap 226 also preferably has medial and lateral extending tabs 248 and 250 which carry coextensive Velcro bands 251, again on opposite sides to permit securing of these tabs about the ankle of the wearer.

An air pump 170 is provided in the flap 226 and this air pump is shown by the broken lines similar to that shown on FIGS. 23 through 25 and mounted similarly to the mountings shown in FIGS. 22 and 29. In addition, the heel of the inner sole preferably includes a continuous circular seam 254 to form an opening that will receive an air blower 260 which induces forced air circulation through the shoe. The air inlet to the blower is flexible tube 256 which extends along flap 226 and is shown in a broken line in FIG. 30.

Figure 31:
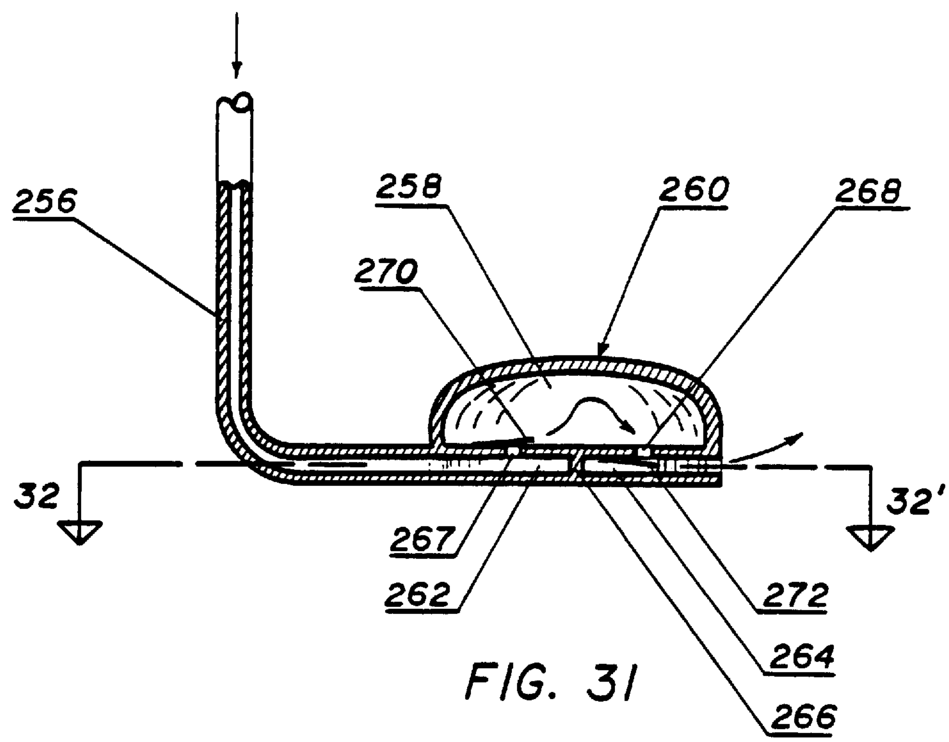
FIG. 31 is an enlarged sectional elevational view along line 31–31' of FIG. 32 showing a blower to circulate air in the boot liner of FIG. 30.
Figure 32:
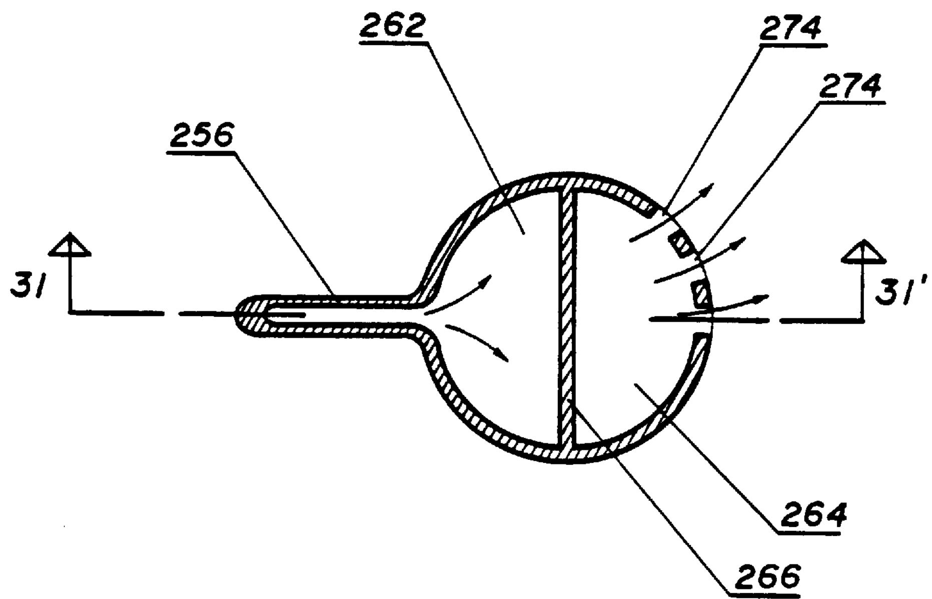
FIG. 32 is a sectional view along line 32–32' of FIG. 31.

The blower is shown in greater detail in FIGS. 31 and 32, and includes the aforementioned flexible tube 256 for the fresh air inlet that communicates with an inlet chamber 262, an upper chamber 258 within the flexible bulb 260 of the blower, and outlet chamber 264. Inlet chamber 262 and outlet chamber 264 are separated by a transverse wall 266. Apertures 267 and 268 are provided, one each in the top wall of each subjacent chamber 262 and 264, opening into the chamber 258 of the flexible and resilient bulb 260 of the air blower. A flap 270 of flexible plastic sheet material is mounted over the aperture 267 communicating with the inlet chamber 262 and is hinged to the bottom surface of the flexible bulb to thereby function as an inlet flapper check valve. A similar flap 272 of flexible sheet material is mounted on the undersurface of the bottom wall of the flexible bulb to function as a discharge flapper check valve.

As shown in FIG. 32, preferably a plurality of apertures 274 are provided about the periphery of the outlet chamber 264 to permit air to be discharged into the shoe, beneath the inner sole thereby serving to force air down the channels which are formed between the tubular passageways of the inflatable inner sole thereby permitting the air to be circulated through the plurality of through apertures 32 of the inner sole thereby establishing forced air circulation through the shoe above and below the inner sole. As described hereinafter, the forced air circulation achieved by blower 260 can be accomplished with a flexible bulb pump; see FIG. 84 and the accompanying description.

The inflatable inner sole shown in FIGS. 33–39 is substantially similar to that shown in FIG. 1, however, a greater number of seams 25 are provided, which decreases the diameters of the air channels 21 which are formed between the seams, thereby reducing the thickness of the inner sole. This is desirable to permit use of the inner sole with existing footwear, as it can be easily inserted or removed from existing footwear. This effect is apparent in the sectional view which appears as FIG. 34. In this embodiment, the peripheral channel 20 is slightly larger than the other channels 21 to provide greater stability and gripping.

Figure 35:
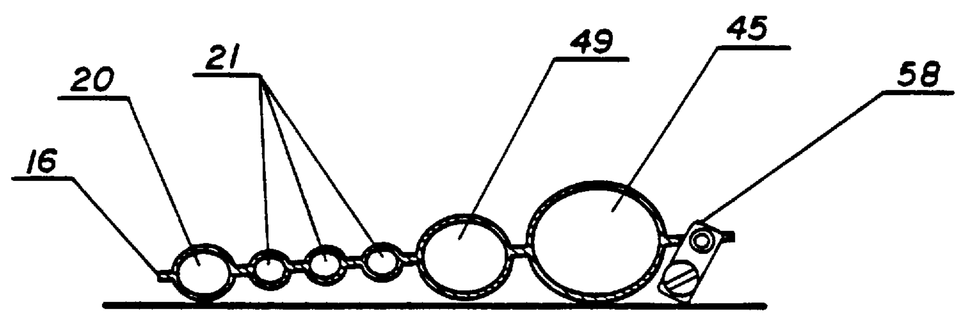
FIG. 35 is a sectional view along line 35–35' of FIG. 33.

Referring now to FIG. 35, the sectional view through the instep of the inner sole shows channels 45 and 49, which provide large pillows that give arch support to the wearer.

Figure 33:
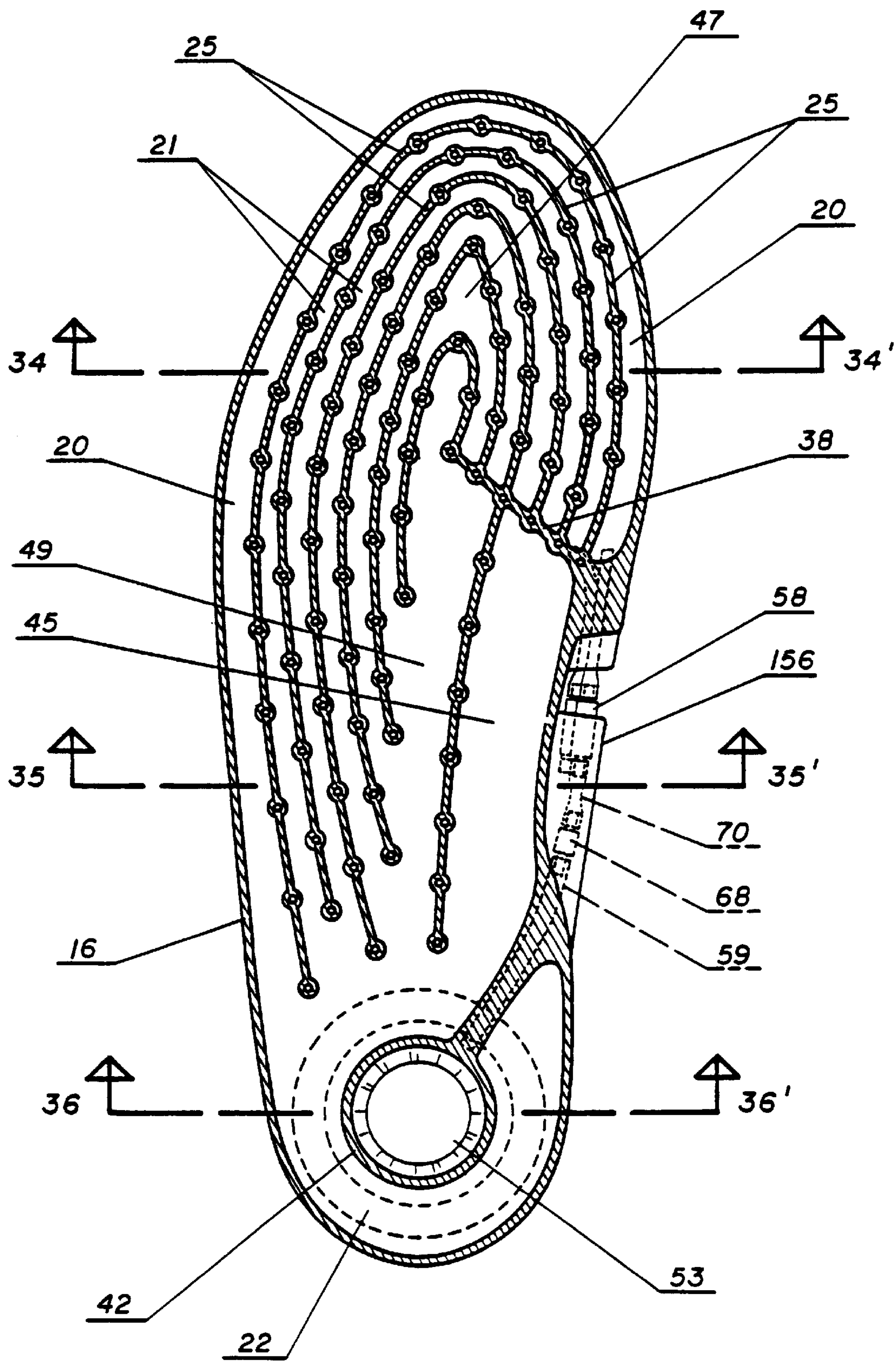
FIG. 33 is a plan view of an alternative inflatable inner sole.
Figure 34:
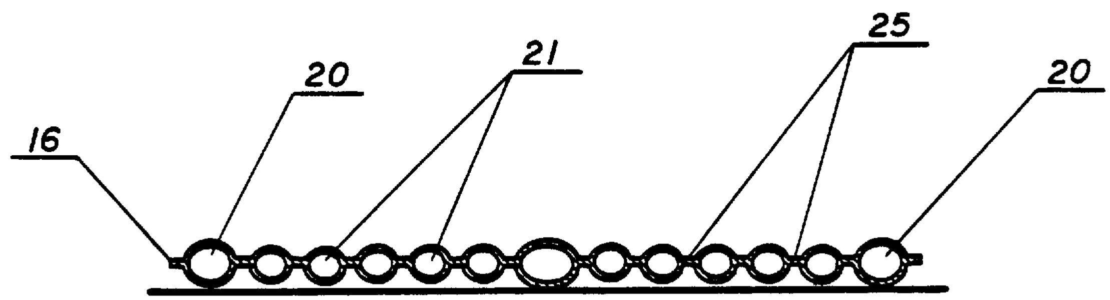
FIG. 34 is a sectional view along line 34–34' of FIG. 33.
Figure 36:
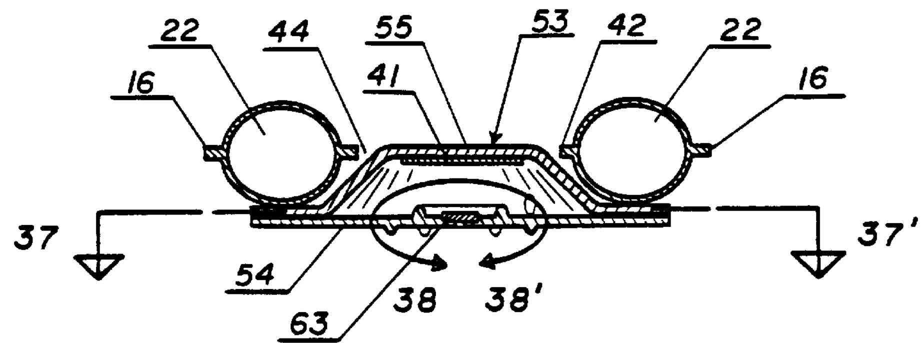
FIG. 36 is a sectional view along line 36–36' of FIG. 33.
Figure 37:
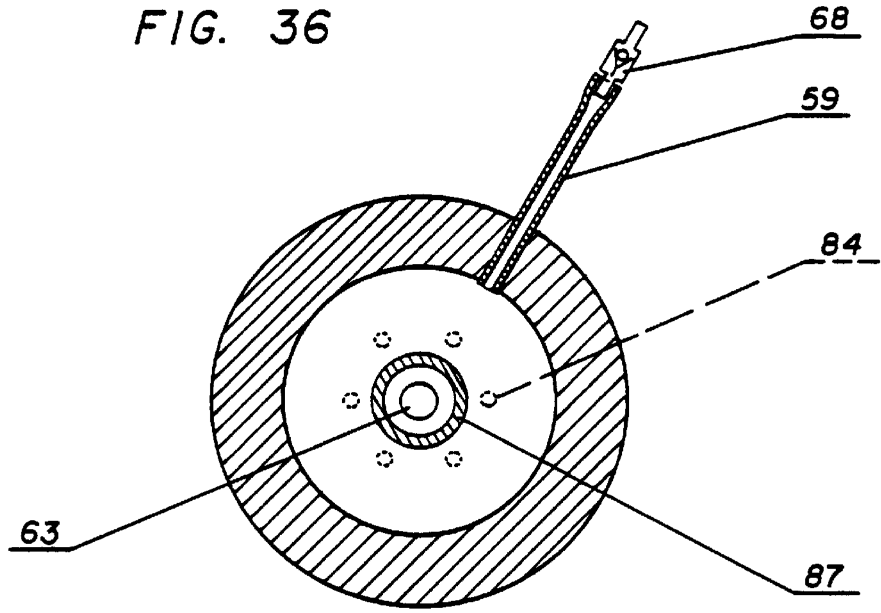
FIG. 37 is a sectional view along line 37–37' of FIG. 36.

FIG. 36 is a sectional view through the internal inflation pump 53 of the inflatable inner sole shown in FIG. 33. The pump 53 is an expandable chamber pump, and fits within the well or recess formed by circular seam 42 which surrounds aperture 44 through the sheet materials from which the inner sole is manufactured. This pump 53 is retained beneath the aperture as its diameter is greater than that of the aperture 44. The pump 53 is similar to pump 50, previously described with reference to FIGS. 6 and 7 and has a plurality of protrusions 84 on its undersurface to provide a clearance for air passage. The pump 53 is formed with a bottom sheet 54 to which is bonded the upper sheet 55. Preferably the bottom sheet has a substantial diameter to provide an annular flat seam which has sufficient width (see FIG. 39) to prevent extruding through the aperture 44 of the inner sole. A flexible tube 59 communicates with the air pump 53 and passes to the check valve 68 and pressure control valve 58, shown in FIGS. 33 and 39. An aperture 61 (see FIG. 38) in the side wall of pump 53 opens into tube 59. These elements are described in detail with reference to the same elements of FIG. 1.

Figure 38:
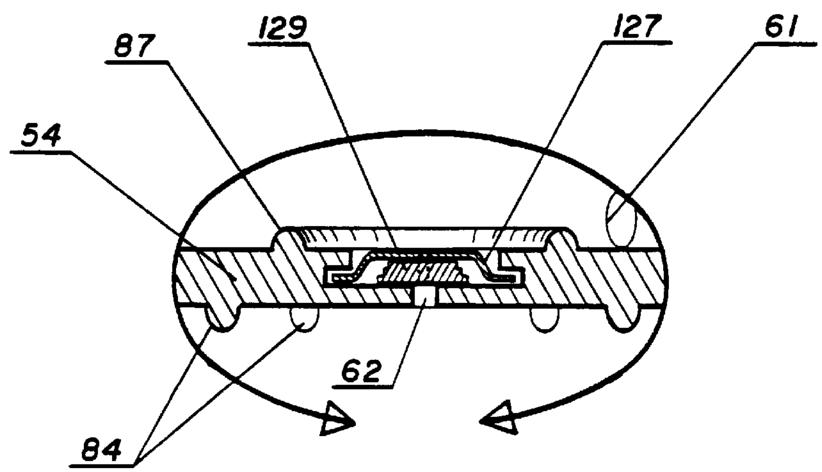
FIG. 38 is an enlarged view of the area within the line 38–38' of FIG. 36.
Figure 39:
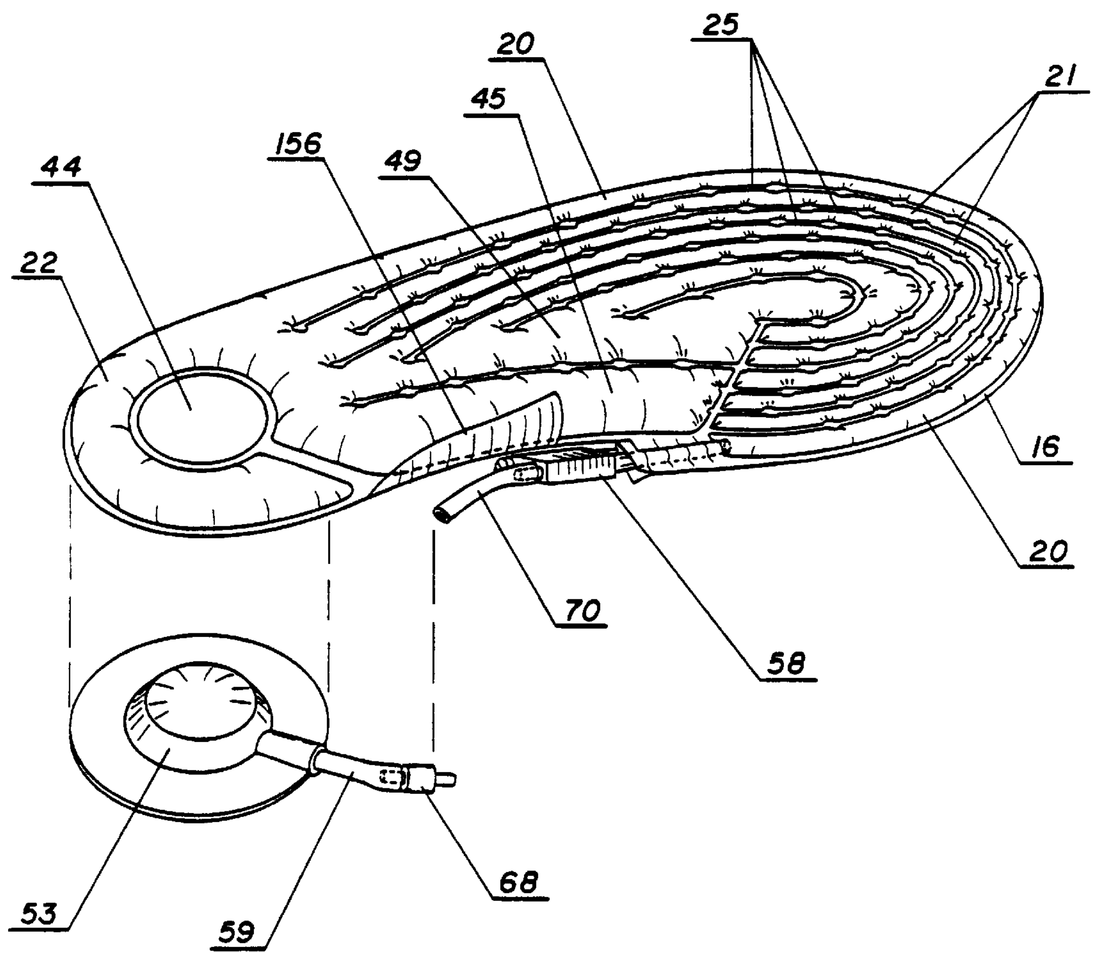
FIG. 39 is a perspective view of the inflatable inner sole shown in FIG. 33.
Figure 40:
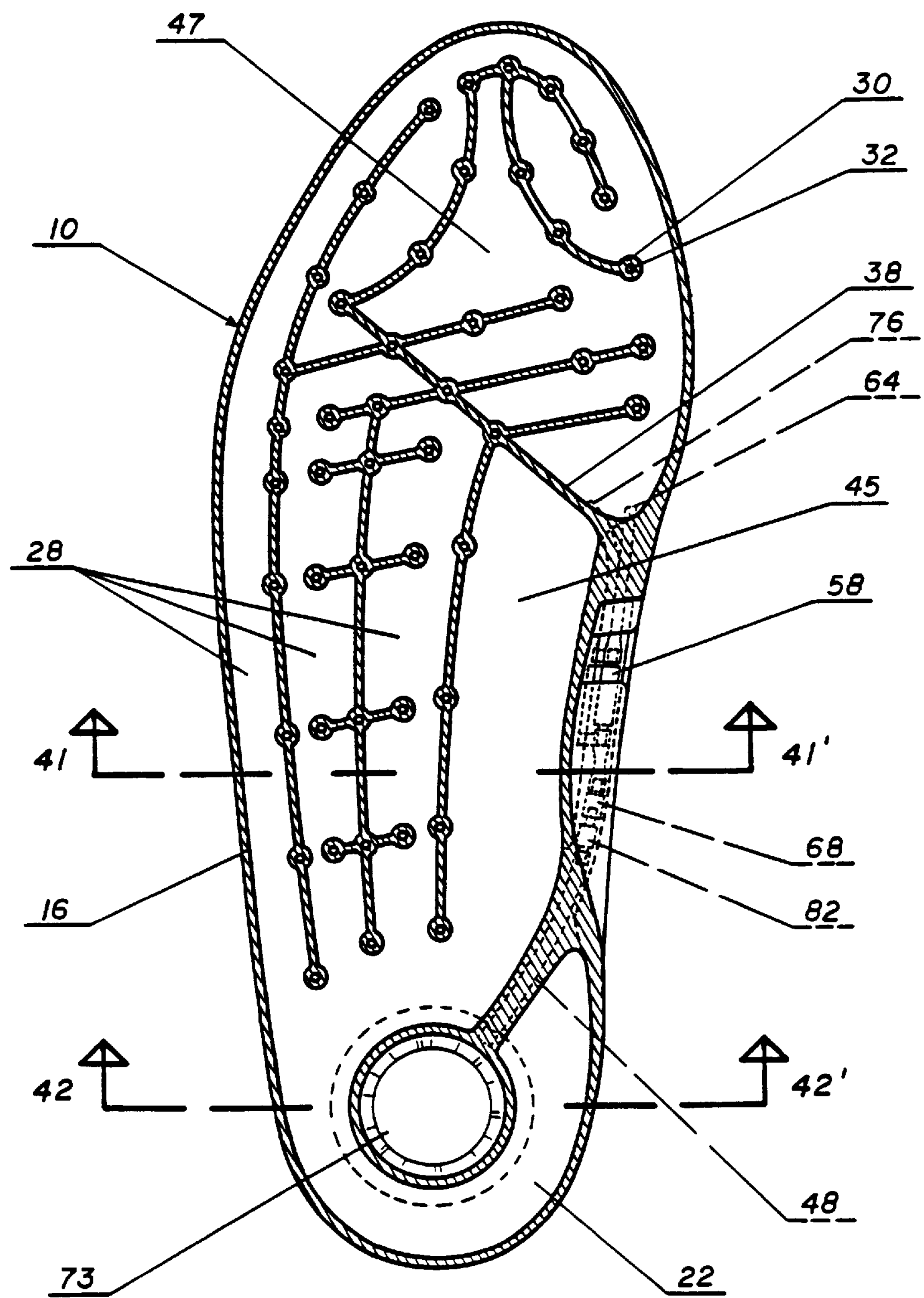
FIG. 40 is a plan view of an alternative inflatable inner sole.

The inlet valve to the air pump 53 is shown in detail in the enlarged sectional view of FIG. 38. As there illustrated, the bottom wall 54 of the air pump has an aperture 62 which is closed by the resilient plug 129 that is supported by spider 127. When a partial vacuum is formed within the pump 53, by expansion of the chamber of the pump, air flows past valve plug 129 and into the chamber of the pump. When the wearer's heel compresses the pump 53, the plug 129 seals the aperture 62 and forces the air through tube 59 and check valve 68. Preferably, the valve structure is surrounded by a raised circular rib 87 to prevent damage to the spider 127 and plug 129 when the air pump is entirely compressed. Preferably, a plate 41 is placed beneath the upper surface of the pump 53 to reinforce and stiffen this surface.

The plug 129 also functions to seal the inlet aperture against water intrusion, particularly when the inner sole, or footwear with the inflatable sole is washed or cleaned. Water cannot intrude past the plug 129 as there is no partial vacuum developed within the air pump 53.

Figure 41:
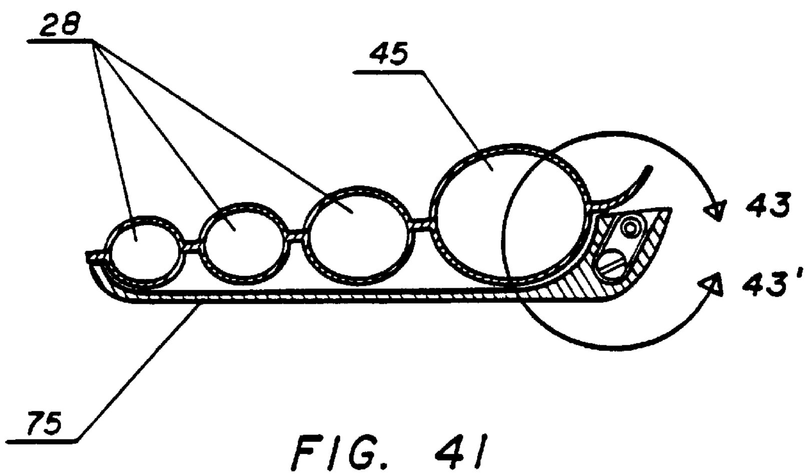
FIG. 41 is a sectional view along line 41–41' of FIG. 40.
Figure 42:
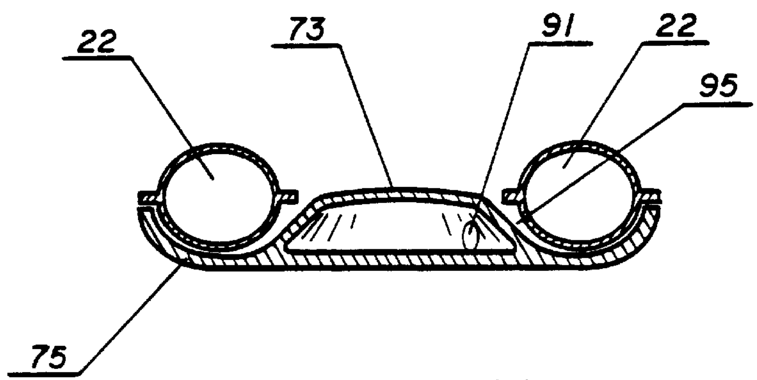
FIG. 42 is a sectional view along line 42–42' of FIG. 40.
Figure 43:
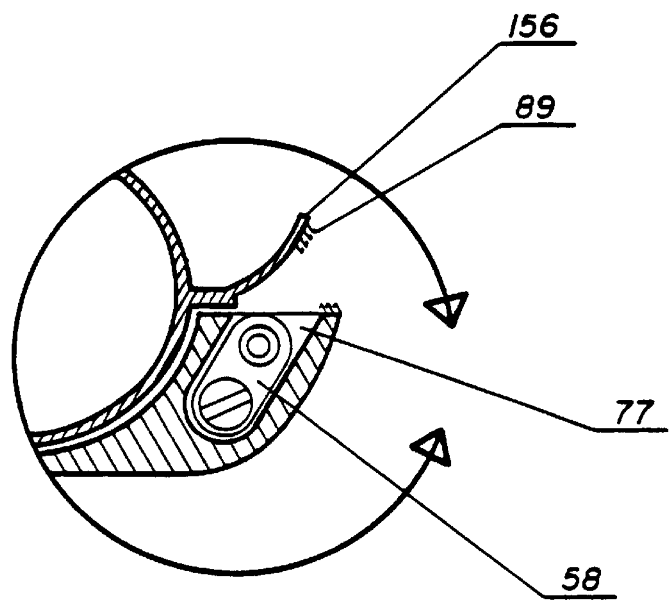
FIG. 43 is a an enlarged view of the area within the line 43–43' of FIG. 41.
Figure 44:
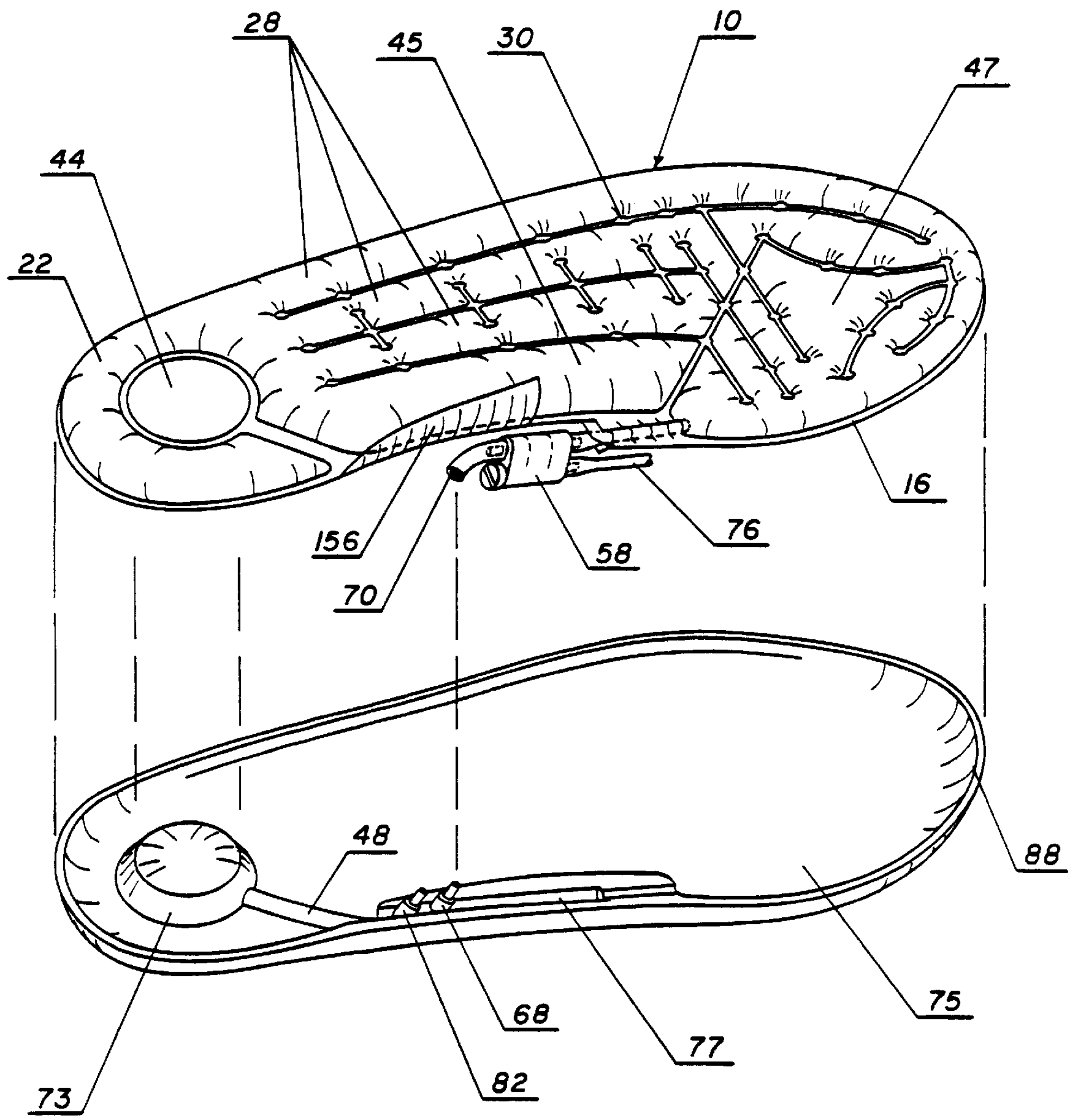
FIG. 44 is an exploded perspective view of the inflatable inner sole of FIG. 40.
Figure 45:
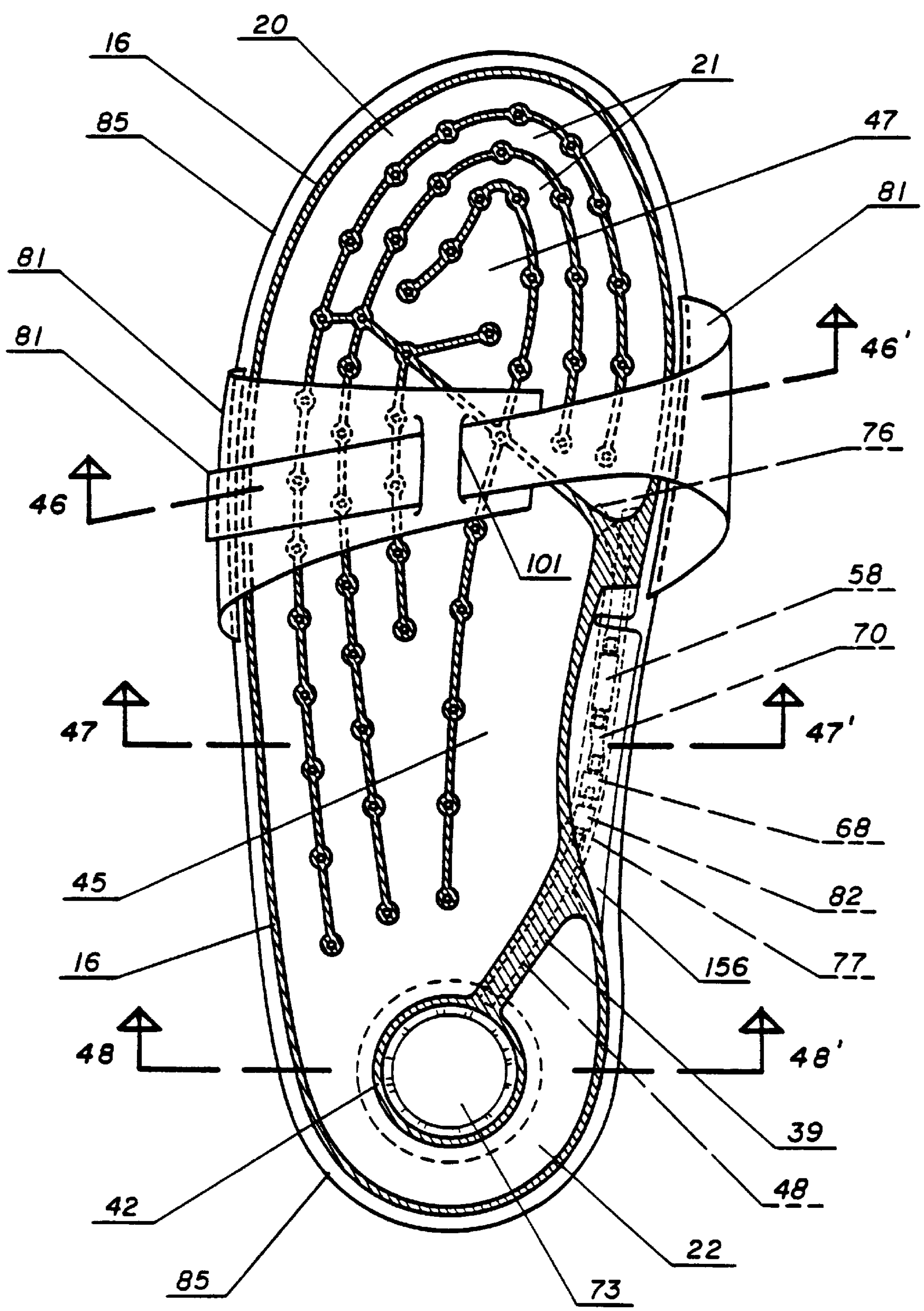
FIG. 45 is a plan view of an alternative inflatable inner sole for a sandal.
Figure 46:
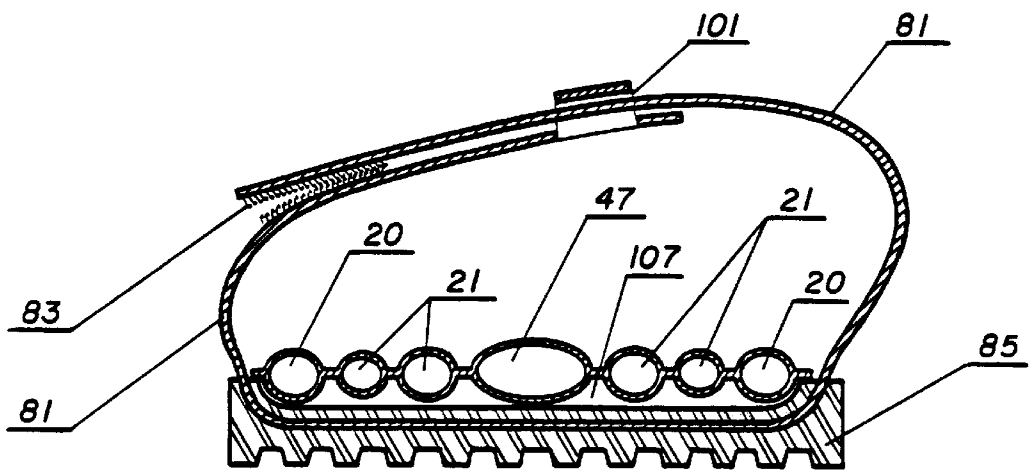
FIG. 46 is a sectional view along line 46–46' of FIG. 45.
Figure 47:
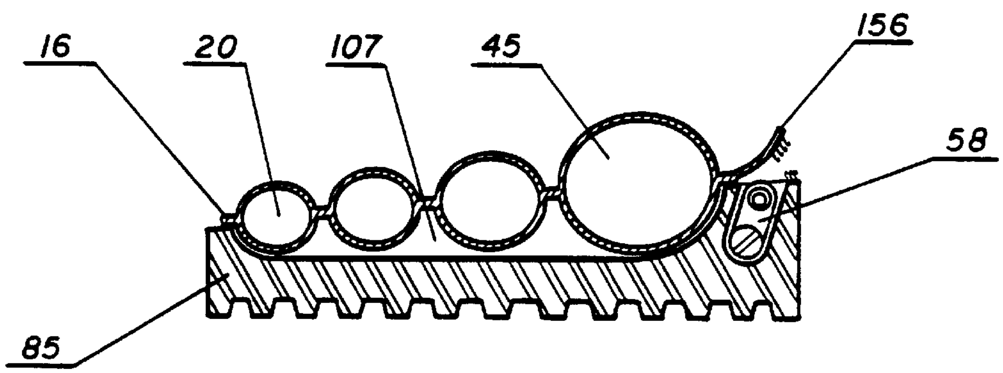
FIG. 47 is a sectional view along line 47–47' of FIG. 45.

Referring now to FIGS. 40 through 44, there is illustrated an embodiment of an inflatable inner sole which includes a support underlayment for the inner sole. This embodiment can be for a removable inner sole for foot wear. It is especially useful, however, as a permanent member in footwear, particularly in athletic footwear or in house shoes, e.g., slippers, moccasins, etc. Some slippers now on the market have two fabric soles separated by a space which is filled with a removable foam sole. This embodiment can be inserted as a substitute for the foam sole. The inner sole 10 is substantially identical to that shown and described with reference to FIG. 1. As shown in FIG. 44, the inner sole is used in combination with a supporting underlayment 75 which has an upwardly curled edge 88 extending entirely about its periphery, conforming to the shape of the inner sole. The air pump 73 can be integrally formed with the underlayment 75, and as shown in FIG. 42, the circular channel 22 of the inner sole 10 is received within the circular trough 95 formed between the upwardly curled peripheral edge 88 and the air pump 73. Alternatively, the air pump can be formed separately as shown in FIGS. 8 and 9 and can be assembled to the underlayment 75. In this embodiment, the inlet valve to the air pump is located at the medial edge of the underlayment 75; see FIG. 44. The pump 73 has a communicating tube 48 which has a Y-shaped end similar to pump 57 shown in FIG. 4. This tube 48 can be integrally molded into the underlayment 75. The inlet check valve 82 has its open end within the shoe. The outlet, or discharge, check valve 68 is coupled to tube 70 that extends to the pressure control valve 58. As shown in FIG. 41, a pocket 77 is molded adjacent the medial edge of the underlayment along the instep region. This pocket receives the pressure control valve 58 (see FIGS. 41 and 43) and the check valves 68 and 82 (see FIG. 44). The pocket is preferably closed with a flap 156 that can be retained closed by Velcro bands 89.

The invention can also be incorporated in footwear as an integral inflatable sole. FIGS. 45 through 49 illustrate the incorporation of the invention as a permanent member of footwear. For illustration purposes, a sandal, or clog, is shown. It is apparent, however, that the upper portions of a conventional shoe or boot could also be permanently attached to the illustrated sole. In such application, the inner sole could also include inflatable upper liners such as shown in FIGS. 29 and 30. In the illustrated application, the sandal has a conventional outer sole 85 that is provided with treads on its undersurface, and with conventional straps 81 which extend from opposite, medial and lateral sides of the upper edges of the outer sole. The straps can be molded into the outer sole 85, as shown in the sectional view of FIG. 46. The straps 81 interconnect above the arch or toes of the wearer and for this purpose can be provided with slots such as 101 and/or Velcro attachment bands 83 on opposite mating surfaces, all in a conventional manner.

The outer sole 85 can have a recess 107 in its upper surface and the inflatable liner 10 of the invention can be received within this recess. This liner is substantially as previously described with flow passageways 21 and a toe pillow 47. Preferably, the liner is permanently secured to the upper surface of the outer sole 85 with stitching, bonding with a suitable cement or glue, or by solvent welding. The permanent attachment is along the peripheral edge 16 of the inflatable inner sole. Alternatively, the inflatable inner sole can be removably attached by Velcro attachment fabric bands which can be applied to the underside of peripheral edge 16 of the inner sole and about the mating peripheral edge of the outer sole 85.

Figure 48:
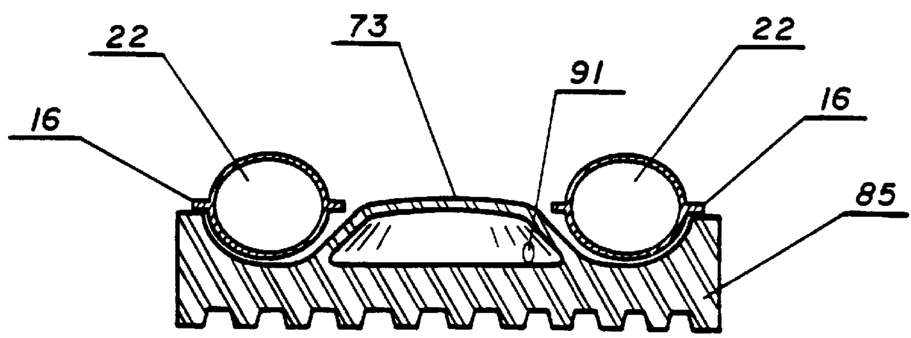
FIG. 48 is a sectional view along line 48–48' of FIG. 45.
Figure 49:
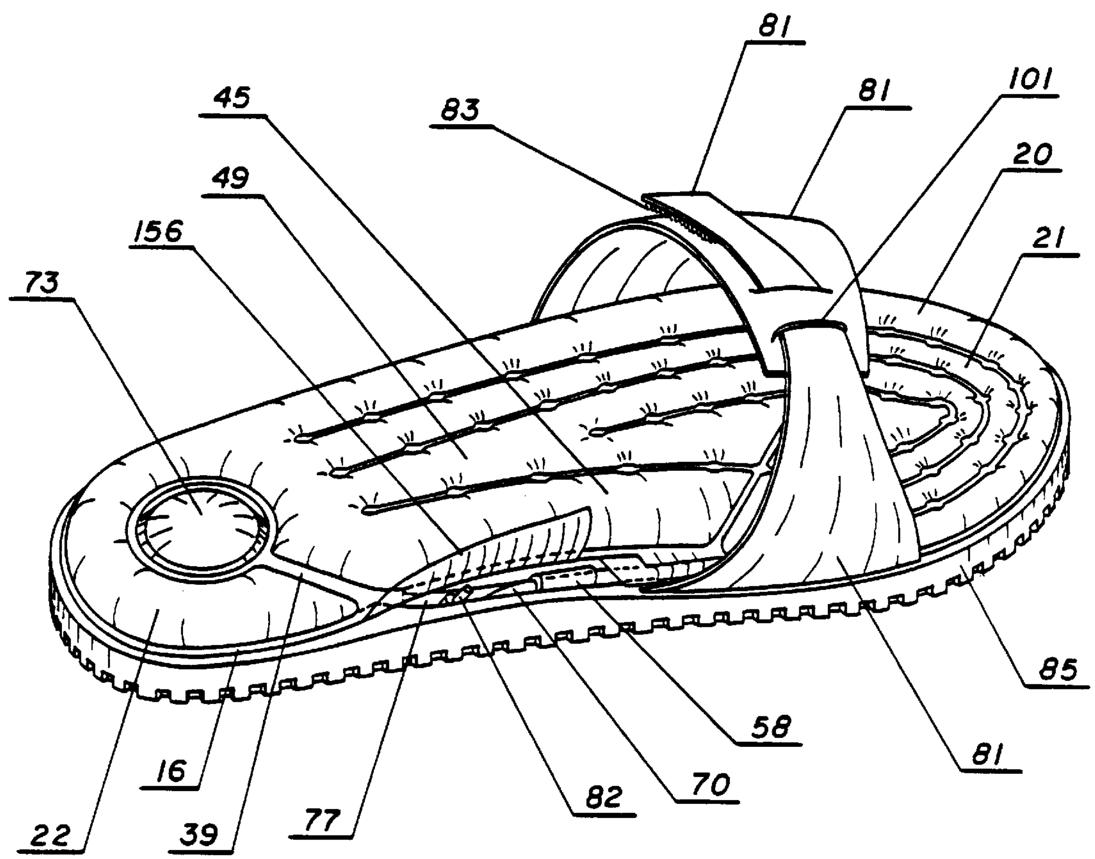
FIG. 49 is a perspective view of the inflatable inner sole of FIG. 45.

As shown in FIG. 48, the air pump 73 can be integrally molded into the outer sole 85. This is especially advantageous for a sandal as the pump is thus integral with the heel of the sandal, and no additional flap or band is needed for mounting of the pump. An aperture 91 in the sidewall of the air pump 73 communicates with a tube 48 that has a Y-shaped end (see FIG. 4) which has an inlet check valve 82 and a discharge check valve (not shown) which is connected to tube 70. As shown in FIGS. 44 and 49, tube 48 is beneath seam 39. The outer sole is preferably formed with a pocket along its medial edge adjacent the instep region to provide a recess that receives the pressure control valve 58 and the check valves 68 and 82. This pocket can be closed with flap 156 of the inner sole 10 and secured with Velcro fabric bands (not shown). In some applications, e.g., beachwear, the apertures 32 can be eliminated and the discharge tube 76 from the pressure relief valve 58 can be directed outside of the recess 107. As shown in FIG. 10, tube 76 is connected to the excess pressure relief port 74 of the pressure relief valve 58.

Figure 50:
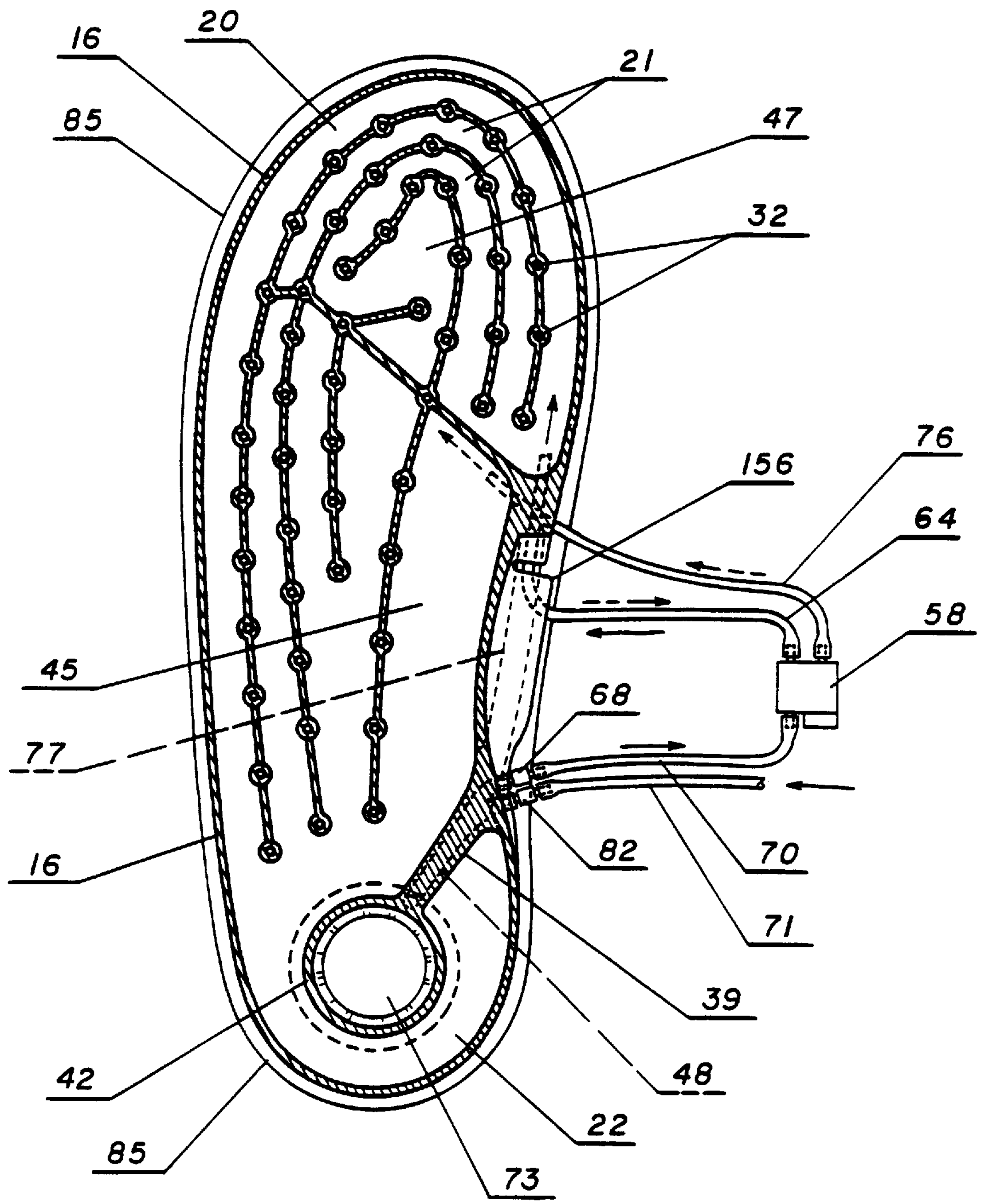
FIG. 50 is a plan view of an inflatable inner sole with a heel pump and a remotely-located, adjustable relief valve.

Referring now to FIG. 50, there is illustrated a plan view of an inflatable inner sole according to the invention which is provided with a remotely located pressure control valve 58. For this purpose, the flexible tube 70 which extends from the air pump check valve 68 has sufficient length to extend beyond the region of the sole. Similarly, the flexible tube 64 which directs pressure controlled air from valve 58 to the sealed interior chamber of the inner sole, and the flexible tube 76 which directs excess air from the pressure control valve 58 to beneath the inner sole, also have sufficient length to extend beyond the region of the sole. This permits the pressure control valve 58 to be located remotely from the sole of the shoe, e.g,, the valve 58 can be located on the sides of the upper portion of the shoe where it is readily accessible to the wearer. If desired, the inlet flexible tube 71 can also be of sufficient length to extend to a location remote from the sole.

Figure 51:
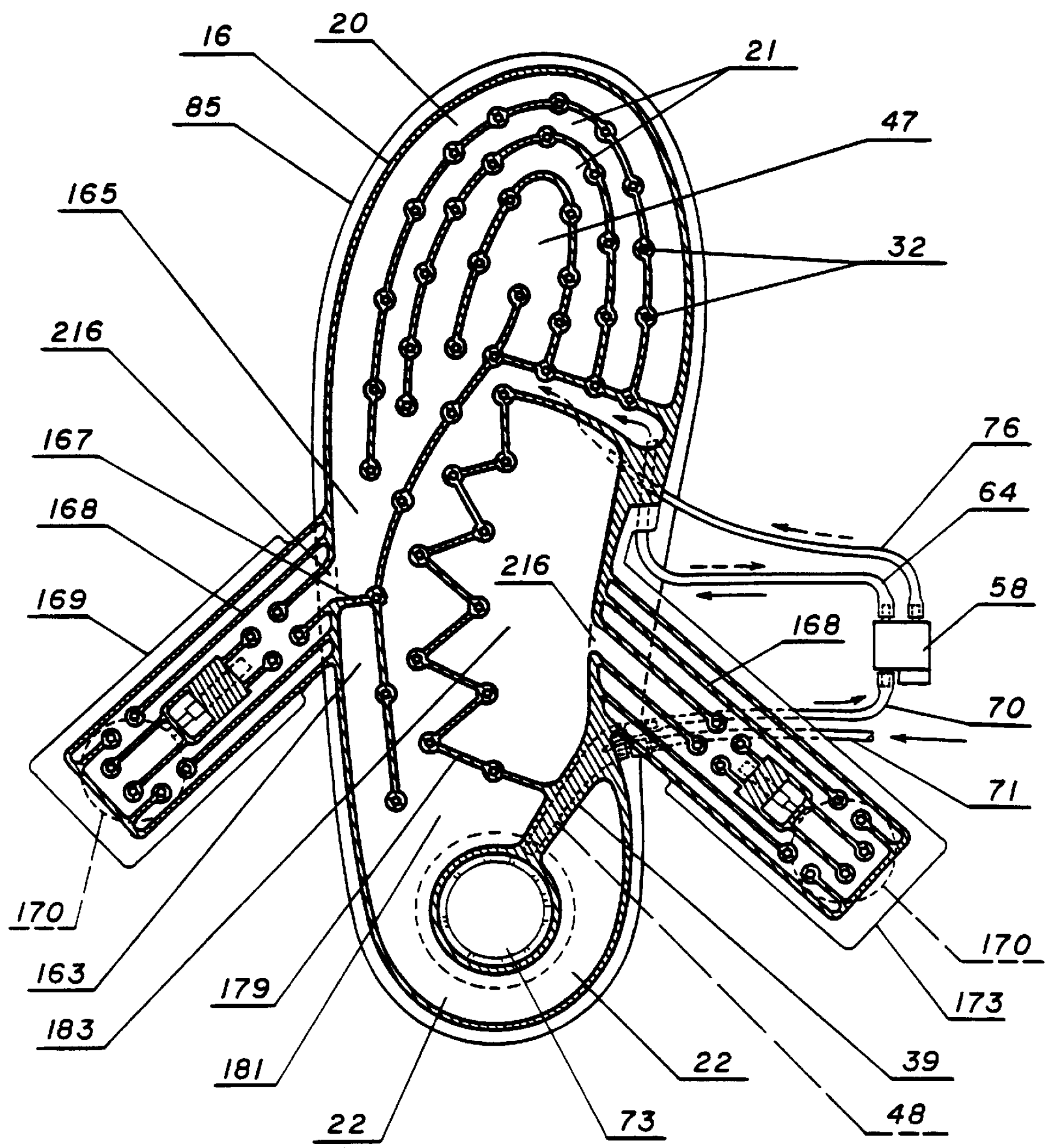
FIG. 51 is a plan view of an inflatable inner sole with three interior chamber and separate air pumps for each interior chamber.

Referring to FIG. 51, the inner sole previously described with reference to FIG. 50 is further modified by the provision of a lateral flap 169 and a medial flap 173. These flaps are substantially the same as flaps 164 of FIGS. 22 and 28 and 210 of FIG. 29. These flaps are formed by overlying extensions of the first and second plastic sheets, and they are seamed about their peripheries to provide sealed interior chambers, and have a plurality of discontinuous seams 168 which form tubular passageways within each flap. Preferably, a manual actuated air pump 170 is provided on each flap so located to orient its discharge into the sealed interior chamber of the flap. Each flap has at least one tubular passageway 216 open into the sealed interior chamber of the inner sole.

The inner sole has a continuous seam 179 which completely transverses the sealed interior chamber of the inner sole, thereby creating sealed interior chambers 181 and 183. The sealed interior chamber 183 provides an arch pillow in the inner sole. Another continuous seam 167 further subdivides interior chamber 181 into a forward or toe sealed interior chamber 165, and a heel sealed interior chamber 163. The medial side flap 173 has one tubular passageway open to sealed interior chamber 183 and lateral side flap 169 has a tubular passageway open to the sealed interior chamber 181, whereby the manual air pumps 170 can be used to adjust, independently, the inflation pressure in each of the sealed subdivided interior chambers. The heel pump provides inflation pressure which is controlled in the controlled pressure relief valve for the heel sealed interior chamber 163. Excess air discharged from the pressure relief valve 58 is passed by tube 76 to a discharge beneath the inner sole and the underlayment of the shoe, e.g., the outer sole of the shoe, where it can flow along the channels formed on the undersurface of the inner sole and pass through the apertures 32 of the inflatable sole, thereby providing air circulation within the shoe in the same manner as previously described with reference to FIG. 1. Alternatively, tube 76 could extend outside of the shoe so that the excess air would be vented outside of the shoe.

Figure 52:
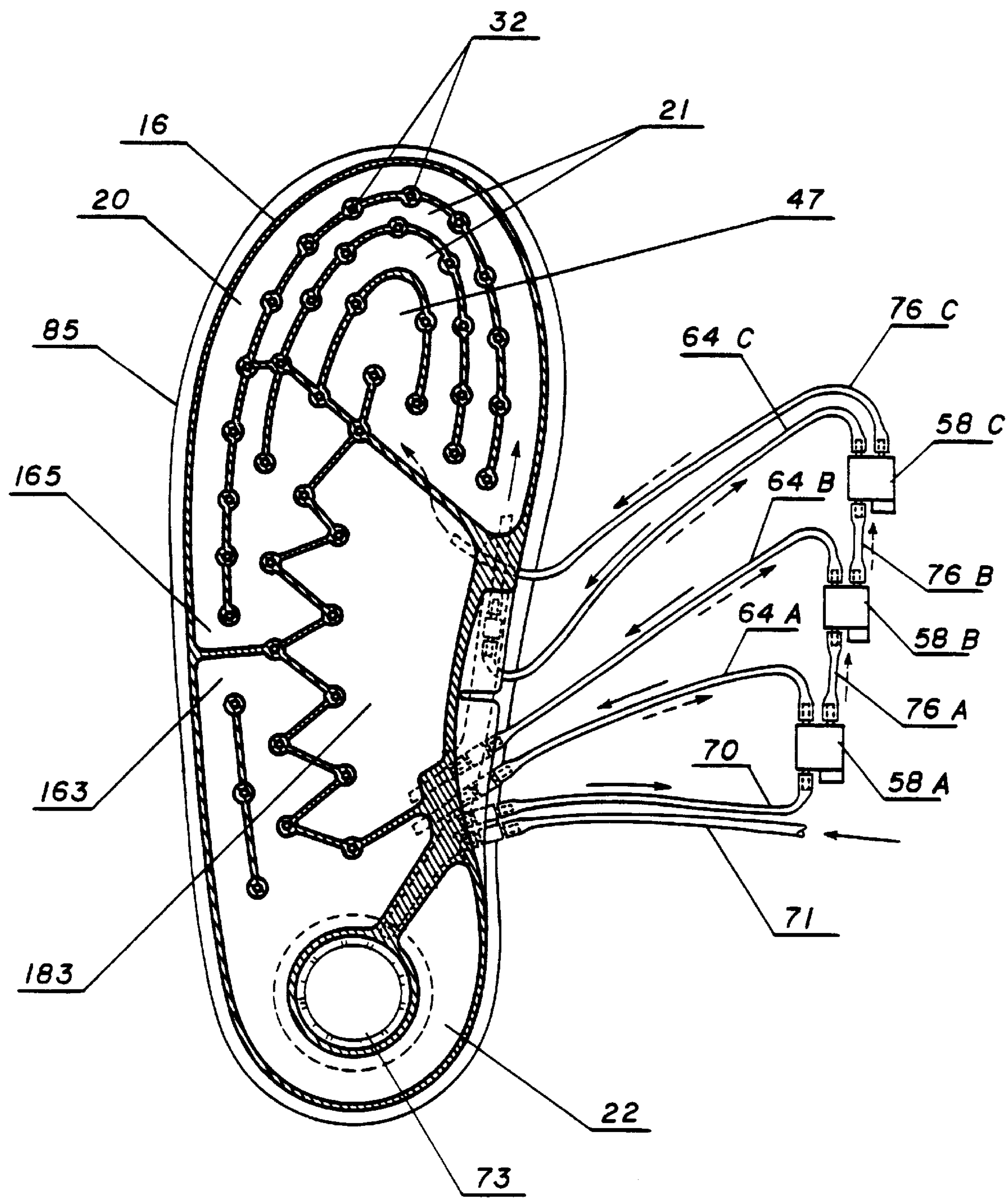
FIG. 52 is a plan view of an inflatable inner sole with three interior chambers, and separate, remotely located pressure control valves for each of the three interior chambers.

Referring now to FIG. 52, there is illustrated an embodiment in which the same three subdivided sealed interior chambers, 163, 165 and 183 are pressured with a single air pump 73, and are each provided with separate and independent pressure control valves **58*a*, 58*b* and 58*c*. In this application, the pressure control valves are serially connected, in tandem, with the excess air from valve 58*a* being passed by flexible tube 76*a* to the succeeding valve 58*b*, and the pressure controlled air being passed by tube 64*a* to sealed subdivided interior chamber 163. The valve 58*b* is set for a slightly lower pressure than valve 58*a* and discharges air at its controlled pressure into sealed interior chamber 183 (arch pillow) through tube 64*b* and discharges excess air through tube 76*b* to the succeeding valve 58*c*. The latter valve discharges air at its control pressure through tube 64*c* into the sealed interior chamber 165, while passing excess air through tube 76*c* to a location beneath the inner sole, i.e., between the inner sole and the sole of the shoe. Although the valves 58*a* through 58*c* are shown in connection to provide the highest pressure in the heel, lowest in the toe and intermediate pressure in the instep, regions, the relative pressures in these regions could be varied by switching the discharge locations of the tubes 64*a*, 64*b* and 64*c*. Also, as previously discussed with regard to FIG. 51, the excess air from valve 58*c*** is preferably vented into the shoe, beneath the inflatable inner sole to provide forced air circulation through the shoe.

Figure 53:
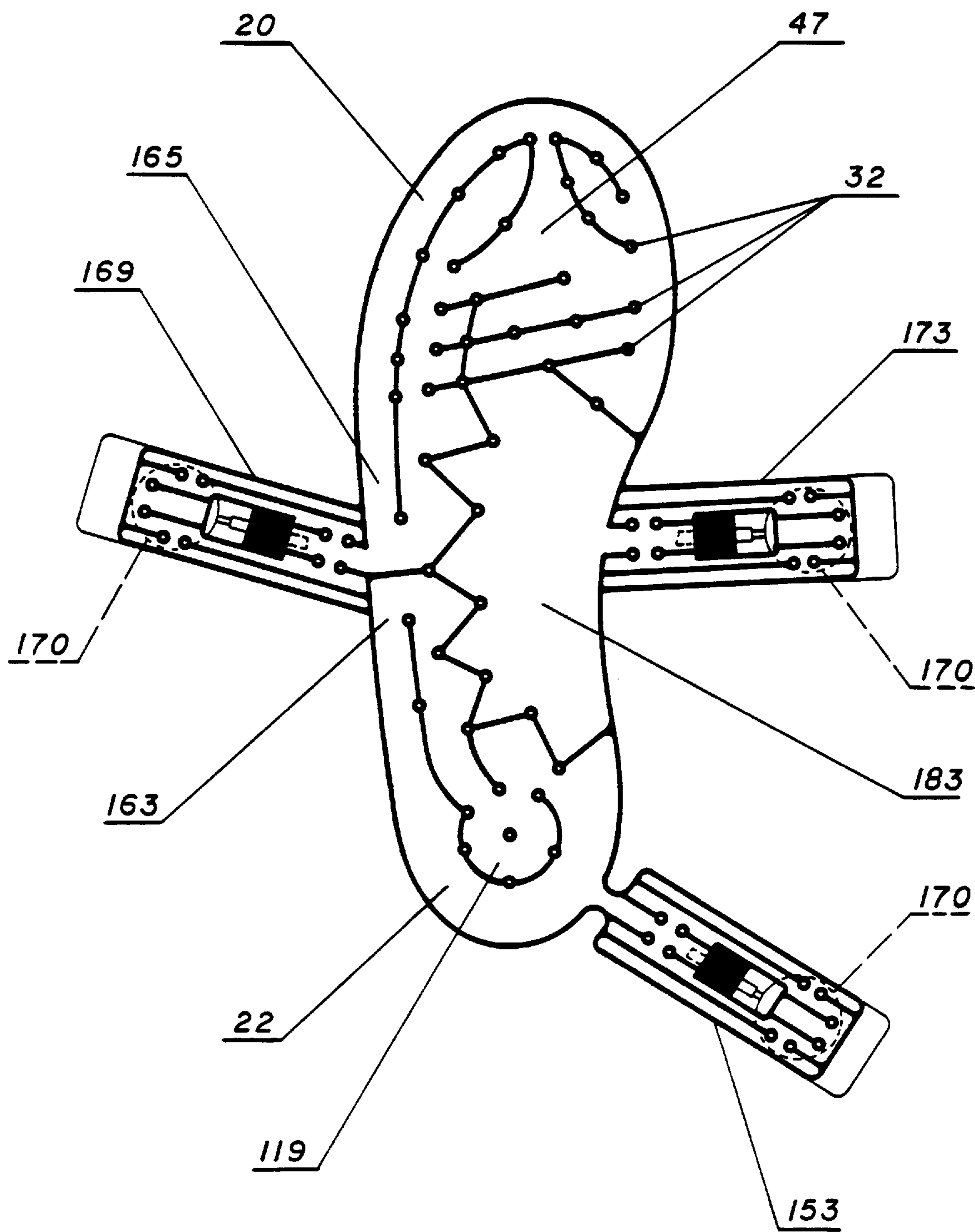
FIG. 53 is a plan view of an inflatable inner sole without a heel pump and with three interior chambers, and a separate, manual air pump for each of the three interior chambers.

Referring now to FIG. 53, the invention is shown as applied to an inner sole which has three separated sealed interior chambers 163, 165 and 183. The interior chambers 163 and 165 have discontinuous seams forming tubular passageways within each chamber. Chamber 183 is preferably unseamed, thereby forming an inflatable arch pillow. Each of the sealed interior chambers has an adjacent flap such as medial flap 173, lateral flap 169 and heel flap 153. Each of the flaps is formed of overlying appendages of the first and second sheets which are sealed about their peripheral edges, and each is provided with a plurality of discontinuous seams to form internal, tubular passageways. Each of the flaps is provided with a hand pump 170 located to discharge pressured air into the flap and the sealed interior chamber of the sole which is in open communication with the tubular passageways of a flap.

Figure 54:
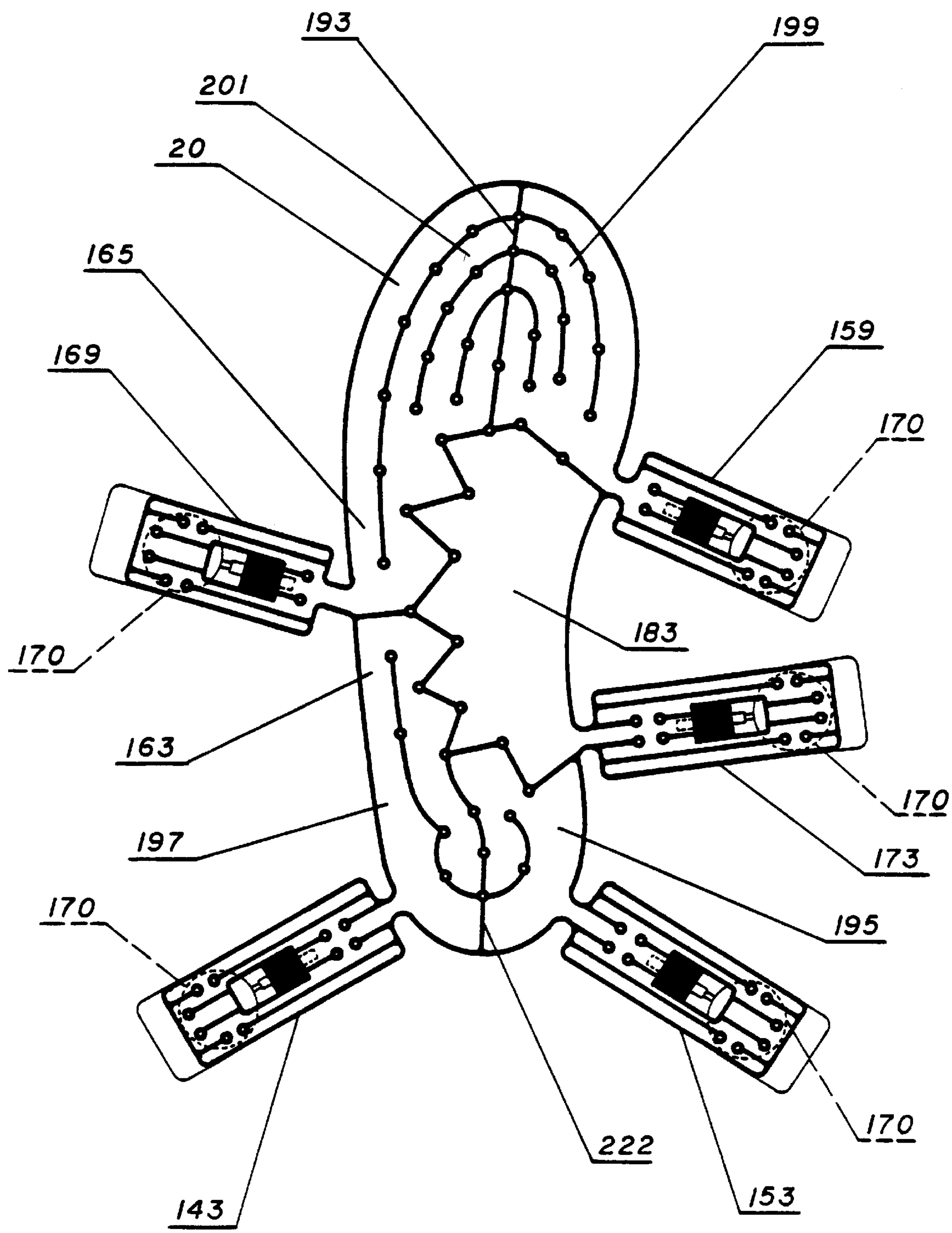
FIG. 54 is a plan view of an alternative inflatable inner sole with rear and medial and lateral inflatable chambers and an arch pillow, each having an independent air pump and pressure relief valve.

FIG. 54 is a plan view of an alternative inflatable inner sole similar to that shown in FIG. 53, however, the sealed interior chambers of the liner are further subdivided by longitudinal continuous seam 222 which divides the heel interior chamber into a right chamber 195 and a left chamber 197 and continuous seam 193 which divides the toe interior chamber 165 into a right toe chamber 199 and a left toe chamber 201. Chamber 183 is as previously described with reference to FIG. 53. Each of these chambers which are formed in the liner has an adjacent flap 169, 173, 153, 159 and 143, and each flap has a plurality of discontinuous seams that form tubular passageways which provide communication from a manual air pump 170 to the interior of its respective chamber. The flaps can be located at convenient and inconspicuous positions along the peripheral edges of the inflatable inner sole, so that the air pumps and associated control valves are accessible, without providing any structure which may obstruct normal activities.

Figure 55:
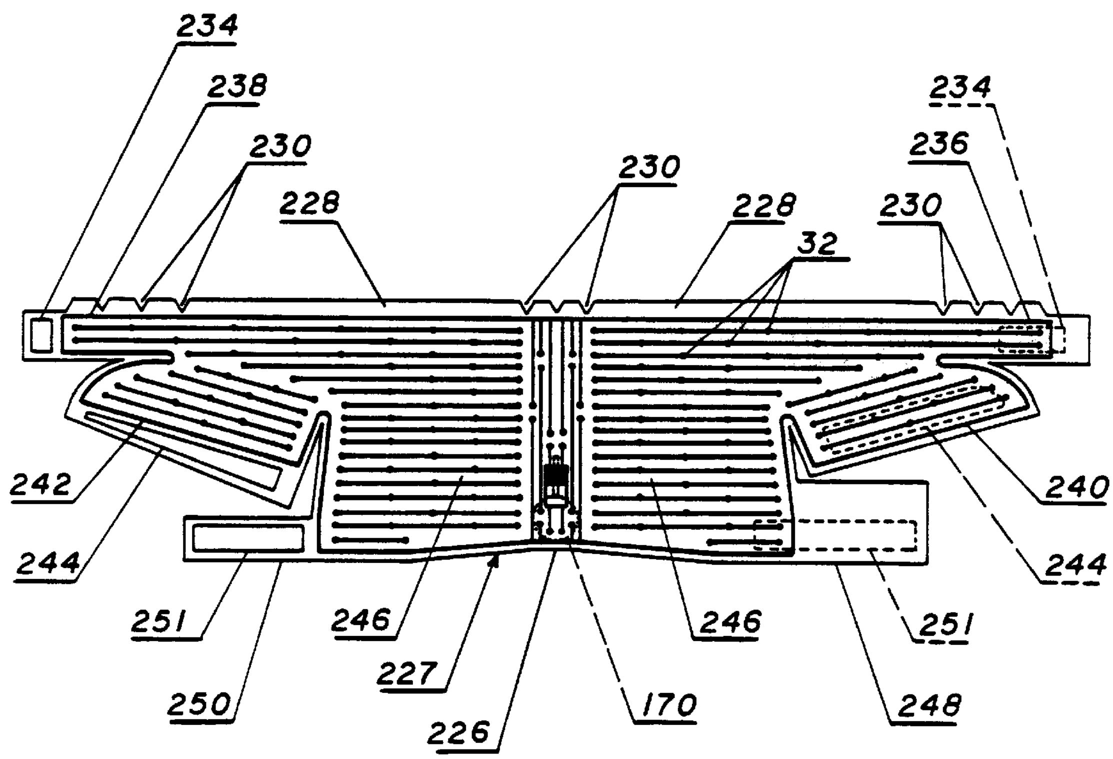
FIG. 55 is a plan view of an alternative inflatable liner with a rear and medial and lateral inflatable flaps which provide linings for the heel and instep sides of the upper inner surfaces of a shoe.

In some applications, it may be desirable to combine any of the aforedescribed inflatable inner soles with an inflatable liner for the upper surfaces of footwear. Alternatively, it may be desirable to provide an inflatable liner only for the upper inside surfaces of the footwear. In such applications, FIG. 55 illustrates a suitable lining 227 which covers the inside surfaces of the upper portion of footwear, only. This lining 227 is substantially the same as that shown in FIG. 30 except the lining has no inner sole. This lining 227 has a heel flap 226 that extends laterally and medially a sufficient distance to permit the flap 226, when folded to extend entirely about the toe of the shoe, forming a liner for the upper of footwear such as a shoe or boot. The flap 226 has a coextensive tab 228 which can fold beneath a normal, or non-inflated inner sole of the footwear, and also can be glued or sewed to that inner sole. Alternatively, it can be folded to lie against the lower edges of the upper portion of the footwear. As the tab 228 must be formed about the curved toe of the footwear, this co-extensive tab 228 can have a plurality of V-shaped notches 230 to permit folding about this curved surface without forming creases. The flap 226 is provided with a plurality of fabric attachment bands 234 such as Velcro to secure its opposite ends 236 and 238. Thus, a band of Velcro is provided at the medial end 236 of flap 226, and a co-acting Velcro band is placed on the opposite side of the flap 226 on its lateral end 238, thereby permitting the ends of the flap 226 to be secured together when wrapped about the toe of the inner sole. Preferably flaps 240 and 242 are provided at the medial and lateral sides of the instep to fit over the instep of the boot and each of these flaps also is provided with a co-extensive Velcro band 244 on its opposite sides whereby the flaps can be folded over the instep of the wearer and secured together with the bands of Velcro attachment fabric. The upper portion of the ankle area 246 of the flap 226 also preferably has medial and lateral extending tabs 248 and 250 which carry co-extensive Velcro bands 251, again on opposite sides to permit securing of these tabs about the ankle of the wearer. A plurality of through apertures 32 are formed in the first and second sheets of the liner and are surrounded by a continuous circular seam, to provide ventilation holes through the lining, permitting free movement of air and moisture.

An air pump 170 is provided in the flap 226 and this air pump is shown by the broken lines similar to that shown on FIGS. 23 through 25 and mounted similarly to the mountings shown in FIGS. 22 and 29.

Figure 56:
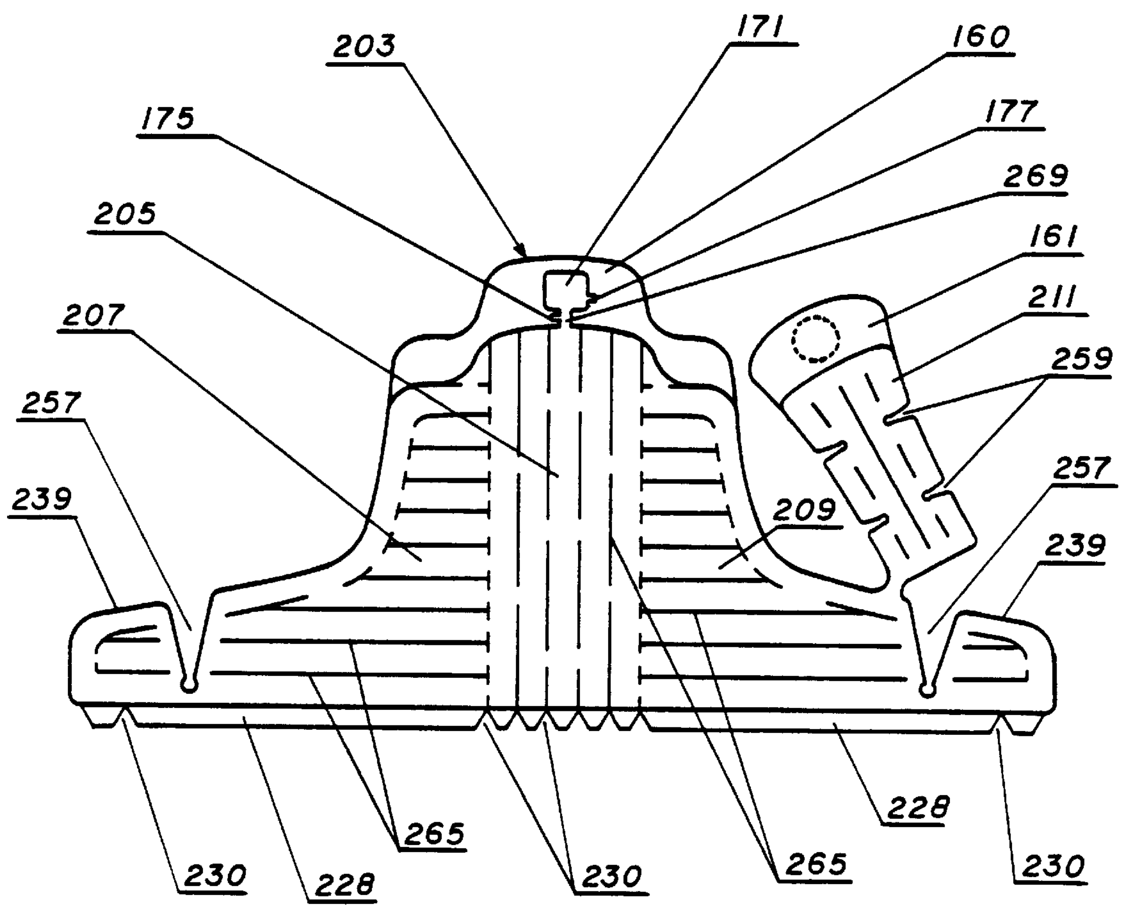
FIG. 56 is an alternative inflatable lining to that shown in FIG. 55.

FIG. 56 illustrates another inflatable lining which is intended for lining only the inside surfaces of the upper portion of footwear. This liner 203 has a heel flap 205 with dependent side flaps 207 and 209, which are intended to overlie the inside sides and instep areas of the upper of footwear. Forward notches 257 form toe linings and permit the lining to flex and conform to the shape of the uppers of the footwear. If desired, an inflatable tongue 211 can be provided as a dependent flap of the liner. Preferably, a manual air pump 171 is located on the base 160 of the lining, adjacent the upper edge of the heel flap 205. The pump 171 is described in detail hereinafter with reference to FIGS. 67 and 68. The base can be an uninflated extension of the lining and can be formed from either or both of the first and second overlying sheets of the lining. This air pump has an inlet 177 and a manual pressure relief valve 175. Alternatively, the air pump, inlet and valve could be located on the upper end of the tongue 211, most preferably on the base 161 of the tongue, as shown by the phantom lines. The tongue can have notches 259 for flexibility. A tab 228 can be provided along the lower edge of the lining to fasten the lining to an interior surface of the footwear. Notches 230 can be provided for flexibility of the tab 228, thereby avoiding creasing of the tab when it is fitted into footwear.

Figure 57:
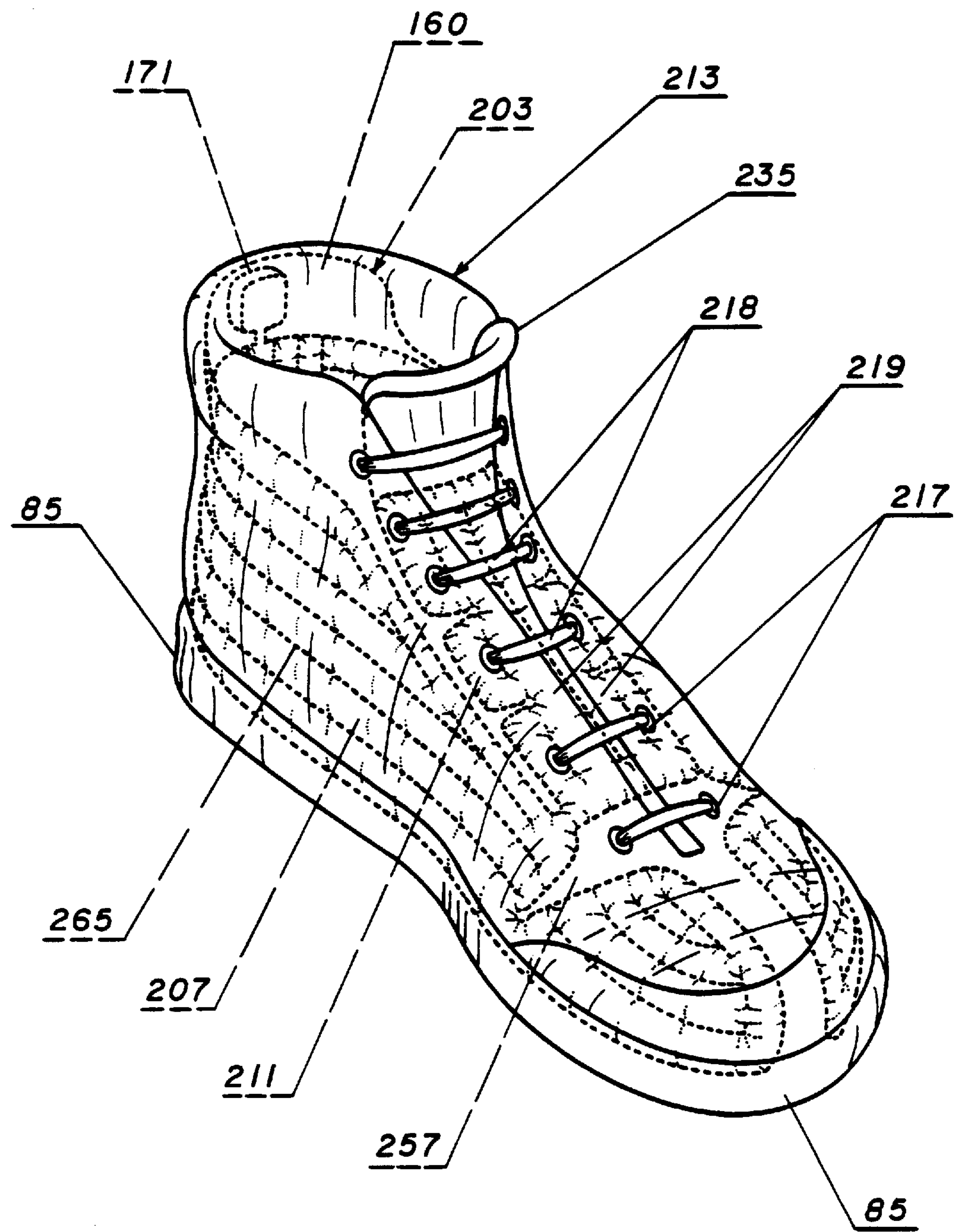
FIG. 57 is a perspective view of a shoe fitted with the upper lining shown in FIG. 56.

FIG. 57 illustrates an athletic shoe 213 which has conventional lacing 218 in eyelets 217 along edge medial edge of opposite vamps 219. The liner 203 (shown in FIG. 56) is shown in hidden object lines, where it is within the shoe and concealed by the sides of the shoe. The air pump 171 is shown as projecting from the rear of the heel of the shoe.

Figure 58:
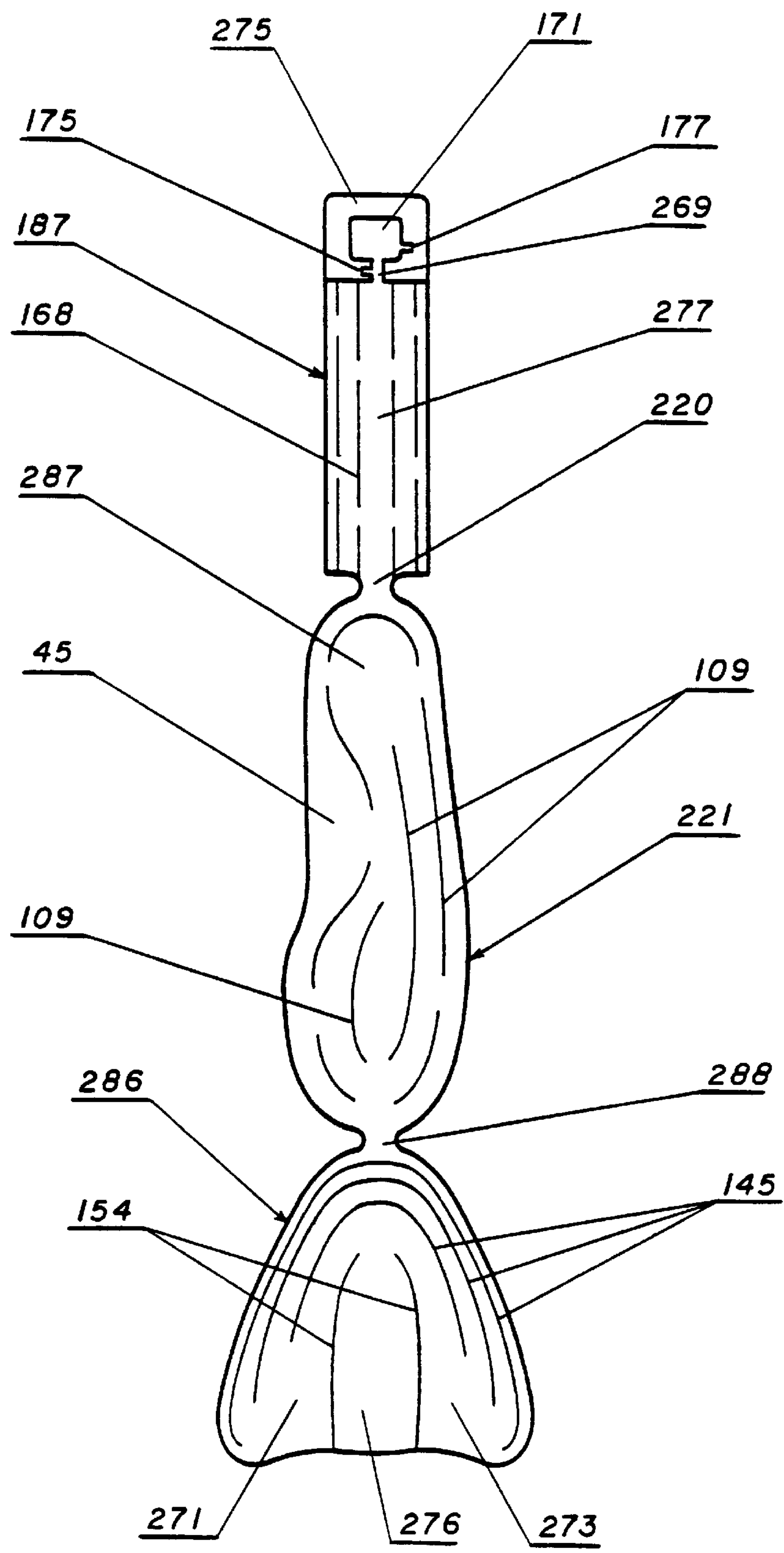
FIG. 58 is a plan view of an inflatable lining having an inflatable inner sole and upper air bag with a manual pump and relief valve.

FIG. 58 illustrates an alternative lining having an inflatable inner sole 221, a heel flap 187, and a frontal air bag 286. The heel flap 187 has a peripheral seam to form a sealed interior chamber and supports a manual air pump 171 adjacent its upper end, preferably on the base 275 of the heel flap 187. The heel flap 187 has a plurality of discontinuous seams 168 to form internal air passageways with the central passageway 277 open at 220 to the sealed interior chamber of the inflatable inner sole 221. The inflatable inner sole has a plurality of discontinuous seams which form air passageways and support pillows such as heel pillow 287 and arch support pillow 45.

An air bag 286 is formed by forward flaps of the first and second sheets of the liner which are seamed together about their peripheries. The seam is open at the toe to provide an air passageway 288 communicating between the inner sole 221 and the forward air bag 286. Air can flow between the inner sole 221 and air bag 286 which lies over the foot, permitting the foot to flex within the shoe while maintaining a constant pressure about the foot and thereby retaining the security of tight lacings. The rate of air flow between the inner sole 221 and the air bag 286 can be controlled by the diameter, i.e., size, of the passageway 288. Preferably the air bag has a plurality of discontinuous seams such as the arch-shaped seams 145 and the curved seams 154 to provide a medial support pillow 271, a lateral support pillow 273 and a support pillow 276 above the instep. The air bag 286 extends to each side so that it also serves as a side lining, as apparent in FIG. 59. If desired, the air bag 286 alone, without the inner sole 221, can be provided.

Figure 59:
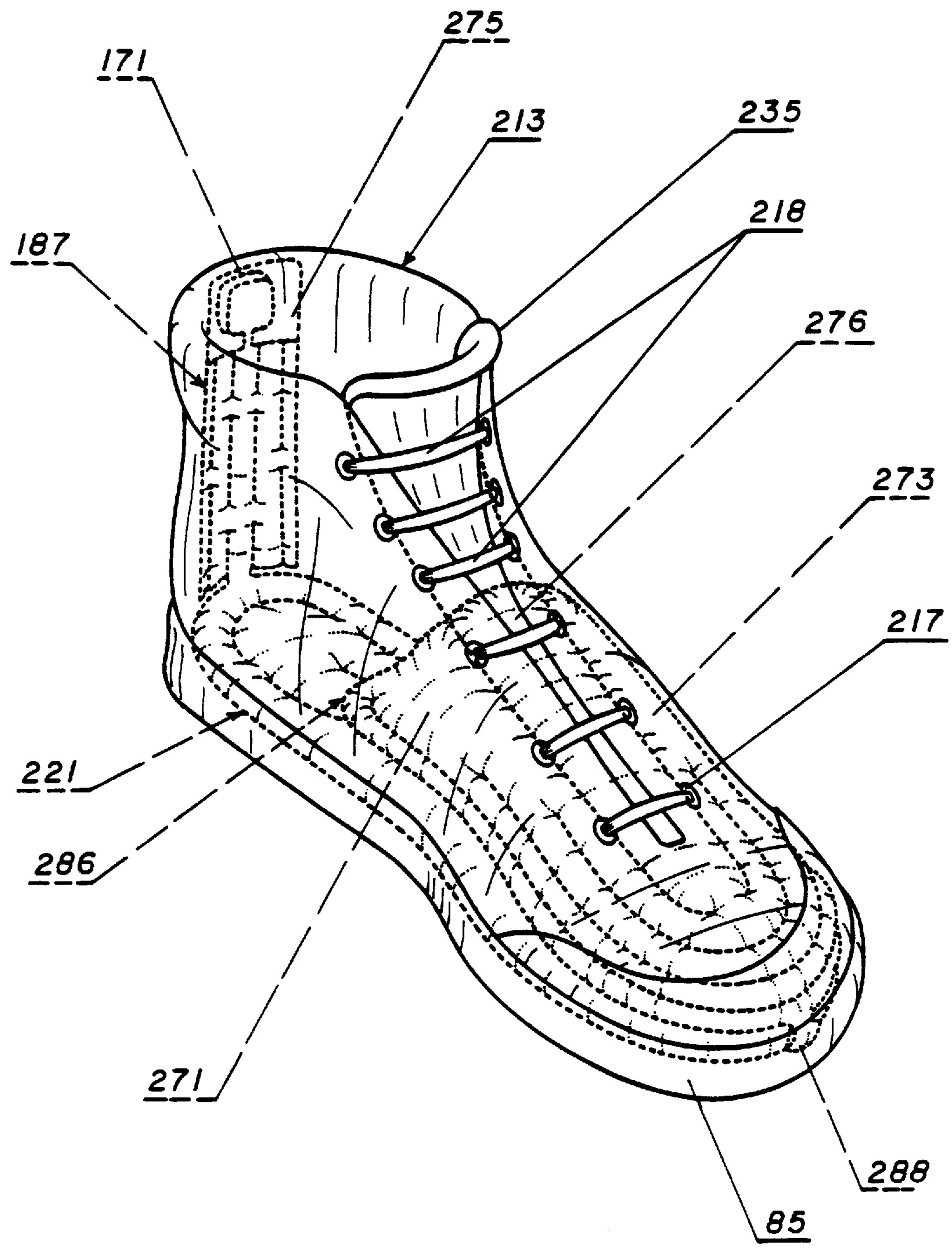
FIG. 59 is a perspective view of a shoe fitted with the lining of FIG. 58.

FIG. 59 illustrates the liner of FIG. 58 within shoe 213. The air pump 171 is supported at the upper edge of the heel of the shoe, and for clarity of the illustration, the inlet and relief valve are omitted from the drawing. The shoe has conventional lacing 218 through eyelets 217 and an outer sole 85. The medial support pillow 271 lies along the medial side and top of the shoe, and the lateral support pillow 273 is in the same position on the opposite side of the shoe. The support pillow 276 underlies the lower portion of the tongue 235 of the shoe, and preferably is bonded or sewn to the tongue 235. The air passageway 288 is shown at the most forward toe end of the inner sole.

Figure 60:
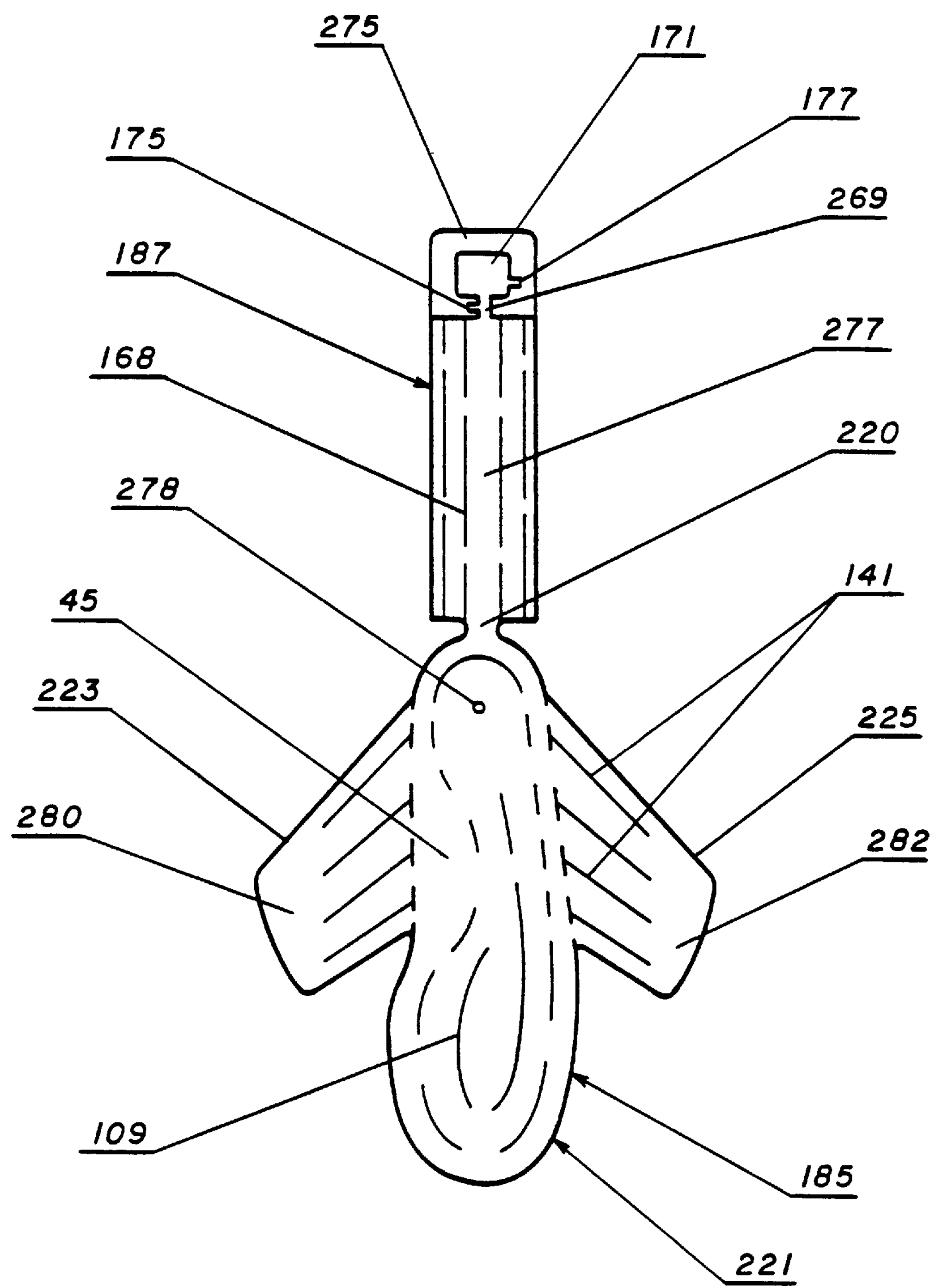
FIG. 60 is a plan view of an alternative lining to that shown in FIG. 58.

FIG. 60 illustrates another liner 185 which has a heel flap 187 with an air pump 171, all as previously described with reference to FIG. 58. The inflatable inner sole 221 has medial inflatable flap 223 and a lateral inflatable flap 225 which are formed by coextensive flaps of the first and second sheets which are seamed together about their peripheries to provide sealed interior chambers. The flaps have a plurality of discontinuous seams 141 which form tubular passageways, and which terminate short of the ends of the flaps to provide pillows, or air bags, 280 and 282. Preferably the peripheral seam about the inner sole 221 is open to each of the tubular passageways of the medial and lateral flaps to provide air communication. The size of the openings between the inner sole 221 and the air bags 280 and 282 can be varied to provide restrictive flow orifices and thereby provide control over the rate of pressure equalization between the inner sole 221 and air bags 280 and 282. Also, the heel of the inner sole can have a centrally located circular seam 278 to enhance the support and stability of the heel pillow.

Figure 61:
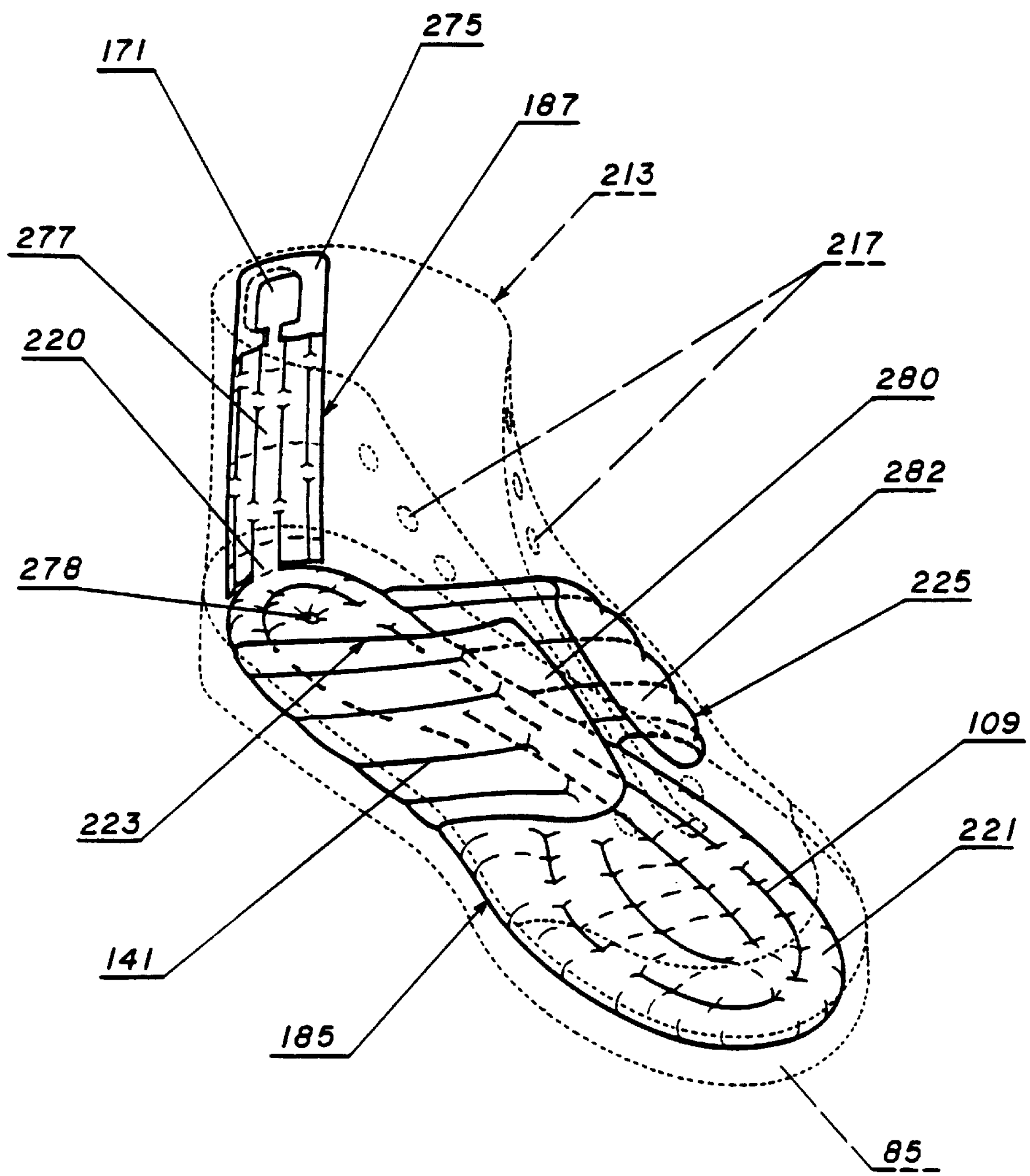
FIG. 61 is a perspective view of a shoe, in phantom outline, fitted with the lining of FIG. 60.
Figure 62:
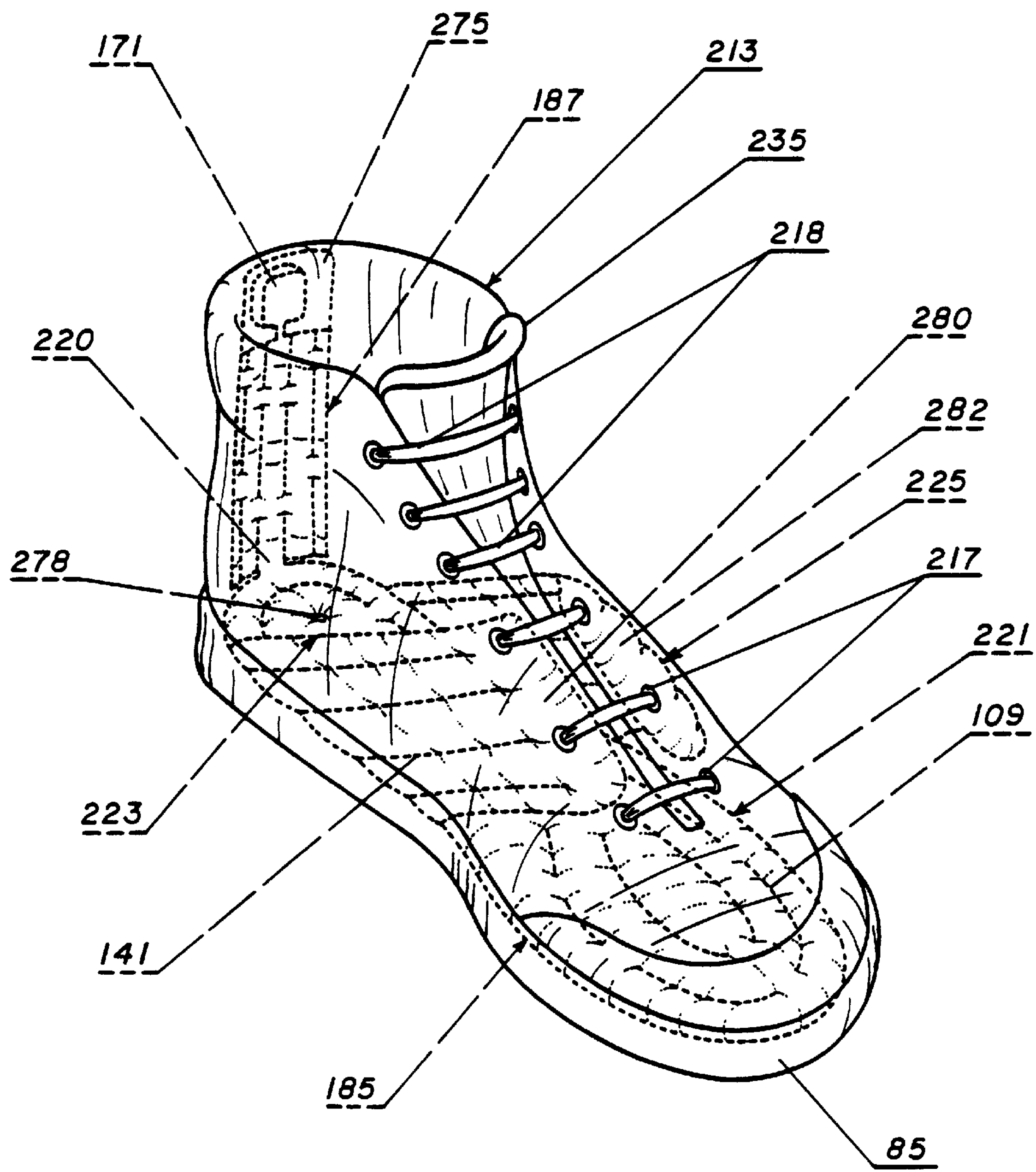
FIG. 62 is a perspective view of the shoe, in solid lines, and liner shown in FIG. 61.

Referring now to FIGS. 61 and 62, the liner 185 of FIG. 60 is shown within a shoe 213. The shoe is outlined by phantom lines in FIG. 61 and is shown in solid lines in FIG. 62. The shoe 213 is as previously described with eyelets 217 and an outer sole 85. The medial flap 223 extends upwardly along the medial side of the shoe, with the medial pillow 280 beneath the medial vamp of the shoe 213. The lateral flap 225 extends similarly on the lateral side of the shoe. The pillows 280 and 282 provide support and an adjustable tightness to the lacing, all controlled by the air pump 171 and its associated manual relief valve 175 (shown in FIG. 60).

Figure 63:
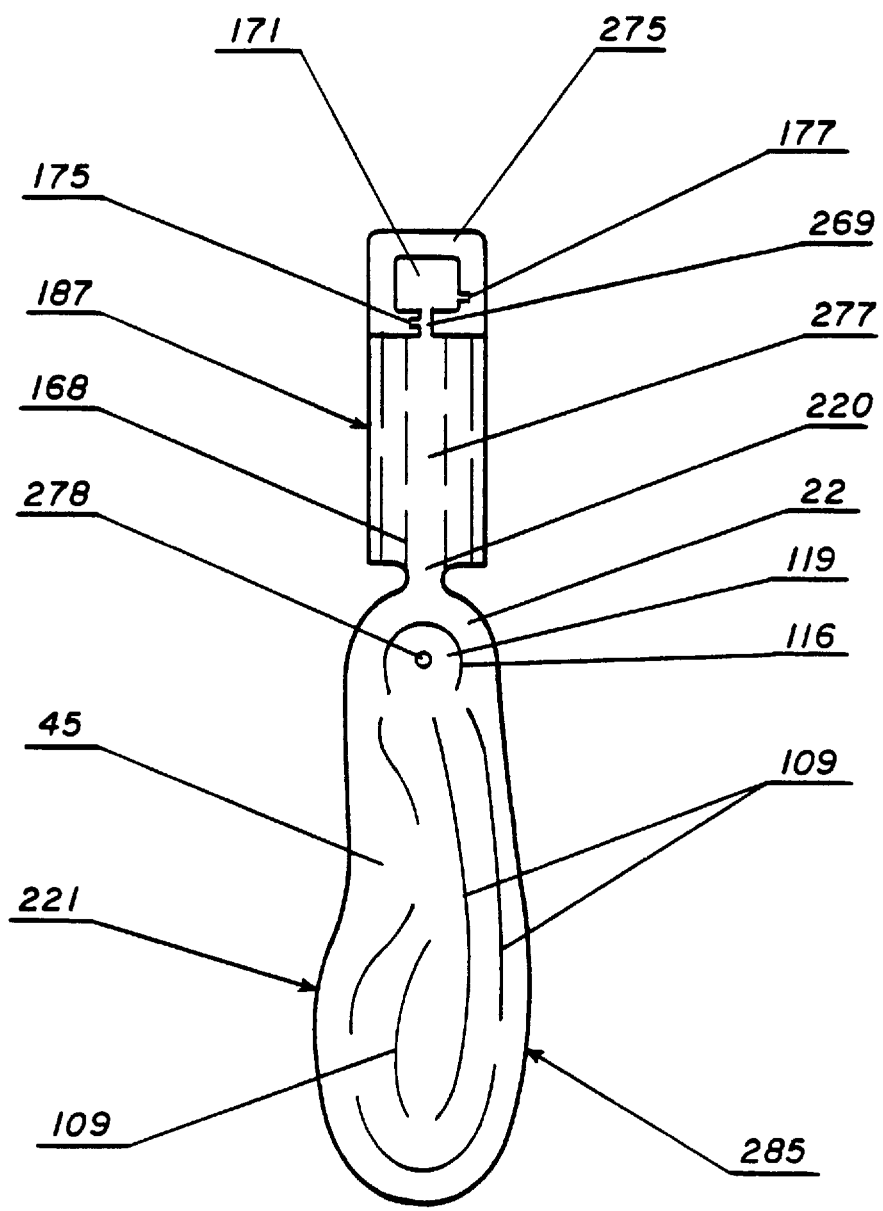
FIG. 63 is a plan view of an alternative inflatable inner sole.

FIG. 63 shows an inflatable liner 285 formed with an inflatable inner sole 221, a heel flap 187, and associated air pump 171 on base 275, all as previously described. The inflated inner sole 221 is attached at its heel end, to vertical heel flap 187 that has a sealed interior chamber with discontinuous seams 168 which form tubular passageways which communicate, at 220, with the sealed interior chamber of the inner sole 221. The base 275 of the heel flap 187 supports a flexible bulb air pump 171 with an air inlet 177 and relief valve 175. The pump discharges into the sealed interior chamber of the heel flap 187.

The inner sole 221 has a plurality of discontinuous seams 109, and preferably has an arch pillow 45 formed by an unseamed area between the first and second sheets. Preferably the heel of the inner sole is provided with a semi-circular seam 116 that provides the circular air passageways 22 and 119, all as previously described with regard to FIG. 20.

Figure 64:
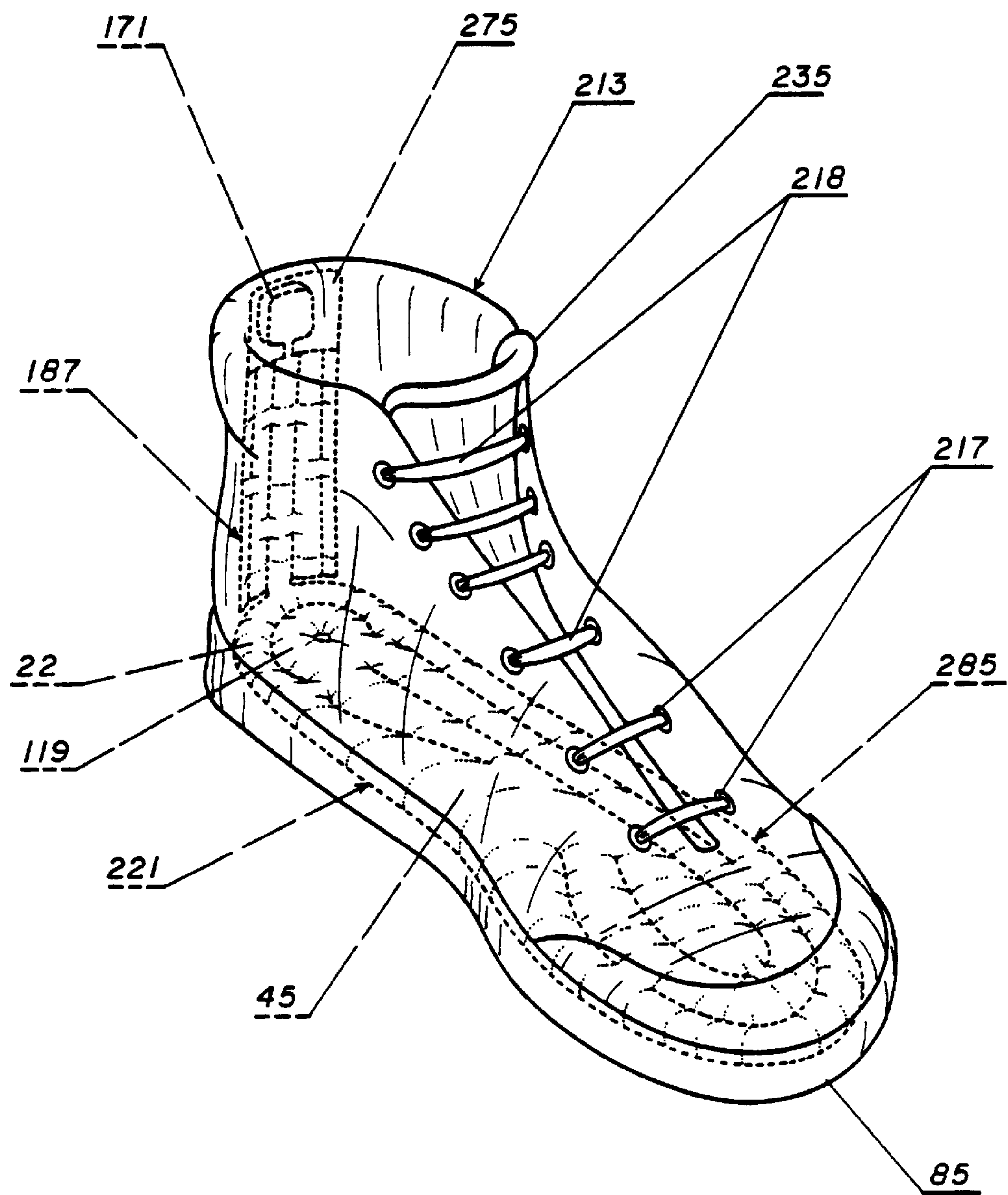
FIG. 64 is a perspective view of a shoe, in solid lines, fitted with the liner shown in FIG. 63.

FIG. 64 shows a shoe 213 which is fitted with the liner 285 shown in FIG. 63. The shoe is the same as previously described. The illustration shows the heel flap 187 in position along the upper portion of the heel of the shoe, and with the inner sole 221 resting on the outer sole 85.

Figure 65:
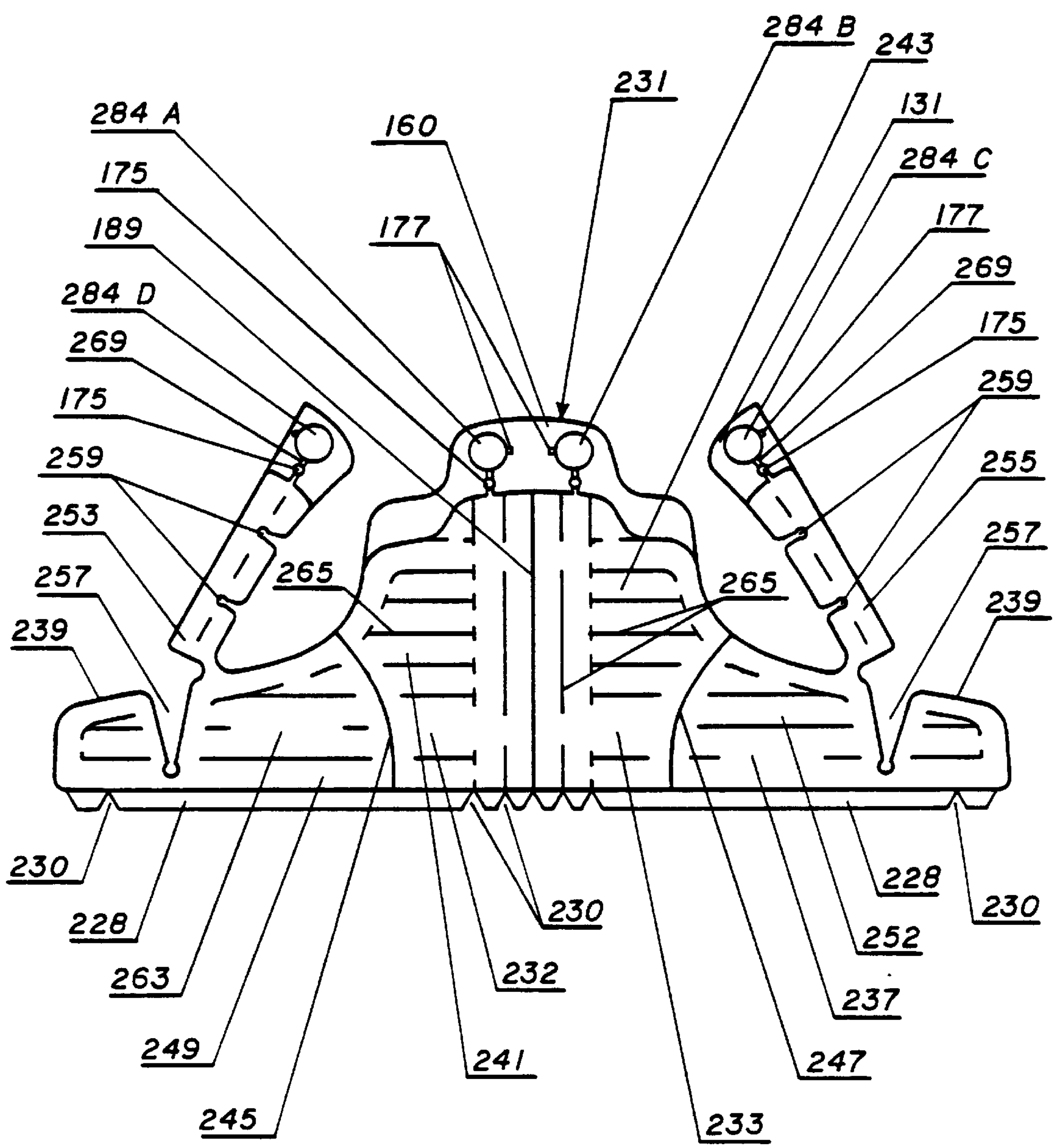
FIG. 65 is a plan view of an alternative inflatable upper liner with a rear and medial and lateral inflatable chambers which provide linings for the upper inner surfaces of a shoe.

FIG. 65 is a plan view of an alternative lining 231 for the upper of a shoe, particularly an athletic shoe. This lining 231 has a base sheet 160 which can be either of the first and second sheets which is seamed to the periphery of the opposite and smaller sheets to form a sealed interior chamber. The lining 231 can be subdivided into medial and lateral side chambers by continuous vertical seam 189. The medial and lateral side chambers are further subdivided into heel side chambers 241 and 243 and forward side chambers 249 and 252 by continuous seams 245 and 247. All the side chambers have a plurality of horizontal discontinuous seams 265 which form air passageways. Air pumps 284*a* and 284*b* with air inlets 177 can be attached to the base sheet 160, preferably bonded thereto, and discharge into the sealed interiors of the chambers 241 and 243 of the lining 231. The pressure relief valves 175 are provided for control of the pressure in each chamber.

The heel portions 241 and 243 which overlie the heel are preferably unseamed at selected locations to provide heel pillows 232 and 233 on each side of the lining 231. Preferably the side portions also have discontinuous seams which form arch pillows 263 and 237 in preselected unseamed areas. Each forward portion of the inflatable lining is provided with a separate air pump 284*c* and 284*d*, and these pumps are supported on tongue base sheets 131, which extend from tongue flaps 255 and 253. The tongue flaps are formed by coextensive flaps of the first and second sheets which are seamed together about their peripheries to form sealed interior chambers into which each air pump discharges. Preferably, the tongue flaps 253 and 255 also have a plurality of notches 259 which are spaced along a side edge to provide flexibility to the flaps, when inflated. Similarly, notches 257 are provided in the forward side chambers 249 and 252 to form toe linings 239, and permit flexing of the lining 231. The toe linings 239 could, if desired, be formed as separate chambers with independently controlled air pressure.

The lining 231 has a continuous lower edge band 228 which is not inflated and which provides attachment to the shoe or sole of the shoe. Notches 230 can be provided in the edge band 228 to permit flexing of the lining to fit into a shoe.

Figure 66:
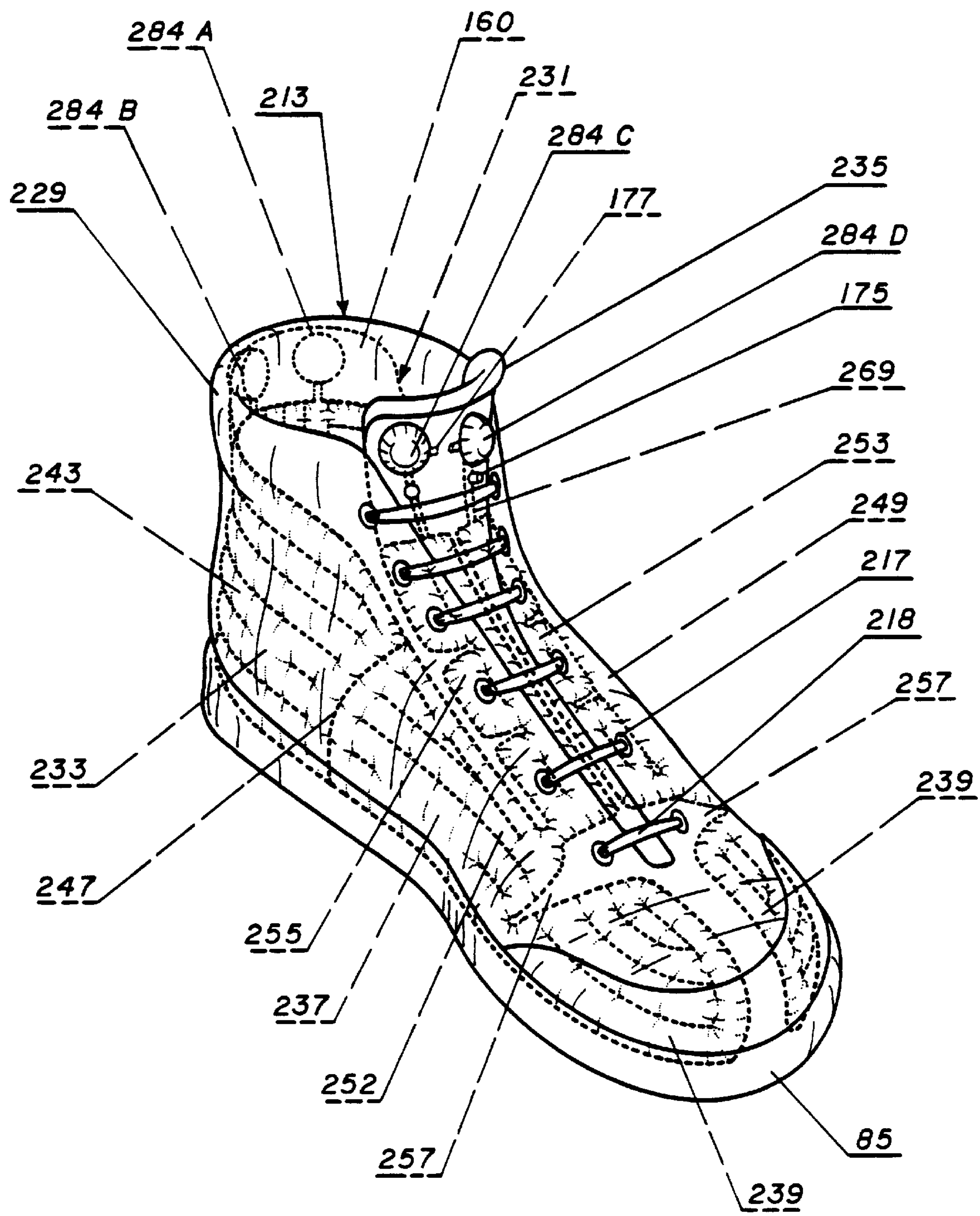
FIG. 66 is a perspective view of a shoe fitted with the upper lining shown in FIG. 65.

FIG. 66 illustrates a shoe 213 which is fitted with the lining 231 shown in FIG. 65. The shoe 213 is the same as previously described. As there illustrated, the air pumps 284*a*–284*d* are located externally of the shoe 213 on the upper ends of the tongue 235 and heel upper 229. The air inlets 177 can be inside the shoe, however, the pressure relief valves 175 are preferably outside the shoe to provide accessible exteriorly of the shoe 213. The lining 231 covers substantially the entire inner surface of the upper of the shoe and includes a toe lining 239 and the ankle pillows 232 and 233, and the side pillows 237 and 263. The tongue flaps 253 and 255 fold together and lie along the tongue 235.

Figure 67:
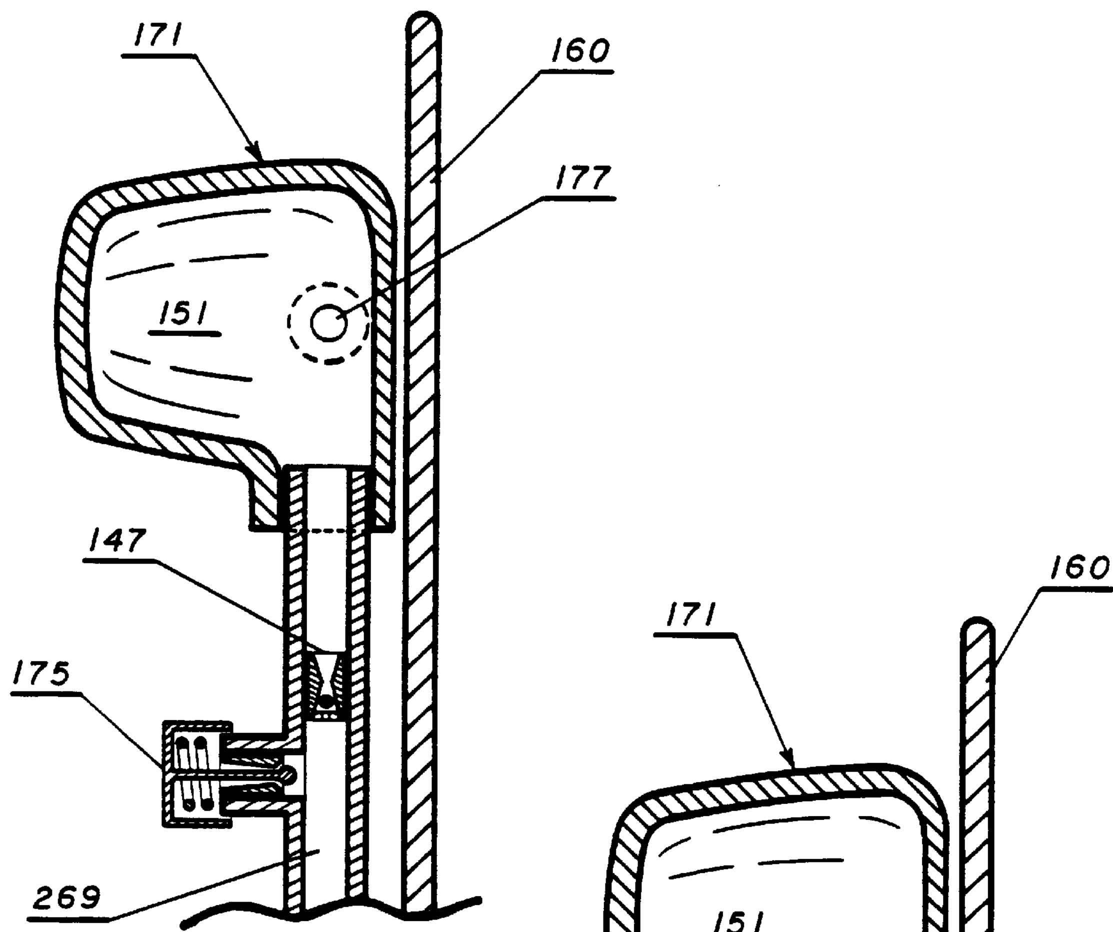
FIG. 67 is a sectional elevational view of an air pump used in the invention.

Referring now to FIG. 67, the air pump 171 is illustrated. The air pump is formed of a resilient, compressible bulb 151 which has an inlet which is closed with an inlet check valve 177. The bulb is supported on a base sheet 160, and has its mouth about the end of flexible tube 269 which contains a discharge check valve 147, thereby forming an air pump. A pressure relief valve 175 is provided in a branch of the tube 269. This relief valve has a valve operator which is biased into a normally closed position by an internal spring, and includes a button which can be depressed to open the valve against the force of the spring. In the drawing, the valve member is shown slightly open or apart from its valve seat for illustration purposes. The button could be threadably engaged on the valve stem to provide a closer control or adjustment of the air pressure in the lining.

Figure 68:
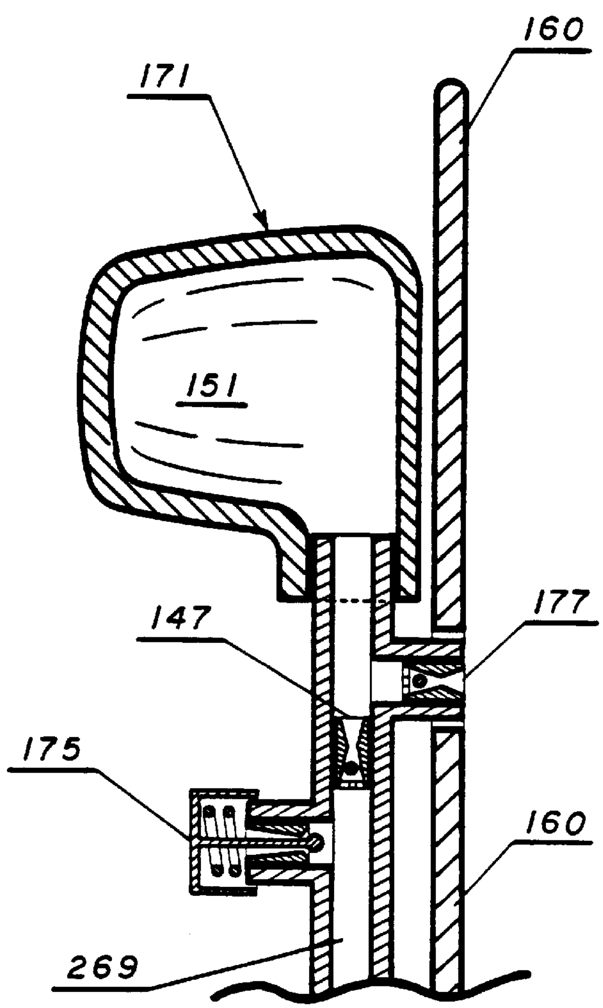
FIG. 68 is a sectional elevational view of an alternative air pump for use in the invention.

FIG. 68 illustrates another configuration of the air pump 171 in which the inlet check valve 177 is located in a branch of the tube 269, immediately upstream of the discharge check valve 147. In this configuration, the branch tube containing the inlet check valve 177 can extend through the supporting base sheet 160, or alternatively, can be directed beside sheet 160. It is understood that check valves of other construction than that shown by valve 177 can be used, e.g., duckbill type valves such as manufactured by Verney Laboratories, Inc., of Yellow Springs, Ohio, or, alternatively, flapper valves.

Figure 69:
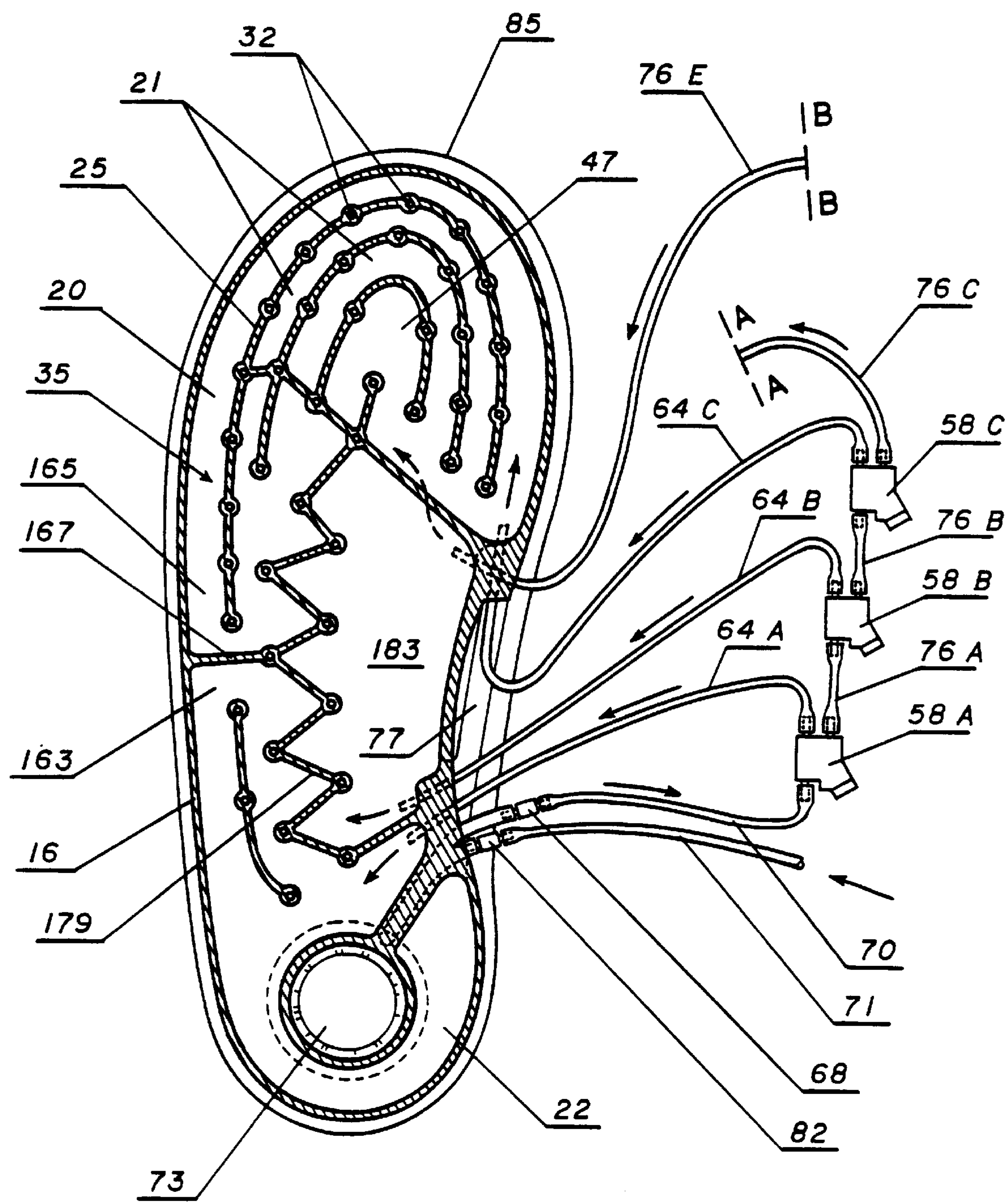
FIG. 69 is an assembly view of an embodiment of the invention showing an inflatable inner sole in plan view as having several chambers and an air pump in the heel of the inner sole, with separate pressure control valves for each chamber.

Referring now to FIG. 69, there is illustrated an inflatable inner sole 35 which has multiple, independent chambers which are a rear chamber 163; an arch chamber 183, and a toe chamber 165. The liner also has an air pump 73 which is located at the heel of the inner sole, similar to that shown in FIG. 52. The independent chambers are formed by interconnecting through seams 179 and 167 which extend from the continuous peripheral seam 16. Seam 179 extends from the peripheral seam 16 to enclose the arch area of the inner sole 35 to provide for an independently adjustable chamber 183 which functions as an arch pillow.

Figure 70:
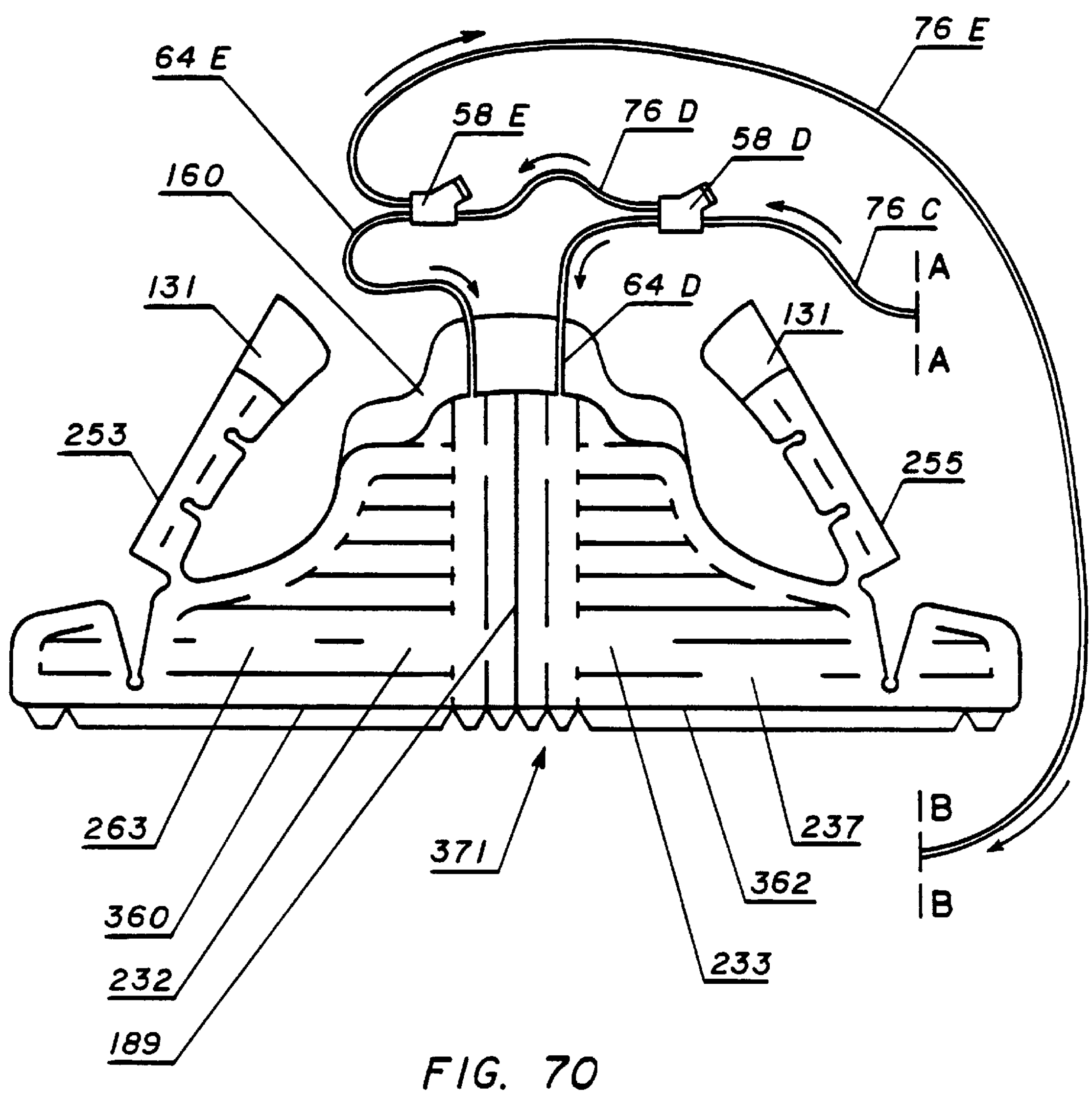
FIG. 70 is a view of an upper liner for footwear which has two chambers, each with a separate pressure control valve.

Fresh air is drawn into the air pump 73 through tube 71 having a check valve 82, and pressured air is delivered from the air pump 73 through tube 70 having check valve 68. Tube 70 connects to the first pressure control valve 58*a* of a series of pressure control valves 58*a* through 58*e* (valves 58*d* and 58*e* are shown in FIG. 70). These valves are the same as valve 58 shown in FIGS. 10–12. The controlled pressure port of valve 58*a* is connected to chamber 163 of the inner sole through tube 64*a*, and the relief port of valve 58*a* is connected to the next valve 58*b* of the series of pressure control valves by tube 76*a*. The controlled pressure port of this valve is connected to the arch chamber 183 by tube 64*b* and the relief port of this valve is connected to the next valve 58*c* by tube 76*b*. The controlled pressure port of valve 58*c* is connected to the toe chamber 165 by tube 64*c* and the relief port of valve 58*c* is connected to the upper liner 371 (shown in FIG. 70) by tube 76*c*, as indicated by break line A—A.

Referring now to FIG. 70, the upper liner 371 has a continuous vertical seam 189 at the heel to divide the liner 371 into a lateral side chamber 360 and a medial side chamber 362. This liner is similar to liner 231 shown in FIG. 65, and has the same elements such as the inflatable tongue halves 253 and 255, and inflatable ankle pillows 232 and 233. For simplicity of illustration, the seams are shown as single solid lines rather than the cross sectioned depiction used in FIG. 69 for seams in the inner sole. Also, apertures such as 32 shown for the inflatable inner sole 35, are not shown in the side lining, however, it is understood that such apertures can also be provided in this lining also, to facilitate air circulation throughout the entire footwear.

Pressure control valve 58*d* receives pressured air through tube 76*c*, as indicated by break line A—A. Valve 58*d* has its controlled pressure port connected to the medial side chamber 362 by tube 64*d*, and its relief port connected to the last valve 58*e* of the series of pressure control valves by tube 76*d*. Valve 58*e* has its pressure control port connected to the lateral side chamber 360 by tube 64*e* and its relief port discharges into tube 76*e*.

Tube 76*e* extends to the inflatable inner sole 35, as indicated by break line B—B. Referring now to FIG. 69, tube 76*e* is connected to the air channels beneath the inner sole 35 to provide air circulation through the shoe and inner sole (apertures 32) in the manner described previously with reference to FIGS. 19–21.

Figure 71:
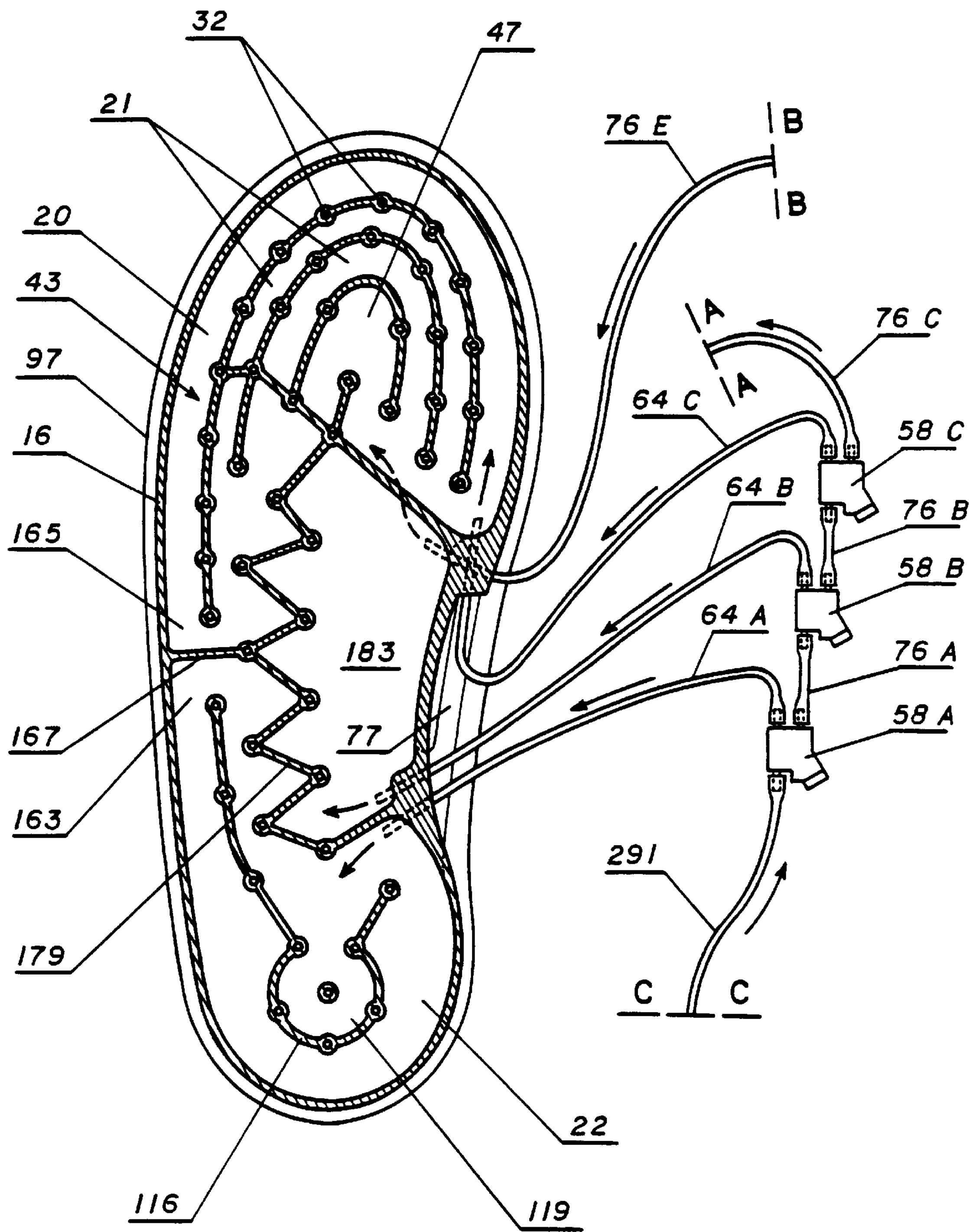
FIG. 71 is an assembly view of an inflatable inner sole shown in plan view similar to that of FIG. 69, but intended for use with a hand air pump.
Figure 72:
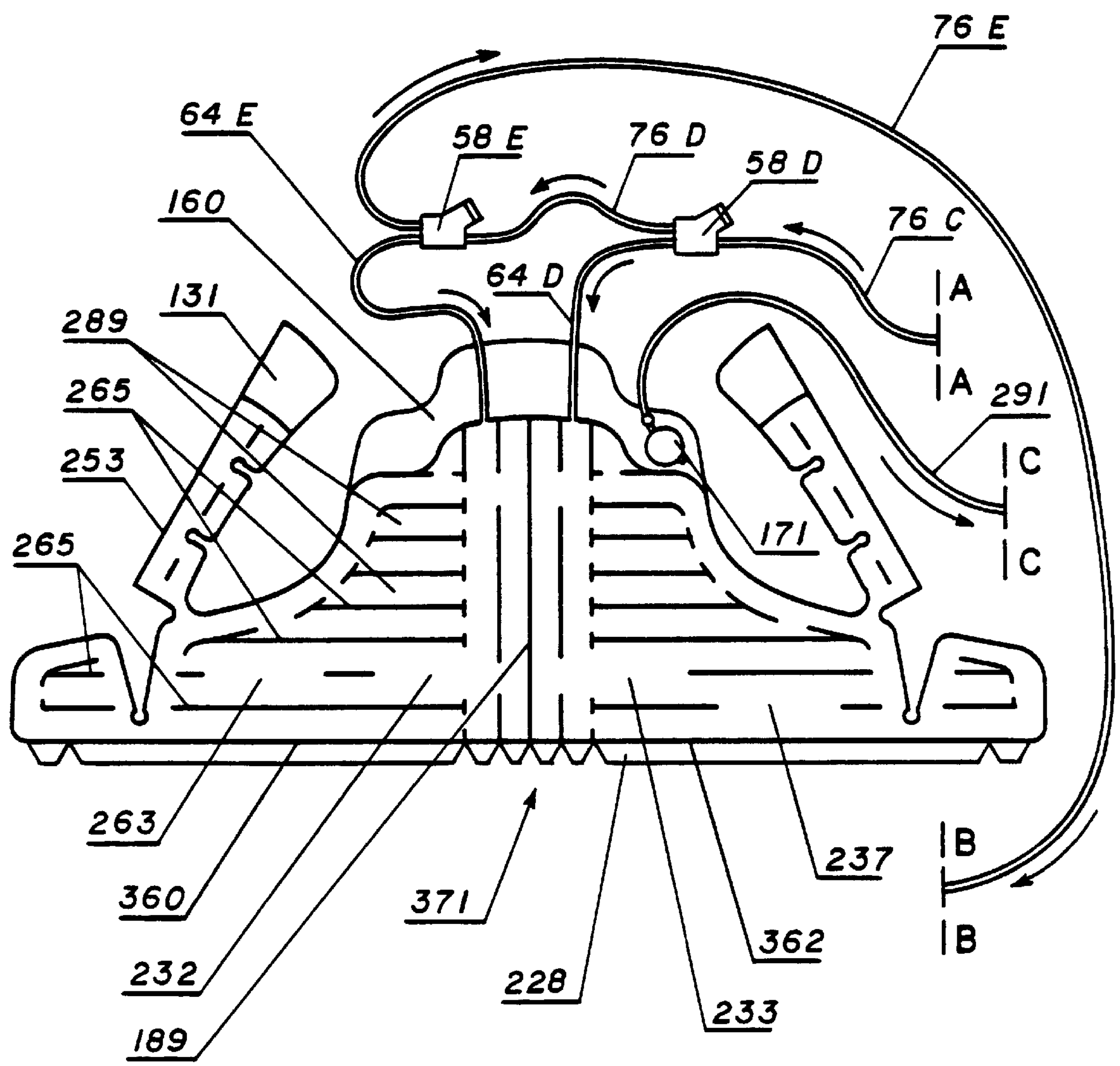
FIG. 72 is a plan view of an inflatable upper liner similar to that of FIG. 70 for use with a hand air pump.

Referring now to FIG. 71, an inner sole 43 is shown, resting on an outer sole 97 which is similar to outer sole 85 except it lacks provision for a heel pump. This embodiment is an alternative for the inflatable inner sole 35 shown in FIG. 69. This alternative inner sole 43 has a heel pillow 119 in the rear chamber 163, rather than the air pump 73 shown for inner sole 35 of FIG. 69. In this respect the inner sole 43 is similar to that shown in FIG. 53. The inner sole is used in combination with a hand air pump. The hand air pump can be mounted on the upper portion of an inflatable side lining, as shown in FIG. 72, which is a view of the same lining 371 shown in FIG. 70, except for the hand air pump 171 which is permanently secured to the upper base 160 of lining 371. Tube 291 extends from the hand air pump 171 to control valve 58*a*, as indicated by break line C—C. In all other aspects, the inflatable inner sole 43 is the same as inflatable inner sole 35, and the inflatable upper lining is the same as the inflatable upper liner 371 shown in FIG. 70.

With the embodiment such as shown in FIGS. 69–72, where the pressure control valves are serially connected, the user can alter the order of the valves in the serial connection to alter the location of the highest pressured chamber. As shown in FIGS. 69–72, the rear chamber 163 is provided with the greatest pressure by control valve 58*a*, and each of the chambers which are connected to the succeeding valves 58*b*, 58*c*, 58*d* and 58*e* is provided with a slightly lesser pressure than the chamber connected to the immediate preceding valve. The connection of the tubes 64*a*, 64*b*, 64*c*, 64*d* and 64*e* can be altered, as desired, to provide variation in the pressure which is applied to any of the chambers, thereby adapting the footwear to different applications, or varying the comfort of various parts of the footwear.

Figure 73:
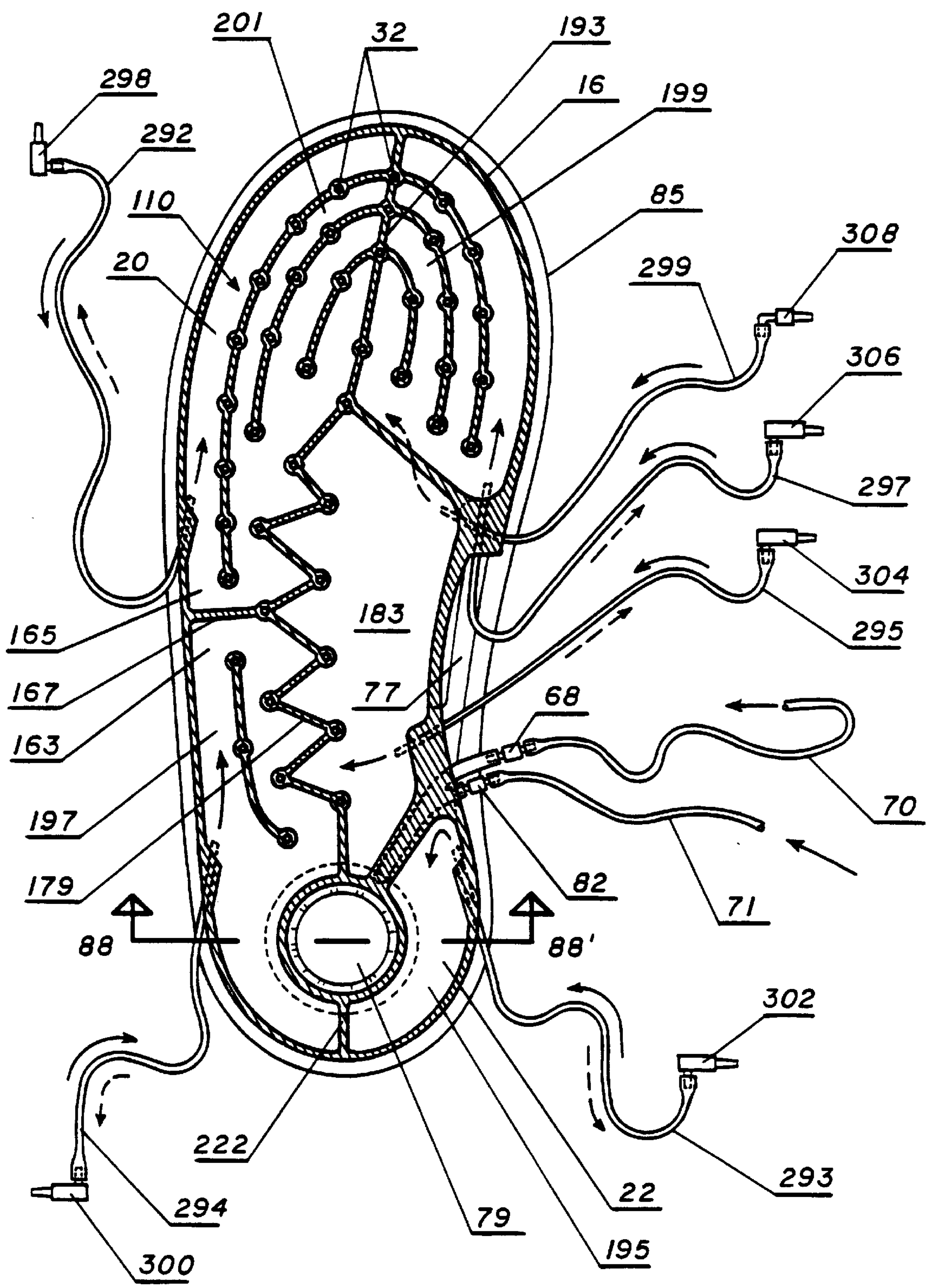
FIGS. 73 through 76 illustrate footwear with an inflatable upper liner and inflatable inner sole having an air pump in the heel, each with multiple chambers and a connector/pressure control valve shown in FIG. 76.
Figure 74:
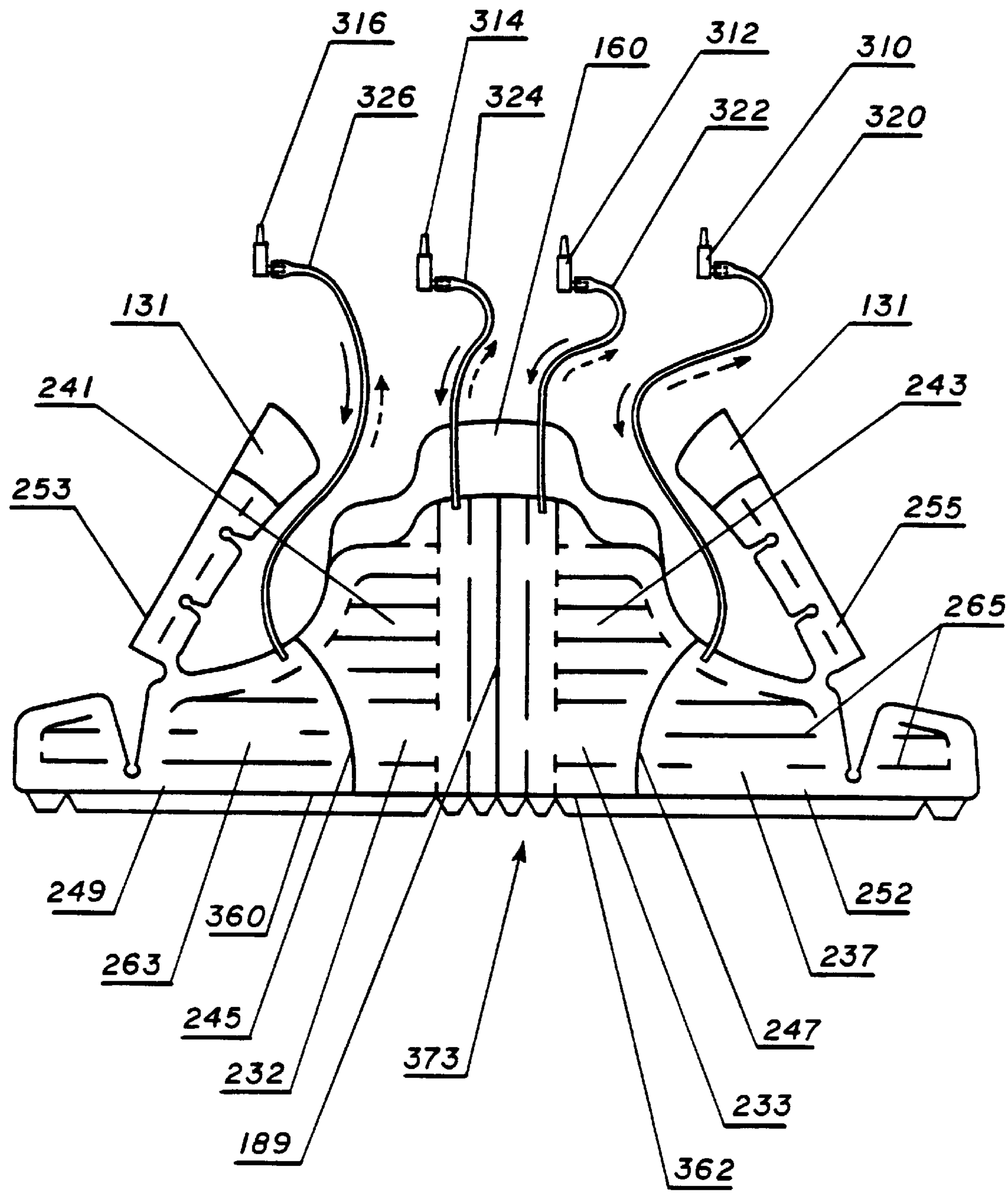
Figure 75:
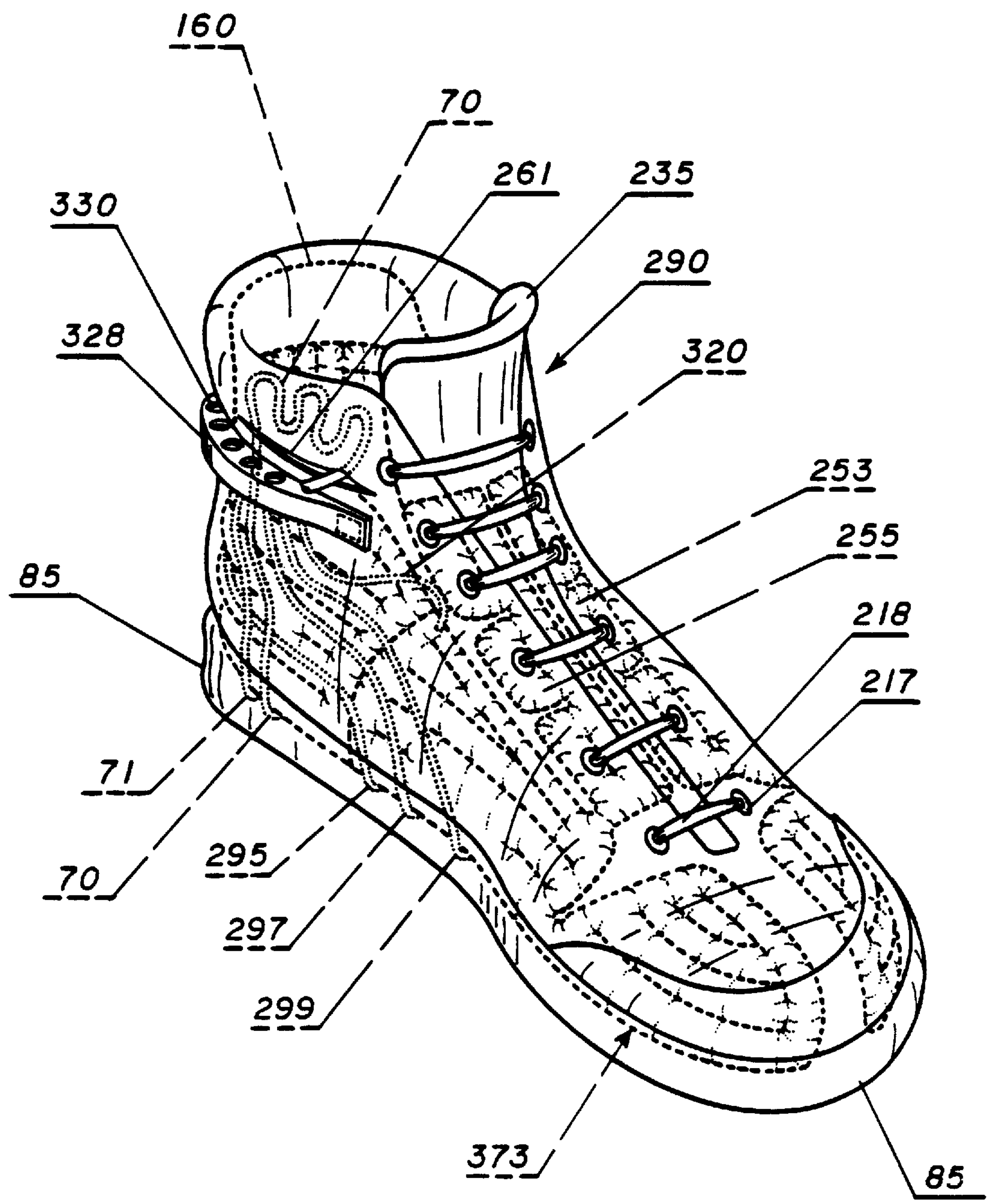

Referring now to FIGS. 73 through 76, a complete sport shoe 290 with inflatable liners of the invention is illustrated. The sport shoe is conventional in appearance with an outer sole 85, eyelets 217 and lacing 218, and tongue 235. The shoe 290 has an inflatable inner sole 110, which is shown in plan view in FIG. 73, and an inflatable upper liner 373 which is shown in FIGS. 74 and 75.

Figure 88:
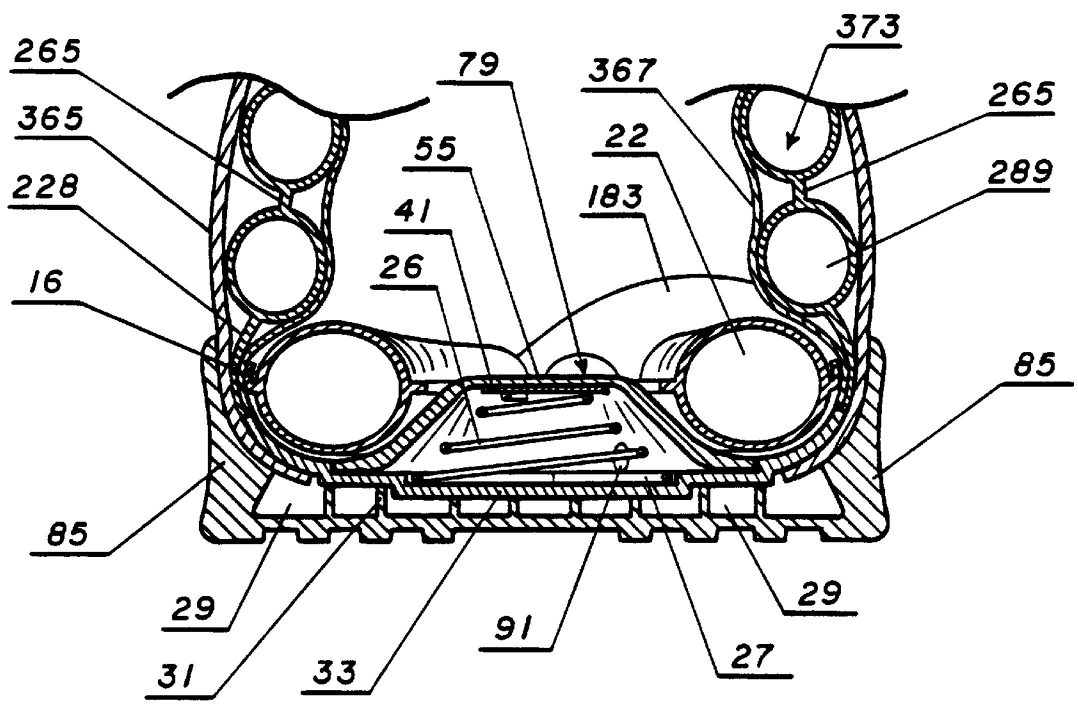
FIG. 88 is an elevational sectional view along line 88–88' of FIG. 73 illustrating in detail the air pump and inflatable inner sole and liner.
Figure 89:
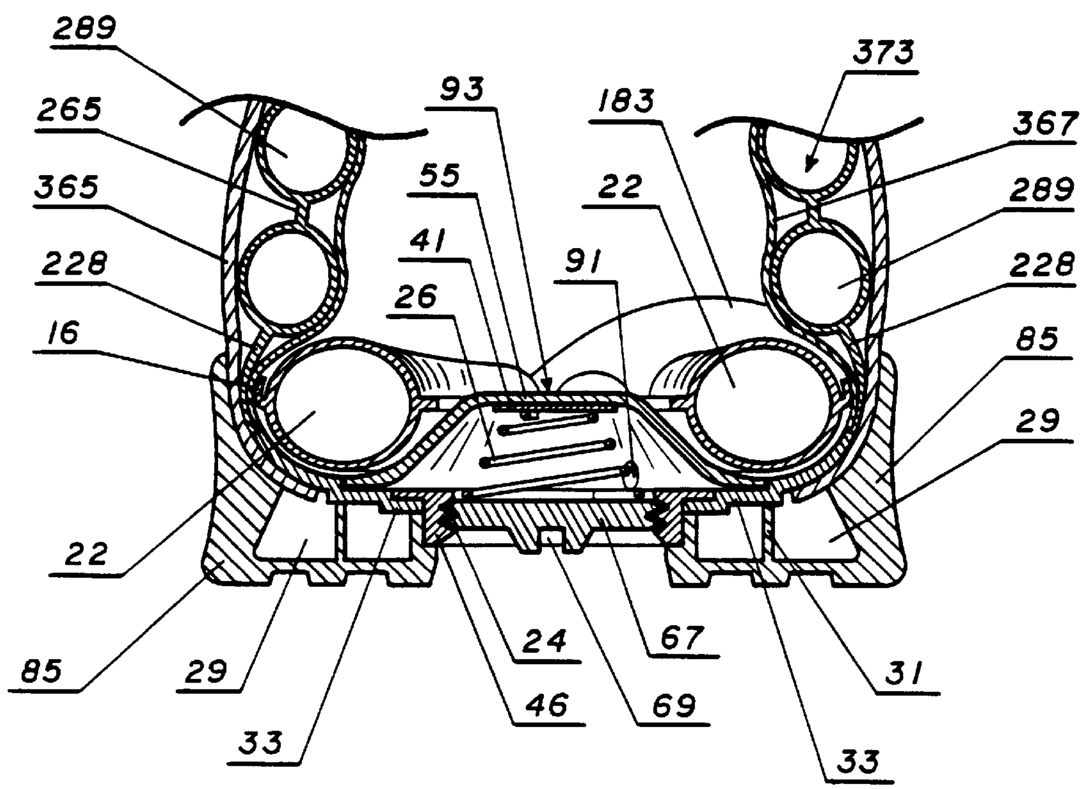
FIG. 89 is an elevational sectional view also along line 88–88' of FIG. 73 illustrating an alternative air pump to that shown in FIG. 88.

The inflatable inner sole 110 is subdivided into five interior chambers by continuous seams. Seam 179 surrounds the arch, forming arch chamber 183 and connects to seam 167 to divide the inner sole into front and rear portions 165 and 163. The rear portion 163 is subdivided by seam 222 into a medial heel chamber 195 and a lateral heel chamber 197. The front portion 165 is subdivided by seam 193 into a lateral toe chamber 201 and a medial toe chamber 199. As with the inner sole 35 shown in FIG. 69, an air pump 79 is located at the heel to provide a source of air under pressure for inflation of the chambers and to circulate air thorough the shoe. Sectional views through a typical air pump are shown in FIGS. 88 and 89. The air pump receives fresh air through tube 71 and its associated check valve 82 and discharges pressured air through check valve 68 and tube 70.

Tubes 70 and 71 are also shown in FIG. 75 as extending upwardly within the rear medial side of the shoe. Tube 71 terminates within collar housing 328. Tube 70 extends through a slit 261 in the outer wall of the shoe, with the slit providing an internal chamber within the wall of the shoe for storage of coils of tube 70. If desired, the edge of the slit could be closed with a zipper, or an elastic closure, or a Velcro closure (not shown).

Referring again to FIG. 73, each of the five separate and independent chambers of the inner sole is provided with a connector/pressure control valve and a connecting air tube. Arch chamber 183 has connector/valve 304 and tube 295; medial toe chamber 199 has connector/valve 306 and tube 297; lateral toe chamber 201 has connector/valve 298 and tube 292; lateral heel chamber has connector/valve 300 and tube 294; and medial heel chamber 195 has connector/valve 302 and tube 293.

Figure 76:
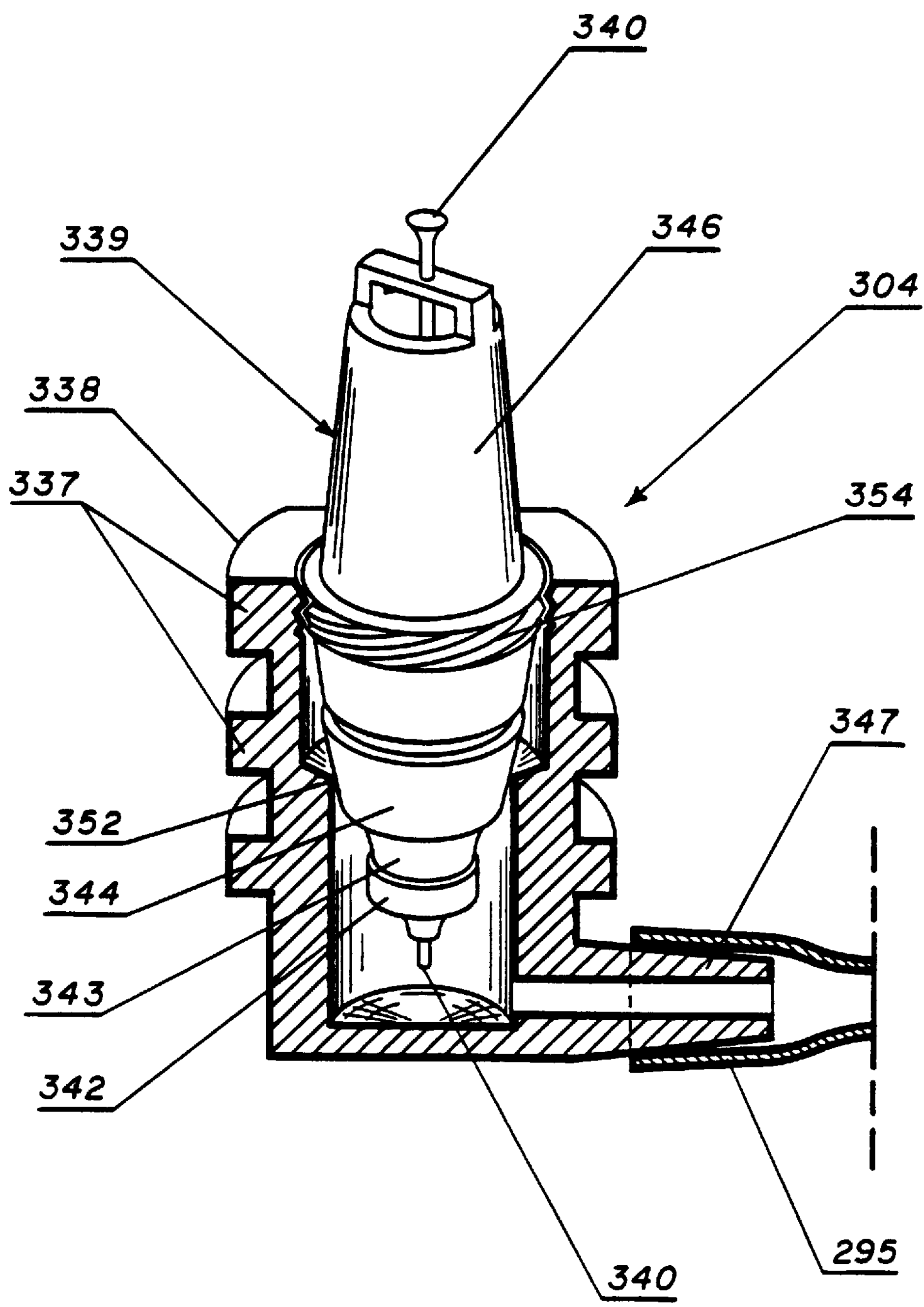

The structure of each connector/valve such as 304 is shown in detail in FIG. 76, which is a partial cross sectional view of the connector/valve 304. The pressure control valve 339 is an conventional inflation valve similar to valves available from Schrader Automotive Inc., Nashville, Tenn. 37202. This valve 339 has a valve member 342 which is resiliently biased into a closed position against the valve seat 343 by an internal spring (not shown). The valve member 342 is secured to a rod 340 which extends through the valve to an upper end 340 which serves as a valve operator to permit opening of the valve. The valve 339 has external threads 354 which are threadably received within a connector housing 338. The upper end or neck 346 of the valve 339 is conical to permit removable attachment of tubing. The lower end of the valve 339 has a rubber ring 344 which seats against internal shoulder 352 of the housing 338 for resilient sealing within the connector housing. The connector housing has a conical connector leg 347 to receive a tubing such as tube 295.

Referring again to FIGS. 73, 74 and 75, the discharge tube 70 from the air pump can be connected to any of the necks 346 of the connector/pressure control valve assemblies to permit a controlled pressurization of each of the individual chambers of the inflatable inner sole. To facilitate the connection by the wearer of the shoe, the connector/control valve assemblies are mounted within a collar housing 328 which has a plurality of circular wells 330 in which the connector/valve assemblies are mounted. The tube 70 has sufficient length to permit connection to each of the connector/valve assemblies and the excess length of the tube 70 is coiled within slit 261 in the shoe. As shown in FIG. 75, the tubes 295, and 297, which extend to chambers 183 and 199 are located in the upper medial side of the shoe.

FIG. 74 shows that the shoe 290 is also provided with an upper lining having a lateral side portion 360 and a medial side portion 362. This upper lining has four independent chambers which are formed by continuous seams 247, 189 and 245. The chambers are forward lateral and medial side chambers 249 and 252, rear lateral and medial side chambers 241 and 243. As with the embodiment shown in FIG. 65, the forward chambers are connected to inflatable half tongue liners 253 and 255.

Each of the independent chambers is provided with a connector/control valve assembly and connecting tubing. The forward lateral chamber 249 has connector/valve assembly 316 and tube 326; the rear lateral chamber 241 has connector/valve assembly 314 and tube 324; the rear medial side chamber 243 has connector/valve assembly 312 and tube 322; the forward medial side chamber 252 has connector/valve assembly 310 and tube 320. Tube 70, shown in FIGS. 73 and 75 can be connected to each of these connector/control valve assemblies to permit controlled pressurization of each chamber in the upper lining and in the inner sole. Each connector/control valve can have indica such as color or lettering to identify its respective chamber of the footwear. If color is used, corresponding color indica can be placed exteriorly on the shoe to identify the location of each inflated chamber.

Referring again to FIG. 73, the inflatable inner sole also has provision for circulation of air beneath and through the inner sole. The circulating air is provided by connecting tube 70 to the connector/valve assembly 308 which is connected to tube 299 (also shown in FIG. 75) that extends beneath the inner sole, discharging in the channels formed on the underside of the inflated inner sole which are vented through the inner sole by through apertures 32 spaced along the seams.

Figure 77:
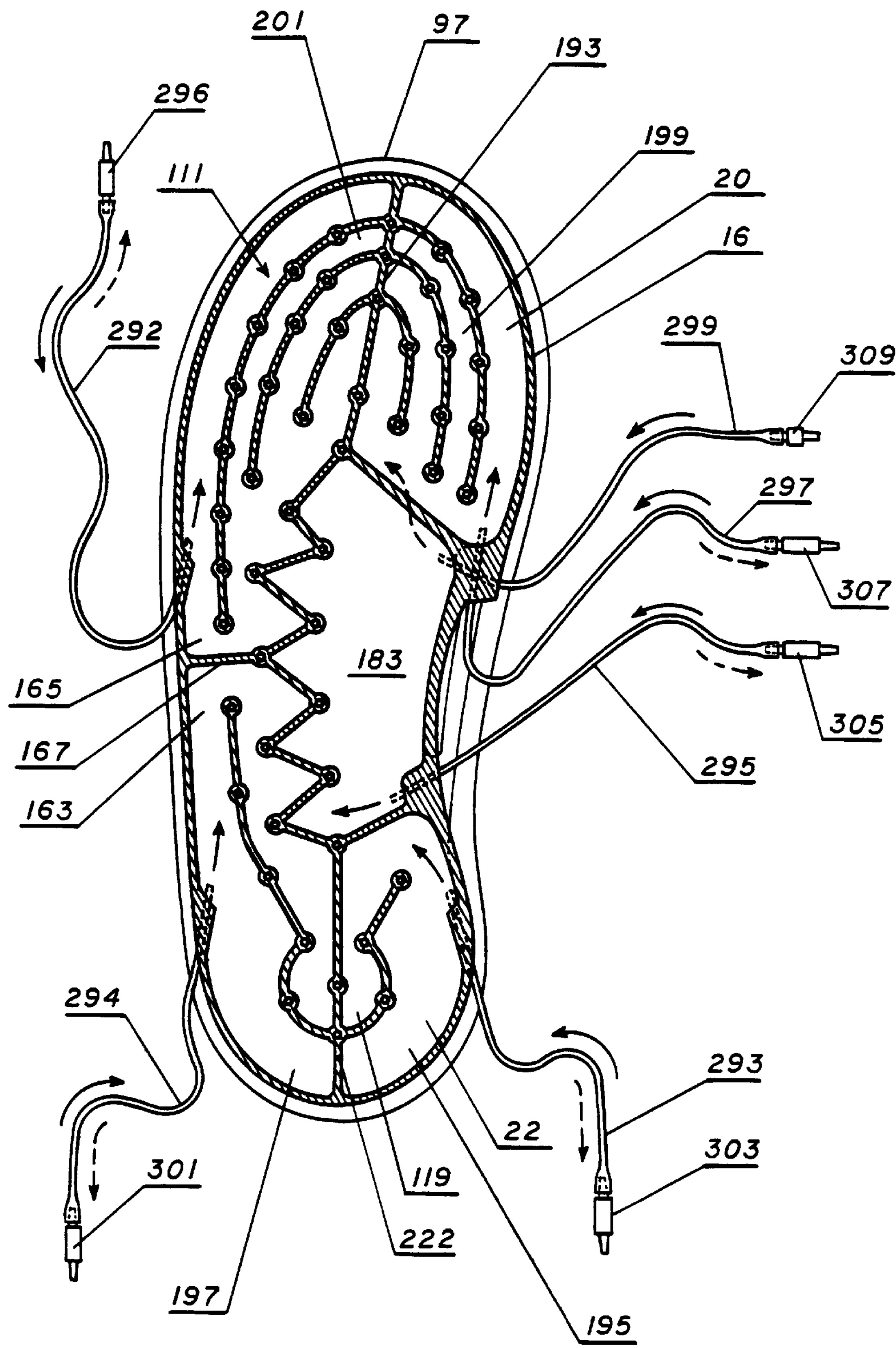
FIG. 77 illustrates an inflatable liner similar to that of FIG. 73 for use with a hand air pump.
Figure 78:
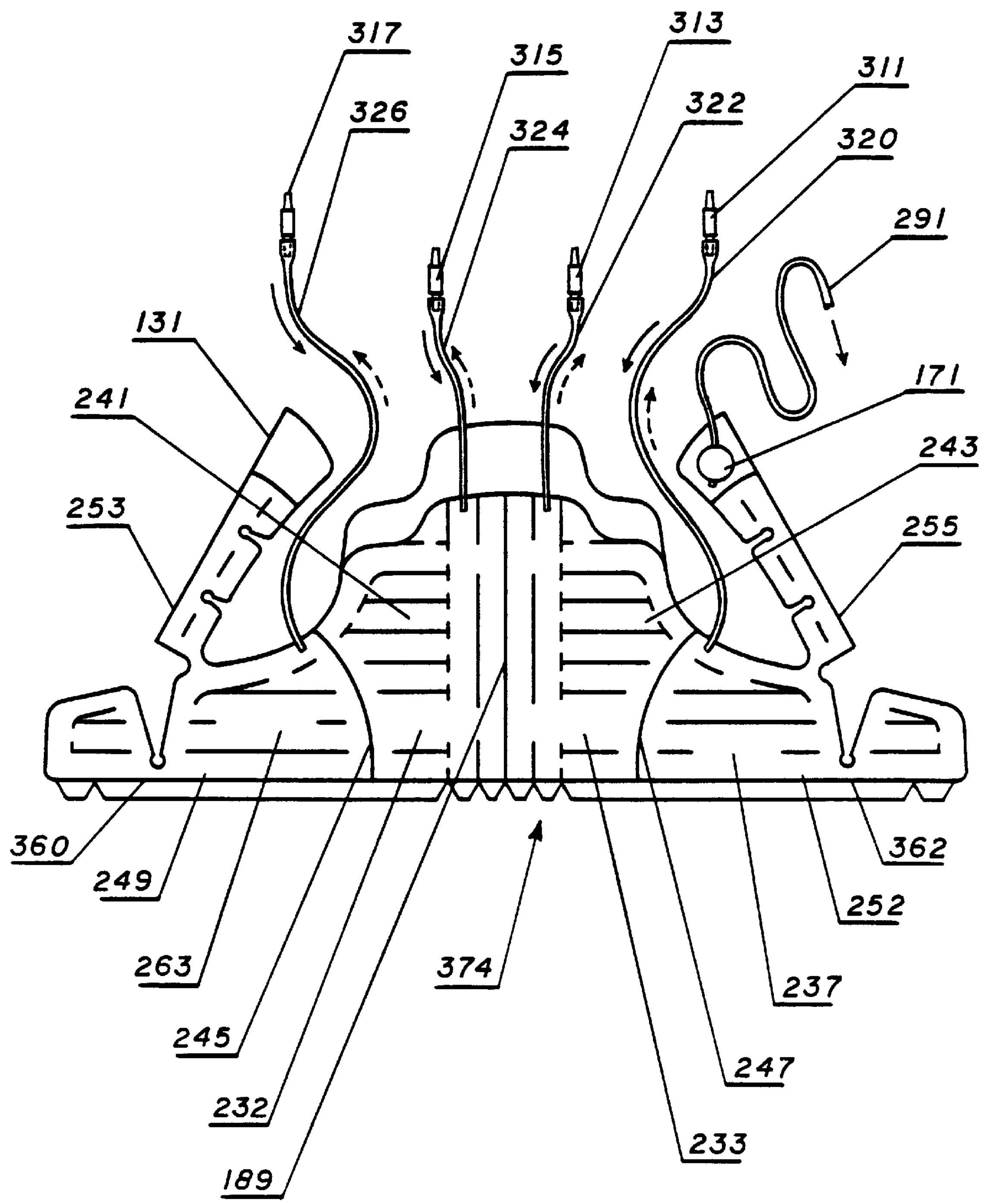
FIG. 78 is a plan view of an inflatable upper liner similar to those of FIGS. 70, 72 and 74 for use with a hand air pump.

FIGS. 77 and 78 illustrate an embodiment of the invention in which an inner sole 111 is shown as an alternative for the inflatable inner sole 110 shown in FIG. 73. This alternative inner sole 111 has a heel pillow 119 in the rear chamber 163, rather than the air pump 79 shown for inner sole 110 of FIG. 73. In this respect the inner sole 110 is similar to those shown in FIGS. 53, 54 and 71. The inner sole 111 is used in combination with a hand air pump. The hand air pump 171 can be mounted on the upper portion 131 of an inflatable tongue 255 or 253, as shown in FIG. 78, which is a view of lining 374. Tube 291 extends from the hand air pump 171 and can be connected to any of the connector/valves 311, 313, 315 and 317 of the upper lining 374, or to either of connector/valves 296, 301, 303, 305 and 307 or connector 309 of the inflatable inner sole 111 (FIG. 77). If desired a slit can be provided in the tongue of the shoe such as tongue 235 (FIG. 75) to store the coiled tube 291, similar to slit 261 shown for storage of tube 70 in FIG. 75. The connector/valves shown in FIGS. 77 and 78 are essentially the same as those shown in FIGS. 73 and 74, except they are in line with the inlet and outlet ends being coaxial, rather than the right angle connector/valve structure shown in FIGS. 73 and 74. All tubes which extend from the connector/control valves to the chambers can be located between the inflatable lining and the outer upper of the shoe to avoid direct contact with the wearer's foot and thus avoid possible discomfort to the wearer.

Figure 79:
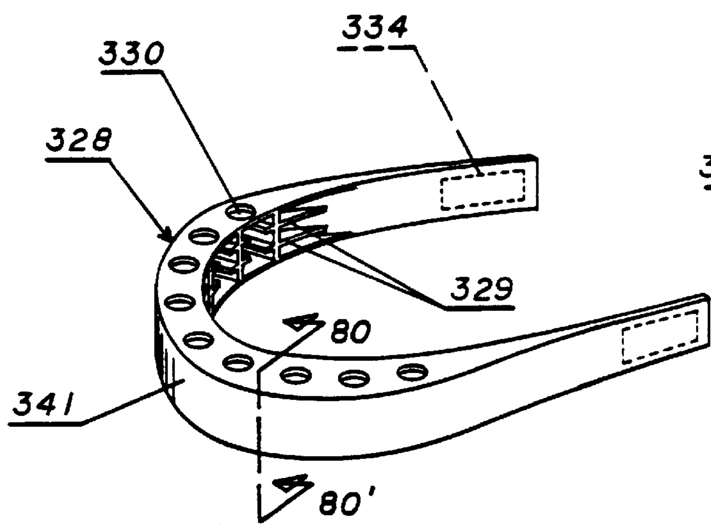
FIGS. 79 and 80 illustrate a collar housing for the footwear of FIG. 73 which contains the connector/control valves of the inflatable liners.
Figure 80:
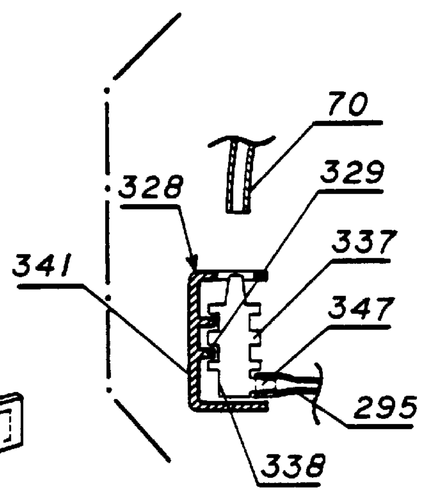

The collar housing 328 is shown in greater detail in FIGS. 79 and 80. The collar housing is a C-shaped channel with apertures along its upper wall to form recesses 330. It is received about the rear upper portion of the shoe, as shown in FIG. 75 and can be permanently secured to the shoe by adhesive bindings 334, or alternatively by permanent stitching. FIG. 80 is a sectional view along line 80–80' of FIG. 79. It shows that the vertical wall 341 of the collar housing 328 has two horizontal internal ribs 329 which are received between the ribs 337 of the connector/control valve housing 338 (shown only in contour). FIG. 80 also shows the tube 70 as it is placed onto the conical neck of the control valve.

Figure 81:
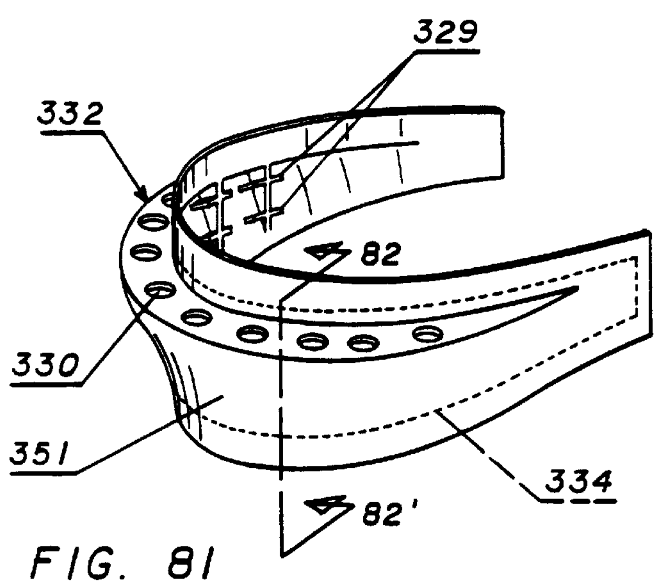
FIGS. 81 through 83 illustrate alternative housings for the connector/control valves.
Figure 82:
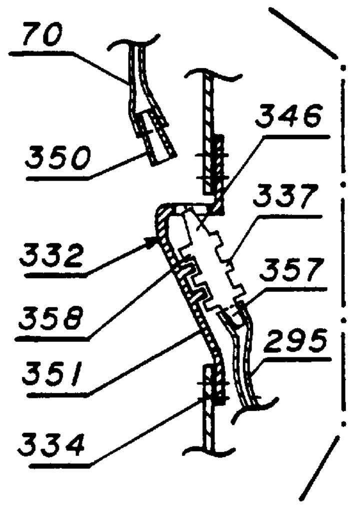

An alternative collar housing 332 is shown in FIGS. 81 and 82. In this embodiment, the collar has a tapered side wall 351 with inclined recesses 330. The collar housing 332 is permanently attached to the upper rear of the shoe with stitching 334. Permanent, adhesive cement could also be used. The connector/valve assembly 358 is substantially the same as shown in FIGS. 73 through 76 and 80, however, the leg 357 is coaxial with the conical neck 346, providing an in-line configuration for attachment of tubes. A connector tube such as 295 is permanently connected to leg 357, and the tube 70 is removably connected to the tapered neck 346 of the control valve. For this purpose, a conical connector sleeve 350 can be used, if desired. A collar housing the same as or similar to collar housing 328 and 332 can also be provided to receive valves 58 shown in FIGS. 69–72.

Figure 83:
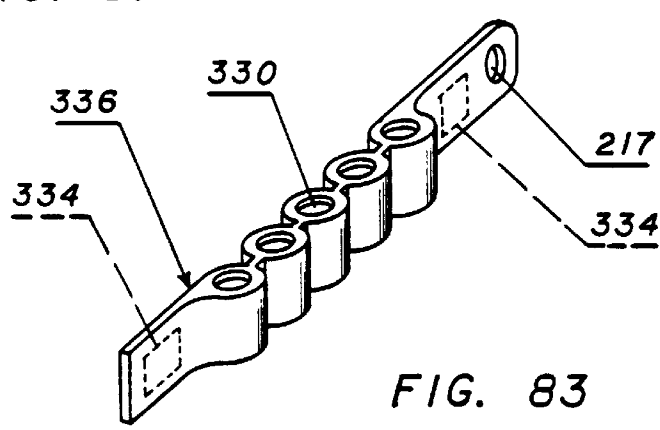

Referring now to FIG. 83, another housing for the connector/control valve assemblies is shown. This housing is adapted to be secured along the side of the shoe with adhesive or stitching strips 334. At its forward end, the housing can have an aperture 217 which serves as an eyelet for lacing, thereby also reinforcing the side of the shoe. The housing has a plurality of cylindrical sleeves which are connected in a side-by-side array, thereby forming wells 330 in which are mounted the connector/control valve assemblies 318, previously described. The housing can be made of flexible, hard rubber or plastic.

Figure 84:
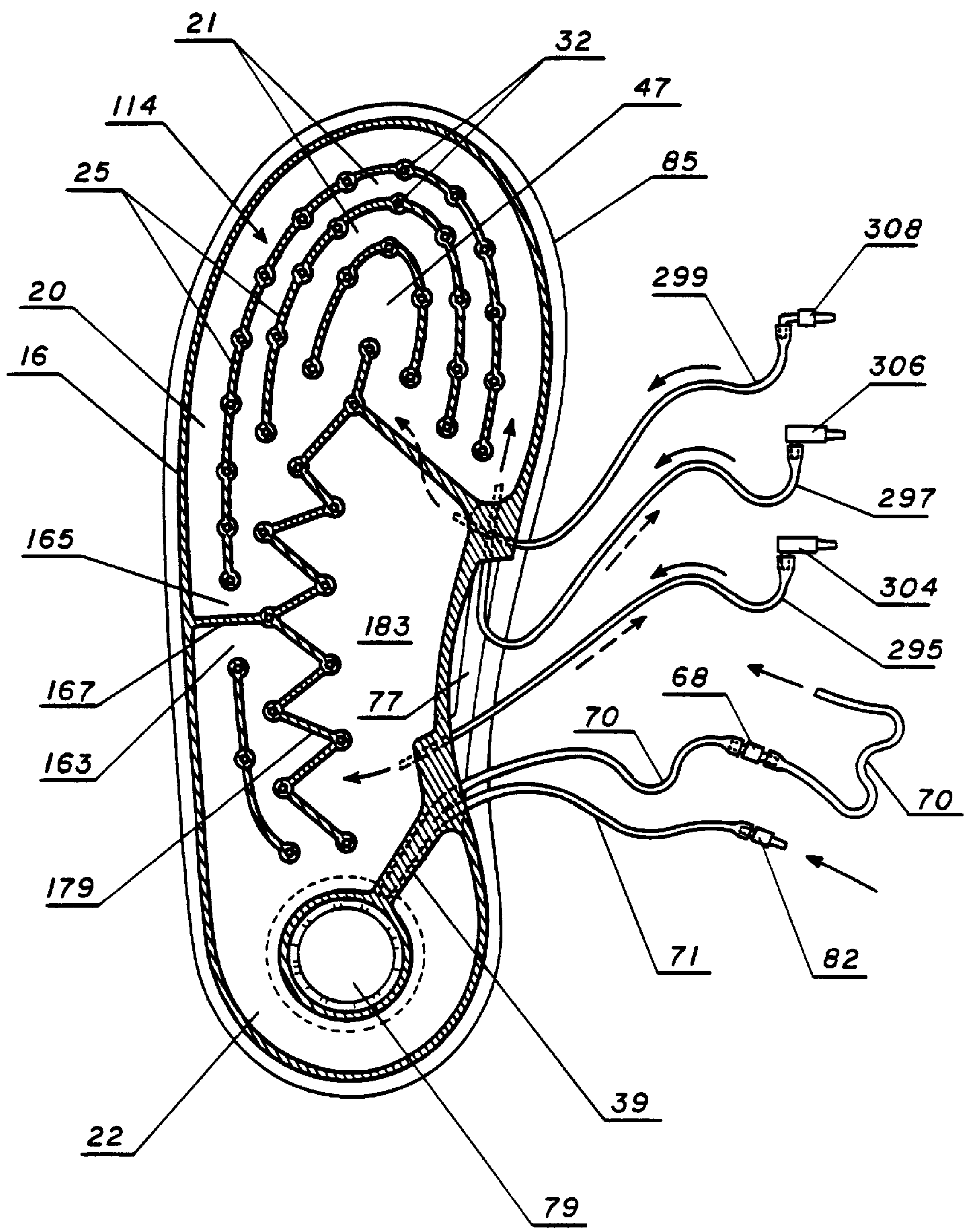
FIG. 84 is an assembly view of an embodiment of the invention showing an inflatable inner sole in plan view as having two chambers and an air pump in the heel of the inner sole, with separate pressure control valves for each chamber.

FIG. 84 illustrates an inflatable inner sole 114 which has only two separate chambers; forward chamber 165 and rear chamber 163. The rear chamber 163 is provided with a through aperture at the heel which is surrounded by a continuous seam to receive a heel air pump 79. The tubes extend through a channel formed beneath seam 39, from the air pump to the medial side of the inner sole. Tube 71 provides an air inlet to the pump through its check valve 82, and tube 70 provides an air discharge from the pump through its check valve 68. The check valves 82 and 68 can be placed in the channel 77 under the arch, as shown on FIG. 44. As illustrated, however, the check valves are installed in the tubes, remote from the inner sole to avoid any accidental contact of the valves with the wearer's foot. Preferably the valves 82 and 68 are mounted in the holder 328 shown in FIG. 75 in the same manner as described for the pressure control valves. Each of the chambers of the inner sole 114 has an independently controllable inflation system; connector/valve 304 and tube 295 communicate with the rear and instep chamber and connector/valve 306 and tube 297 communicate with the front chamber 165. The tube 70 can be connected to either of these systems to provide the internal pressure, or firmness desired by the wearer. Once the pressure is established as desired by the wearer in any chamber, the tube 70 can be disconnected and used to pressure the other chamber, or it can be connected to connector 308 which discharges into tube 299 that extends beneath the inner sole 114 to discharge air into the channels formed on the underside of the inner sole for circulation through the shoe. The rear chamber 165 provides stability to the footwear, as the support from the inner sole 114 is distributed evenly between the heel and arch of the wearer.

Figure 85:
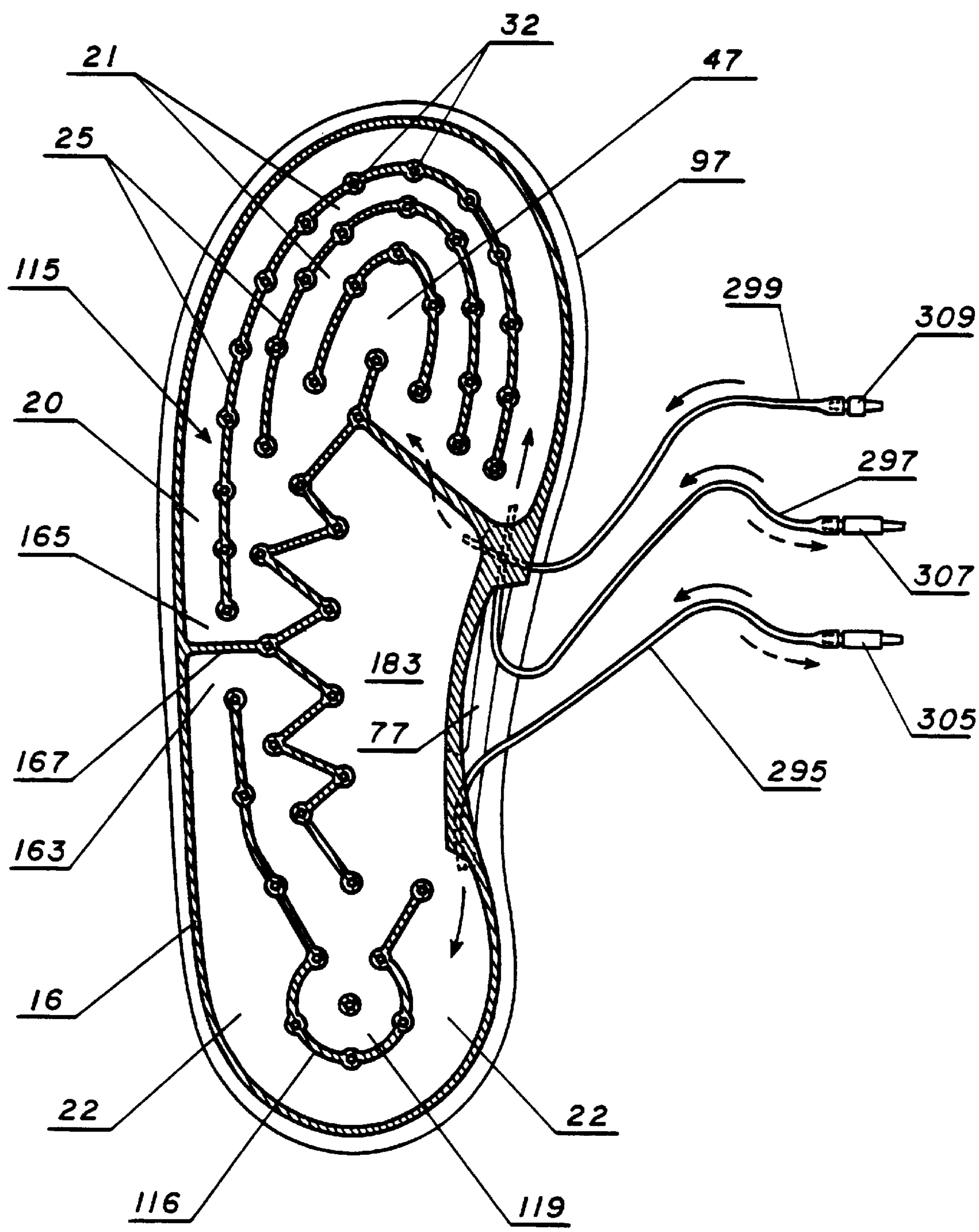
FIG. 85 is an assembly view of an inflatable inner sole shown in plan view which is similar to that of FIG. 84, but intended for use with a hand air pump.

FIG. 85 illustrates a two-chamber inner sole 115 which is essentially the same as that shown in FIG. 84, however, the heel chamber is modified to provide a heel pillow 119 in the rear chamber 163, rather than the air pump 79 shown for inner sole 114 of FIG. 84. In this respect the inner sole 115 is similar to those shown in FIGS. 53, 54, 71 and 77. The inner sole 115 is used in combination with an upper lining and a hand air pump such as shown in FIGS. 72 and 78.

Figure 86:
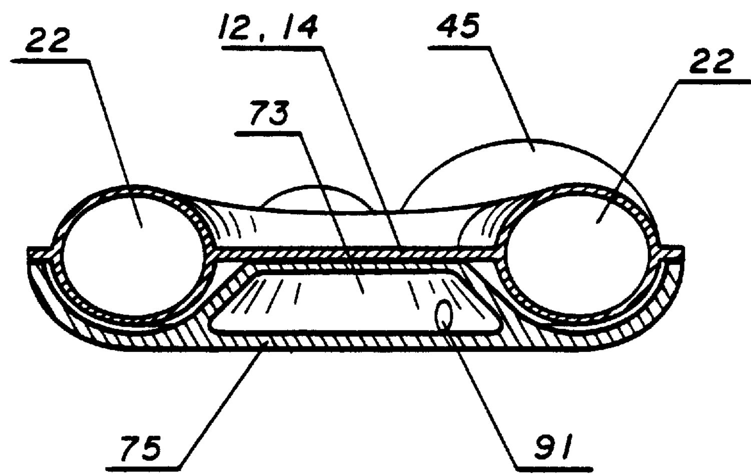
FIG. 86 is an elevational sectional view of an air pump alternative to that shown in FIG. 42, with the section line along line 42–42' of FIG. 40.

Referring now to FIG. 86, a heel air pump 73 is shown as received within the circular inflated passageway 22. This air pump is integral with the outer sole or underlayment 75. The air pump is similar to air pump 73 shown in FIG. 42, however, the upper sheet 12 and lower sheet 14 of the inner sole are bonded together and are not apertured, as in FIG. 42. Instead, the upper sheet of the air pump 73 underlies the bonded area of sheets 12 and 14 and preferably is glued or bonded to these sheets, so that the flexing of the sheets assists the return of the air pump. Port 91 which communicates with the external tubes containing the check valves, previously discussed is also shown in this view.

Figure 87:
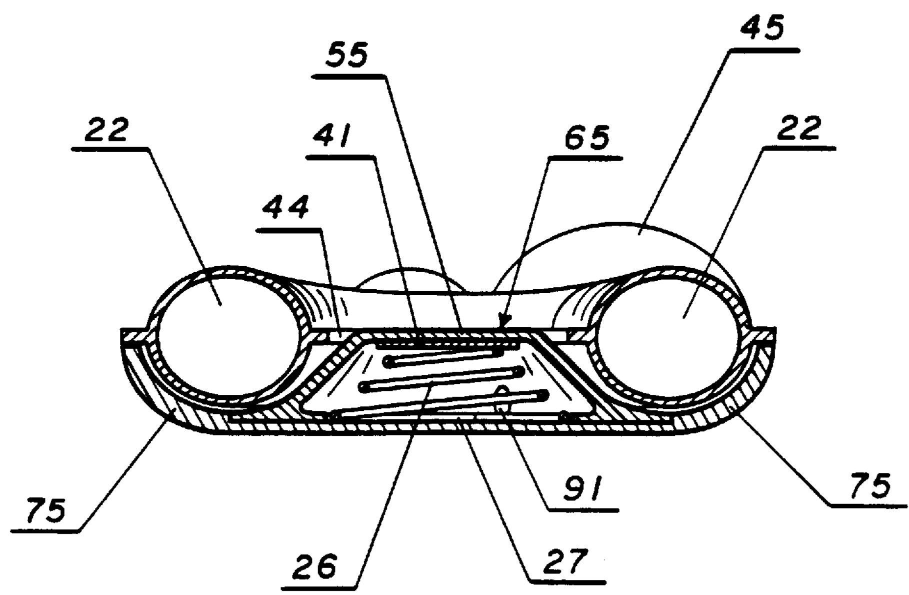
FIG. 87 is an elevational sectional view of another alternative air pump to those shown in FIGS. 42 and 86.

FIG. 87 illustrates another embodiment of an air pump 65. In this embodiment, the inner sole is apertured, and the upper layer 55 of the air pump 65 extends through the aperture 44. The air pump is mounted in a circular recess 27 formed on the upper side of the underlayment 75, and is permanently bonded thereto. The air pump 65 can have an internal helical coil spring 26 which is biased against a plate 41 on the underside of the upper layer 55 of the air pump 65. The spring 26 assists the return of the air pump and increases its pumping action. Also, the spring also provides enhanced shock absorbency and resiliency to the footwear.

Referring now to FIG. 88, there is shown a sectional view through the heel of a shoe provided with an inner sole and upper lining of the invention. This view is located along a plane generally depicted by line 88–88' of FIG. 73. As there illustrated, the outer sole 85 has a honeycomb structure with air cells 29 which are formed by internal ribs 31. A cover plate 33, which is also the midsole of the shoe, overlies the ribs and is sealed thereto to provide enclosed air cells 29. The plate 33 can be made of a high strength and wear resistant material such as carbon or graphite fiber reinforced plastics. The plate 33 increases the strength and stiffness of the sole without significantly increasing its weight. The plate 33 has a central recess 27 which serves as a spring retainer for the base of helical spring 26. The air pump 79 is similar to air pump 65 previously described with reference to FIG. 87 and has its upper layer 55 extending through a receiving aperture in the inner sole and has a plate 41 beneath the upper layer 55, all as previously described.

FIG. 88 also illustrates the assembly of the inner sole and the upper lining 373 which is contained between the outer skin 365 and the inner liner 367 of the upper for the footwear. As previously mentioned the upper lining 373 is also formed with internal inflated passageways 289 which are formed by seams 265. Preferably, the upper lining 373 has tabs such as 228 which can be bonded to the outer skin 365 and liner 367 of the shoe to retain the upper lining 373 in place. The tabs 228 can also be bonded or sewed to the outer sole 85 in the fabrication of the shoe. In this fabrication, the peripheral seam 16 of the inner sole is folded upwardly and can be used as a surface for attachment of the inner sole with the upper liner 373 and outer sole 85, as desired.

Referring now to FIG. 89, there is illustrated an embodiment of the invention which is alternative to that shown in FIG. 88. This embodiment is essentially the same as that of FIG. 88, except an aperture 24 extends through the outer sole 85 and midsole 33 at the heel, immediately beneath the heel air pump 93. The aperture is closed with a flanged sleeve 46 which receives a plug 67 that is threadably engaged in the sleeve 46. A slot 69 can be provided on the underside of the plug 67 to permit its insertion and removal. The plug 67 provides access to the interior of the air pump 93, thereby permitting replacement of the helical coil spring 26. The spring 26 provides greater resiliency to the air pump and also increases the resiliency and shock absorbing properties of the shoe. The spring 26 can be replaced with springs of varied compression strengths to adjust the shoe to the wearer's weight and particular activity, e.g., sport, walking, running, basketball, etc., as well as for sport training exercises. The remainder of the structure is the same as that shown in FIG. 88.

Referring now to FIGS. 90 through 98, a complete sport shoe 376 is shown with inflatable liners of the invention. The sport shoe has the same construction and substantially the same liners as that described previously with reference to FIGS. 73–75, and identical elements shown in the drawings retain the same numbers as those of FIGS. 73–75.

Figure 91:
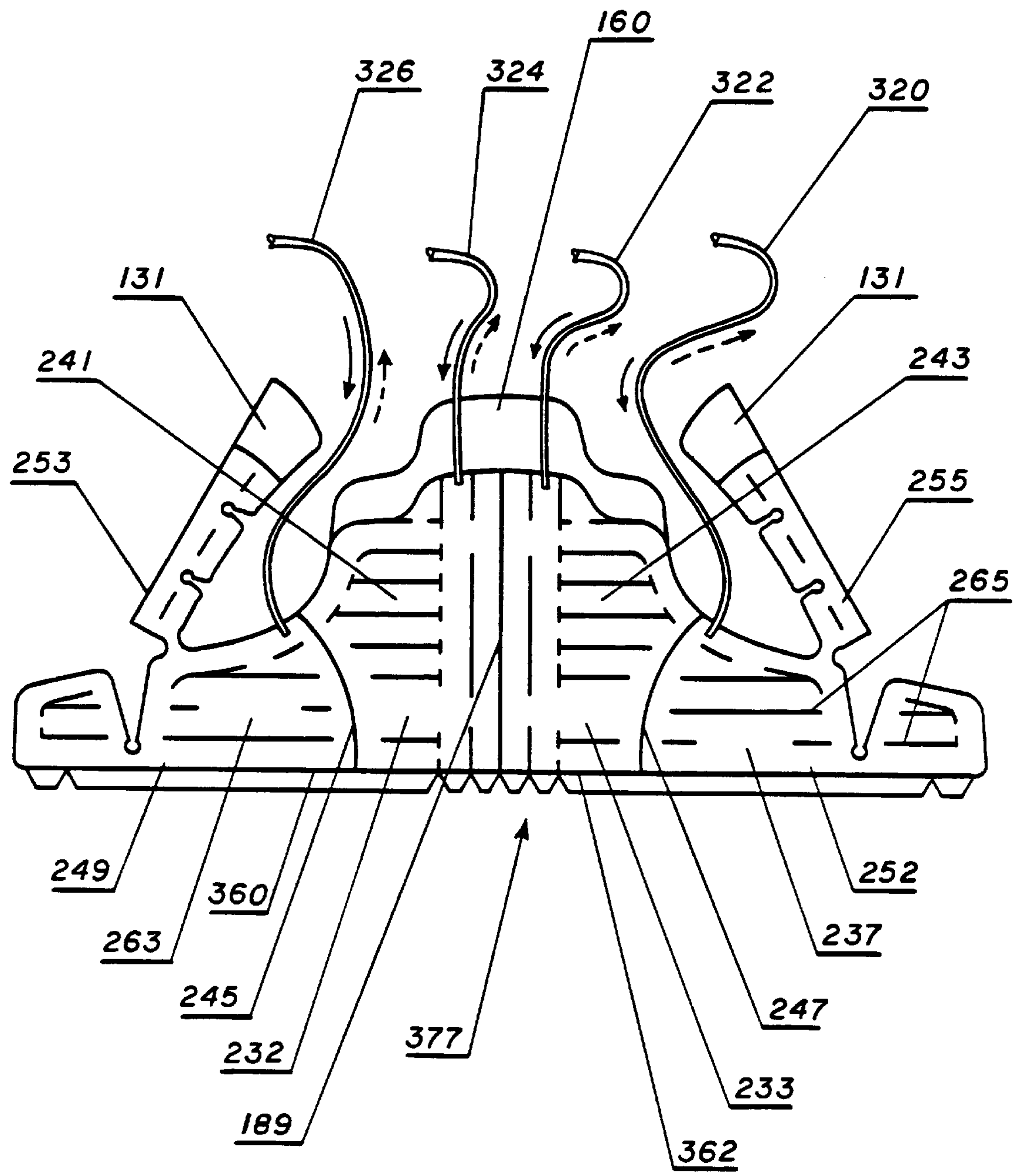
Figure 92:
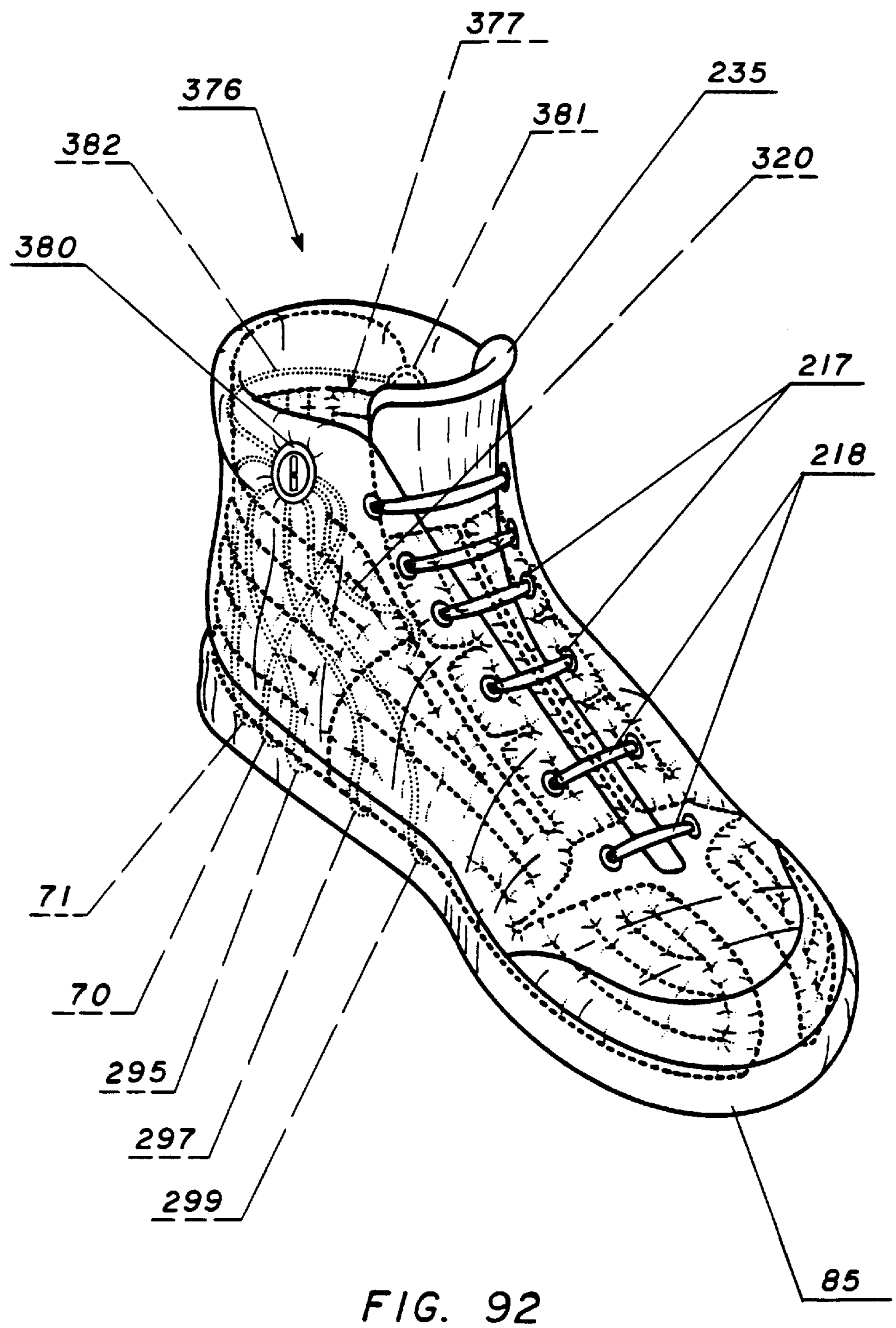

The sport shoe, which is shown in perspective view in FIG. 92, has an outer sole 85, eyelets 217 and lacing 218, and tongue 235. The shoe 376 has an inflatable inner sole 375, which is shown in plan view in FIG. 90, and an inflatable upper liner 377 which is shown in FIG. 91.

The inflatable inner sole 375 is subdivided into five interior chambers by continuous seams, the same as that shown and previously described with reference to FIG. 73. Seam 179 surrounds the arch, forming arch chamber 183 and connects to seam 167 to divide the inner sole into front and rear portions 165 and 163. The rear portion 163 is subdivided by seam 222 into a medial heel chamber 195 and a lateral heel chamber 197. The front portion 165 is subdivided by seam 193 into a lateral toe chamber 201 and a medial toe chamber 199.

An air pump 79 is located at the heel to provide a source of air under pressure for inflation of the chambers and to circulate air thorough the shoe. Sectional views through a typical air pump are shown in FIGS. 88 and 89. The air pump receives fresh air through tube 71 and its associated check valve 82 and discharges pressured air through check valve 68 and tube 70.

Tubes 70 and 71 are also shown in FIG. 92 as extending upwardly within the rear medial side of the shoe. Tube 70 extends to the selector valve 380, which is shown at the medial, upper region of the shoe. The selector valve is a multiported valve with a rotatable valve operator, whereby the air pump discharge tube 70 can be connected to one of each of five tubings, such as 292, 293, 294, 295 and 297 (all shown in FIG. 90) which supply individual chambers of the inner sole 375, and tubes 320, 322, 324 and 326 (shown in FIG. 91) which supply individual chambers of the upper lining 377. The selector valve also can direct air to tubing 299 (see FIG. 90) which discharges beneath the lining 375 to force air circulation along the channels between the inner sole and the sole of the footwear, from where it passes upwardly through apertures 32, passing over the wearer's foot.

The construction of the selector valve 380 is shown in FIGS. 93 through 95. The valve has a cylindrical housing 384 with a rotatable valve member 386, which has a radial port 400 which aligns with one of five radial ports in the housing 384. The selector valve member 386 has a handle 398 on its outside surface formed by a pair of wings. The rear cover 392 of the valve housing has a through passageway 394 with an aperture 395 opening into the interior of the housing 384. The discharge end of tubing 70 is connected to one end of the passageway 394, and tubing 382, which extends to the second selector valve 381 from the opposite end of the through passageway 394.

The valve member 386 also supports a relief valve member 396 which has the shape of a flat circular disc with a center post that extends through a center aperture in the valve member 386. The relief valve member 396 is resiliently secured within the housing 384 with a compression spring 388, so that the air pressure within any chamber connected through the selector valve 380 can be released by pressing on the relief valve member 396. The pressure can only be relieved from a chamber which is connected through port 400, so when the selector valve 386 does not align port 400 with any radial port in the housing, all chambers in the lining are sealed.

As shown in FIG. 92, a second selector valve 381 is also located on the opposite side of the shoe, and tubing 382 extends to this valve. The second selector valve 381 is shown in FIGS. 96–98. This valve is substantially identical to the first valve shown in FIGS. 93–95, with the exception that the rear cover 391 of this valve has a single passageway 393 to which tubing 382 is connected. Each selector valve can have indica on its exterior surface, such as color or lettering, to identify its respective chamber of the footwear. If color is used, corresponding color indica can be placed exteriorly on the shoe to identify the location of each inflated chamber.

Figure 99:
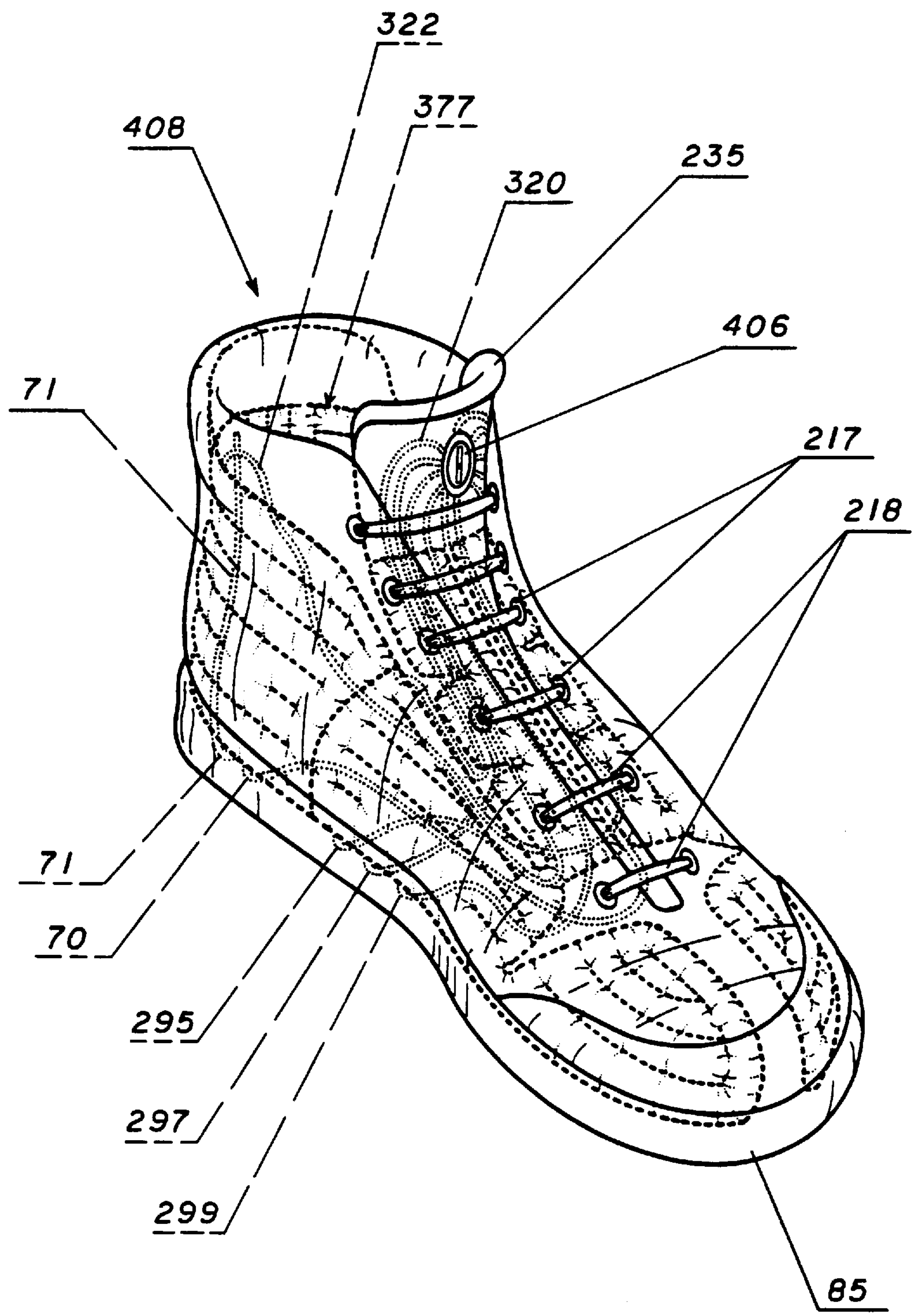

Referring now to FIG. 99, there is shown a sport shoe 408 in perspective view, which has a single selector valve 406 which is carried on the tongue. This shoe has a total of nine inflatable chambers in the inner sole and upper lining. The selector valve 406 is shown in FIGS. 100 through 102. It has the same basic construction as valve 380 with a rotatable valve member 386 and relief valve member 396, internal compression spring 388. The housing 404 of selector valve 406 has ten radial ports which can be aligned with the single port 400 of the valve member 386. The discharge tubing 70 from the air pump is connected to the single passageway in the rear cover 391 of selector valve 406. The single selector valve thus supplies the nine individual chambers of the lining and the tubing 299 which discharges air between the lining and the sole of the footwear. The selector valve 406 can, of course, be located at any other accessible position, and can be connected in any order to any of the chambers of the lining. Also, indica, such as color or printed matter, can be placed on the selector valve housing to identify which chamber is connected to a particular port of the selector valve.

Referring now to FIGS. 103 through 106, there is illustrated another embodiment of the invention with two selector valves to supply each of nine chambers located in the inner sole and upper lining of the shoe, and to supply circulation air beneath the lining. The shoe 420 is shown in perspective view in FIG. 105 with first selector valve 380 and second selector valve 381 located at opposite sides on the upper region of the shoe, as in the embodiment shown in FIG. 92. In shoe 420, however, the heel pump is replaced with a hand pump 410 which can be located on the tongue of the shoe, or at any other convenient and accessible location on the shoe. The discharge tubing 370 from this hand pump 410 is connected to the first selector valve 380 and to the second selector valve 381 by tubing 382, as described with reference to FIG. 92.

Figure 103:
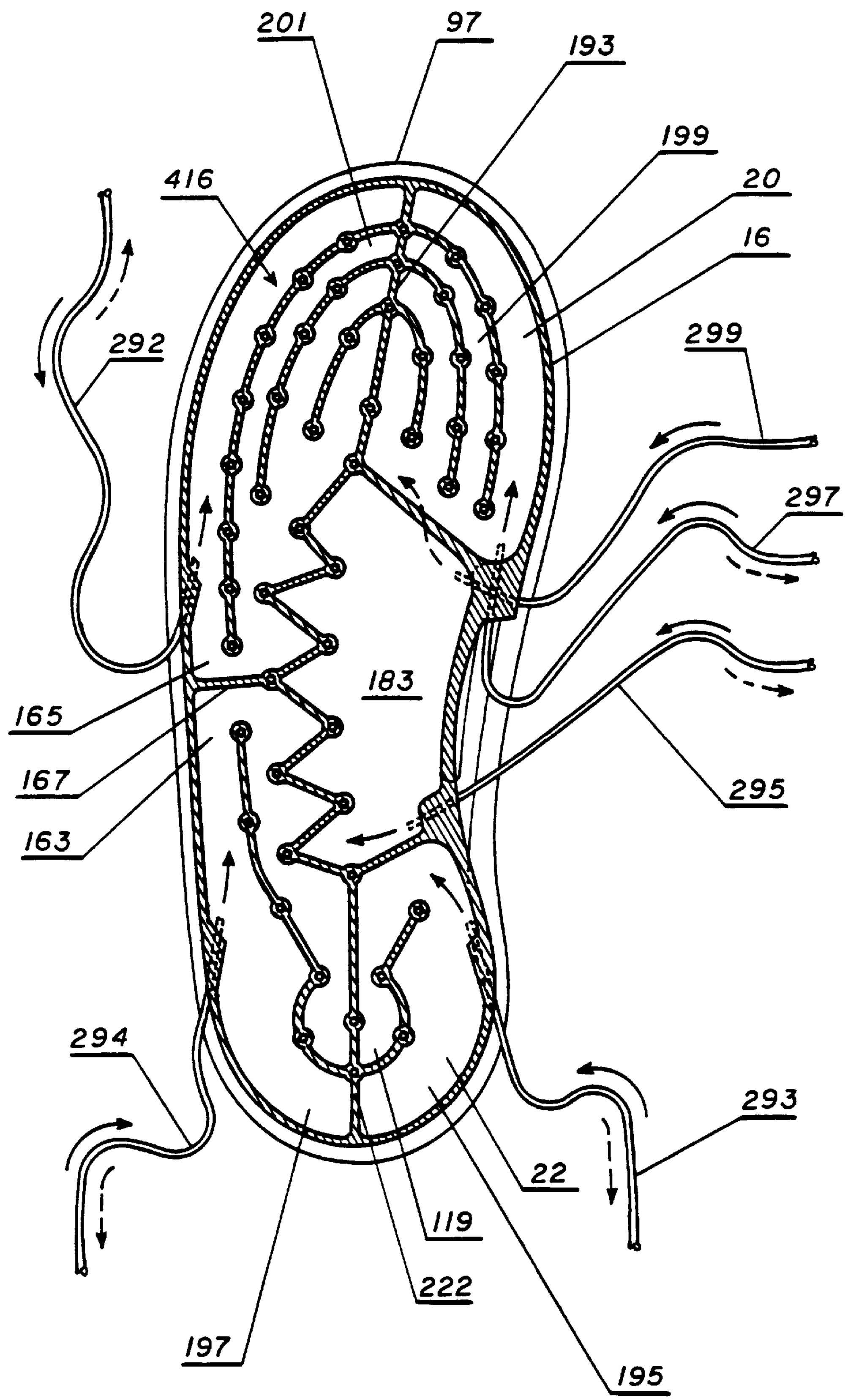
FIG. 103 illustrates an inflatable inner sole similar to that of FIG. 90 for use with a hand air pump.
Figure 104:
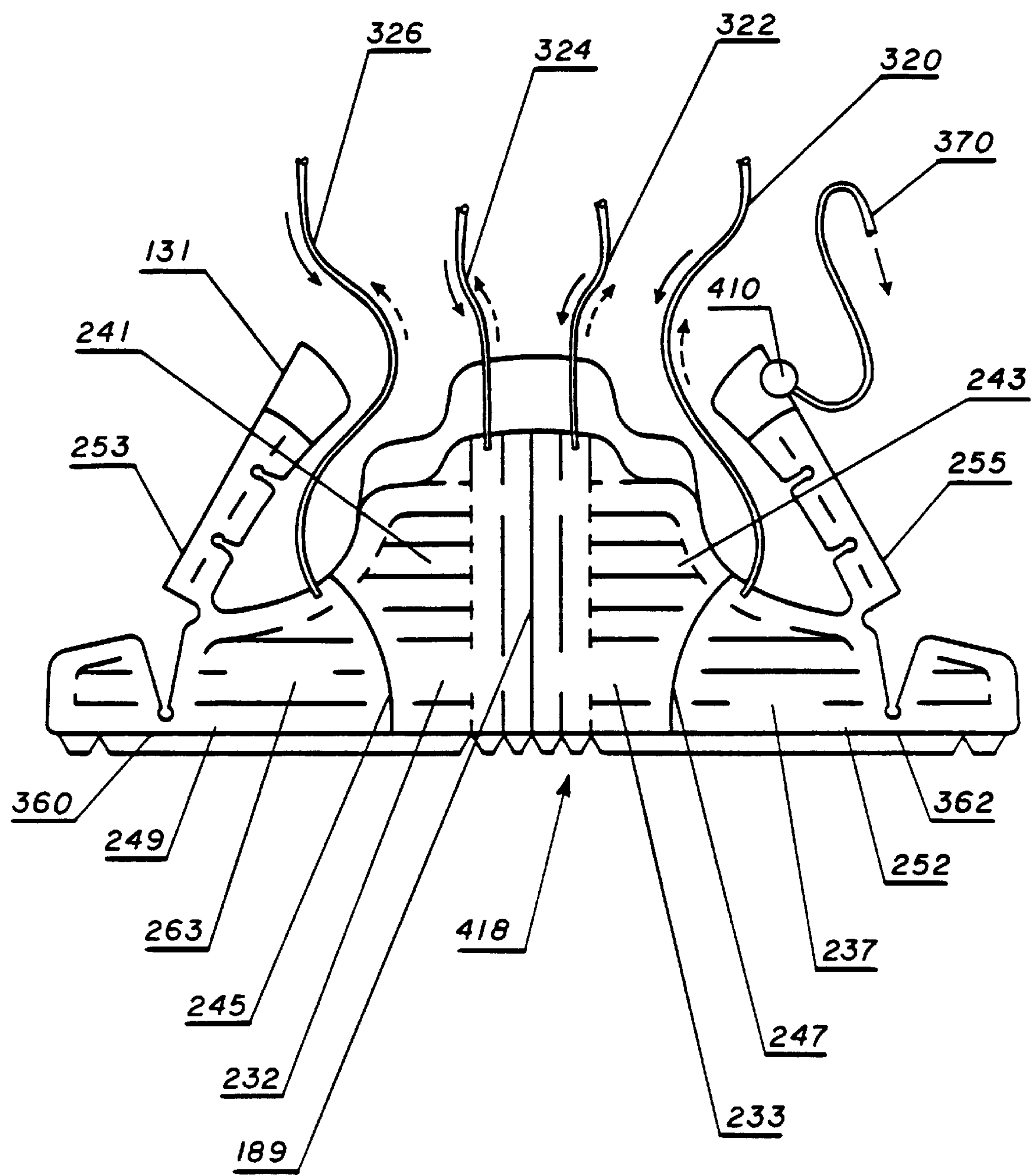
FIG. 104 illustrates an inflatable upper liner useful in combination with the inner sole shown in FIG. 103.
Figure 105:
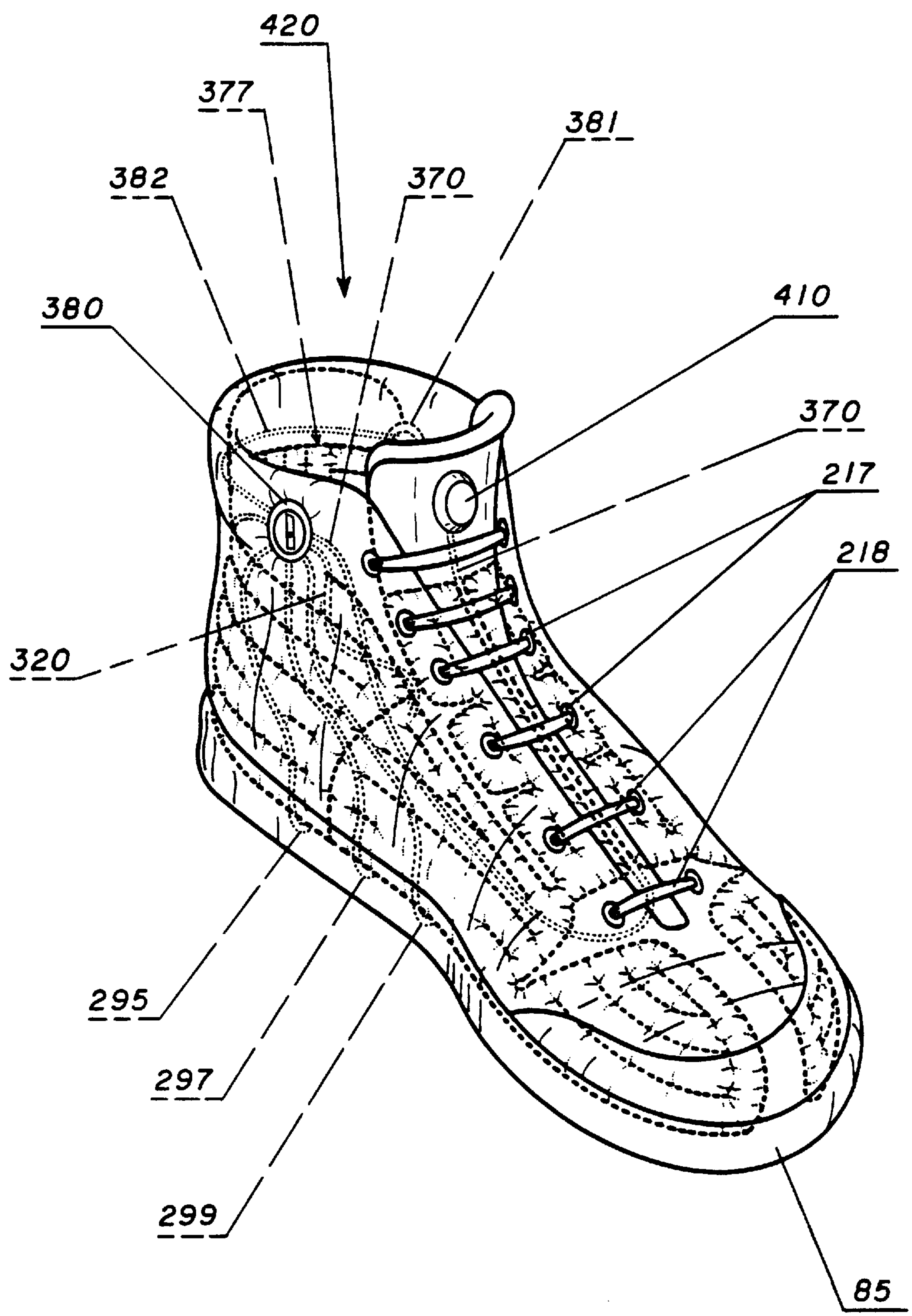
FIG. 105 is a perspective view of footwear with the linings of FIGS. 103 and 104.

Referring now to FIG. 103, the heel of the inflatable inner sole has a heel pillow 119 on each side of the transverse seam 222, in the rear chambers 197 and 195, rather than a heel air pump. In other respects the inner sole is the same as inner sole 375 shown in FIG. 90. Similarly, the upper inflatable lining 418 shown in FIG. 104 is substantially identical with lining 377 shown in FIG. 91, with the exception of the hand air pump 410 which is supported on the tongue of the lining.

Figure 106:
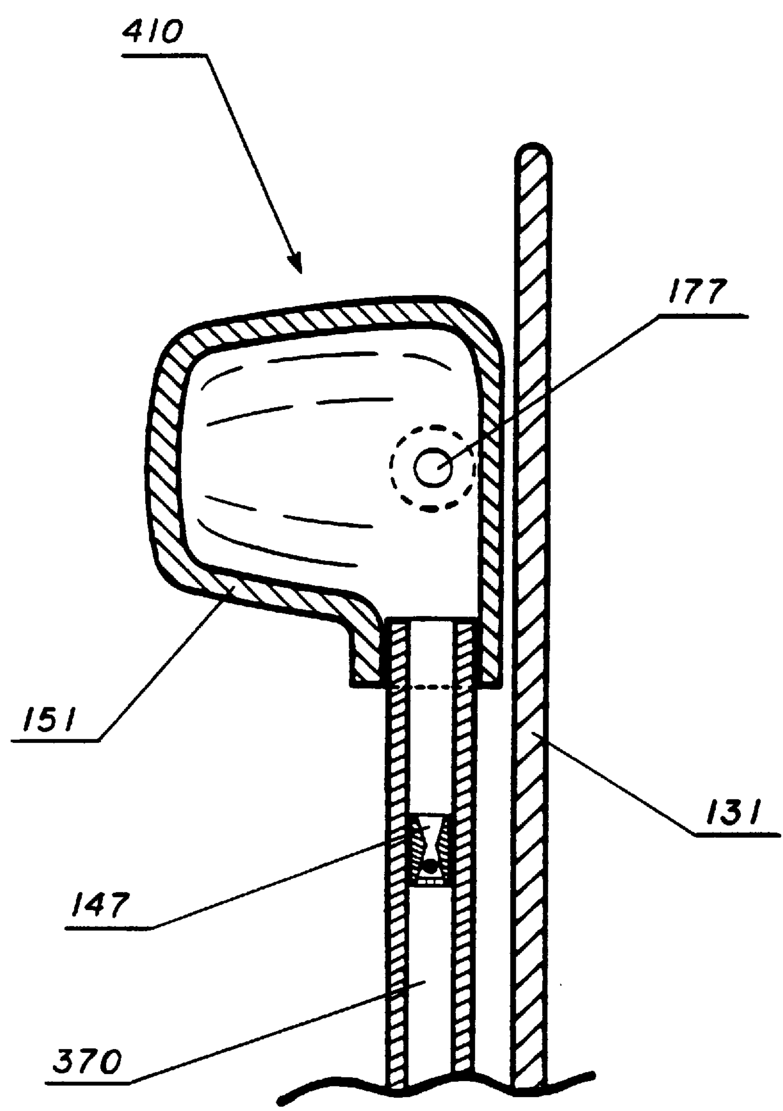
FIG. 106 is a sectional view of a hand pump for use with the linings of FIGS. 103 and 104 and footwear of FIG. 105.

The hand air pump 410 is shown in sectional view in FIG. 106. The pump has a flexible, elastic bulb 151, which has an intake port that is closed with a check valve 177 permitting air entrance but blocking air discharge. The discharge tubing 370 contains another check valve 147 which permits discharge of air from the bulb, and prevents entrance of air into the bulb, thereby permitting the bulb to serve as an air pump. The entire pump 410 can be supported on base 131 for the tongue of the upper lining. Pump 410 is similar to pump 11 shown in FIG. 67, but without the relief valve, as pump 410 is used with selector valve 380 which has an integral relief valve.

As previously mentioned, the inflatable lining can also have used for other apparel such as gloves. The gloves with the linings are particularly useful in sports such as motorcycling, bicycling or skiing where protection for the back of one's hands is desired, or where a tightness of fit is desired.

Figure 107:
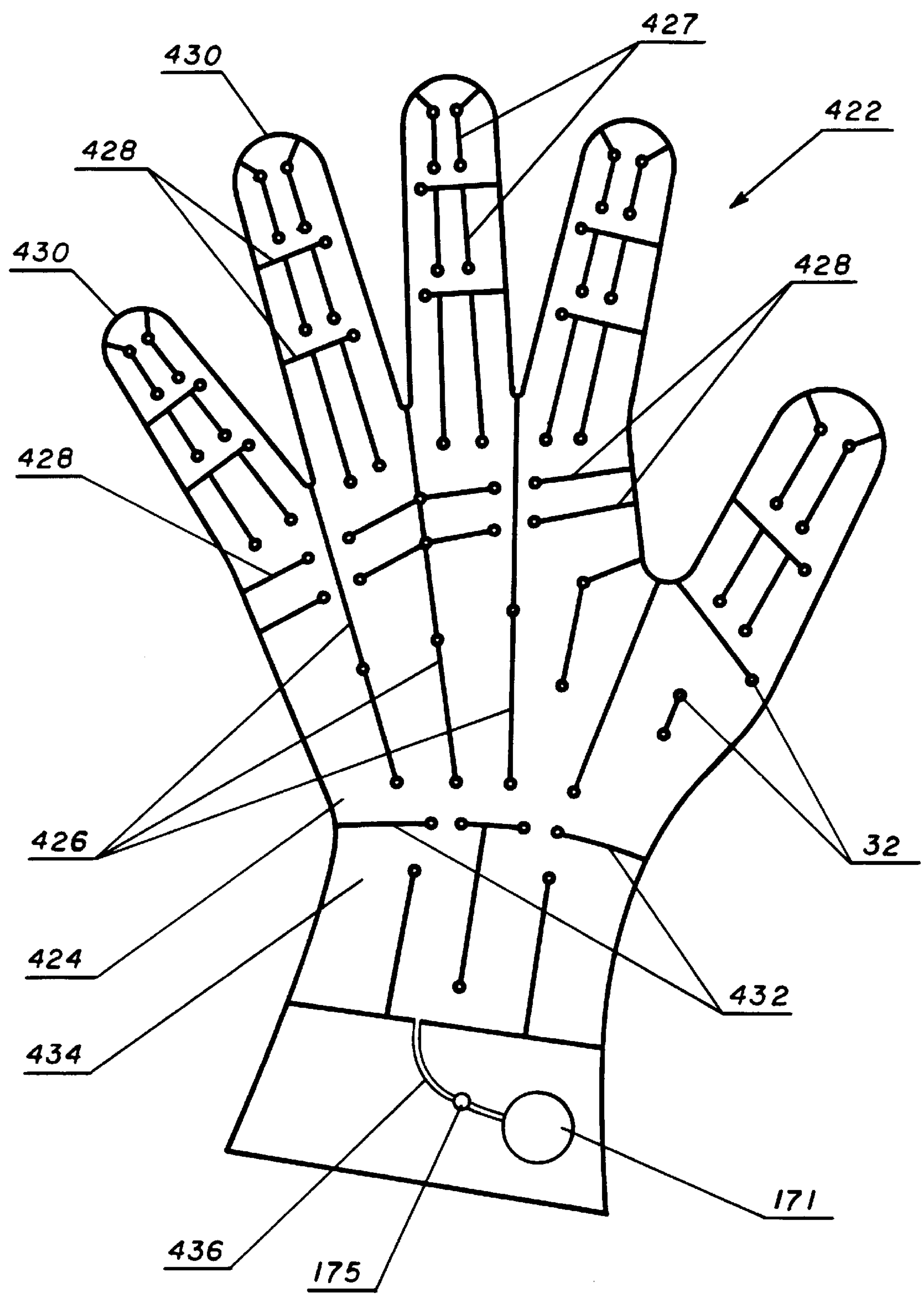
FIGS. 107 through 110 illustrate the inflatable lining of the invention applied in a glove.

FIGS. 107 through 110 illustrate an application to a glove. The inflatable lining 422 is used beside a selected interior surface of gloves, preferably beside the rear inside surface of a glove. For this purpose a lining 422 such as shown in FIG. 107 which, as the other linings described herein, is formed of first and second sheets of plastic which are seamed or sealed together about their peripheral edges, forming a sealed interior chamber. The lining 422 shown in FIG. 107 has a single interior chamber 424, with a plurality of discontinuous seams such as long longitudinal seams 426 and short longitudinal seams 427 which permit the lining 422 to flex over the back of the hand and fingers, and a plurality of transverse seams 428 spaced along the fingers 430 to permit the lining 422 to flex at the finger knuckles. Similarly a transverse seam 432 is provided over the wrist area 434, again to permit ease of flexing of the lining 422 when it is inflated.

The lining 422 is provided with an air pump 171, which has been previously described with reference to FIG. 68. The air pump 171 is connected to the interior chamber of the lining by a flexible tubing 436 which contains the pressure relief valve 175.

Figure 108:
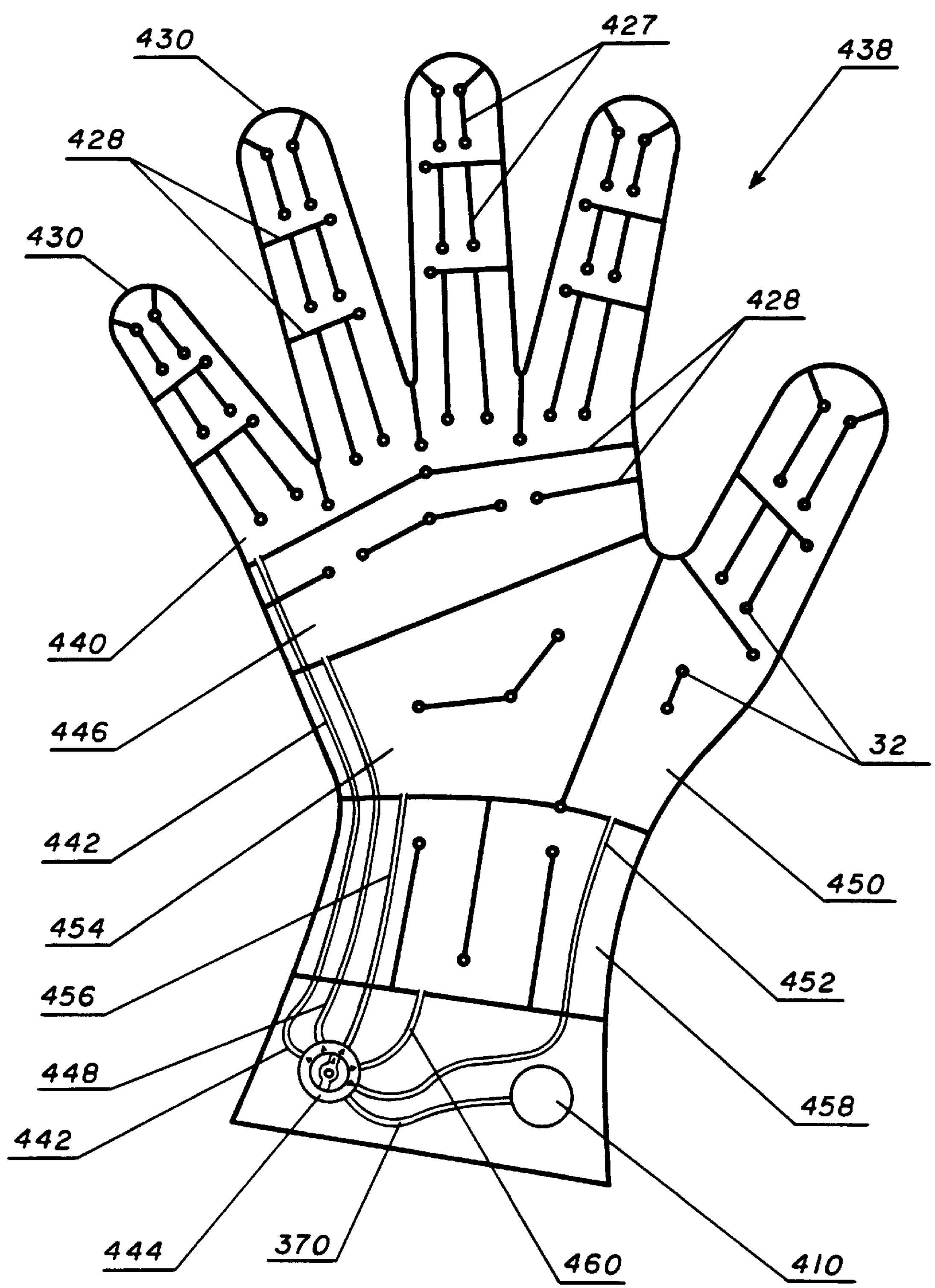

Preferably the glove lining is provided with independently sealed interior chambers such as shown for the lining 438 of FIG. 108. This lining 438 has a finger chamber 440 which is supplied with inflation air by tubing 442 that extends from a single selector valve 444, which is substantially similar to selector valve 381, previously described. The lining 438 also has a knuckle chamber 446 which is supplied with inflation air by tubing 448, a thumb chamber 450 which is supplied with inflation air by tubing 452, a back chamber 454 with air tubing 456, and a wrist chamber 458 with air tubing 460. All can be inflated to any desired pressure with the air pump 410, which is described with reference to FIG. 106.

Figure 109:
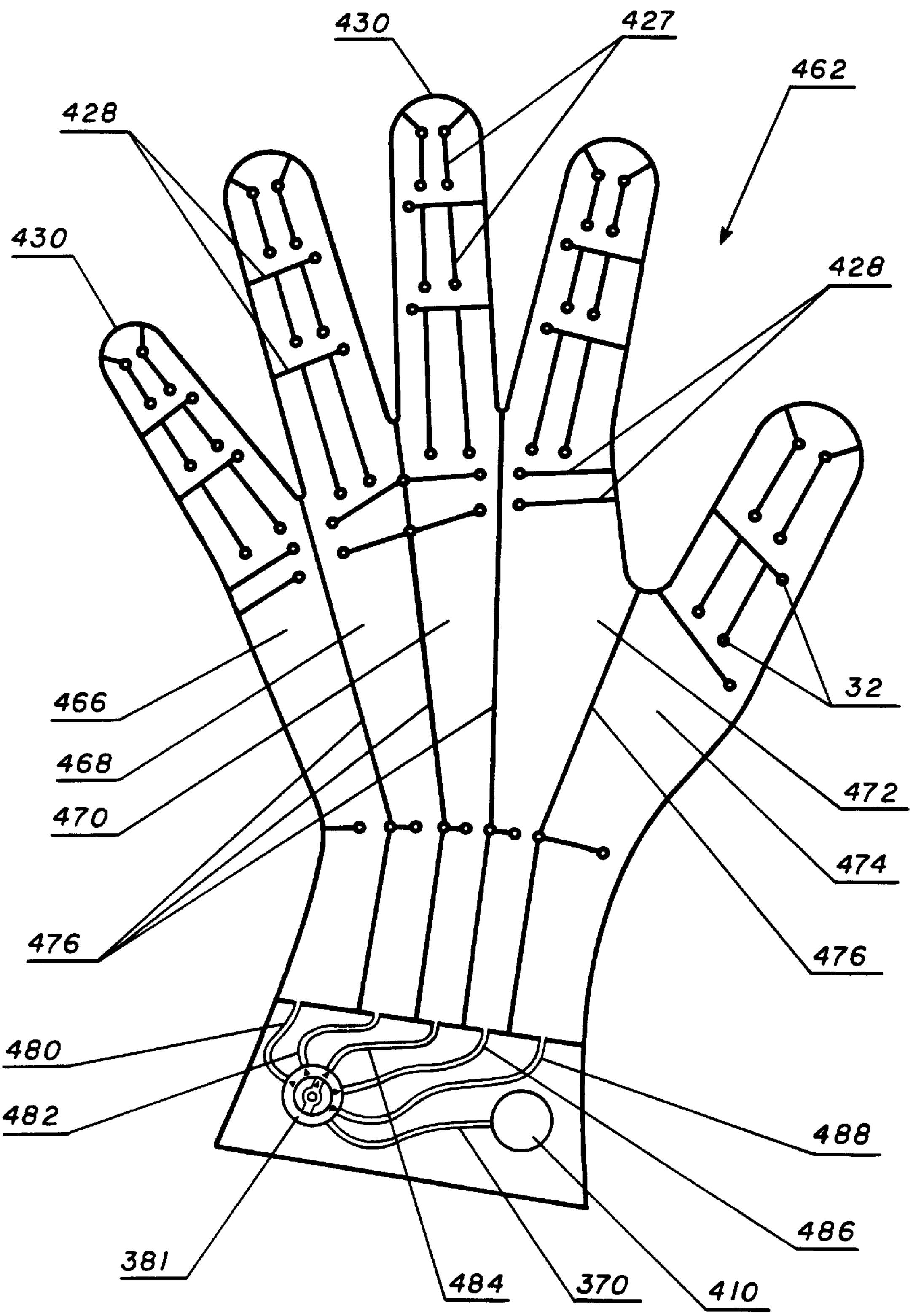
Figure 110:
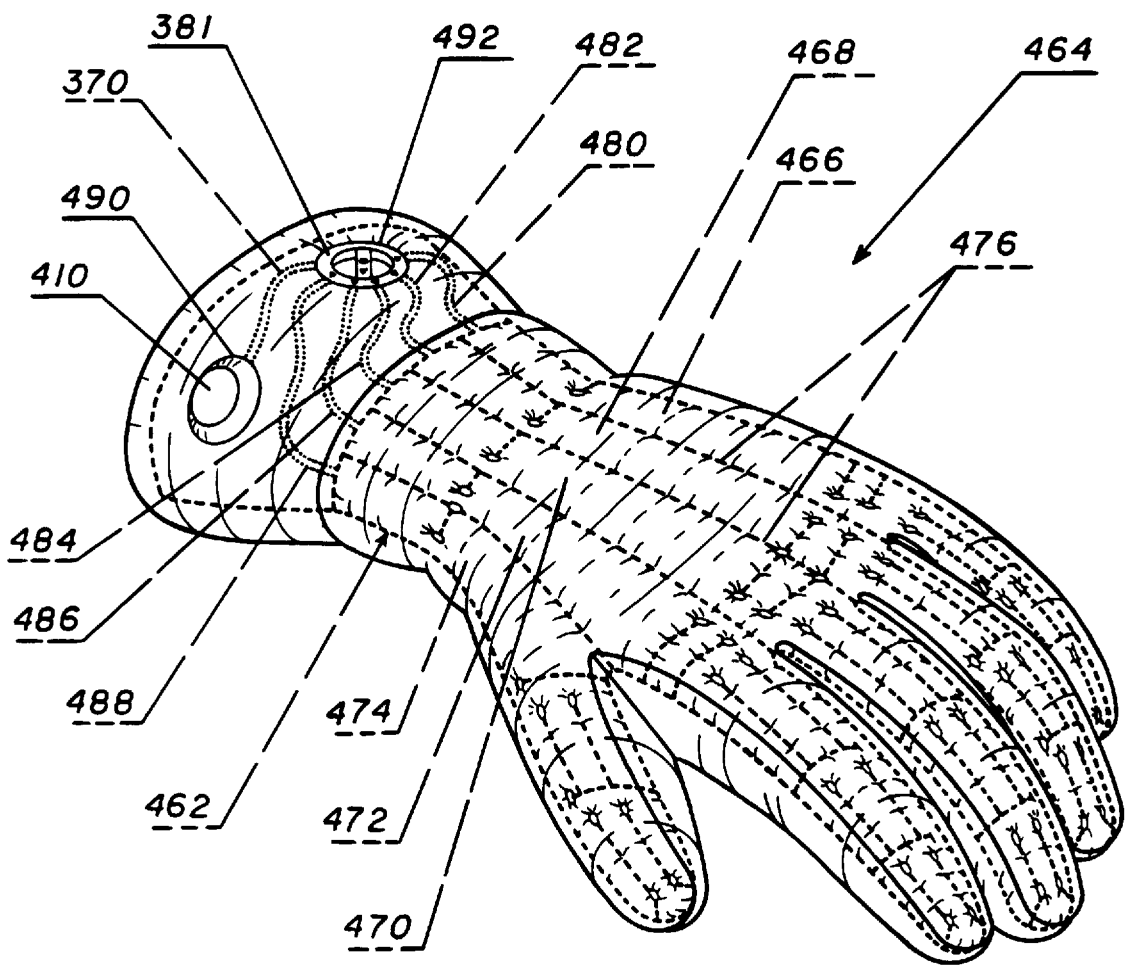

FIGS. 109 and 110 illustrate another application, where the lining 462 is shown in dashed lines, within a glove 464. This lining 462 is divided into five longitudinal interior chambers 466, 468, 470, 472 and 474 by longitudinal seams 476 which extend from the bases of the fingers 430 to the wrist. The chambers are supplied with inflation air by tubing 480, 482, 484, 486 and 488, each of which is connected to the selector valve 381 to direct pressured air from the air pump 410 to its respective chamber. As previously mentioned with reference to FIGS. 96–98, selector valve 381 also includes a pressure relief valve so that the air pressure within each of the chambers can be separately controlled, independently of the pressure in the other chambers. As apparent from FIG. 110, the glove 464 is provided with openings 490 and 492 which receive the air pump 410 and the selector valve 381, thus providing access to these components.

FIGS. 113–118 illustrate the application of the invention to headgear, such as a helmet used in sports such as bicycling, motorcycling, football, baseball, etc., or a boxing headgear.

In the helmet applications, a rigid shell is often used for head protection, and problems in fit and comfort, as well as maximum safety are usually encountered.

Figure 111:
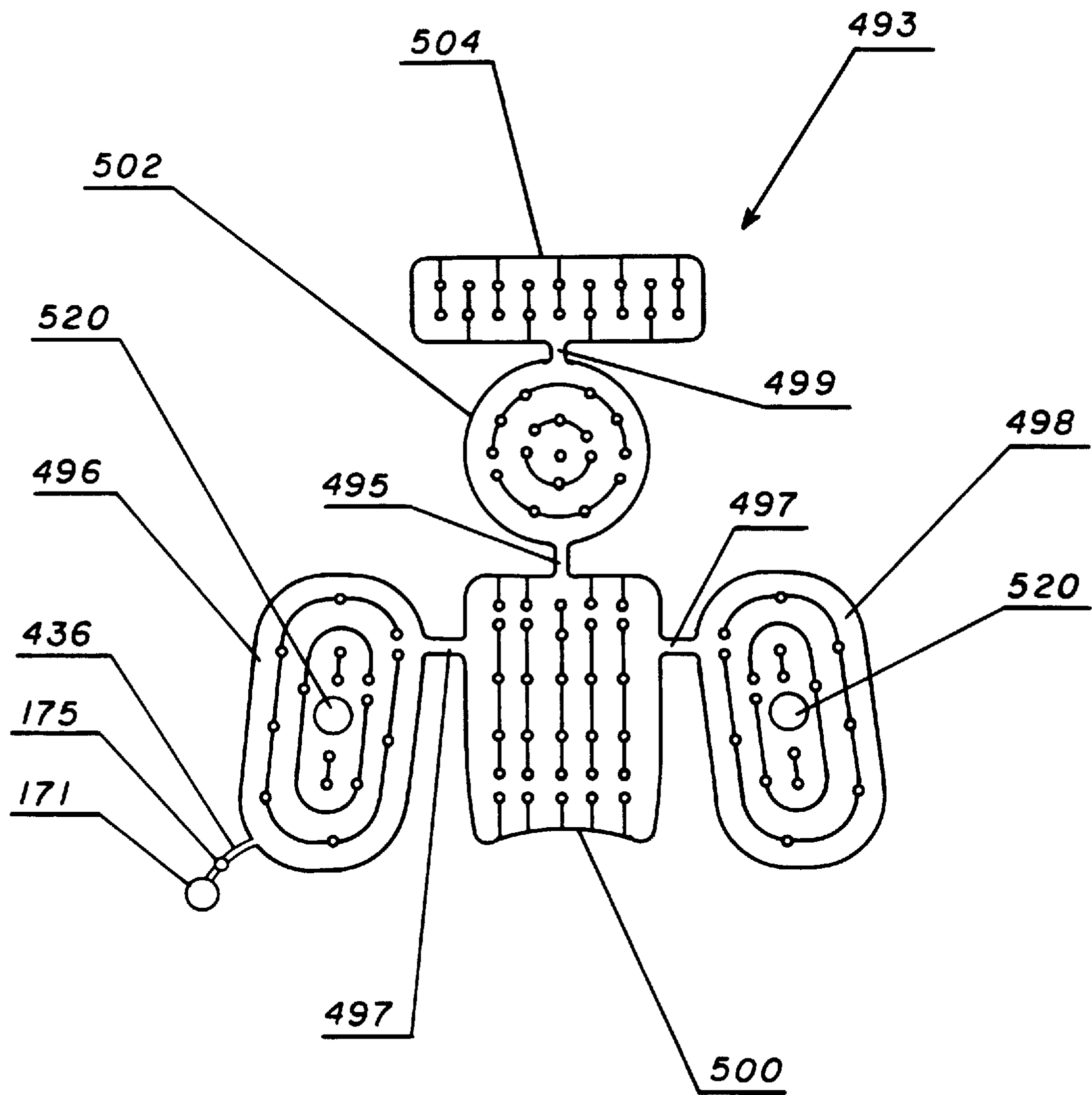

As shown in FIG. 111, a helmet lining 493 can be provided as a plurality of separate and interconnected linings, such as left side lining 496 and right side lining 498, a back lining 500, a top lining 502, and a forehead lining 504. The side linings can have through apertures 520 for the wearer's ears. The linings are all interconnected by air passageways 495, 497 and 499, which are either formed by seams in the two sheets of plastic film from which the linings are fabricated, or by short lengths of flexible tubing. The inflatable linings of the invention can be secured in the helmet by positioning the linings beneath the fabric lining of the helmet, or by using adhesive tape or Velcro tabs.

The linings are inflated with an air pump 171 which has a pressure relief valve 175, all previously described. The air pump 171 and relief valve 175 are connected to the linings with a flexible tubing 436 that discharges to lining 493.

Figure 112:
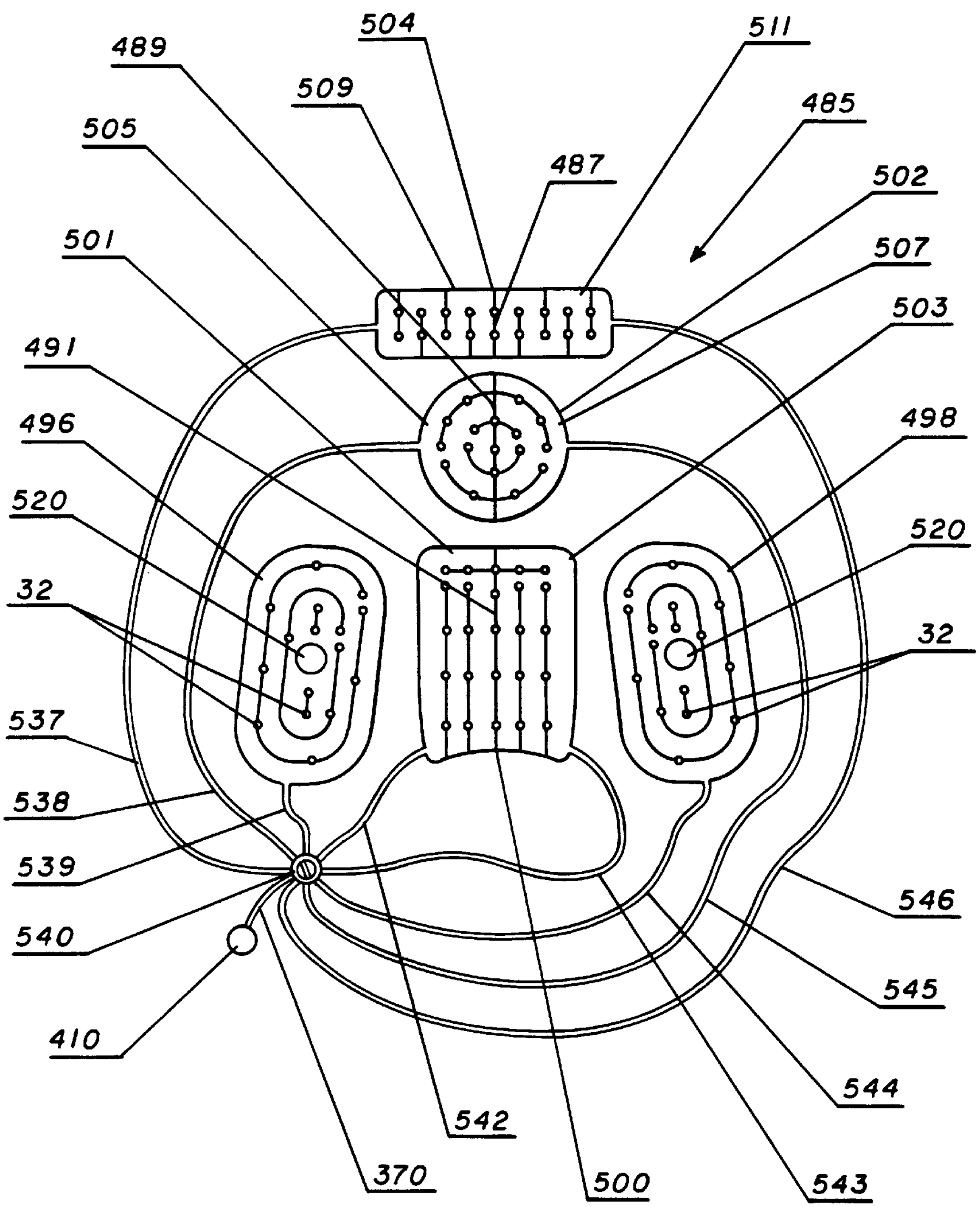

Referring now to FIG. 112, another helmet lining 485 is shown as having separate and multiple-chambered linings. The linings are pressured with an air pump 410 which discharges through tubing 370 to a selector valve 540. The selector valve is essentially the same as selector valve 380, previously described with the exception that it has eight discharge ports, one for each of the separate chambers of the lining 485.

In the application shown in FIG. 112, the side linings 496 and 498 communicate with the selector valve 540 through flexible tubings 539 and 544. The back lining 500 has a continuous seam 491 which divides the lining into a right chamber 503 and a left chamber 501. Each chamber has an independent air passageway to the selector valve through its respective tubing 543 and 542. Similarly, the top lining 502 has a continuous seam 489, which forms chambers 505 and 507, each of which communicates with the selector valve 540 through its respective tubing 538 and 545. The forehead lining 504 is also divided into right and left chambers 511 and 509 by seam 487, and each of these chambers communicates independently with the selector valve 540 through tubings 546 and 537.

Figure 113:
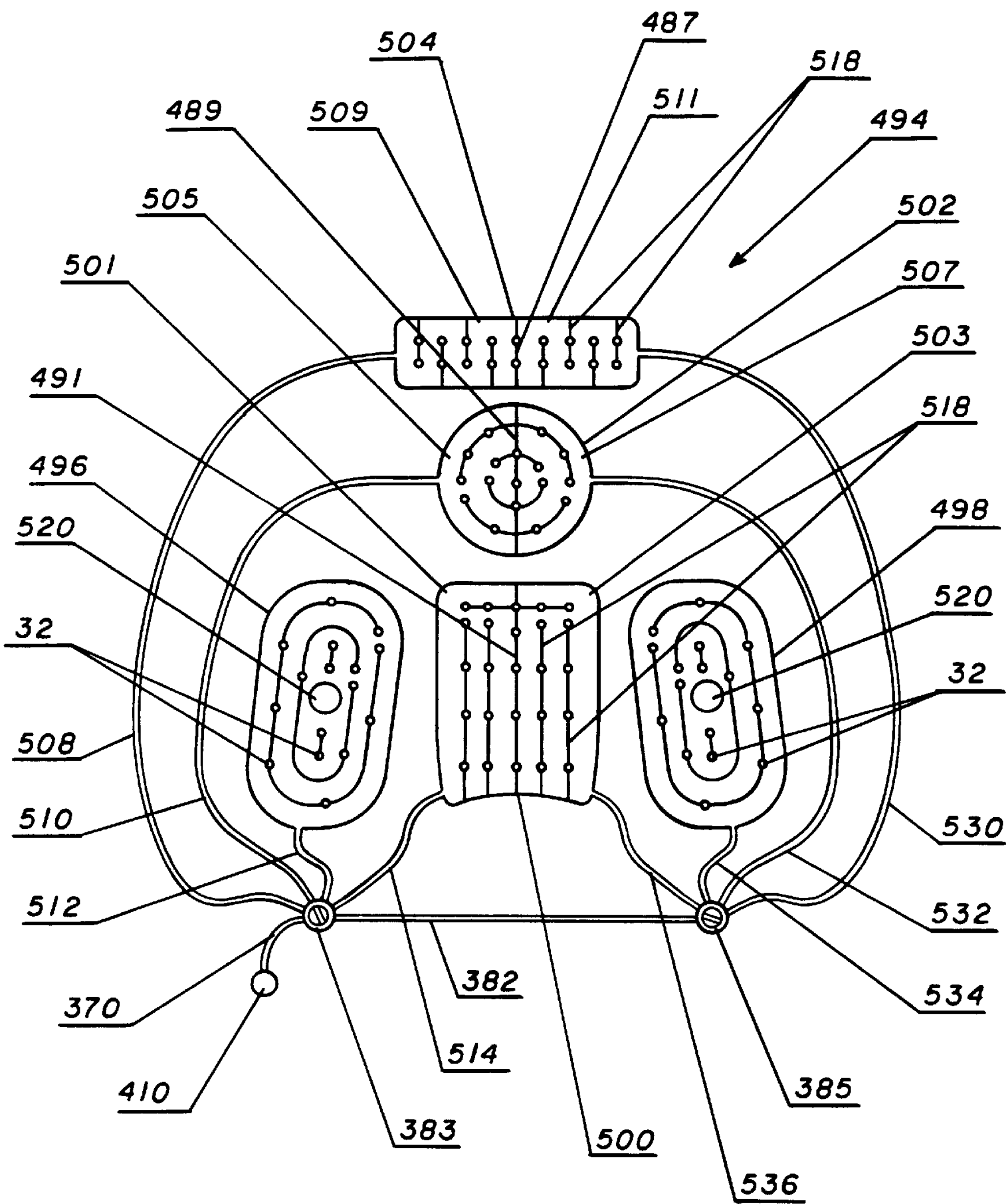

FIG. 113 illustrates a similar lining 494. In this illustration, however, two selector valves are provided with each selector valve being located at one side of the helmet, to provide control over the air chambers on its respective side of the helmet. Thus selector valve 383 is located on the left side of the helmet and controls the access from the pump 410 (and its associated relief valve) to the chambers 496, 501, 505 and 509 on the left side of the helmet through flexible tubes 112, 514, 510 and 508. Selector valve 385 controls access to the chambers 498, 503, 507 and 511 on the right side of the helmet through flexible tubes 534, 536, 532 and 530. As with the linings previously described, the helmet liners preferably have transverse seams such as 518 to provide a controlled and even thickness upon inflation and to provide flexibility to the inflated lining. The side linings 496 and 498 have, of course, through apertures 520 which permit sound transmission to the ears. Preferably the linings have through apertures 32, previously described which permit air to flow through the lining, providing comfort to the wearer.

A typical helmet 522 is shown in FIGS. 114–117. The linings 496–504 of the invention are shown in dashed lines, as they are in the interior of the helmet 522, and beneath an interior fabric lining 531. The linings of the invention are shown in an inflated state with a multiple-tubular cross section, achieved by the plurality of transverse seams, previously described, between the upper and lower sheets of plastic of the linings. The helmet 522 can contain conventional shock absorbing internal layers 524, of an elastic, compressible foam, e.g., a layer of polyurethane. This is particularly applicable for helmets used in potentially high impact applications, e.g., helmets for motorcyclists. Alternatively, the internal layers 524 of foam can be entirely replaced with one or more layers of the inflatable linings of the invention. Each layer can be provided with separate chambers, to provide a maximum capability of fitting the helmet and achieving maximum comfort and protection. The helmet 522 also includes conventional edge banding 552 of soft or compressible foam which surrounds the neck and head openings.

Figure 117:
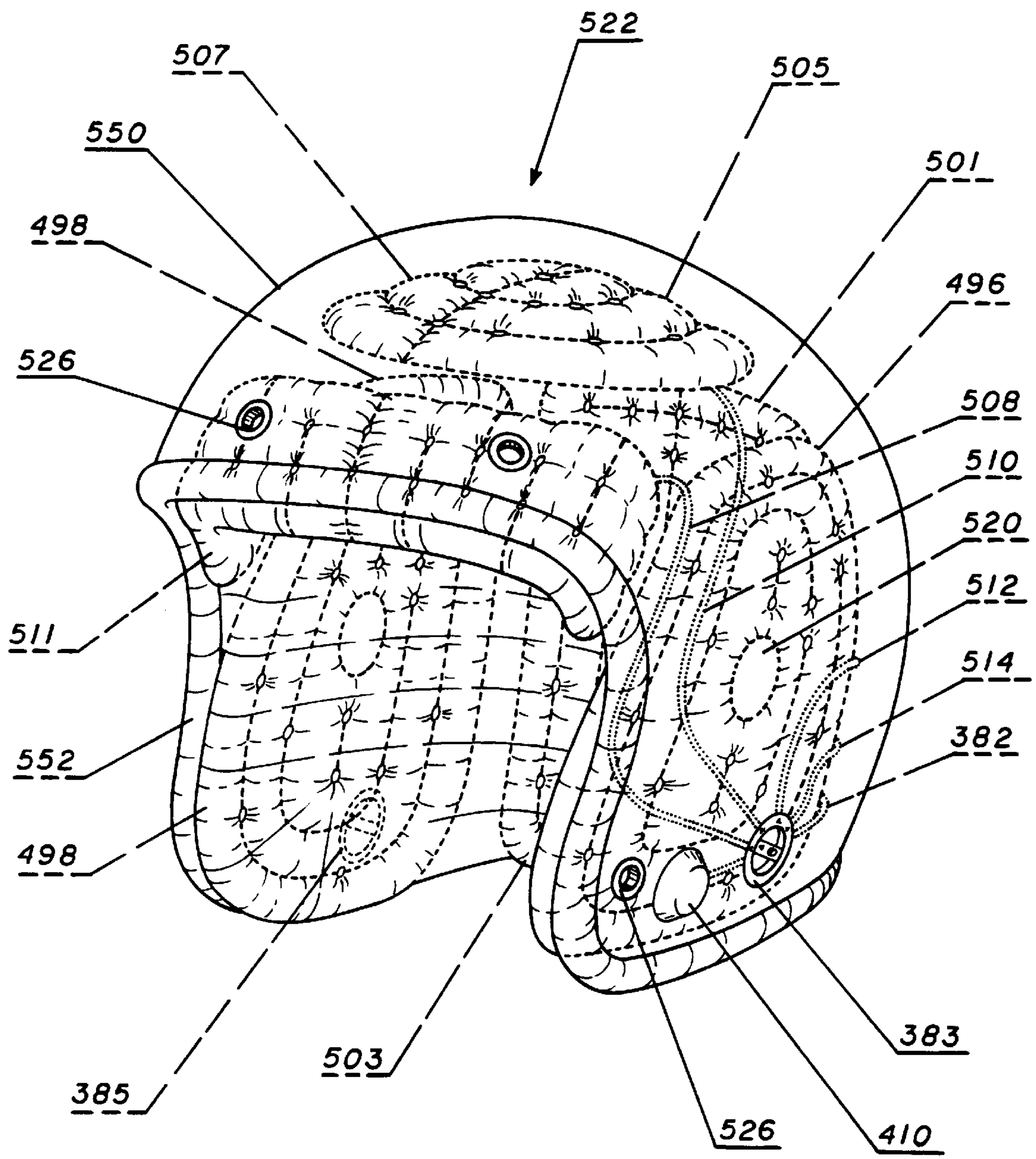

Preferably the air pump 410 is located at one side of the helmet 522, adjacent its lower edge, as shown in FIGS. 114 and 117. Selector valve 383 is located adjacent the air pump 410 and the second selector valve 385 is located on the opposite side of the helmet. While the air pump 410 can project from the exterior surface of the helmet, it is preferred to locate the selector valves flush with the surface.

As shown in FIG. 117, the helmet 522 can be provided with the conventional fastening means, such as apertures 526 which receive fasteners, or snap fasteners, to secure face masks, nose guards, chin guards, face shields, etc. Also, conventional snap fasteners can be used to secure chin straps.

Figure 118:
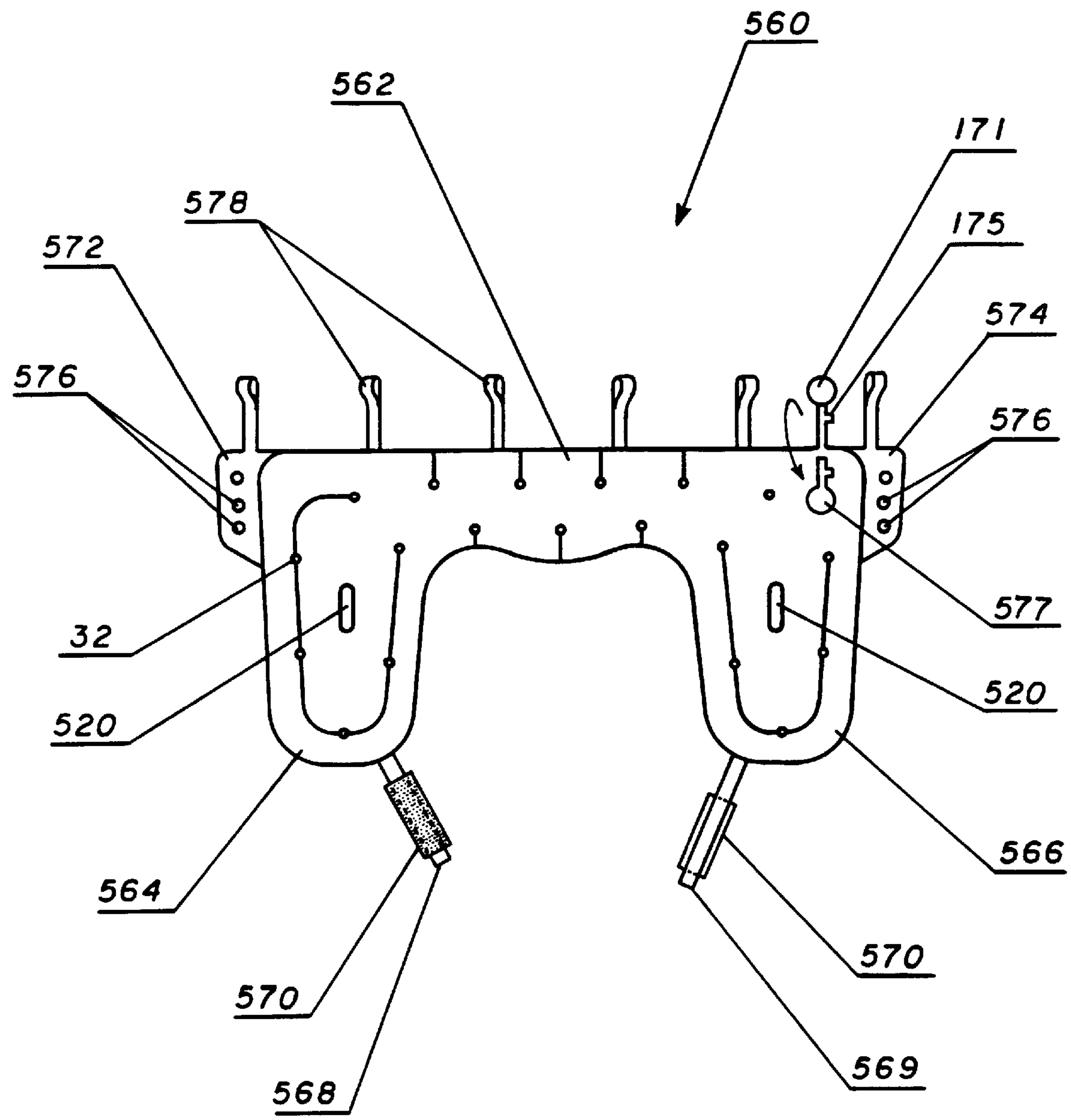
FIG. 118 illustrates the inflatable lining of the invention applied to a boxer's headgear.

FIG. 118 illustrates a lining 560 for a boxer's protective headgear. The lining has a continuous band 562 that wraps about the boxers's head, with downwardly dependent right and left sides 564 and 566 which overlie the boxer's ears. The lower edges of the sides 564 and 566 support conventional chin straps such as 568 and 569 which can have attachment means such as conventional Velcro tabs 570. Apertures 520 in the side linings permit sound transmission to the boxer's ears.

The opposite ends of the band 562 have tabs 572 and 574 which have eyelets 576 for conventional lacing to secure the lining, and a plurality of short bands 578 which are seamed back on themselves to form loops which also receive securing lacing.

The lining is inflatable for protection and snugness in fit, and for this purpose is formed from first and second plastic sheets which are seamed together about their peripheral edges to form a sealed interior and an air pump 171 with a relief valve 175 is provided to pressure the lining. The air pump preferably can be folded into a recess 577 within the lining, and covered with adhesive tape to secure it within the recess. The recess is formed in the lining by a continuous seam which follows the outline of the desired recess (outer shape of the air pump 171). As the seam in the lining will also create a depression on the opposite side of the lining, this depression can be filled with a tab of plastic foam, to provide protection to the boxer.

Preferably the plastic used for the boxer's headgear is transparent, thus permitting sight through the lining, and avoiding any interference with the peripheral or side vision of the wearer. Also, it is preferred to cover the seamed peripheral edges of the headgear with tape to avoid any possibility of cuts from the edges of the plastic lining. The head gear formed of the inflatable lining of this invention thus achieves comfort and safety by providing shock-absorbency, permanent resiliency, and adjustable fitting, while avoiding any hinderance of vision of the wearer.

Figure 119:
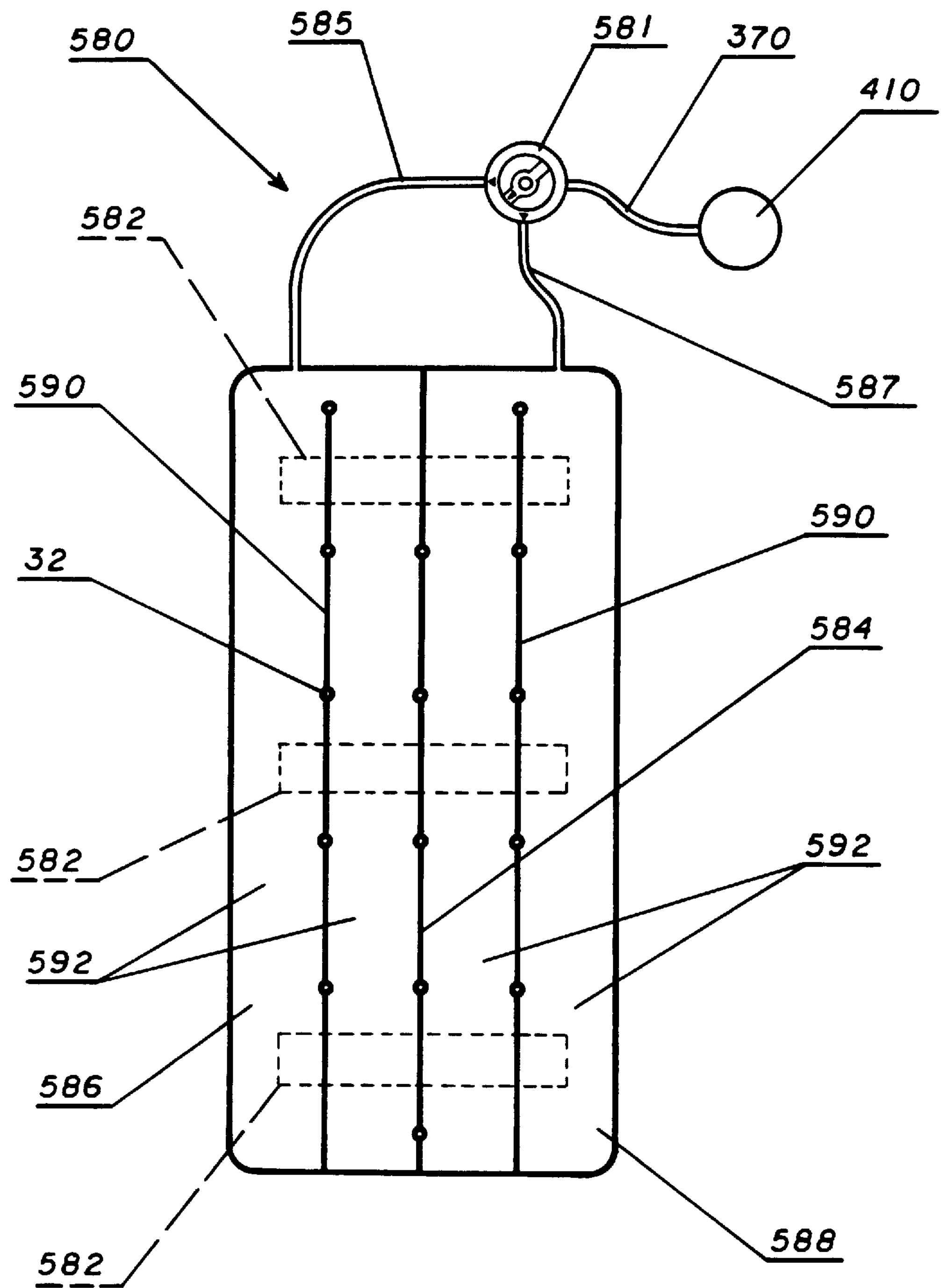
FIG. 119 illustrates the inflatable lining of the invention applied to a protective shield.

FIG. 119 illustrates a lining 580 for a protective shield or splint. In this application, the lining 580 has the shape to conform to the selected interior surface of the shield or splint which is to be lined, e.g., a rectangular area, as shown. The lining can have a single chamber, or can be subdivided, as desired with a continuous seam such as 584 into a plurality of chambers such as 586 and 588. Flexibility and fit of the lining is achieved by the seams, either or both of the continuous seam 584 and discontinuous seams 590. The lining is secured to the protective shield or splint with bands 582 of Velcro, or adhesive. The air pump 410, selector valve 581, and flexible tubing 585 and 587 permit the user to control the pressure in either chamber 586 or 588 as desired for fit, comfort or the desired immobilization of the wearer's limb, such as a leg, forearm, wrist, etc. As with all the linings described herein, comfort and breathability through the lining is achieved with a plurality of through apertures 32.

Figure 120:
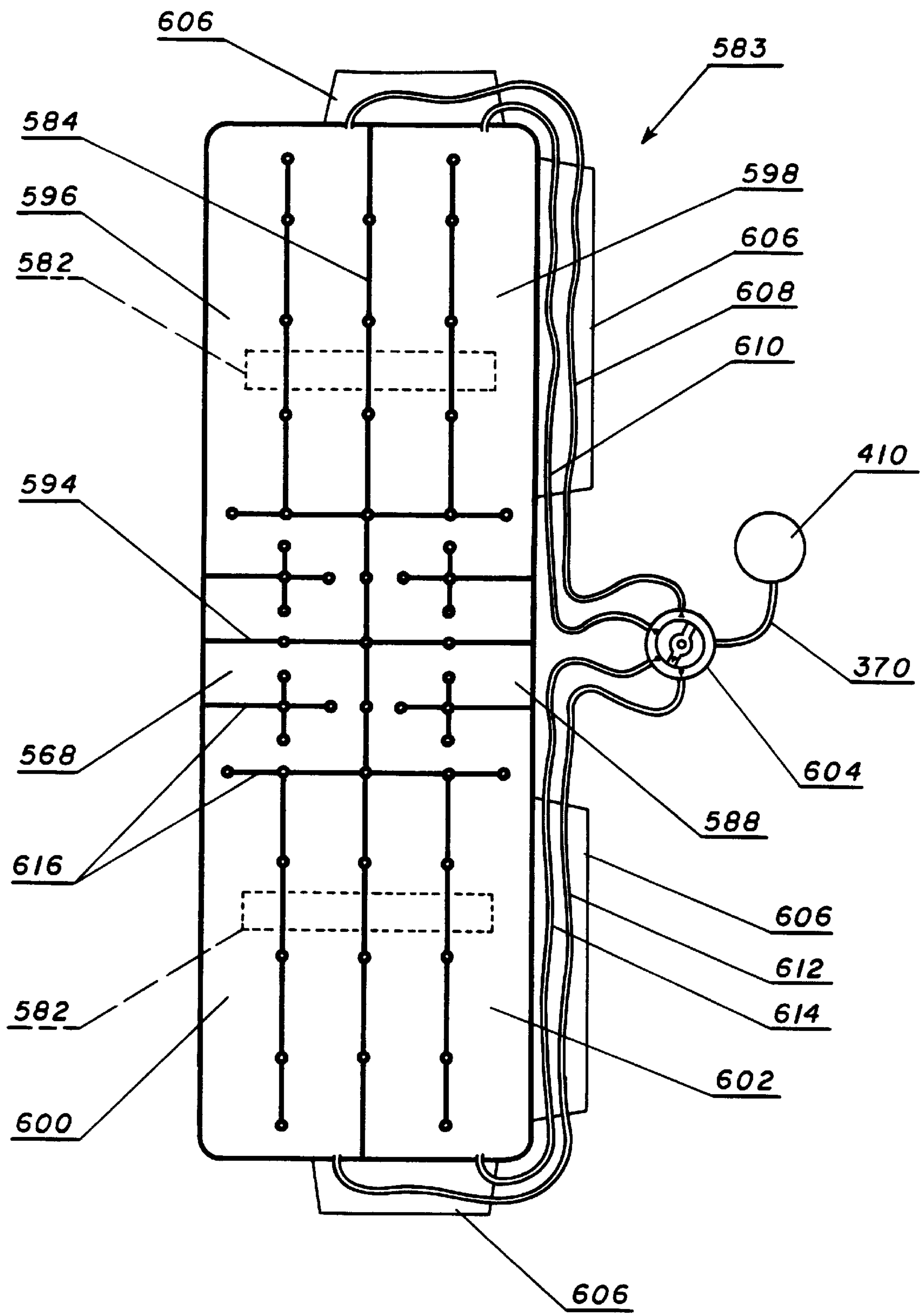
FIG. 120 is a plan view of an inflatable protective shield, particularly for the shoulder, similar to the inflatable liner shown in FIG. 119.

FIG. 120 shows, in plan view, an inflatable protective shield liner 583, particularly for the shoulder, which is similar to the inflatable liner 580 already described on FIG. 119. There are four separate and inflatable interior chambers 596, 598, 600, and 602, each of which can be supplied with pressured air, through their respective air tubes 608, 610, 612, and 614, from the hand pump 410 by the selector valve 604. The use of separate chambers in this application prevents movement of the air between chambers in the event of an impact, thus providing maximum impact resistance. The shield liner 583 also has a transverse continuous seam 594 and a plurality of discontinuous transverse seams 616, which permit it to be folded or bent transverse to its major length to follow the contour or shape of the shield, particularly when used with a shoulder shield. The other elements of the shield are substantially the same as already described with reference to the lining 580 of FIG. 119 and are identified with common numbers. If desired, the lining can be provided with tabs, such as 606 at opposite ends and along one side to which the air tubes can be attached, e.g., by bonding.

Figure 121:
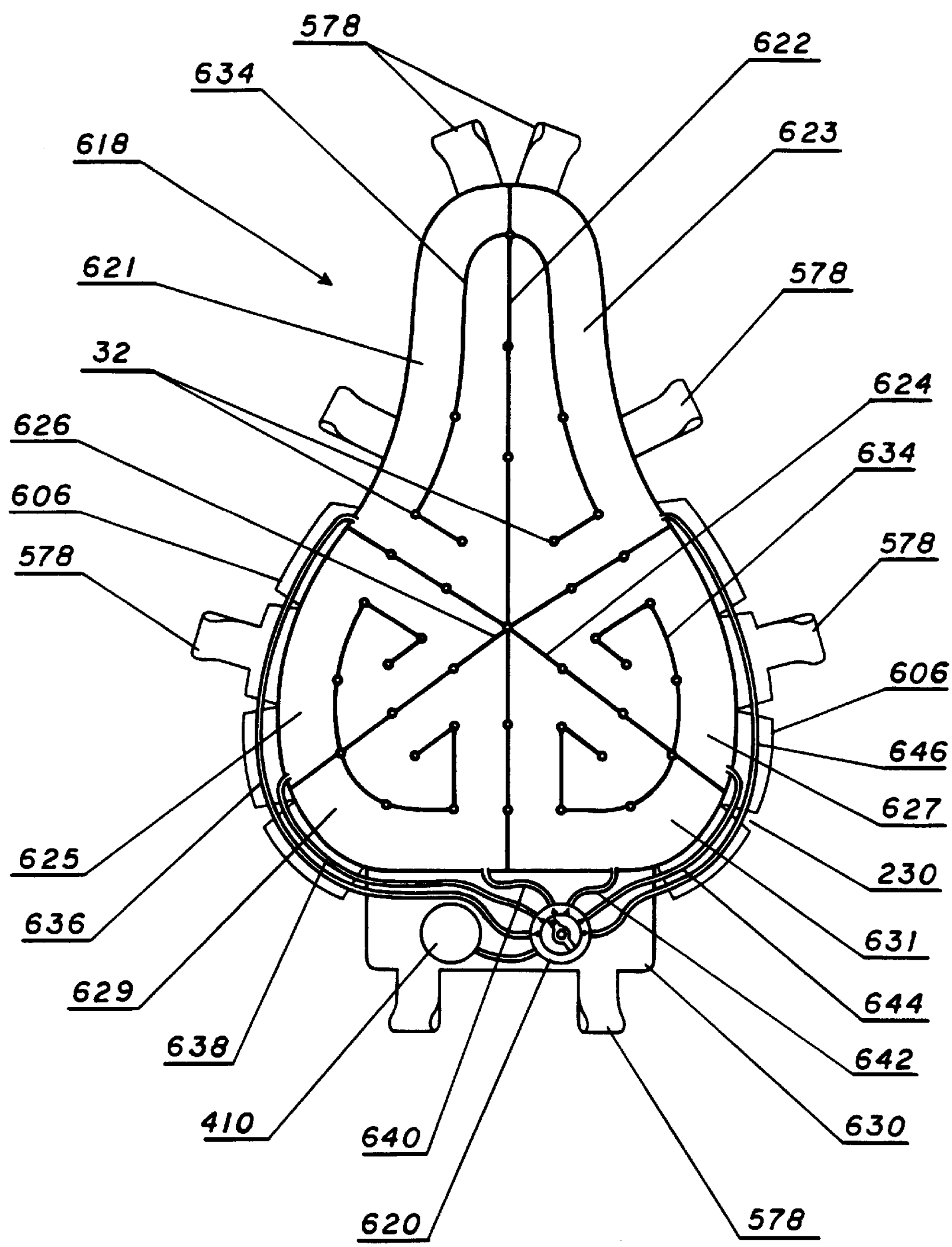
FIG. 121 is a plan view of an inflatable seat liner for a bicycle.

FIG. 121 is a plan view of an inflatable seat liner 618 which is particularly intended for use on a bicycle seat, or other similar portable seats for sports events, etc. There are three continuous seams 622, 624, and 626 which subdivide the lining interior into six chambers 621, 623, 625, 627, 629 and 631. Each chamber is connected to air pump 410 through selector valve 620 and flexible tubes 636, 638, 640, 642, 644, and 646. There are also discontinuous seams 634 to limit the thickness of the seat liner and conform it closely to the shape of the bicycle seat. The use of separate chambers in this application prevents movement of the air between chambers, thus providing stability and comfort to the seat. Also there is a rear flap 630 on which pump 410 and selector valve 620 can be supported, either being attached thereto by Velcro or permanently glued. The ends of the flexible tubes such as 642 also can be taped or otherwise secured to the flap 630, and the tubes can be supported on side tabs 606. The lining can also be provided with a plurality of short bands 578 which are seamed back on themselves to form loops which also receive securing lacing for attachment of the lining to a seat. Provision is made for forced air circulation by vent apertures 32 along the various seams. Air which is forced along the channels which are formed along the top and bottom surfaces of the seat cushion by seams 622, 624 and 626, 634 as the bicycle moves, and the air will flow through the channels and through these apertures 32.

FIGS. 122 to 124 illustrate an alternative pump which can be used for the seat liner of FIG. 121. This pump is similar to the air pump 170 which is described in FIGS. 23 to 25. The pump has a flexible bulb 652 and check valves such as 654 and 178, and a pressure relief valve 339 which has a stem to permit the user to deflate the air chambers. The base of the air pump 656 has a strip 191 of Velcro to attach the air pump to flap 630 (see FIG. 121). The relief valve 339 can also serve as a connector for attachment of an air hose from an alternative air supply, e.g., an air compressor, or an extraneous air pump, to inflate the lining. Another inflation means which can be used is a cartridge of compressed gas, e.g., a conventional carbon dioxide cartridge.

Figure 125:
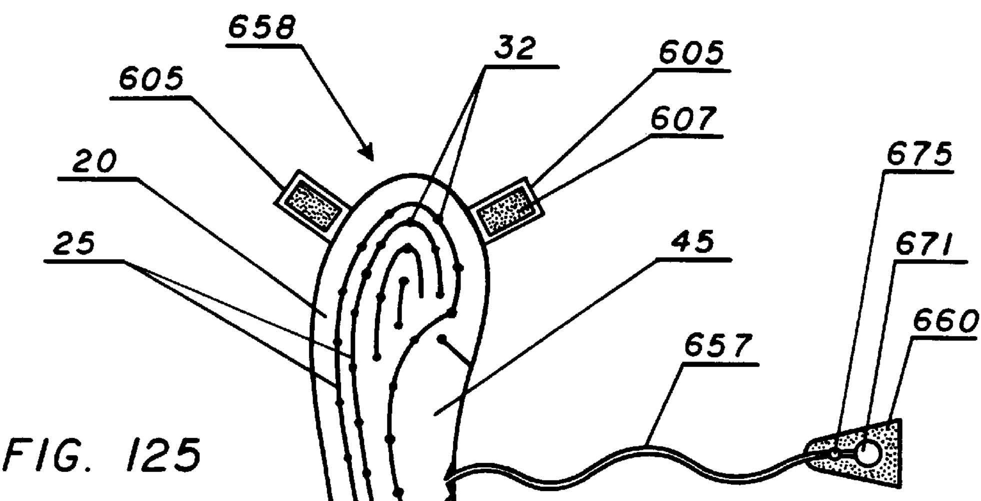
FIGS. 125 to 126 are plan views of an alternative inflatable liner to that described in FIG. 30.
Figure 126:
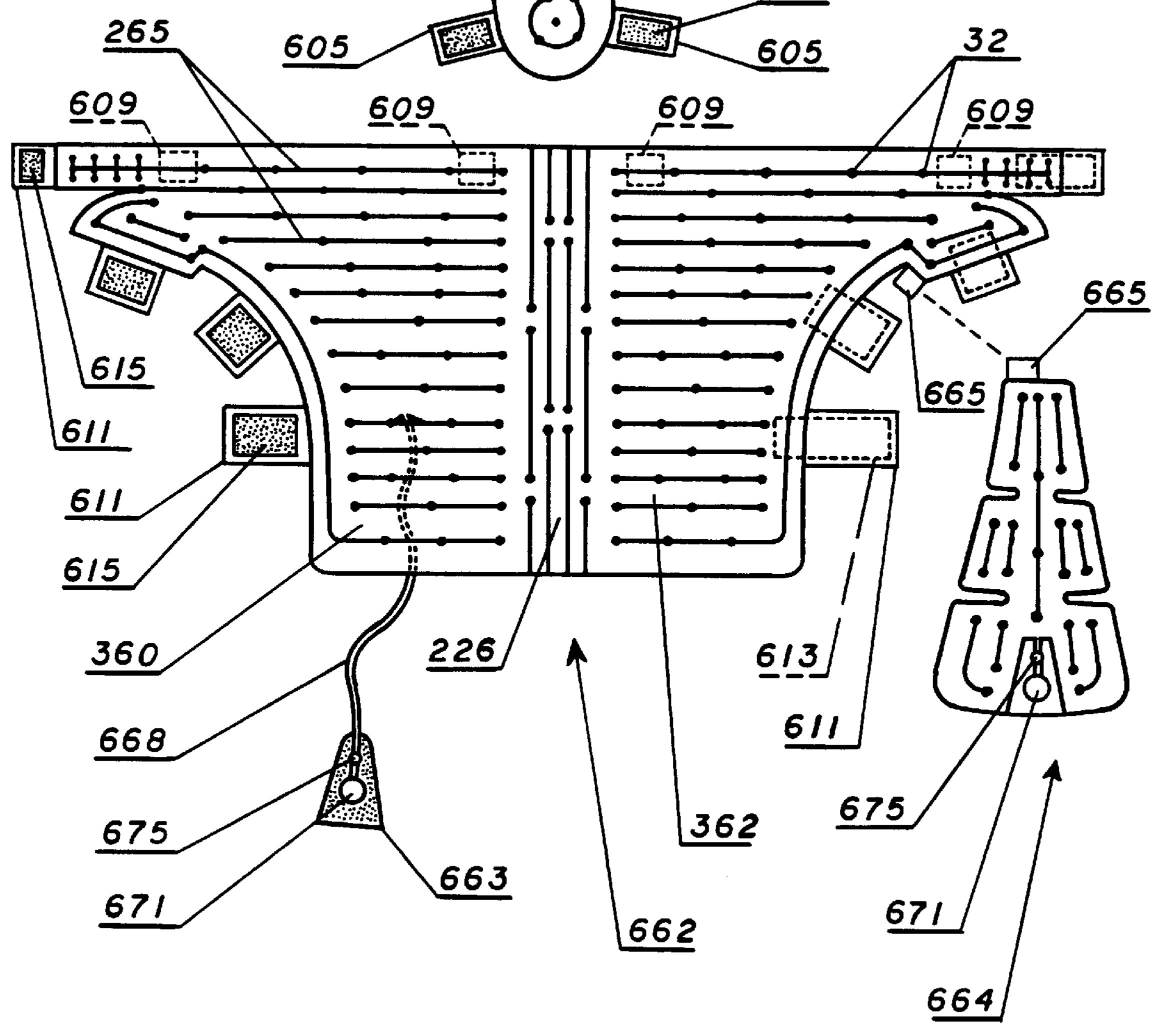

FIGS. 125 and 126 are plan views of separate and alternative inflatable liners which are alternative to the liner described in FIG. 30. The assembled liner 659 (see FIG. 127) includes a separate inflatable inner sole 658 (also shown in FIG. 125) which is connected with flexible tube 657 to an air pump 671 and a relief valve 675 which are supported on a Velcro base 660. The inner sole 658 can be produced of thicker polyurethane film than used for the upper liner 662, shown in FIG. 126. The upper liner 662 is connected by flexible tube 668 with a separate air pump 671 and control valve 675 which are supported on a Velcro covered base 663. The upper liner 662 can be used in combination with an inflatable tongue 664 which can support an air pump 671 and a relief valve 675 for inflating and controlling the internal pressure of the tongue 664. The tongue 664 can be incorporated in open communication with upper liner or can be sewed or glued to the upper liner as a separate chamber with tabs 665. The upper lining 662 also has lateral side 360 and medial side 362 and heel portion 226, which are all inflatable. The inflatable inner sole 658 has discontinuous seams 25 which form an arch pillow 45, and a larger diameter peripheral passageway 20, for foot support.

The inner sole 658 also has four tabs 605 which support Velcro bands 607 which are secured to coating Velcro bands 609 that lie along the base of the upper liner 662. The upper liner 662 also has tabs 611 which lie on opposite sides of the lining and which support coacting Velcro bands 613 and 615.

Figure 127:
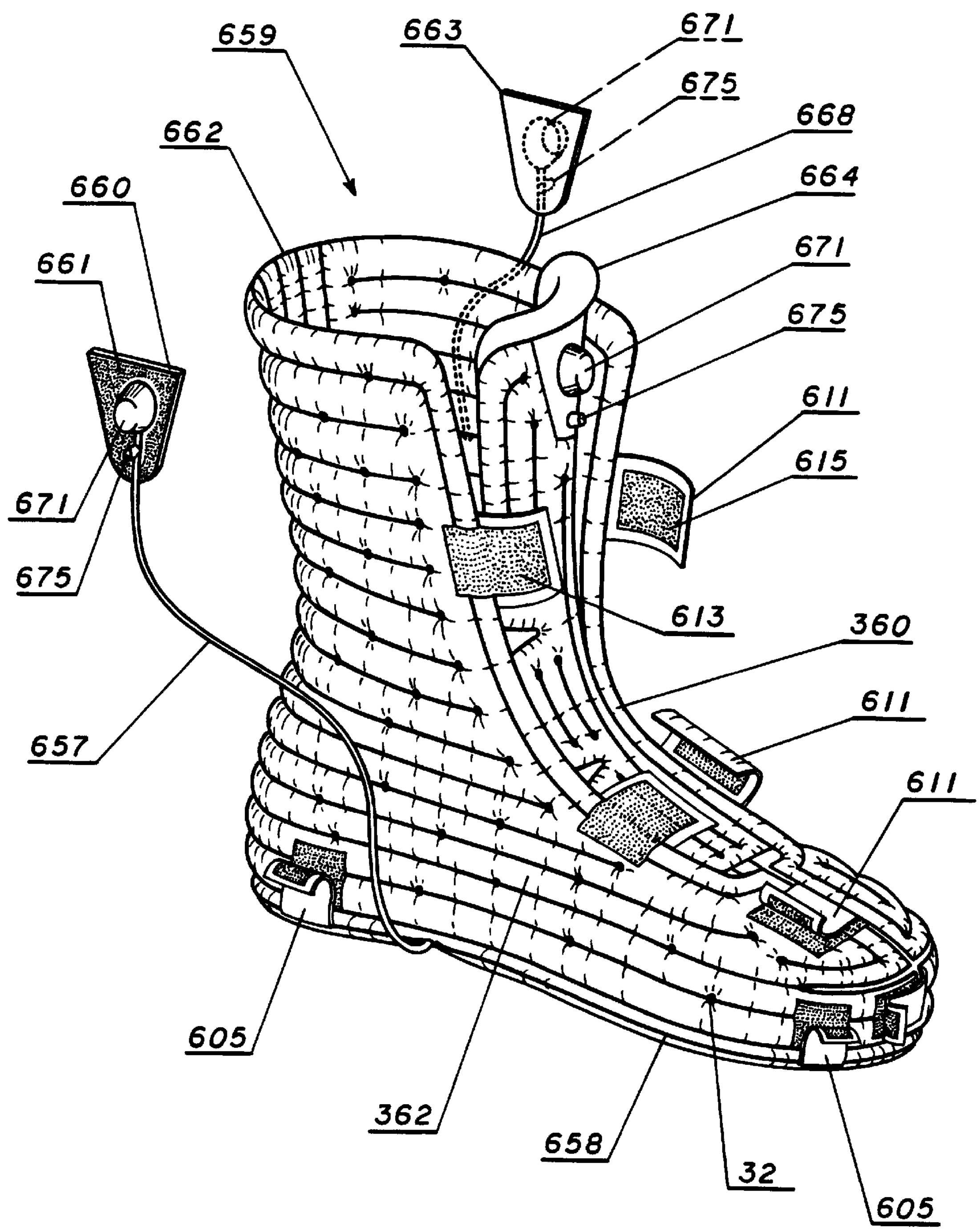
FIG. 127 is a perspective view of the inflatable liner described in FIGS. 125 and 126.

FIG. 127 is a perspective view of the assembly 659 of the inflatable liners 658 and 662 described in FIGS. 125 and 126 with the Velcro covered tabs securing the assembly.

Figure 128:
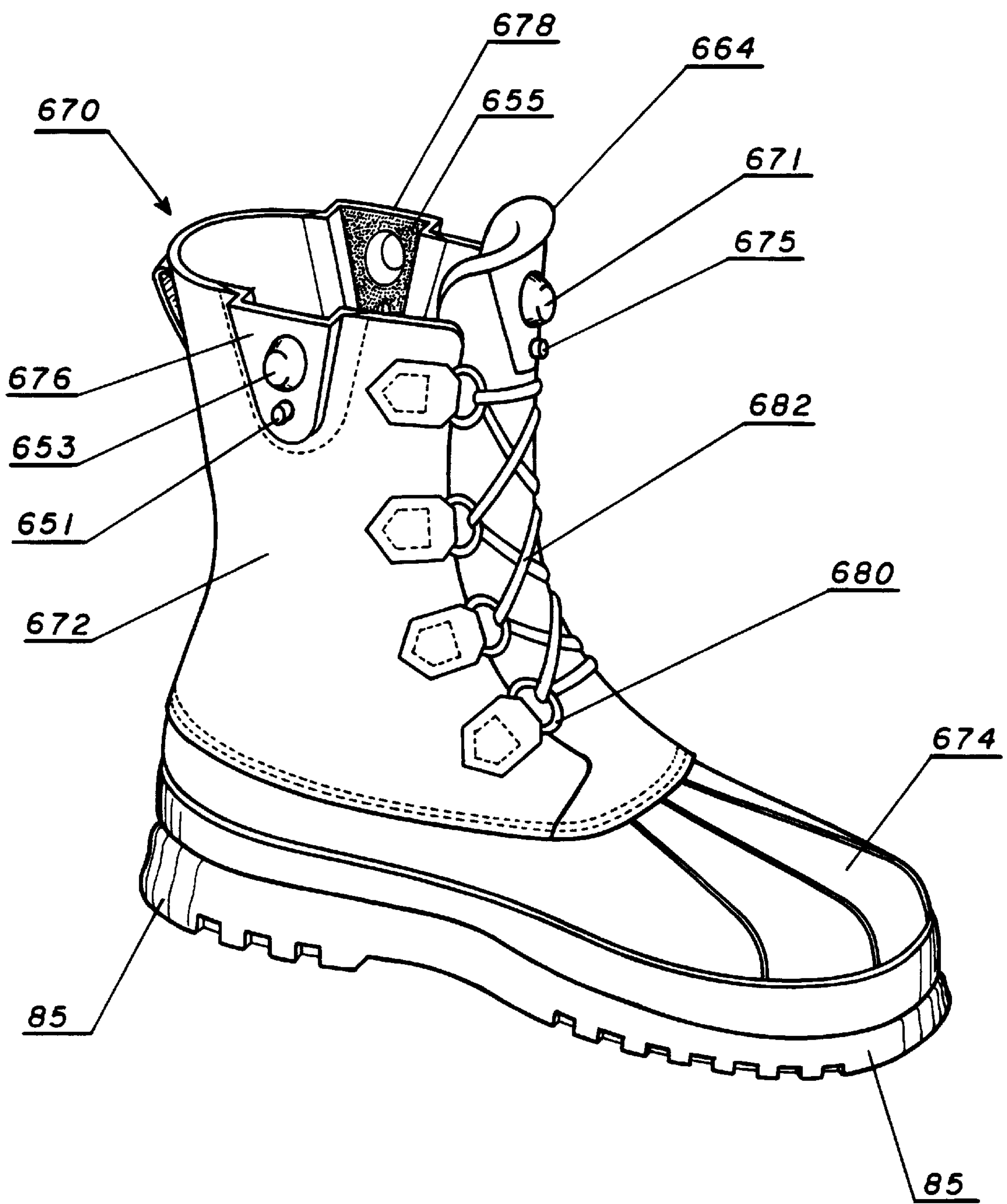
FIG. 128 is a perspective view of an outer shoe adapted to receive the liner illustrated in FIG. 127.

FIG. 128 is a perspective view of an outer shoe 670 suitable for use with the liner assembly 659 illustrated in FIG. 127. This shoe 670 has a conventional sole 85, an upper leather part 672 and a lower rubber part 674 which are well known. The shoe has "D" type rings 680 for laces 682. Tongue 664 can be permanently attached to the outer shoe 670, or as previously mentioned can be attached to the upper lining 662. The conventional upper part 672 which can be made of leather, rubber or other leather substitutes, is provided with two pockets, 676 and 678 with a Velcro tab 655 on the inside wall of each pocket which coacts with the Velcro 661 on the base 660 and 663 (see FIG. 127) to support air pump 671 and relief valve 675. The pockets 676 and 678 have preformed flexible bulbs 653 and 651 to accept the air pump 671 and relief valve 675.

Figure 129:
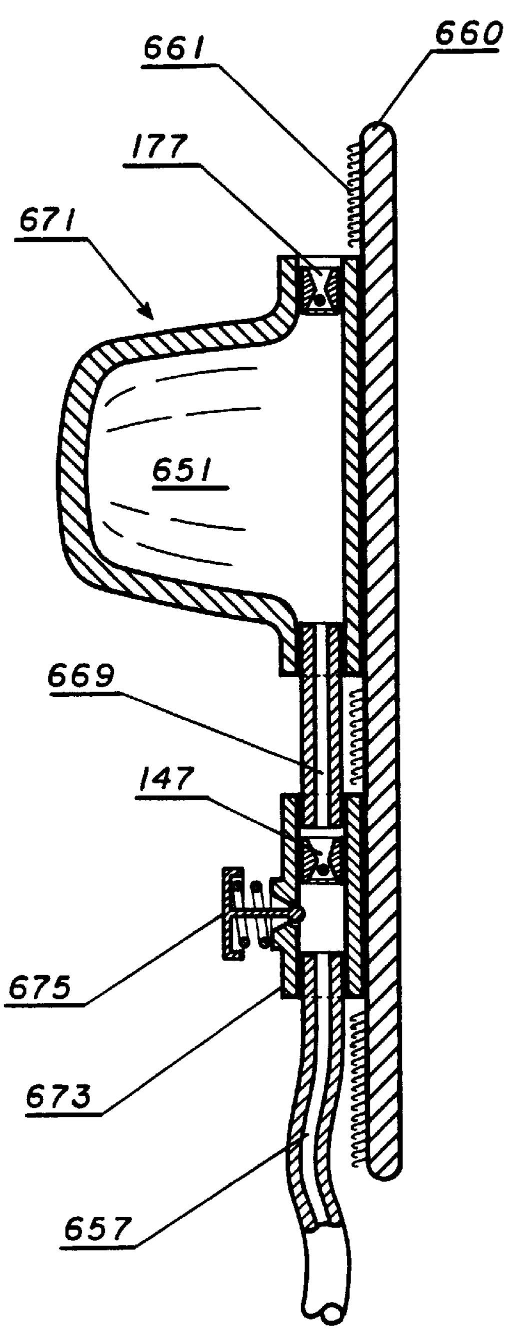
FIG. 129 is a sectional view of a hand pump for use with the lining of FIGS. 125 to 128.

FIG. 129 is a sectional view of a hand air pump 671 for use with the lining of FIGS. 125 to 128 and FIG. 130 is a perspective view of the air pump 671. This pump 671 is similar to air pump 171 already described in FIG. 67. It has a flexible bulb 651 and check valves 147 and 177, all as previously described in FIG. 67. The air pump is connected by tube 669 to the housing 673 of a relief valve with a valve operator 675 which is spring biased into a closed position, and the entire assembly is secured to a base 660 covered with Velcro 661.

Figure 131:
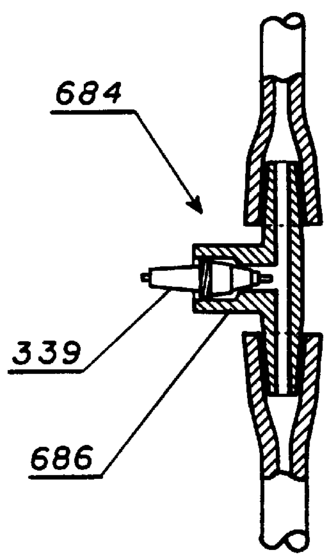
FIG. 131 is a sectional view of an alternative relief valve.
Figure 130:
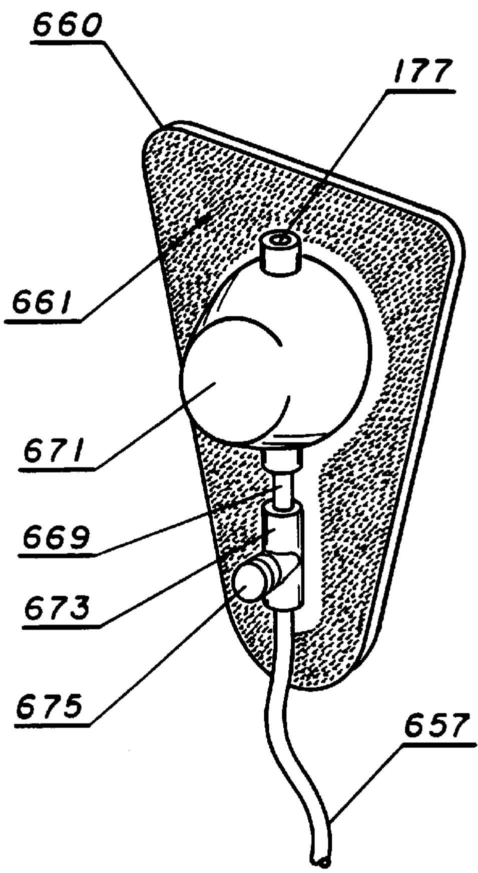
FIG. 130 is a perspective view of the pump shown in FIG. 129.

FIG. 131 is a sectional view of an alternative relief valve assembly 684 comprising a tee 686 and a relief valve 339 for use with the pump shown in FIGS. 122, 129, 147 and 149. The relief valve 339, which is described in detail with reference to FIG. 76 permits attachment of a flexible tube, permitting the inflatable liner to be inflated by hand pump or other inflation devices such as an air compressor, extraneous air pump or a compressed air cartridge such as a conventional $CO_2$ cartridge.

FIGS. 132 to 134 are views of an adjustable pressure control valve 558 which is closely similar to that previously described in FIGS. 10 11 and 12. This valve 558 is useful, particularly with the heel pump inner sole shown in FIG. 69 in which a flexible tube 70 is the discharge tube from the heel air pump 73 (see FIG. 69), and the flexible tube 64 extends to the heel chamber 163 which surrounds the heel air pump. In the valve 558, the lateral passage 694 is of smaller diameter than longitudinal passage 92 so that when there is a sudden surge of air pressure from tube 70 (as when the wearer jumps or suddenly impacts on a heel air chamber or heel air pump) the air will go through tube 64 to a forward air chamber 163 of an inner sole (see FIG. 69), rather than through the lateral passage 694 which communicates through discharge passageway 108 and tube 76 to the next succeeding chamber, and then will expel the air from the internal chambers of the inner sole. This will insure that most of the air will remain within the inner sole upon impact and will only gradually leave through lateral passage 694 and the relief valve 98. This provides additional shock absorbency to the inner sole.

Figures 135, 136:
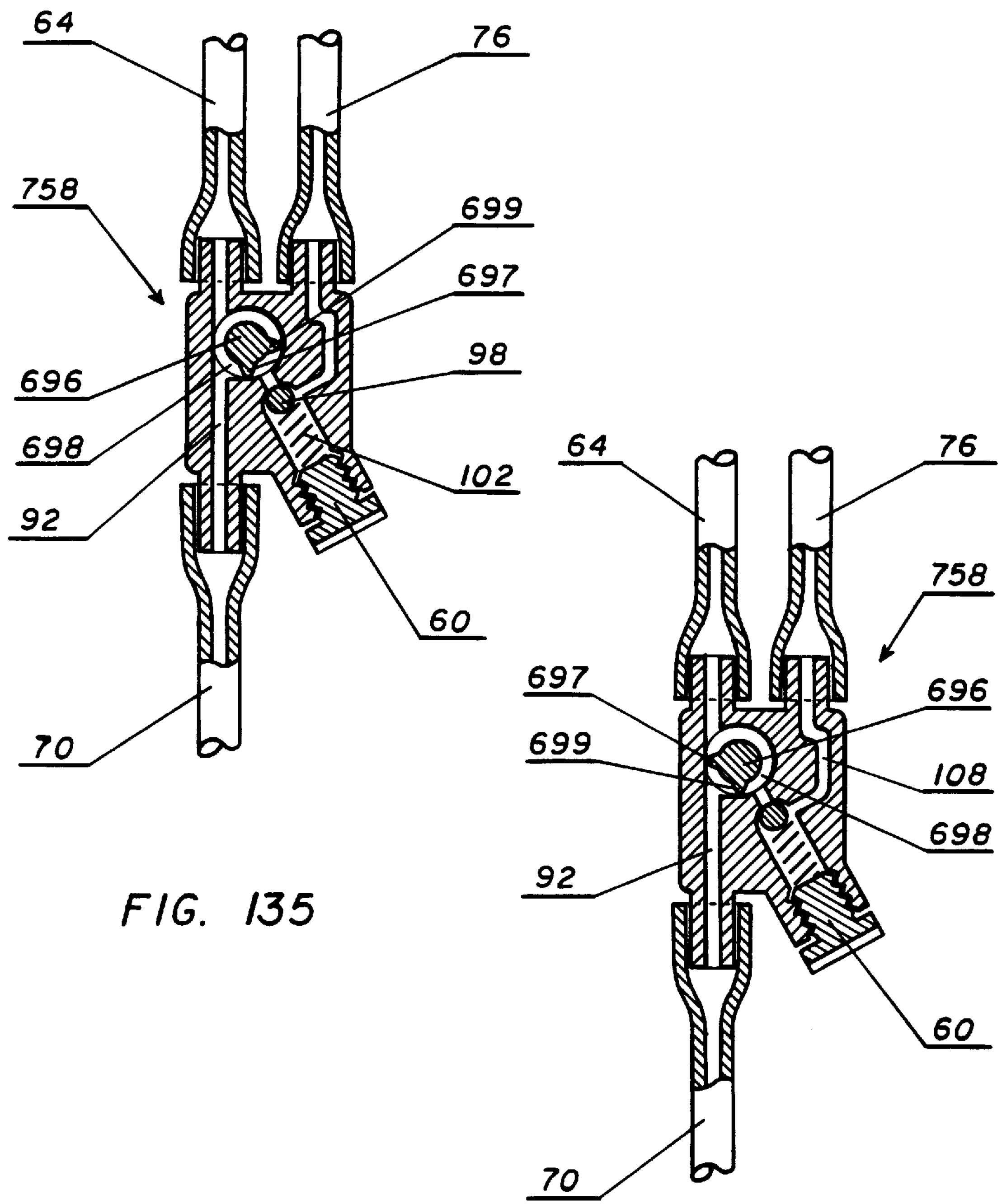

FIGS. 135–139 are views of an alternative pressure control valve 758. This valve has a cylindrical chamber 698 which communicates with the through passageway 92 and discharge passageway 108. A circular valve member 696 having wiper blades 699 and 697 is received in the cylindrical valve chamber 698. The valve member 696 extends externally (see FIG. 139) to permit the user to select between a position directing all air pressure from tube 70 through relief valve 98 to the discharge passageway 108, as shown in FIG. 137. This seals the heel chamber 163 at the desired inflation pressure. In the position shown in FIG. 135, the valve member 696 directs all the air pressure from tube 70 to tube 64. In the position shown in FIG. 136, the valve member 696 closes and blocks all air flow from tube 70 so that the heel air pump then functions as a sealed air chamber, adding shock absorbency to the inner sole. The valve thus selects between a position sealing the heel air pump from the chambers of the inner sole (FIG. 136); a position in which the air pressure supplied to the next succeeding chamber of the inner sole through tube 76 is at the preset pressure selected by the adjustable resilient member of the valve (FIG. 137); and a position in which air freely communicates between the heel air pump and a forward chamber of the inner sole (FIG. 135). Also by setting the valve between the illustrated positions, it will also function as a throttling valve, controlling the rate of air flow.

Figure 140:
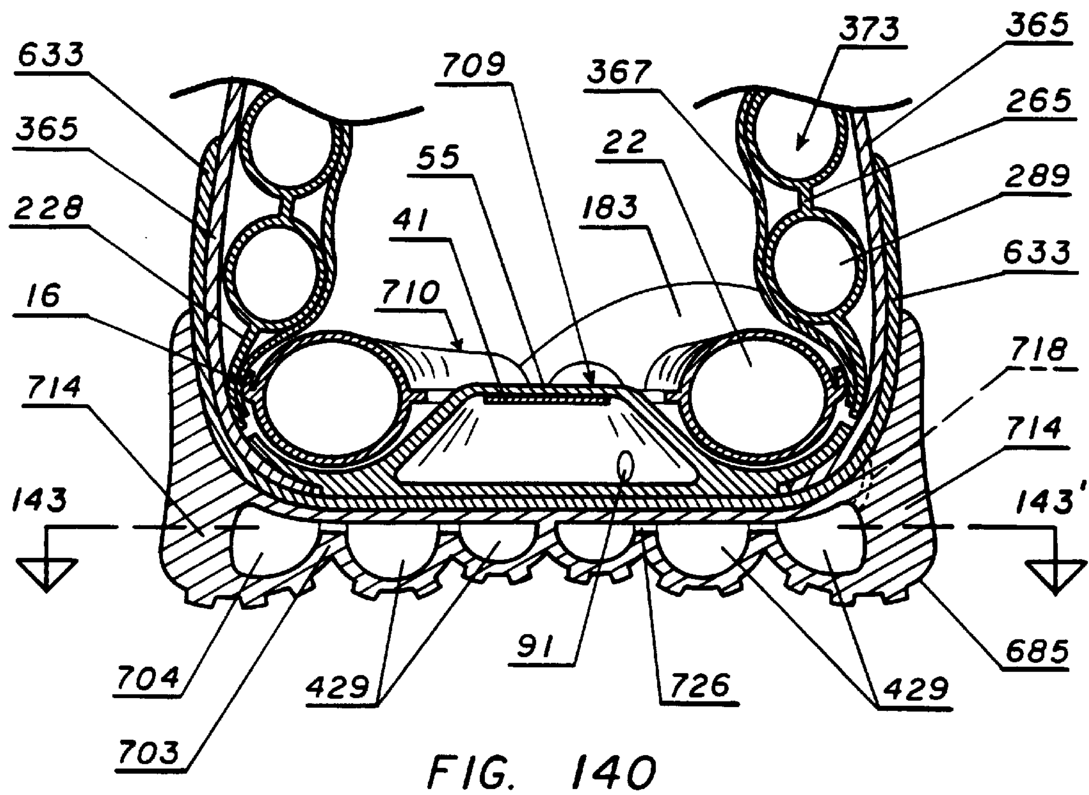
FIG. 140 is an elevational sectional view along line 140–140' of FIG. 142 and 143.
Figure 142:
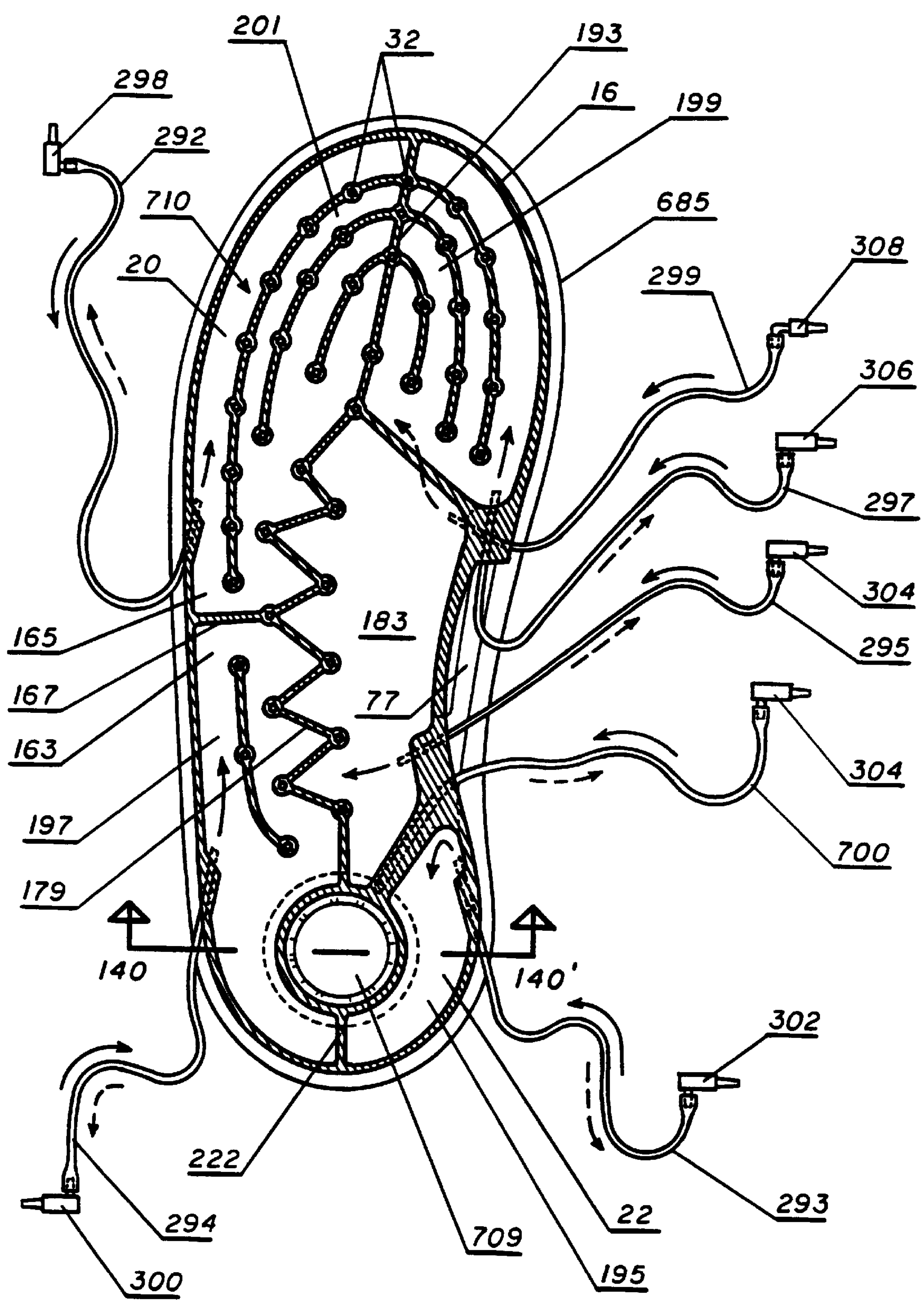
FIG. 142 is a plan view of an alternative inflatable sole similar to that shown in FIG. 73.
Figure 143:
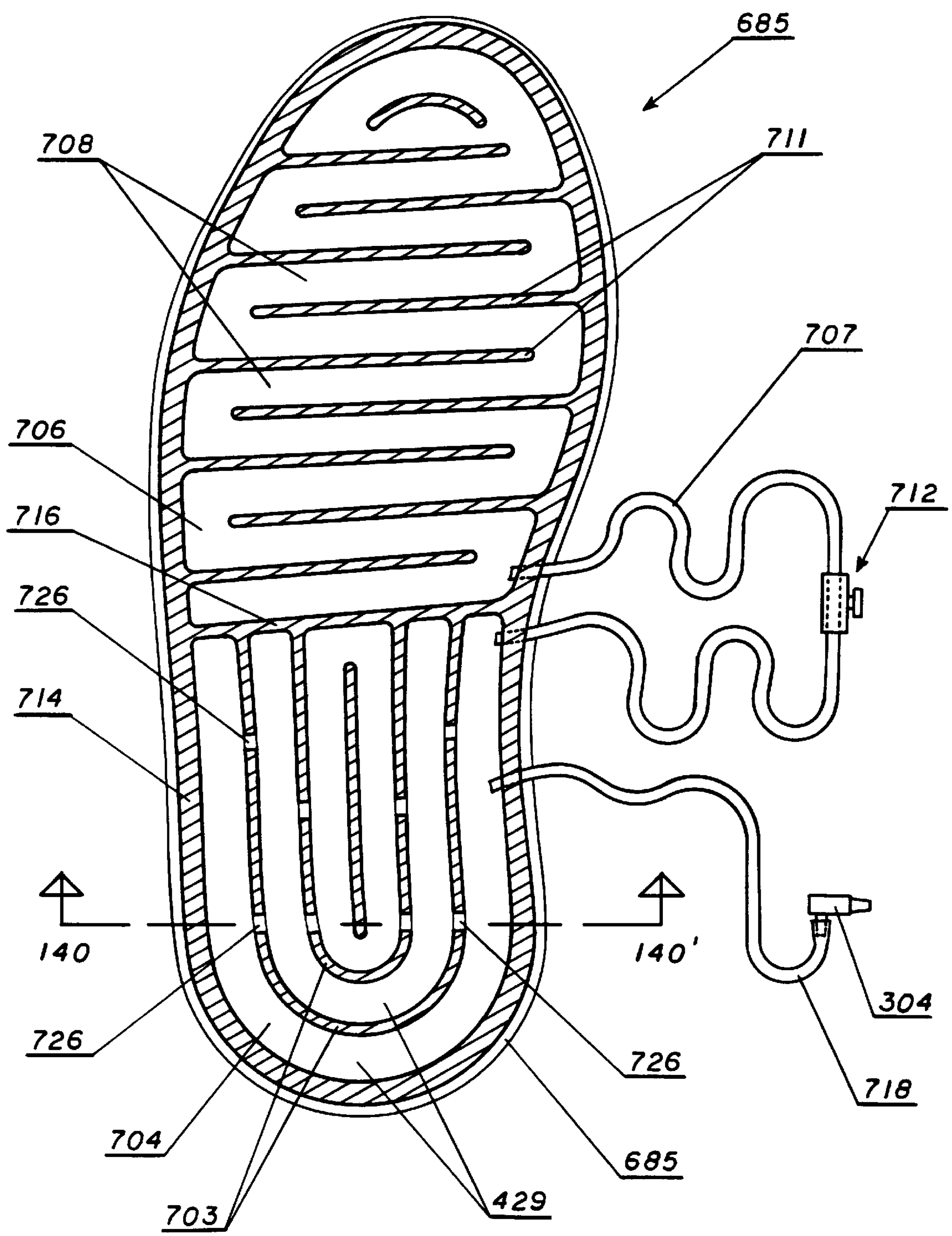
FIG. 143 is a sectional plan view of an alternative inflatable outer sole.

FIGS. 140, 142, 143 and 146 illustrate another embodiment of inner and outer soles (FIG. 140) and its assembly with an upper lining in footwear. FIG. 142 is a plan view of the alternative inflatable inner sole 710 similar to that shown in FIG. 73. In this embodiment, however, an external air pump 410 (see FIG. 146) is used, and the heel chamber 709 is inflated to provide a heel cushion, thereby providing a total of six inflatable chambers in the inner sole. The heel chamber 709 is connected by flexible tube 700 using the relief valve-connector 304 previously described in FIG. 76. The inflatable inner sole 710 is also preferably used in combination with an inflatable outer sole 685 which is shown in FIGS. 140 and 143. The heel chamber 709 is slightly below the upper surface of innersole 710 and above the outersole 685, forming a saddle or depression for the wearer's heel. It can be attached to the mid-sole 633 and it is built of different material than innersole 710 for higher pressure rating. There is a plate 41 under upper wall 55 to prevent upper wall 55 from curving upwardly under pressure.

FIG. 140 is an elevational sectional view through the heel of footwear which has the inner sole 710 and an inflatable upper lining 373 of the invention. The view is along line 140–140' on the inner sole shown in FIG. 142. The footwear is similar to that shown in FIG. 88, and elements of the drawing which are the same as those in FIG. 88 have the same identifying numbers. FIG. 140 illustrates the assembly of the inner sole 710 and an upper lining 373, the latter being between the outer skin 365 and the inner liner 367 of the upper for the footwear.

The upper lining 373 has internal inflated passageways 289 and, preferably, tabs 228 which are bonded to the outer skin 365 and inner liner 367 of the shoe to retain the lining 373 in place. The tabs 228 can also be attached to the inflatable outer sole 685 in the fabrication of the shoe. In this fabrication, the peripheral seam 16 of the inner sole 710 is folded upwardly and can be used as a surface for attachment of the inner sole to the upper lining 373 and the inflatable outer sole 685, as desired. Preferably a graphite fiber reinforced plastic midsole 633 extends upwardly particularly around the ankle area to reinforce the shoe, a modification which is well suited for high impact activities, e.g., sports such as basketball, etc.

FIG. 143 is a sectional plan view along line 143–143' of FIG. 140, showing an alternative inflatable outer sole 685.

In the illustrated embodiment, the outer sole 685 is also formed with internal chambers heel chambers 704 and a front chamber 706 which preferably are tubular passageways 429 formed by walls 703 and tubular passageways 708 formed by walls 711. The passageways can be inflated with the air pump used with the linings of the invention and for this purpose, a flexible tubing 718 extends to chamber 704 in the outer sole 685 to direct air under pressure to the passageways 429 for inflation. The heel chamber 704 and the front chamber 706 are interconnected by flexible tube 707 with a regulator valve 712 which controls the flow of air between the chambers, thereby permitting the outer sole to be adjusted for walking, running, jumping, or any desired performance of sport. Preferably, the passageways 429 in the chamber 704 are connected by transverse orifices 726 in the walls 703 of the passageways. By this construction, the outer sole can also be inflated to any desired degree of firmness, providing enhanced comfort, impact absorption, resiliency, and traction with the ground surface, all of which can be adjusted or varied to suit the particular activity or weight of the user and terrain encountered.

Figure 141:
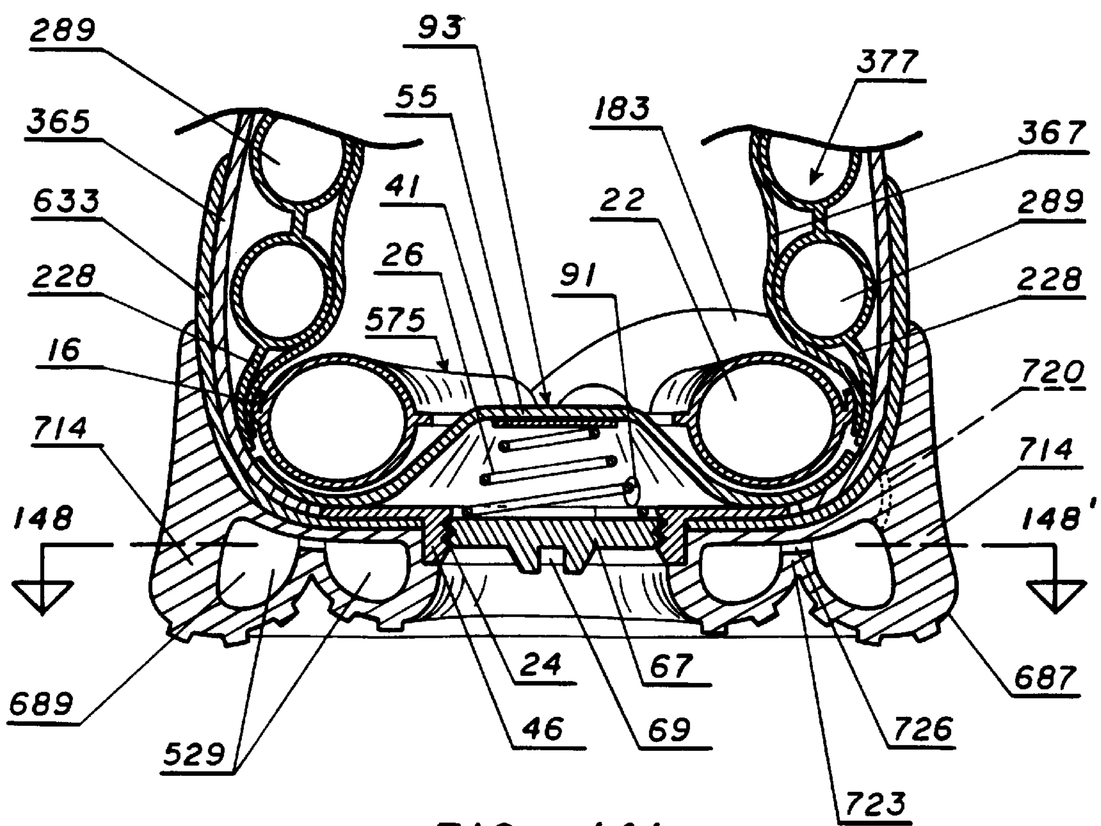
FIG. 141 illustrates an elevational sectional view along lines 141–141' of FIGS. 147 and 148.

As shown in FIGS. 140 and 141, the outer sole has a peripheral wall 714 of greater height and thickness for greater rigidity and stability. This prevents collapsing of the outer sole and potential injury in the event of sudden loss of inflation pressure. Preferably the peripheral wall of the outer sole spread outwardly, as shown. In the event of a high impact or low inflation pressure, the outer sole will flex or spread outwardly, increasing ground contact and avoiding potential injury. The inflated passageways 429 and 529 of the outer sole are of lesser height, resulting in a recessed undersurface, which is preferably concave, as illustrated in FIG. 140 by the dashed line 437. Protuberances 439 such as ribs or cleats can be formed on the undersurface of the outer sole.

Figure 144:
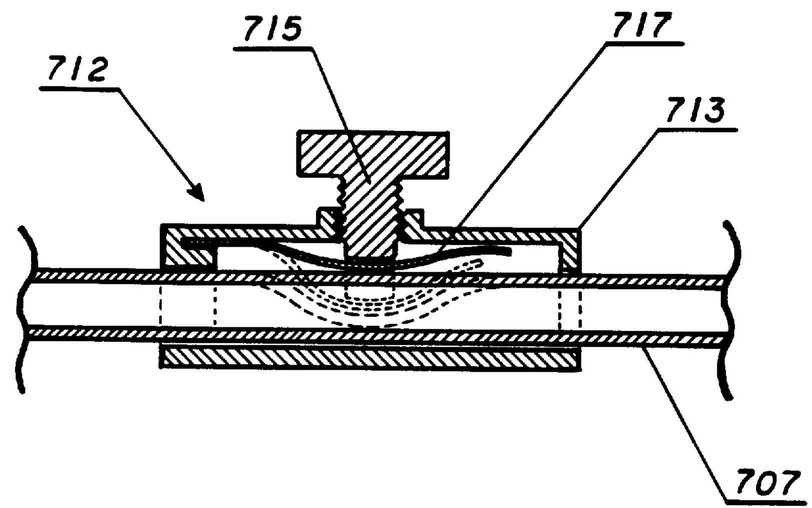
FIG. 144 and 145 are view of the regulator valve shown in FIG. 143.
Figure 145:
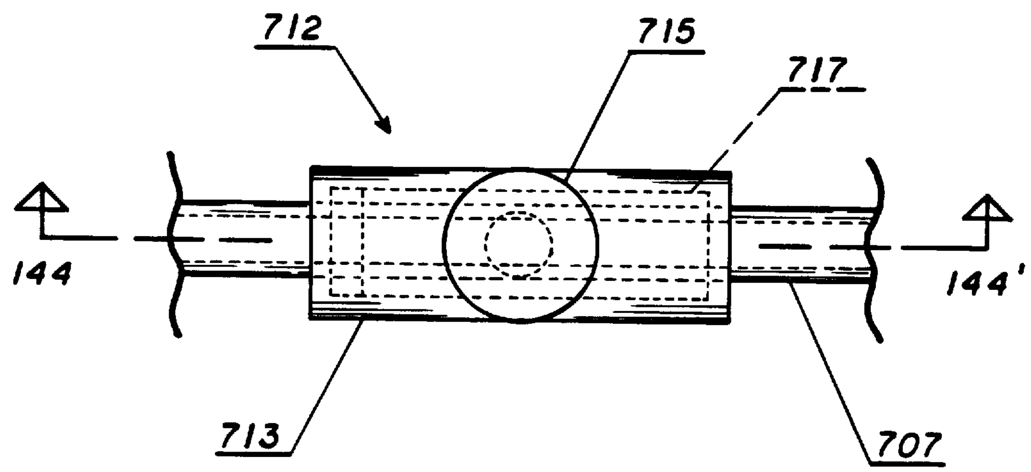

The two separate inflatable chambers 704 and 706 within the outer sole are interconnected by flexible tube 707 which includes a pressure regulator valve 712 (see FIGS. 144 and 145) to control air flow between the rear chambers 704 and the front chamber 706. The regulator is a tubular sleeve 713 with an adjustment screw 715 threadably received in a side wall of sleeve 713 and bearing against a spring leaf 717 to permit the user to constrict the tube 707 (shown in broken line FIG. 144) and restrict or prevent air flow between the chambers 704 and 706. Preferably, the peripheral wall 714 of the outer sole 685 is thicker for greater rigidity and increased stability. The outer sole 685 receives pressured air from flexible tubing 718 from an air pump of the invention through a relief valve-connector 304, previously described.

Figure 146:
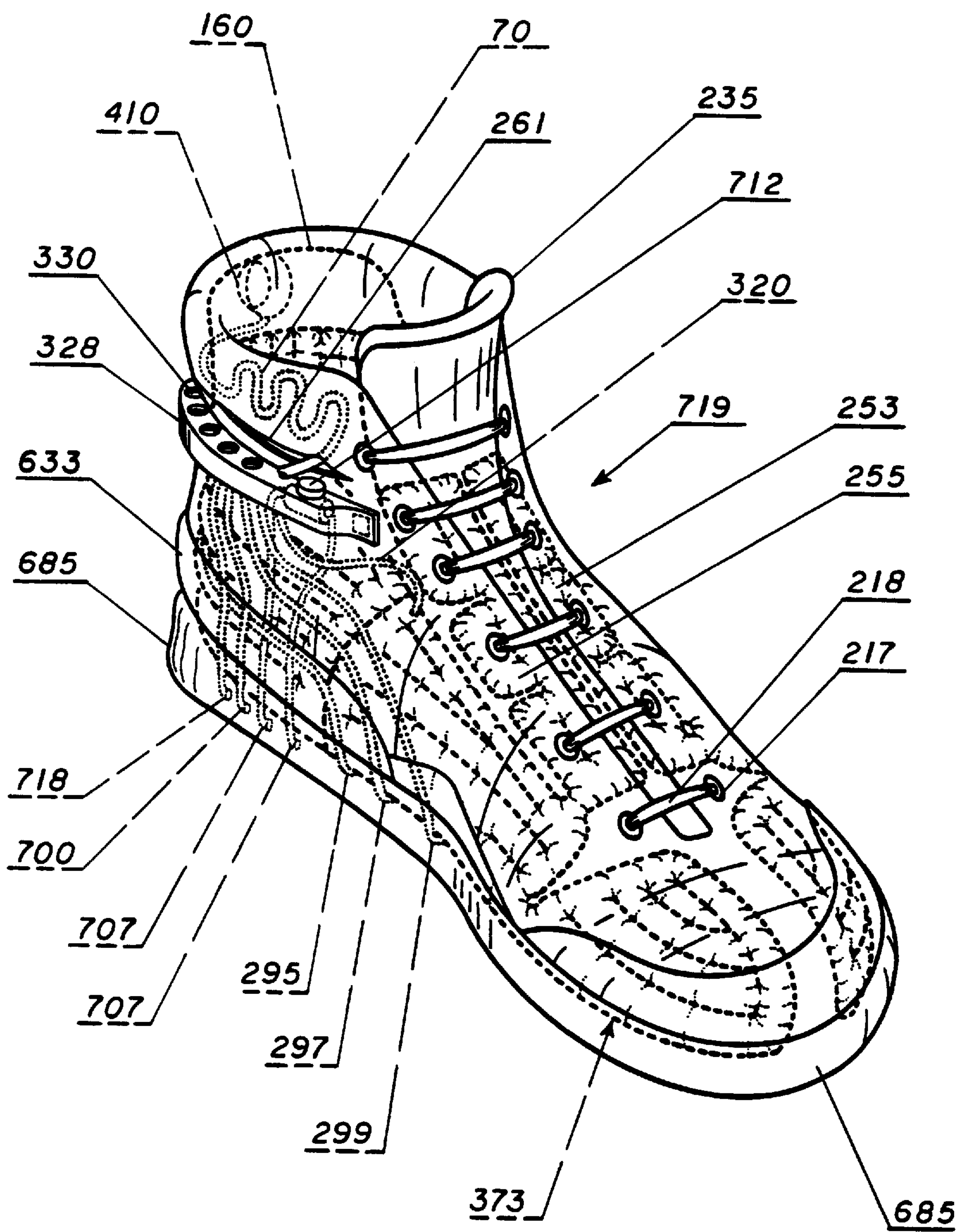
FIG. 146 is a perspective view of the footwear shown in FIGS. 140, 142, 143, 144 and 145.

FIG. 146 is a perspective view of footwear 719 with the linings shown in FIGS. 140, 142, 143, 144 and 145. The footwear is provided with a hand air pump 410 and regulator valve 712 previously described in FIGS. 144 and 145. If desired, other inflation devices could also be used.

Figure 90:
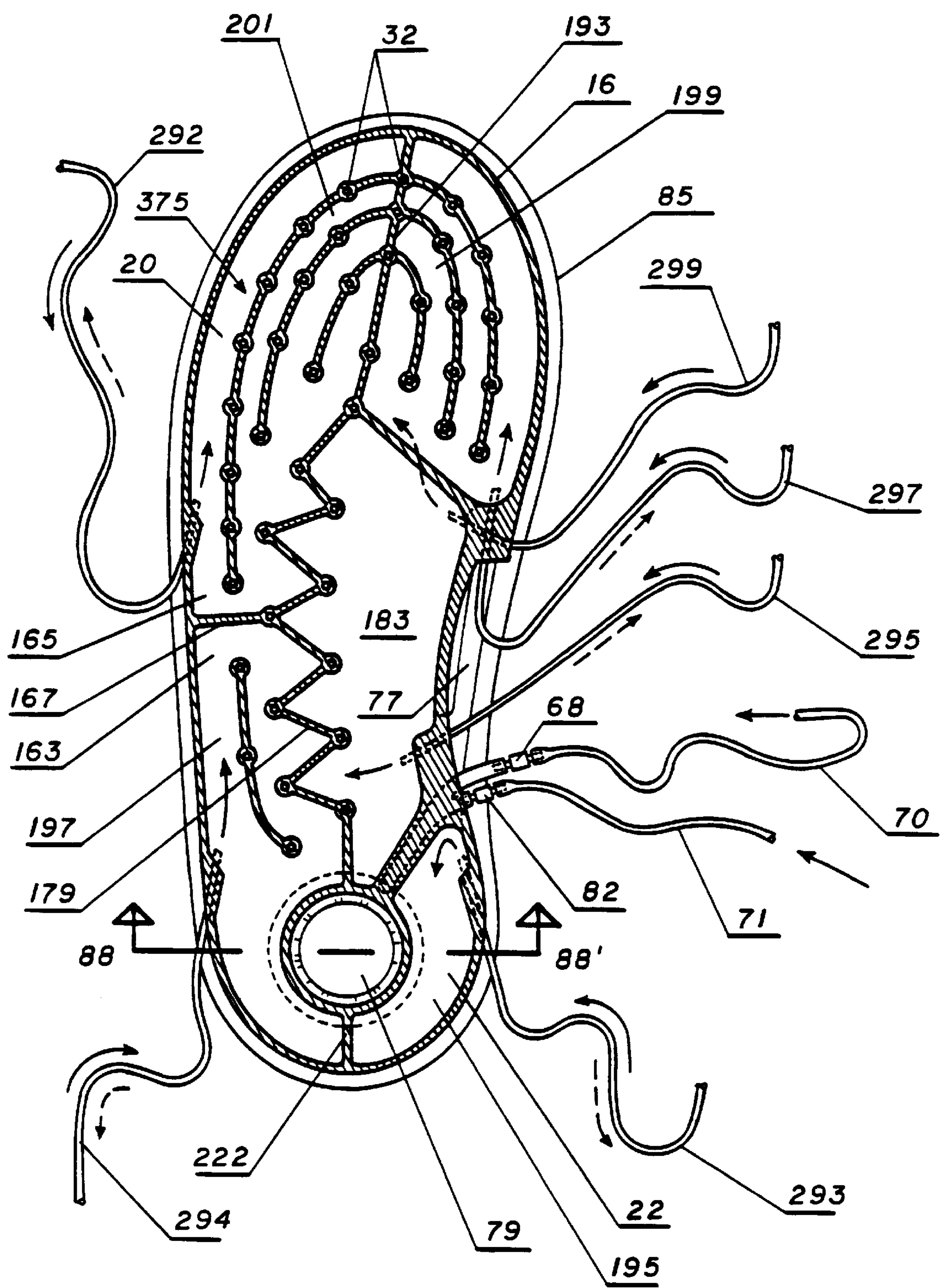
Figure 147:
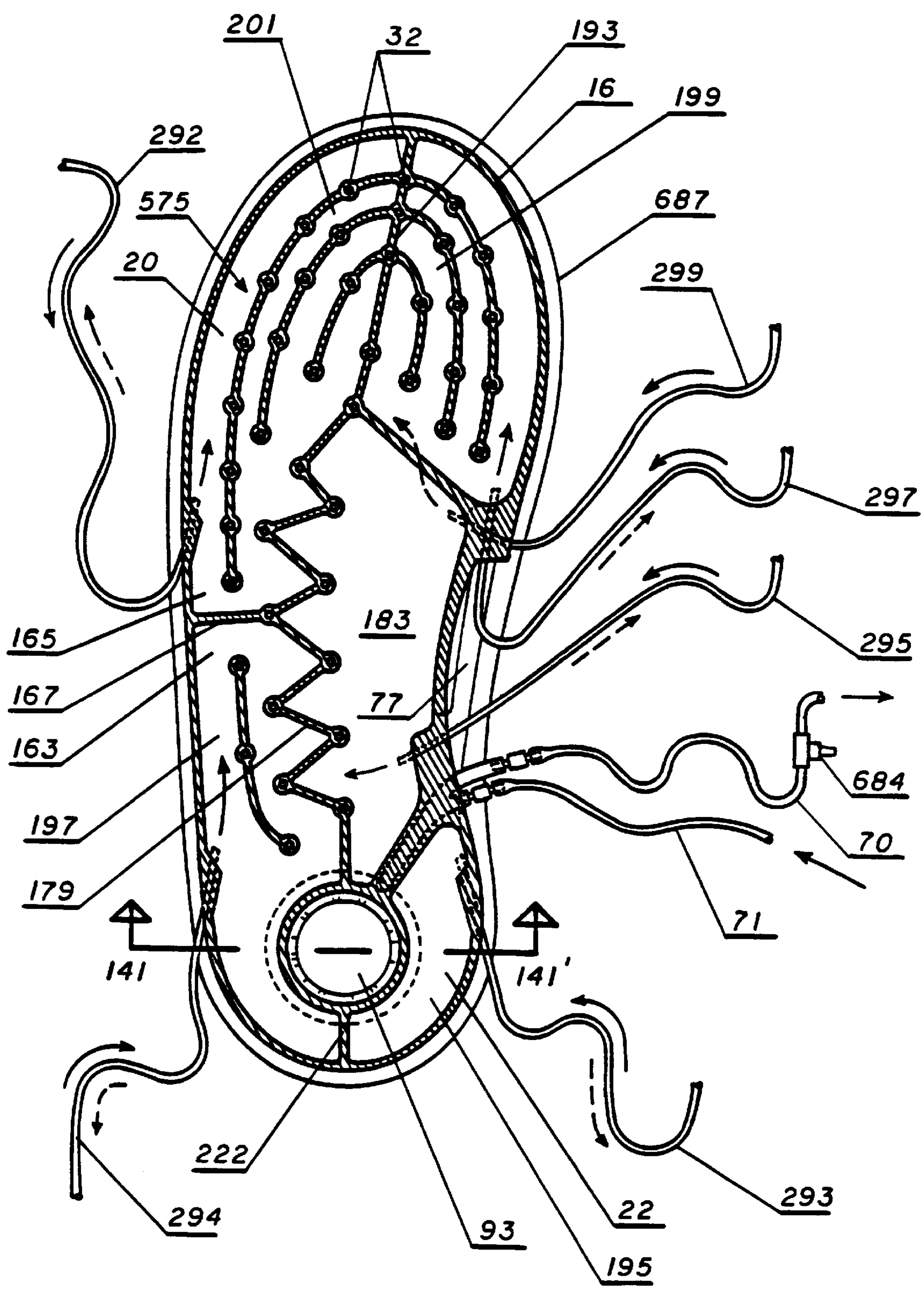
FIG. 147 is a plan view of an alternative inflatable inner sole similar to that shown in FIG. 90.

FIG. 147 illustrates an inflatable inner sole 575 with a heel pump 93 and thus is substantially the same as the inner sole shown in FIG. 90, except it has a relief valve connector 684 to permit use of an extraneous inflation device, e.g., air compressor, air pump, compressed gas cartridge such as a $CO_2$ cartridge. The inflatable inner sole is also preferably used in combination with an inflatable outer sole 687 which is shown in FIGS. 141 and 148.

Figure 148:
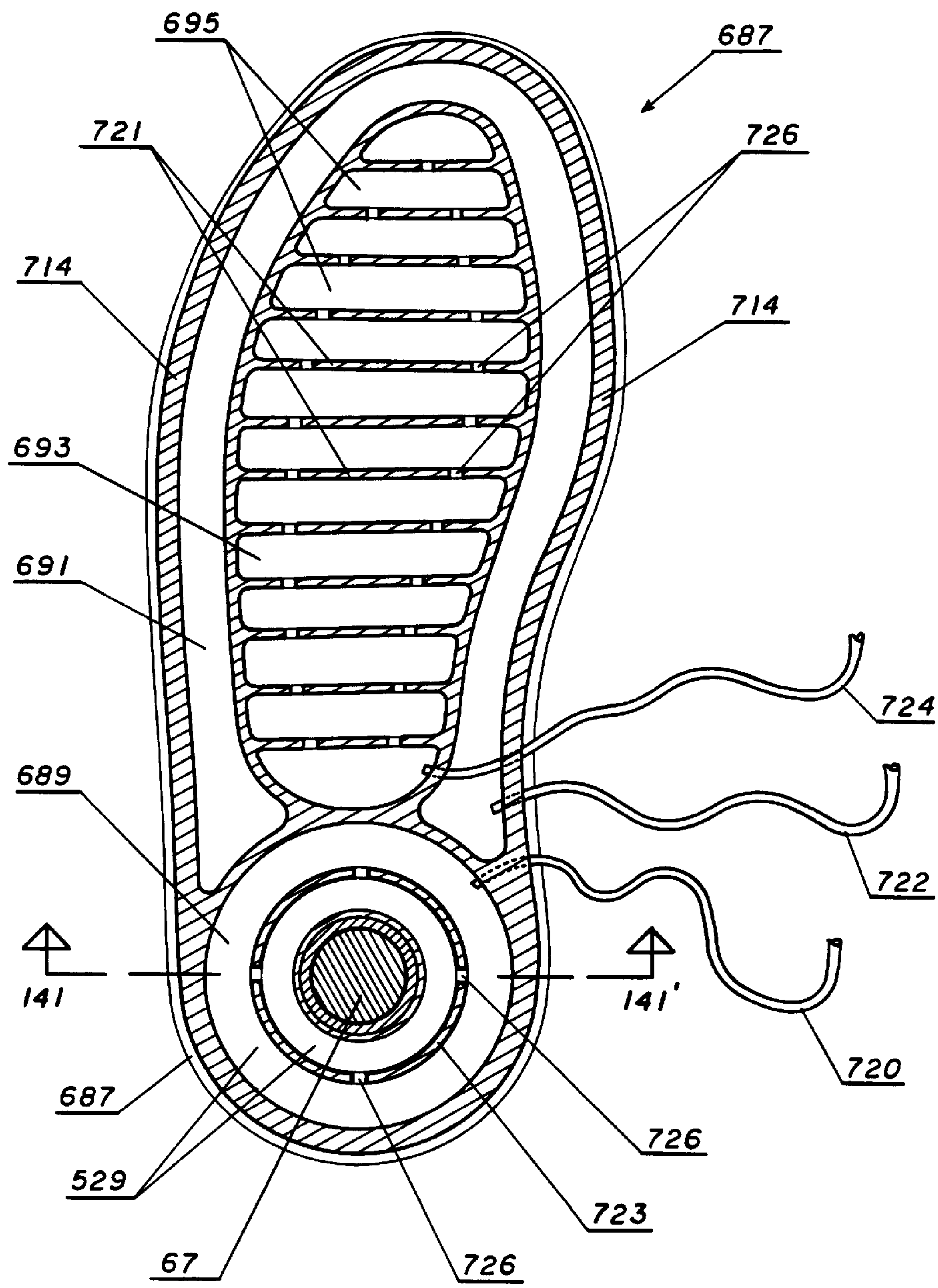
FIG. 148 is a sectional plan view of an alternative inflatable outer sole.

FIG. 148 is a sectional plan view along line 148–148' of FIG. 141 showing an alternative inflatable outer sole 687. There are three chambers, heel chamber 689, peripheral chamber 691 and front/middle chamber 693. The peripheral chamber provides enhanced stability, and if desired, this chamber can be further subdivided into lateral and medial peripheral chambers, or any number of chambers which, together, make up the peripheral chamber 691. The various chambers are connected with selector 445 and flexible tubes 720, 722 and 724. Tubular passages 529 in heel chamber 689 are connected through orifices 726 in side walls 723. Also tubular passages 695 in front middle chamber 693 are in connection through orifices 726 in walls 721.

FIG. 141 illustrates a sectional view along line 141–141' of FIGS. 147 and 148. This embodiment is essentially the same as that of FIG. 140 except an aperture 24 extends through the outer sole 687 and midsole 633 at the heel, immediately beneath the heel air pump 93. The aperture is closed with a flanged sleeve 46 which receives a plug 67 that is threadably engaged in the sleeve 46. A slot 69 can be provided on the underside of the plug 67 to permit its insertion and removal. The plug 67 provides access to the interior of the air pump 93, thereby permitting replacement of the helical coil spring 26. The spring 26 provides greater resiliency to the air pump and also increases the resiliency and shock absorbing properties of the shoe. The spring 26 can be replaced with springs of varied compression strengths to adjust the shoe to the wearer's weight and particular activity, e.g., sport, walking, running, basketball, etc., as well as for sport training exercises.

Figure 149:
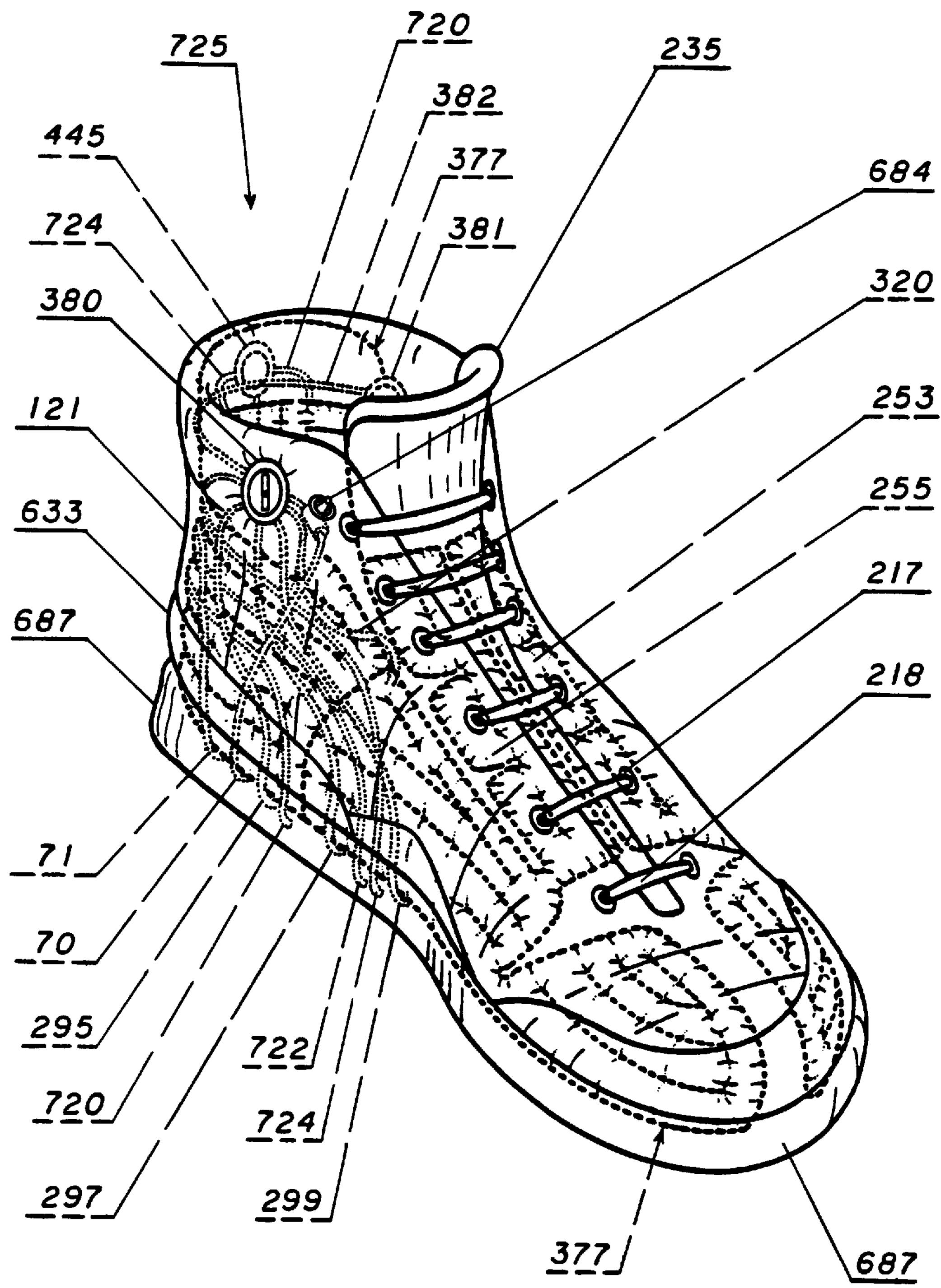
FIG. 149 is a perspective view of the footwear shown in FIGS. 141, 147 and 148.

FIG. 149 is a perspective view of the footwear 725 with the linings shown in FIGS. 141 and 147 and the inflatable outer sole shown in FIG. 148. The footwear 725 has an outer sole 687 and an upper outer 121, a tongue 235 and lacing 218. In this figure are also illustrated selector valve 445 which feeds air through flexible tubes 720, 722 and 724 into inflatable outersole 687 and also relief valve 684 which permits connection of an alternative air supply. The shape of the tubular passages 429 of the inflatable outer sole 687 are so to improve contact with the ground surface, impact absorption and resiliency. The peripheral wall 714 of the outer sole 687 is thicker, or can be rigid, to prevent from bending and so increase stability and decrease possibility for injury.

Figure 150:
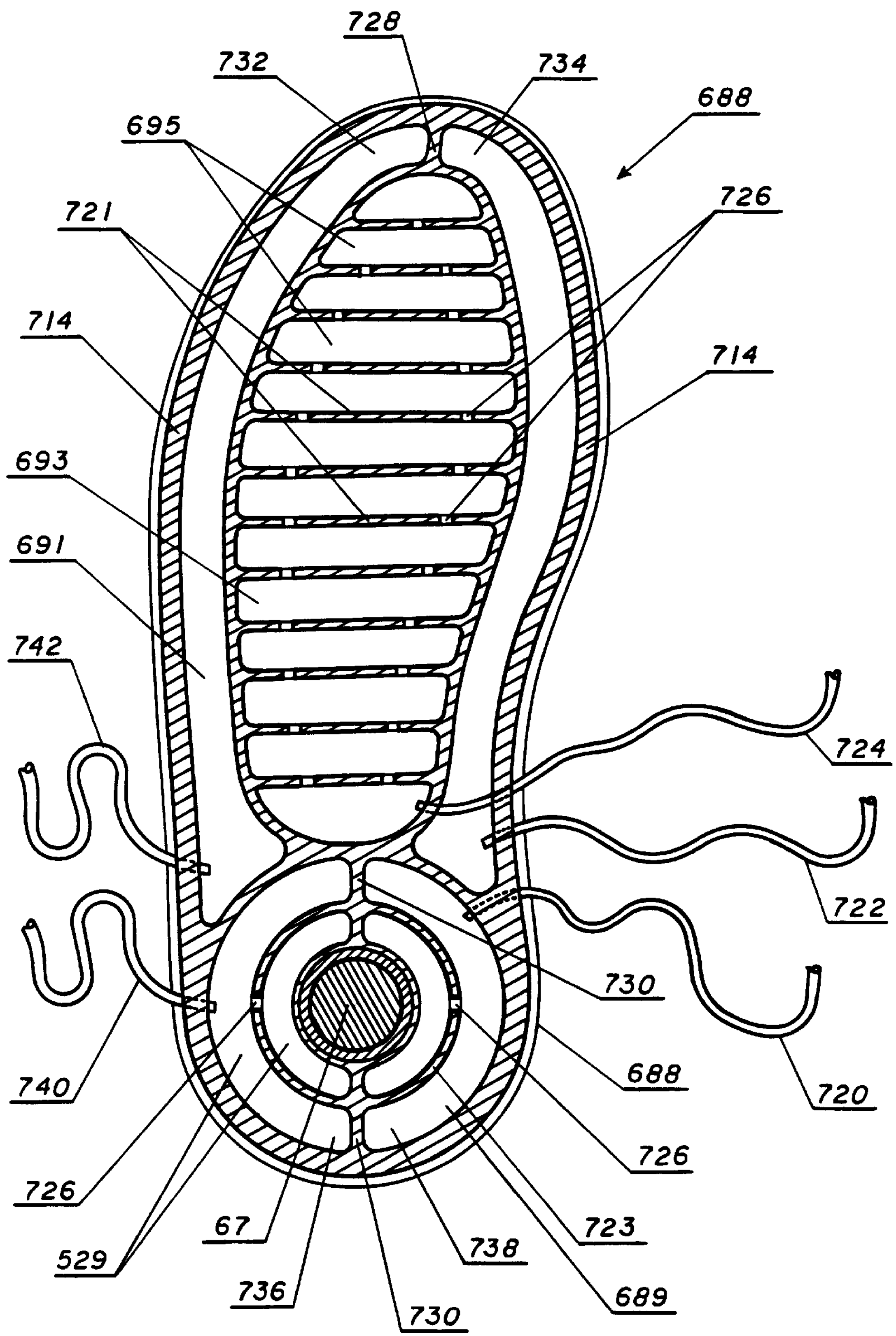
FIG. 150 is a sectional plan view of an alternative inflatable outer sole.

FIG. 150 is a sectional plan view of an alternative inflatable outer sole 688 which is similar to the sole 687 shown in FIG. 148, except that the peripheral chamber 691 is divided by wall 730 into lateral peripheral chamber 732 and medial peripheral chamber 734. The heel chamber 689 is also divided by wall 732 into a lateral heel chamber 736 and a medial heel chamber 738. Air is supplied separately to each of these chambers by additional flexible tubes 740 and 742.

In any of the illustrated applications of multiple chambered linings, the selector valves permit the user to adjust the pressure in each of the independent chambers by connecting each chamber individually to either a hand air pump, or a heel air pump. Any excess pressure can be vented through the relief valve member located in the selector valve. With the heel air pump, after all the chambers are inflated to the desired firmness, the selector valve 380 can be switched to direct the air discharged from the heel air pump beneath and through the inner sole. The circulating air is provided by connecting tube 70 through the selector valve 380 to the tubing 299 (FIGS. 90 and 147) that extends beneath the inner sole, discharging in the channels formed on the underside of the inflated inner sole which are vented through the inner sole by through apertures 32 spaced along the seams.

In all of the embodiments, the outer soles 85, 685 and 687 can be formed of suitable rubber or plastics, including, for example, open or closed cell foams of ethylene vinyl acetate copolymers, polyurethane, ethylene, etc. During their manufacture, the outer soles can be cast with the various internal chambers described above.

The invention provides the advantages of inflatable inner and outer soles and upper lining which can be inflated by the normal walking activities or which can be manually inflated by operation of a small hand pump. In either case, the firmness of the inner sole is custom, adjustably controllable with a pressure control relief valve to insure exactly the desired softness and resiliency for any desired performance and for maximum comfort to avoid fatigue.

The pressures within the individual chambers of the lining can be adjusted to precisely the pressure which is most comfortable, or which provides for the maximum performance of the wearer. In the embodiment such as that shown in FIGS. 147–150, any of the chambers can be adjusted to the desired pressure by connecting the air pump discharge tube 70 to a selected tube of the inflatable inner or outer sole or inflatable upper liner by selector valves 380, 381 and 445, and by applying pressure with the air pump until the desired inflation pressure is reached, as can be determined by the pressure, e.g., firmness, applied to the wearer's foot, or by observation of the inflation pressure on a pressure gauge. Fine adjustment of the pressure within each chamber can then be achieved by releasing any excess pressure through the relief valve in the selector valve. The multiple chambers and, particularly, the provision of separate, independent lateral and medial chambers permit the user to provide neutral (or normal) support or pronated or supinated support when desired, by varied inflation pressures in the medial and lateral chambers. This controlled support can be additionally enhanced by use of upper linings which have separate chambers, such as the linings shown in FIGS. 65, 70, 72, 74, 78 and 91, which show separate medial and lateral chambers, which all have separately adjustable air pressures.

The inflatable inner sole also provides shock absorbency and can increase walking and running efficiency as it will absorb energy from impact and return it in a resilient lift to the wearer. The inflatable linings, including the inflatable inner sole also permit the user to customize the fit by controlling the degree of inflation of the internal chambers of the linings. The inflatable linings, inner sole and outer sole also provide thermal insulation by the air chambers within each of these members, a feature which is especially attractive when playing or walking on hot pavement. The inflatable inner sole also increases the stability of the footwear, and can lead to reduced incidence of injuries such as sprains and the like. The inflatable outer sole increases the stability as it provides the user with an adjustable degree of firmness and flexibility, thereby permitting adjustment for maximum grip or traction to the terrain. The area of the undersurface of the outer sole which is in contact with the ground can be controlled by the pressure of the inflatable outer sole 685 or 687. At maximum inflation pressure, the sole surface has the shape shown in FIGS. 140 and 141, with a limited area in contact with the ground. At lower inflation pressures, the passageways 429 will deflect under load presenting a more flat shape, similar to that shown for outer sole 85 in FIGS. 88 and 89, thus increasing the contact area with the ground. Also, the outer sole will deflect around any obstructions, such as stones, pebbles, etc.

The footwear as shown in FIGS. 140–150 has several independent and separate systems for comfort and resiliency. These systems are the inflatable innersole (710 or 575), the inflatable outer sole (685 or 687), and a separate inflatable heel enclosure (709) and the recessed undersurface of the central area of the outer sole. All of these systems provide resiliency and a spring-like action to the footwear.

Since the preferred lining is self-inflated by normal walking or other activities of the wearer, the internal pressure of the lining remains constant at the setting of the pressure relief valve, thereby always compensating for any loss of air from the lining, which can result from various causes, e.g., defective or worn seams, or the permeability to air of the lining material. Finally, all of these advantages are secured with an inner sole and, optionally upper lining, of very light weight. The upper lining can be replaceable, if desired. It is preferred that the linings of the invention be formed as replaceable inserts, thereby permitting replacement when worn or damaged.

The pressure control valve is preferably located, as illustrated, adjacent the instep or under the arch. It could, however, be located at any other position where there is sufficient space, preferably in a readily accessible location.

Preferably the inner sole includes the plurality of apertures to permit fluid communication between the under side and the top side of the inflatable inner sole thus providing breathability through the inner sole. This insures that moisture does not accumulate on the top of the inflated inner sole. In the most preferred embodiment, the inner sole is provided with a forced air circulating pump which operates with normal walking activities to induce forced air circulation through the inner sole and the shoe. The flexing of the air passageways and the circulation of the air causes a massaging action on the soles of the wearer's feet.

The inflatable lining can be readily manufactured from flat sheets of plastic film, preferably polyurethane, by stamping and with solvent or ultrasonic or thermal bonding to form the seams. Of these, heat stamping in which the sheets are pressed with heat to form the seams is preferred.

Figure 151:
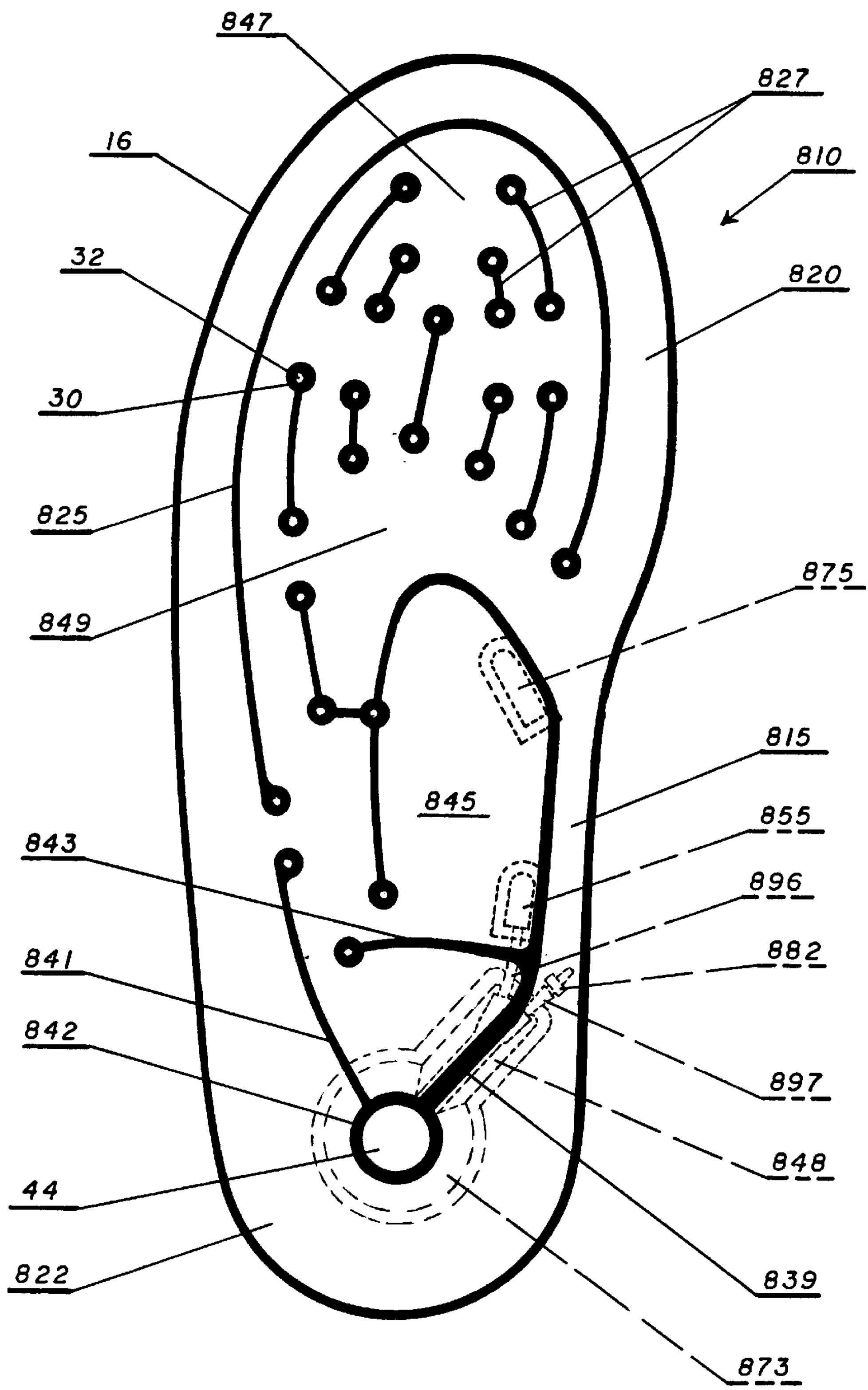
FIG. 151 is a plan view of an inflatable inner sole similar with those previously described in FIGS. 1 and 33.

FIG. 151 is a plan view of an inflatable inner sole similar to those previously described in FIGS. 1 and 33 of my aforementioned, prior applications. In this embodiment the inflatable sole has a heel pump 873 described in more detail in FIGS. 161–166 hereinafter. The discharge port 832 of the heel pump 873 is connected through flexible tube 896 with check value assembly 855 which is permanently attached (heat sealed or glued) underneath and beside arch pillow 845.

An automatic adjustable relief valve assembly 875 is also permanently attached underneath and beside arch pillow 845, but separated from check valve assembly 855.

Figure 152:
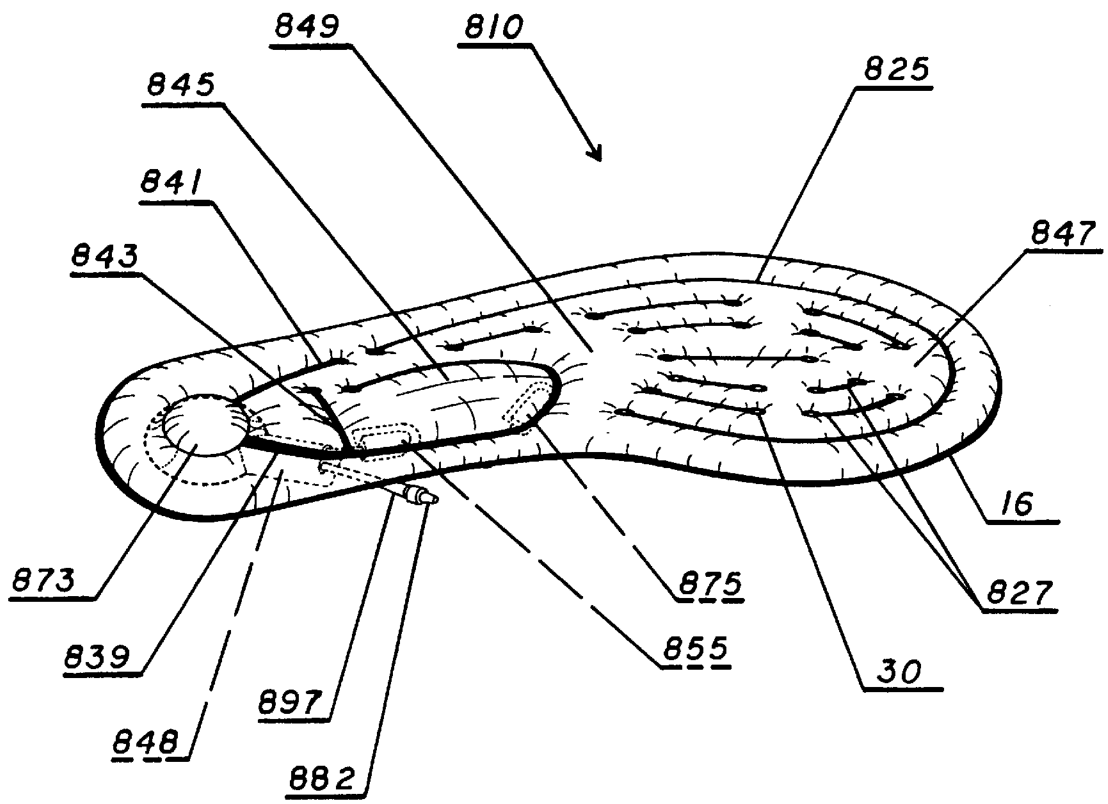
FIG. 152 is a perspective view of the inflatable innersole insert embodiment described in FIGS. 151–166.

FIG. 152 is a perspective view of the inflatable innersole embodiment described in FIGS. 151–166. FIGS. 153–156 are views of the discharge check valve assembly 855. There is a duck bill check valve 860 and a housing 864 of the assembly. Inlet port 862 and outlet port 853 align with opening (not illustrated) on the lower sheet of the inflatable sole 810. There is a flange 857 around housing 864 to permit permanent attachment of the pump and valve assembly to the innersole through heat sealing process or any other alternating process.

FIGS. 157–160 are views of the automatic adjustable relief valve assembly 875. There is a housing 808 of the assembly. There is a spring 802 which can be depressed by the screw 804 which is engaged with sleeve 806 which is permanently inserted into housing 808. There are release ports 880 and 878 which are separated by ball 898. There is a flange 884 around housing 808 to permit permanent attachment through heat sealing process or any other alternative process.

FIGS. 161–164 are plan and sectional views of the heel pump 873 also illustrated in FIGS. 151 & 152. The heel pump 873 is formed with an upper part 767 which has the shape and form of the cavity, formed underneath the heel area of the sole by seams 842 and 839, and a lower flat part 769 which are sealed with a peripheral seam 771. The upper part 767 also has two ports: inlet port 833 and discharge port 832. It can be made from polyurethane, kraton, silicon, rubber, etc., any material that is soft, has good resiliency, good memory and that is durable. There is a slot 835 on the upper part of the pump to accept circular seam 842 of inflatable sole 810. This pump can be assembled by heat sealing or a permanently glued seam.

Figures 161, 162, 163, 164, 165, 166:
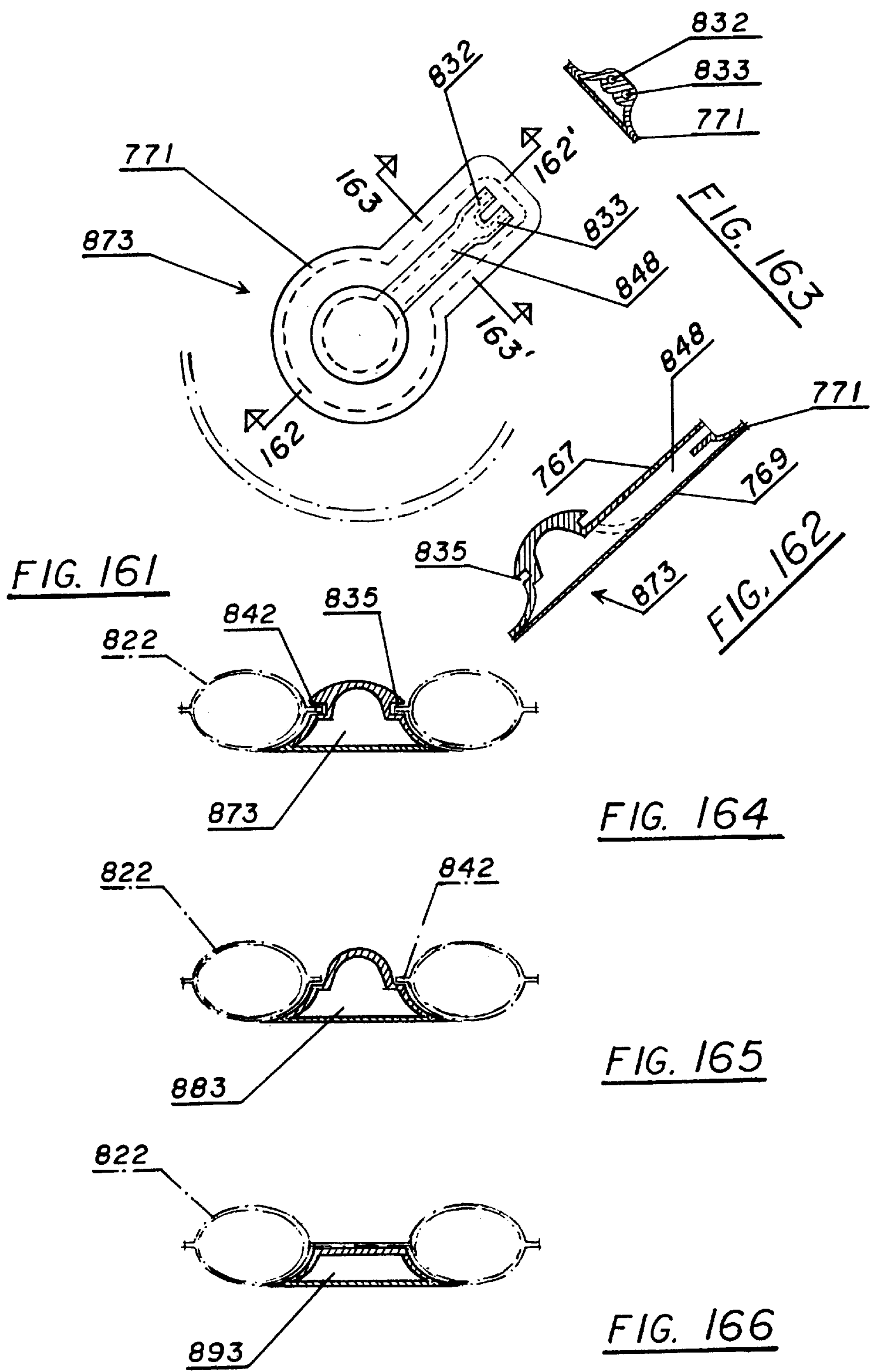
FIGS. 161–164 are plane and sectional views of heel pump which is also illustrated in FIGS. 151 and 152.
FIGS. 165 and 166 are sectional views of several alternative shape of the heel pump.

FIGS. 165 and 166 are sectional views of several alternative shapes of the heel pump 873. The heel pump could also be formed by two symmetrical hemi-spherical halves.

Figure 167:
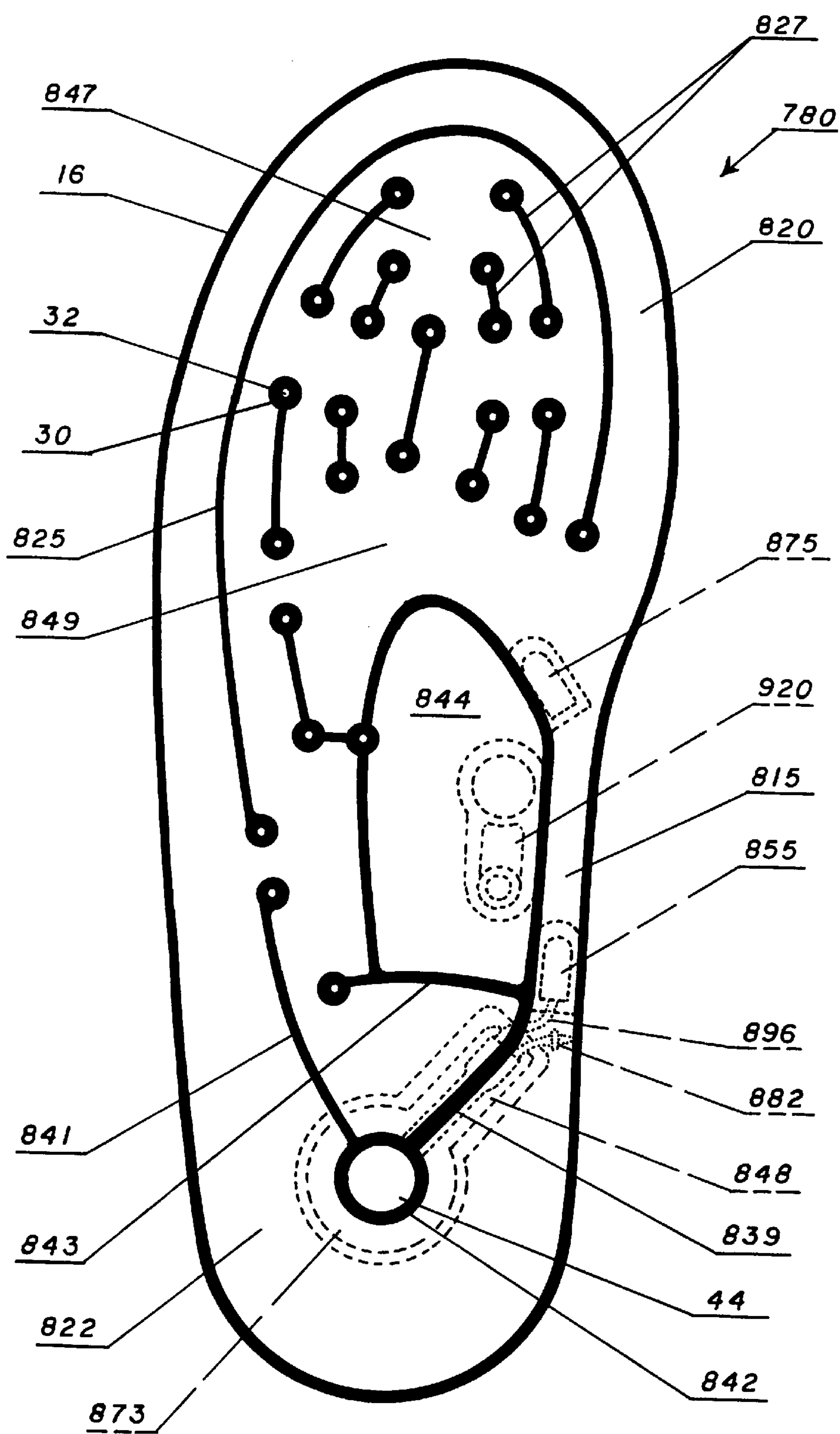
FIGS. 167 and 168 are plan and perspective views of an inflatable inner sole.

FIG. 167 is a plan view of an inflatable inner sole similar to sole 810 already described in FIG. 151. In this embodiment the arch pillow 844 is a separate compartment with an independent inflation system, illustrated as pump, check valve and relief valve assembly 920. By having an independent arch compartment, the wearer is able to adjust air pressure inside the inflatable innersole insert 790 according to his or her weight and also the wearer is able to adjust the air pressure inside the arch pillow 844 according to his or her foot configuration or deformity.

Figure 168:
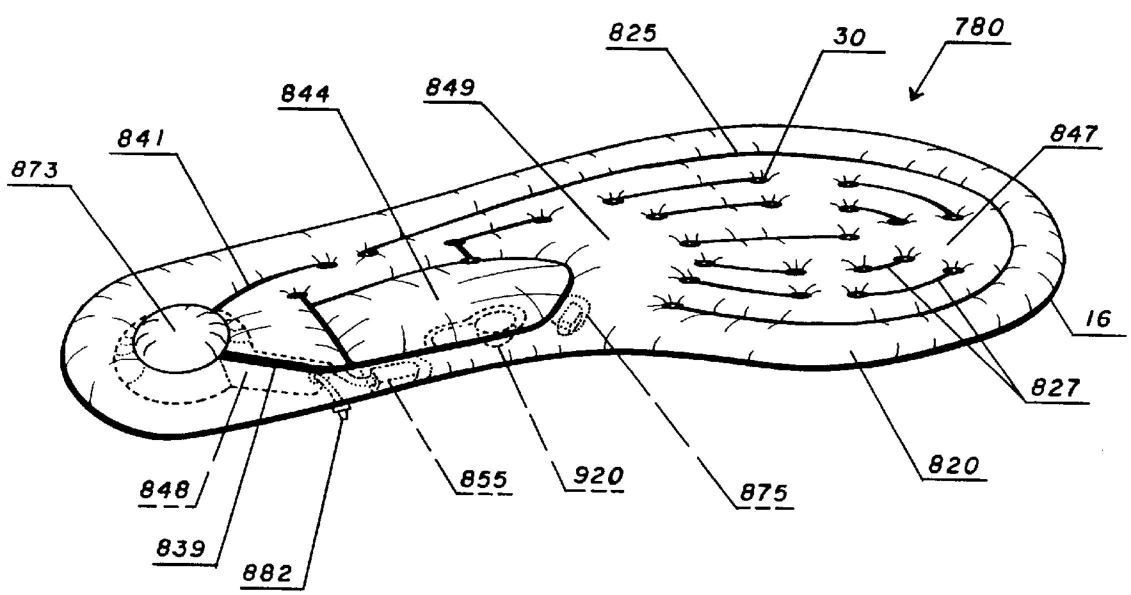
Figures 169, 170, 171, 172, 173, 174:
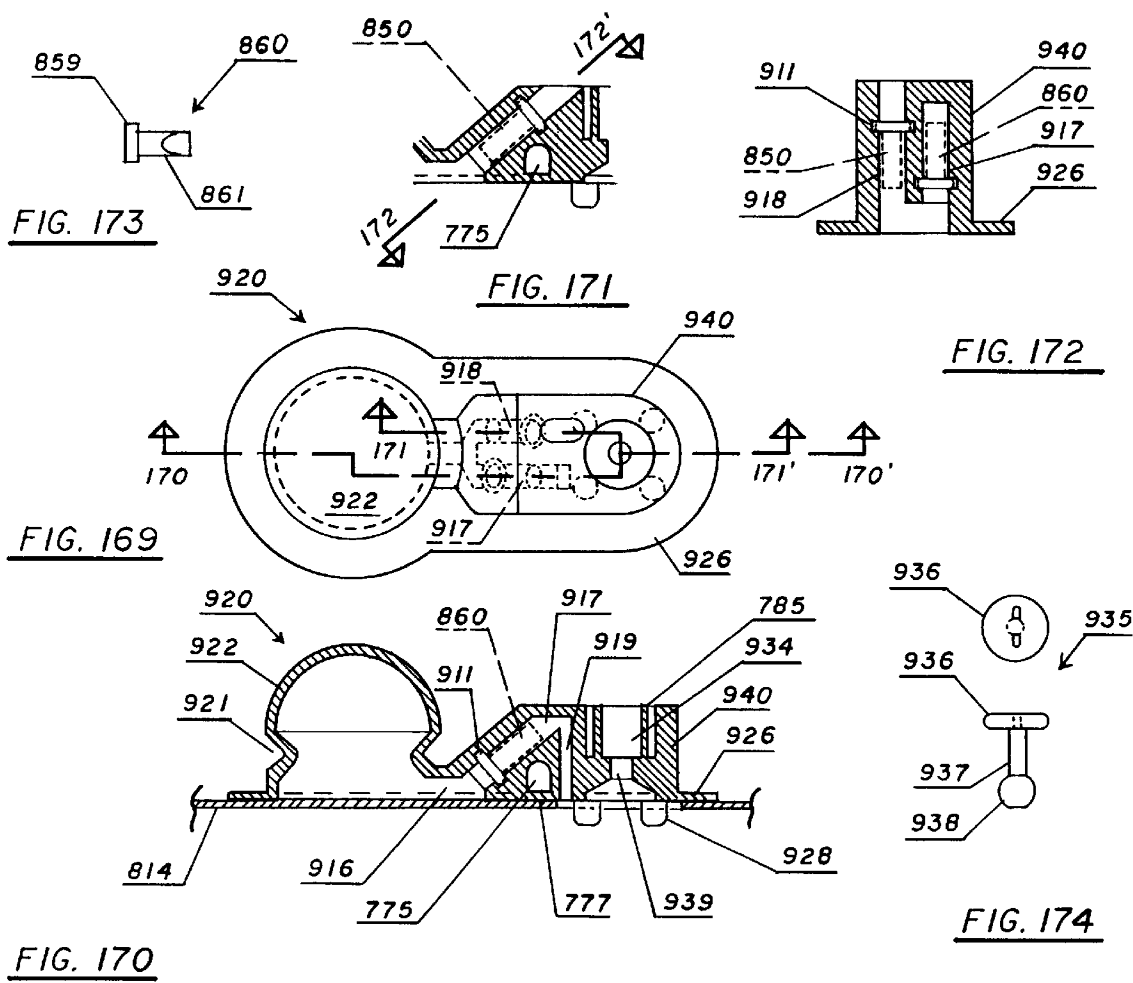
FIGS. 169–174 illustrate a pump, check valve and relief valve assembly.
Figures 175, 176, 177, 178, 179:
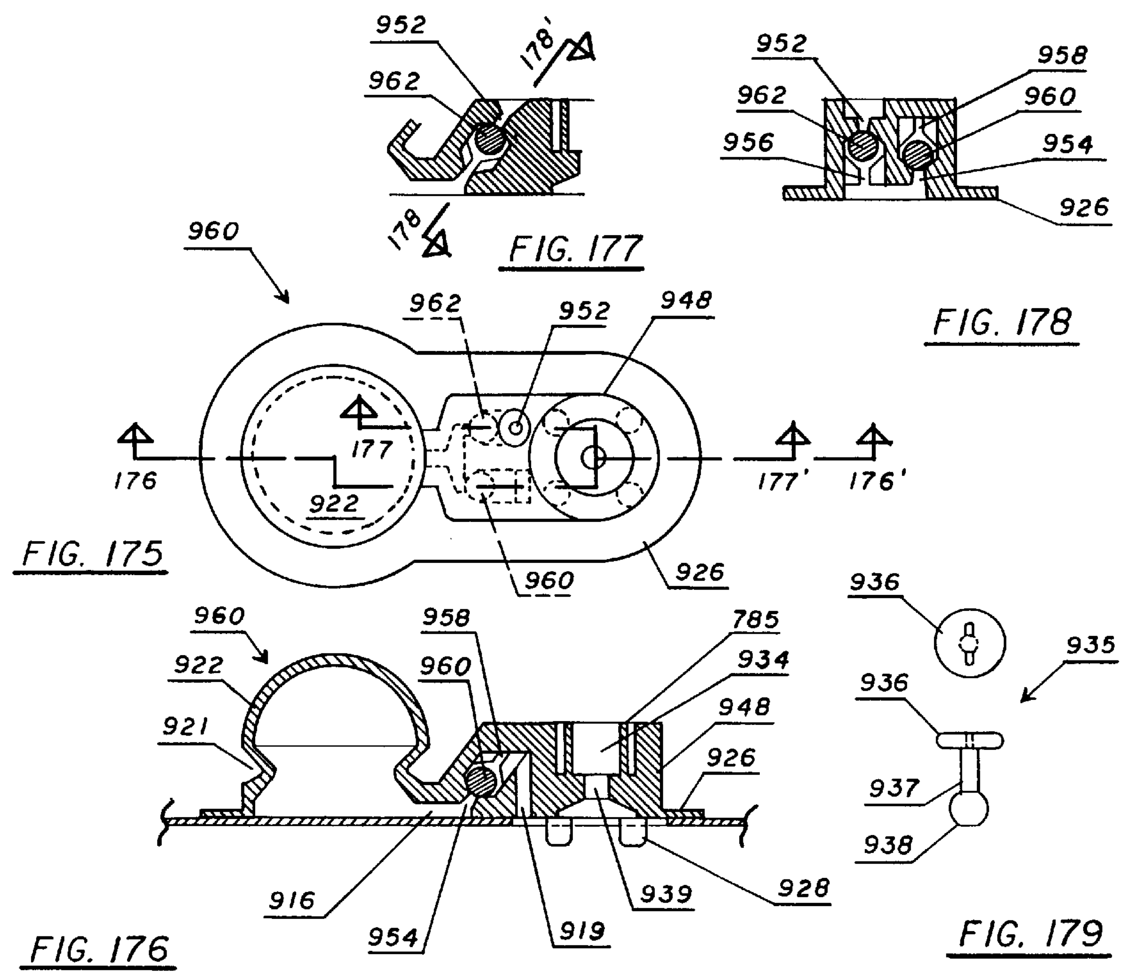
FIGS. 175–179 illustrate an alternative pump, check value and relief valve assembly.

FIG. 168 shows the inflatable innersole 780 which has been described with reference to FIG. 167.

FIGS. 169–174 illustrate a miniature pump, check valve and relief valve assembly 920 as one unit. The pump dome 922 has an undercut 921 for ease of depression. There is a housing 940 for the assembly 920 with two cavities 917 and 918 which accept two duck bill check valves; inlet check valve 850 and outlet (discharge) check valve 860. There is a relief valve button 935 which is inserted through opening 939 of the relief valve housing. There is an extension 785 which can replace and function as a spring which supports relief value button 935. There is channel 916 which connects dome 922 and the check valves assembly. Check valve 860 discharges through channel 919 into inflatable arch pillow 844 and check valve 850 provides air into pump dome 922. There is a flange 926 around the entire assembly 920 to permit attachment of the assembly by heat sealing to the inflatable lining. There is a through tunnel 775 to accept a metal bar (movable part of the die) to perform heat sealing at the area 777, beneath the passage 775 to seal the pump and check valves from the inflatable chamber. This area 777 could also be glued if not heat sealed. The thickness of the pump dome depends on the grade and durometar (hardness) value of the chosen material.

FIGS. 175–179 illustrate an alternative pump, check value and relief valve assembly 960. It is similar to assembly 920 already described in FIGS. 169–174. The only difference is that it is provided with ball check valves instead of the duck bill check valves, previously described. The balls 964 and 962 are inserted through ports 954 and 952 into cavities 958 and 956.

FIGS. 180–184 Illustrate another alternative pump, check valve and relief valve assembly 950. It is similar to the alternates already described in FIGS. 169–174 and 175–179. The only difference is that there is only one duck bill check value 860 which serves as a discharge check valve, and for the inlet check valve there is an opening 924 on the top of the pump dome 942 which functions as a check valve by closing with one's thumb when pressed and opening when released.

FIG. 185 illustrates an alternative inflatable inner sole insert 750. This embodiment is similar with those previously described in FIGS. 13 and 14 of my prior applications, identified above. There is an arch pillow 845 and tubular passageways 907 which are formed by seams 905 that also form peripheral support pillows 909. These peripheral support pillows 909 together form a peripheral support of greater inflated thickness than the remainder of the inner sole 750. The innersole 750 also has a heel enlargement 824 at heel area to provide a heel pillow 819 for better comfort. There is a seal 837 which prevents the innersole from wrinkling in the heel area. The inflatable innersole is provided with a pump, check valves and relief valve assembly 920, already described in FIGS. 169–174 which is permanently attached to the inflatable sole 750 beside and underneath arch pillow 845.

Figure 186:
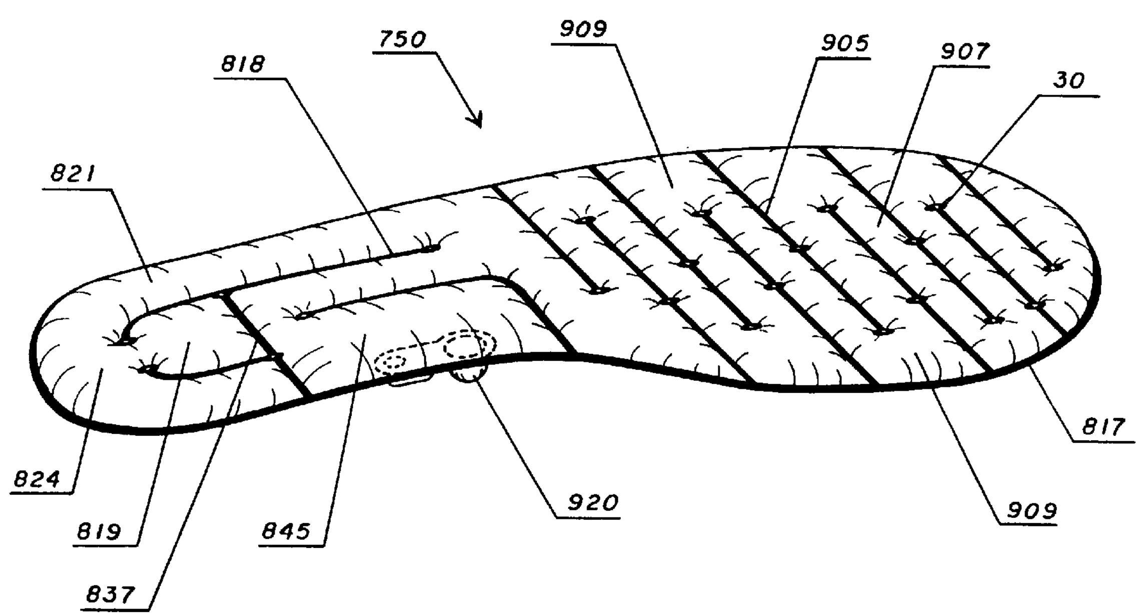

FIG. 186 is a perspective view of the inflatable innersole 750 embodiment described in FIG. 185.

Figure 187:
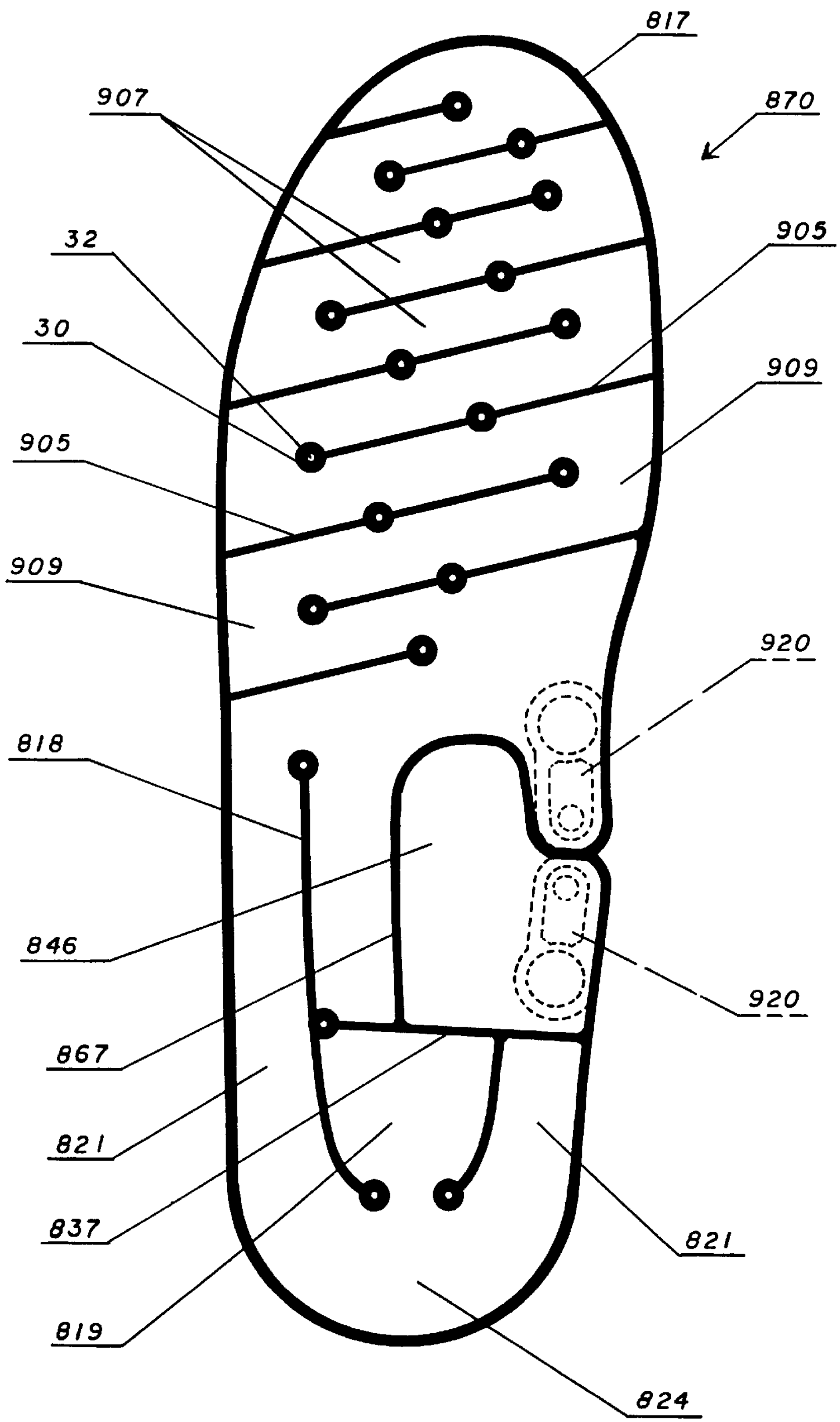

FIG. 187 illustrates an alternative inflatable sole insert 870. This embodiment is very similar with embodiment described in FIGS. 185 and 186. The only difference is that seam 867 completely surrounds the arch area forming an arch pillow 846 with an independent inflation system. There is one pump, check valve and relief valve assembly 920 for the arch chamber 846 and another such assembly for the rest of the inflatable sole 870. Independent arch pillow 845 permits custom fit adjustment to the wearer's foot configuration.

Figure 188:
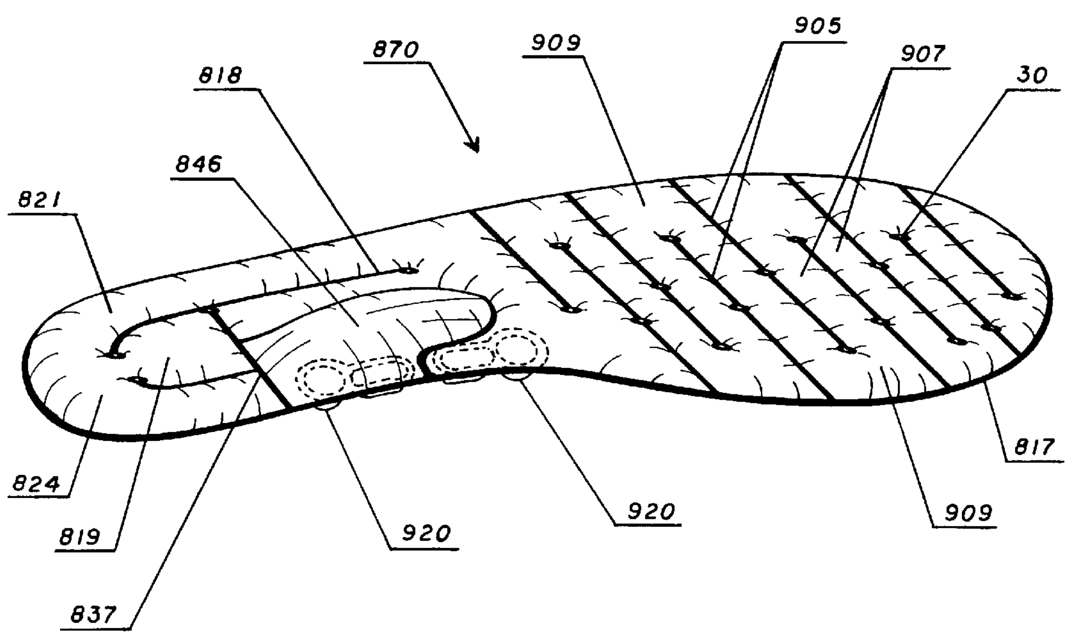

FIG. 188 is a perspective view of the inflatable innersole embodiment described in FIG. 187.

Figure 189:
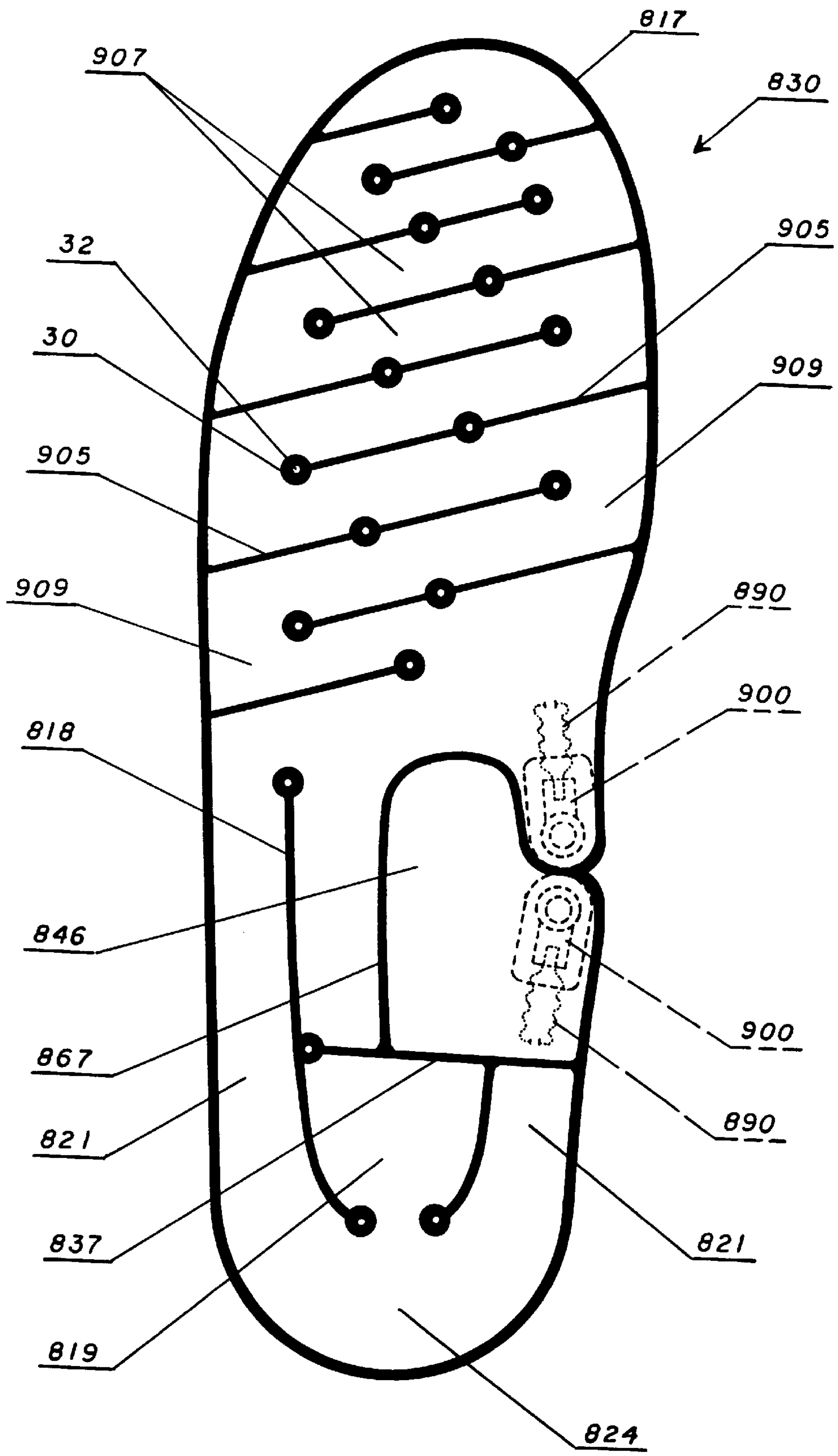

FIG. 189 illustrates another alternative of an inflatable sole 830. This embodiment is very similar to the embodiment described in FIGS. 187 and 188, and has an independent arch pillow 845. Each chamber of the inflatable sole has a separate pump 890 and check valve assembly 900, which are illustrated in more detail in FIGS. 190 to 194.

Figure 190:
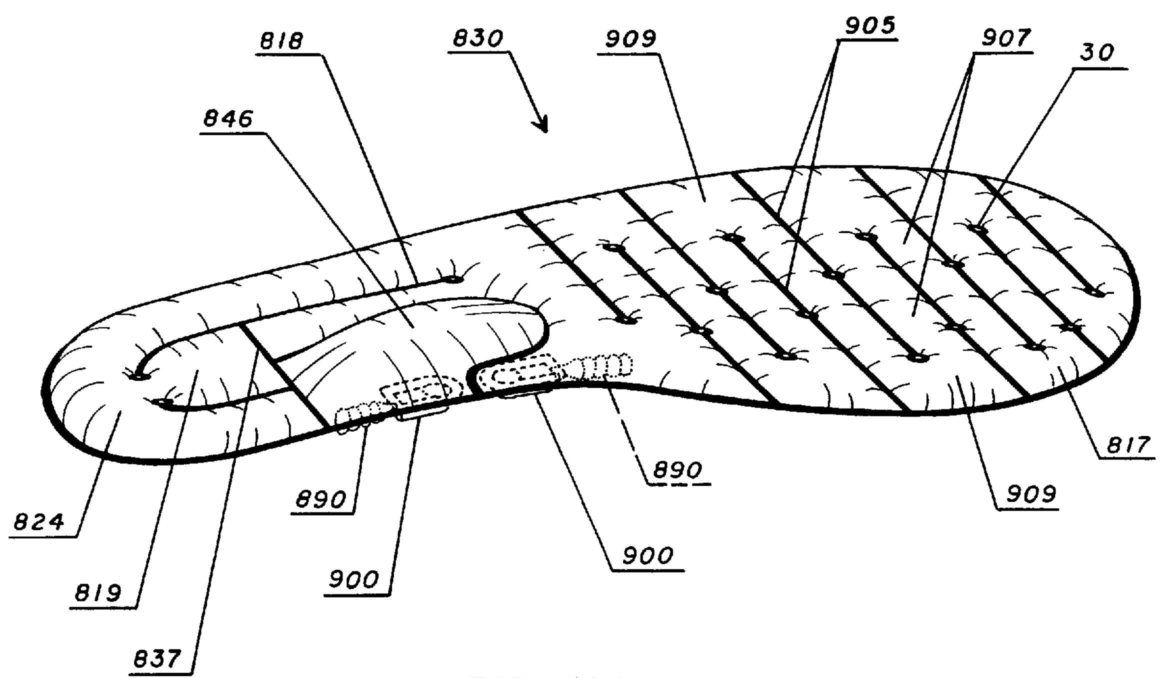
Figure 191:
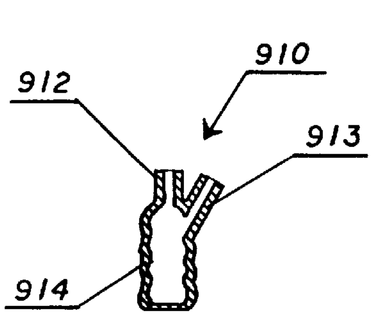

FIG. 190 is a perspective view of the inflatable innersole 830 embodiment described in FIG. 189. FIG. 191 is a sectional view of a flexible bulb 914 for the miniature hand pump 910, with inlet and outlet ports 913 and 912.

Figure 192:
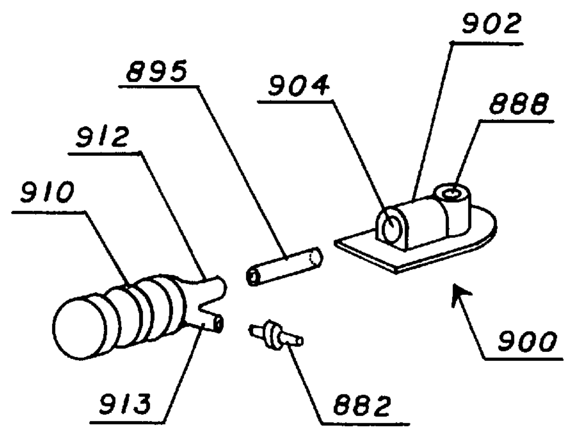

FIG. 192 illustrates an exploded perspective view of the pump 910, inlet check valve 882, and the flexible tube 895 which is inserted into outlet port 912 and into check valve and relief valve assembly 900.

Figure 193:
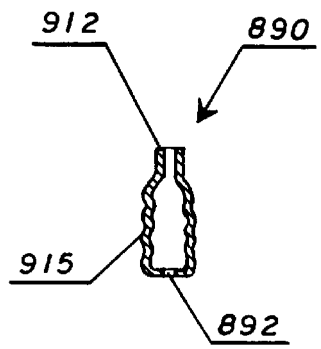

FIG. 193 is a sectional view of a flexible bulb 915 for an alternative hand pump 89, outlet port 912 and an inlet port 892 which function as a check valve, being closed when depressed and opened when released by the thumb of the user.

Figure 194:
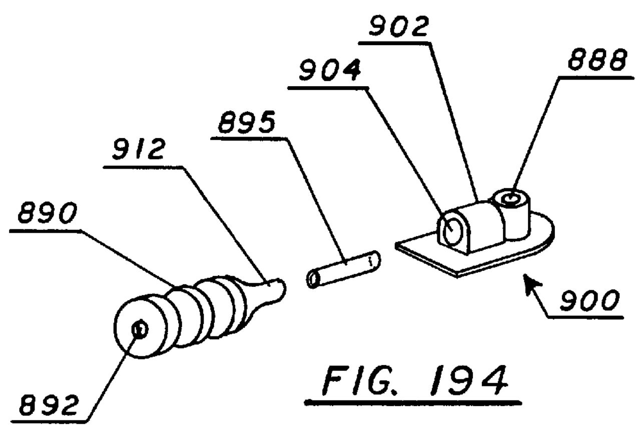

FIG. 194 illustrates an exploded perspective view of the pump 890, showing the flexible tube 895 which is inserted into outlet port 912 and into check valve and relief valve assembly 900.

Figure 195:
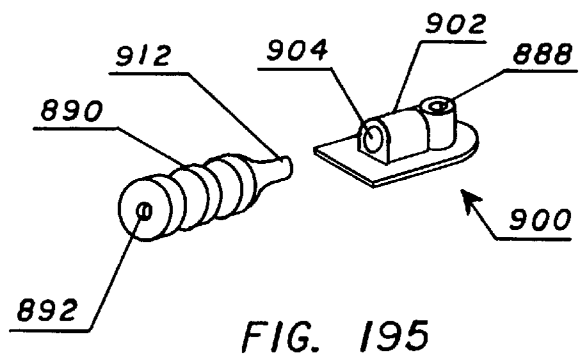

FIG. 195 illustrates an exploded perspective view of the pump 890 and check valve and relief valve assembly 900. In this embodiment the neck of the pump 912 is inserted and if necessary glued into inlet port 904 of the check valve and relief valve assembly 900.

FIGS. 196 to 199 are views of the check valve and relief valve assembly 900 illustrated in FIGS. 189–195. There is a duck bill valve 860, an assembly housing 902, an inlet port 904, a sealing ring 906, and a housing for relief valve assembly 888, which forms upper cavity 889 that receives spring 803. On the bottom of the cavity 889 there is an opening 939 through which is inserted relief valve operator (button) 935 which seals between upper cavity 889 and outlet port 886. The outlet port 886 is aligned with an opening on the lower sheet of the polyurethane film, or any other compatible material, beside and underneath the arch pillow. Flange 891 extends around housing 902 and permits permanent attachment through heat sealing process or some other alternative process to the inflatable assembly.

Figure 200:
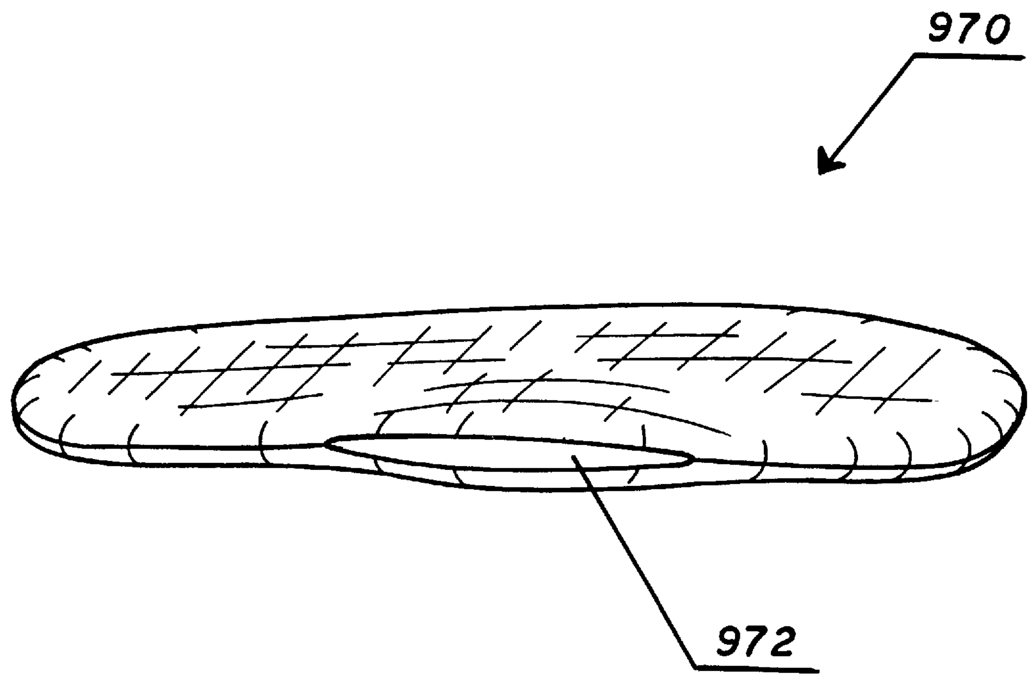

FIG. 200 is a perspective view of a washable pouch 970, in which any of the previously described inflatable soles can be removable inserted through medial slot 972. The pouch is made of any suitable material of sufficient durability and porosity for breathing such as any of the fabrics widely used as liner in footwear.

FIGS. 201–212 illustrate the universal miniature pump and relief valve assembly 1020 of the invention, as a component which is useful for all inflatable linings.

FIGS. 201–204 illustrate universal miniature pump and relief valve assembly 1020 as one unit, heat sealed to the first flexible plastic sheet 1012. FIGS. 205–206 are enlarged views of the pump outlet and inlet check valve assemblies also illustrated in FIGS. 201–204, with the check valves 860 and 850 illustrated in broken lines.

Referring now to FIGS. 201–204, the assembly includes a bulbous pump dome 1022 which has an undercut 1021 for ease of depression. The housing of the assembly is shown as 1043 and has two cavities 1017 and 1018 which receive two duck-bill check valves: inlet check valve 850 and outlet (discharge) check valve 860. The check valves are shown in FIG. 202 with a flange 859 on a tubular body with an air passage 863. Prior to insertion into the housing cavities 1017 and 1018, the duck-bill check valves 860 and 850 are inserted into protective sleeves 1050 and 1060 which are made of rigid plastic, contrary to the housing 1043 which is made of soft plastic. The protective sleeves prevent accidental squeezing of the check valves when forces are applied to the housing.

During this process of assembling duck-bill check valves 860 and 850 in protective sleeves 1060 and 1050, and placing of the valve assemblies into cavities 1017 and 1018, adequate adhesive is used and an additional short protective sleeve 1061 is inserted into cavity 1017. A relief valve operator 1035 is inserted through opening 1039 of the relief valve housing 1040 and a coil spring 1003 is positioned beneath the operator to support the relief valve operator 1035, and force seal ball 1038 on the lower end of the relief valve operator 1035 upward, sealing opening 1039. There is a passageway 1016, which connects the cavity beneath dome 1022 and check valve assembly. Check valve 860 extends over tunnel 1075, and discharges into passageway 1019 which communicates through opening 1005 in the first flexible plastic sheet 1012 into an inflatable bladder, described hereinafter.

The inlet check valve 850 receives air through side opening 1024 and discharges into the cavity beneath pump dome 1022. There is a recess 1023 on top surface of the relief valve housing 1040 to permit the user—s finger or finger nail to compress relief valve operator 1035.

There is a flange 1026 around the assembly 1020 to permit permanent attachment of the assembly to a supporting surface, usually a plastic sheet by heat sealing or any other alternative process. The tunnel 1075 accepts a mandrel (metal bar) which is a removable part of the metal sealing die to heat seal the area 1077, beneath tunnel 1075, to seal the cavity beneath the dome 1022 and check valves 860 and 850 from the inflatable bladder. This area 1077 could also be glued if not heat sealed.

FIG. 207 is a perspective view of the universal miniature pump and relief valve assembly 1020, with the plastic relief valve cover 1025 shown in exploded view.

FIG. 208 is a perspective view of the universal miniature pump and relief valve assembly 1020 in assembly with the plastic relief valve cover 1025. The heat sealing tunnel 1075 accepts plastic pins (pivots) 1027 and 1029 (see FIG. 207), which are part of plastic cover 1025 which protect from accidental activation of the relief valve operator 1035.

FIG. 209 is a plan view of the universal miniature pump and relief valve assembly 1020, with plastic relief valve cover 1025 closed, and FIG. 210 is a side view of the assembly 1020 illustrated with plan view in FIG. 209. The relief valve cover 1025 is illustrated closed over the relief valve with two side pins (pivots) 1027 and 1029 inserted into both ends of the tunnel 1075. On the forward edge of the relief valve cover 1025 there is a little knob 1053 for finger to push up to open the cover. Relief valve cover 1025 is illustrated in its open position with broken lines.

FIG. 211 illustrates the universal miniature pump and relief valve assembly 1020, and first and second flexible plastic sheets 1012 and 1014, which form an inflatable lining of the inflation system. The pump and valve assembly 1020 is illustrated above first sheet 1012 in a position for sealing to the sheet 1012. A major objective of the invention is the ability of the assembly 1020 to be permanently attached to the first plastic film in a single heat sealing cycle.

In FIG. 211 the shaded area 1064 of the first plastic sheet 1012 receives the flange 1026 of the assembly 1020 and forms a permanent peripheral closed seam with flange 1026. The area within the shaded area forms a film base 1066 underneath assembly 1020. Transverse seam 1065 divides that area, into an area 1068 beneath dome 1022, forming the sealed enclosure of the pump and area 1069 beneath relief valve 1069, which contains opening 1005 into the sealed enclosure of the inflatable lining.

Electronic sealing is accomplished by sending a high frequency (heating) current through two or more layers of thermoplastic material placed between two sealing electrodes or dies. One die is shaped in the image of the required seal. The other die may have the same shape or may be a flat plate.

An insulating layer, commonly referred to as a "buffer", which can be a Teflon film with a thickness of from 0.01 to 0.03 inches, is placed over one or both dies. One of the dies has a cavity to receive the pump and valve preform with its flange 1026 and the first plastic sheet of the enclosure between the dies. A metal mandrel is placed in the tunnel 1075 and the surface of this mandrel which contacts the flange 1026 can be coated with a buffer such as a Teflon coating with matching thickness of from 0.01 to 0.03 inches.

After the first cycle, heat sealing of the pump and relief valve assembly 1020 to the first thermoplastic film 1012 is finished, the thermoplastic film 1014 is placed in the assembly and the assembly is moved to a second heat sealing machine having a different upper electrode, the shape of which, of course, depends on the required shape of the inflatable lining. In FIG. 211 the shaded area 1084 on the second plastic sheet 1014 is joined in a permanent seam to the first plastic sheet 1012, forming passageway 1087, which leads to the inflatable lining. Transverse seam 1085 is optional.

FIG. 211 also illustrates the second sheet 1014 being laminated with an inner layer 1044 of thermoplastic material inside and an outer layer 1045 of fabric. The outside fabric material 1045 may be Nylon such as widely used in inflatables produced by Mann Industries, Inc., of Framingham, Mass., or Material produced by Faytex Corp., Weymouth, Mass., like DRI-LEX® LINING, HYDROFIL® Nylon from Allied Signal. The moisture absorbing qualities of the HYDROFIL Nylon draws moisture away from the skin keeping the user dry, cool and comfortable. The outer layer 1044 may also include in whole or in part a hook or loop fabric such as the VELCRO® hook and loop fasteners.

FIG. 212 illustrates the universal miniature pump and relief valve assembly 1020, and first and second flexible plastic sheet 1012 and 1014, similar to assembly already described in FIG. 211. In this assembly, however, first plastic sheet 1012 has also an inner layer 1044 of thermoplastic material, and an outer layer 1045 of fabric material. In this assembly, first sheet 1012 has opening 1015 to accept assembly 1020 with the flange 1026 of the assembly 1020 received between inside layers 1044 of the both first and second plastic sheets 1012 and 1014.

In this assembly transverse seam 1086 completes the sealing isolation of the pump cavity beneath dome 1022 permitting it to function as a pump.

FIGS. 213 and 214 illustrate an inflatable sole insert 1010 formed by a peripheral seam 1011 about the peripheries of the two plastic films to form a sealed enclosure. This insert is similar to those previously described in FIGS. 13, 14, 185, 186. Within the inflatable sole are tubular passageways 1007 formed by parallel seams 1009, that extend transversely across the sole, thereby providing a cushion support and flexibility to the inflated sole. There are also peripheral support pillows 909, which together form a peripheral support of greater thickness than the transverse passages 1007. There is a "C" shaped heel seam 1032, which forms a heel pillow 1031 and a heel peripheral tubular passageway 1033 which provide comfortable heel support. There are central metatarsal foot pillow 1165 and lateral tubular passageway 1036. Medial heel portion of the embodiment 1010 has tendency to pull in and bend toward the central line of the sole, and this tendency is opposed by transverse seam 1037 which resists that force. There is a small arch pillow 1145 formed by seams 1047, 1037 and 1089 which almost encircle the pump and relief valve assembly 1101. The small arch pillow 1045 has a "C" shape and it surrounds pump and relief valve assembly 1101, which is same as assembly 1020, previously described. This inflatable sole is intended to be marketed as a replacement insert for existing shoes, as most existing shoes already have some arch support. Therefore this embodiment 1010 has only a small arch pillow 1145, just sufficient to encircle the pump and relief valve assembly 1101, and to follow the contour line of the existing arch support 1148, as illustrated in FIG. 216.

FIG. 214 is a perspective view of an inflatable insole insert 1010, embodiment described in FIG. 213, showing, in exploded view an optional protector cover 1090 for the pump and relief valve assembly 1101. The protector cover has a cavity 1091 to receive assembly 1101 and is made of soft plastic. FIG. 214 also illustrates a small air pillow 1168 underneath the pump and relief valve assembly 1101, which is formed when seam 1085 (see FIG. 211) is not formed.

FIGS. 215 is a sectional view along line 215–215' of an alternative inflatable sole (insert) 750, previously described in FIG. 185. FIG. 215 illustrates an inflatable sole 750 inside a shoe 1150 having a custom made outsole 1149 with a cavity 1151 provided for the pump and relief valve assembly 920. Similar cavities can be made at other locations, inside other custom made outsoles, for other inflatable insoles like those previously described in FIGS. 151, 167, 187, 189, etc., for their attached elements such as 855, 875, 920, etc. Pump and relief valve assembly 920 is heat sealed (attached) to the lower flexible sheet 1012 of the inflatable arch pillow 845. The upper flexible sheet 1014 is laminated with a fabric layer 1045 previously described in FIG. 211. The channels 155 are formed beneath the inflated insole 750, for air circulation. The upper 1146 of the shoe is also illustrated.

FIG. 216 is a sectional view along line 216–216' of an alternative inflatable sole insert 1010 previously described in FIG. 213. FIG. 216 illustrates inflatable sole 1010 inside an existing shoe 1152. There is an outsole 1147 with an arch support 1148. Contrary to the inflatable sole 750, previously described in FIGS. 185 and 215, this inflatable sole 1010 has a pump and relief valve assembly 1101 surrounded by seam 1089. This seam is made in the second heat sealing cycle. By applying seam 1089, the pump and relief valve assembly 1101 is elevated to the level of the seams and surrounded by inflatable arch pillow 1145, preventing interference of the assembly 1101 with the wearer's foot. Upper flexible sheet 1014 is laminated with fabric layer 1045 previously described in FIGS. 211 and 215. Channels 155 are formed underneath inflated insole 1010, for air circulation as previously described. The upper 1146 of the shoe is also partially illustrated.

FIG. 217 illustrates an alternative inflatable sole 1100. This embodiment is similar with those previously described in FIGS. 22 and 29 and FIG. 213 of this application. The peripheral support pillows 909 together form a peripheral support of greater thickness than the inflated thickness of the remainder of the sole, i.e., transverse passages 1007. There is a "C" shaped heel seam 1032, which forms heel pillow 1031 and heel peripheral tubular passageway 1033. The medial heel portion of the embodiment 1100 has tendency to pull in and bend toward the central line of the sole. Transverse seam 1037 resists this tendency and prevents wrinkling of the inflatable sole. There is a seam 1154 which reduces the height of the arch pillow 1155. This inflatable sole is intended to be marketed as a replacement insert for existing shoe. As most existing shoes already have arch supports, this embodiment 1100 has only a small arch pillow 1155, sufficient to cushion the existing arch support. This embodiment 1100 has pump and relief valve assembly 1102 heat sealed onto the tab 1140. This tab has a peripheral seam 1183, which forms air passageway 1141, with the peripheral seam 1211 of the sole 1100 continuing as the peripheral seam 1183 of the tab 1140. There is a fastening hook band 1187 above pump and valve assembly 1102 to meet with fastening loops inside tongue 235 of the shoe 213; see FIG. 218. Between fastening hook strip 1187 and pump and relief valve assembly 1102, there is an alternative trimming seam 1186 which can be cut to remove the band 1187 if fastening hooks are not needed. There is a peripheral seam 1184 around the pump and valve assembly, and a transverse seam 1185.

FIGS. 217, 213, 220 and 222 illustrate the pattern of the electronic dies for use on the second heat sealing machine, previously described. As previously described in FIGS. 211, 212, the first heat sealing cycle attaches the pump and relief valve assembly to the first plastic film, and the second heat sealing cycle bonds the first and second plastic films of the inflatable lining.

FIG. 218 illustrates the inflatable sole insert 1100, described in FIG. 217, inserted inside shoe 213. The tab 1140 is illustrated as folded over the sole and underneath tongue 235. The upper part of the tongue 235, in the most footwear specially athletic footwear such as sneakers, hiking boots, etc., is soft and stuffed. With this illustrated shape of the tab 1140 end part of it with assembly 1102 could be pulled up or pushed in to adjust with location and size of the tongue 235 of the existing shoe 213. If the innersole 1100 is incorporated in the shoe 213 as manufactured then a cavity can be formed in the upper part of the tongue 235 to receive the pump and relief valve assembly 1102.

FIG. 219 is a perspective view of an alternative inflatable sole 1160 similar with innersole previously described in FIG. 218. FIG. 219 shows an inflatable sole with a tab 1162 on which are carried the pump and relief valve assembly 1103 at the heel with the tab 1162 folded over the collar of the shoe 213. There is also a fastening hook band 1182 on the tab 1162 for attachment with a fastening loop band on the collar of the shoe 213.

FIG. 220 illustrates an alternative inflatable sole 1170 similar to inflatable sole 1100 previously described in FIGS. 217 and 218. The only difference is that this embodiment 1170 has an enlarged arch pillow 1175 with one pump and relief valve assembly 1105 attached to the tab 1172 and connected with arch pillow 1175 through air passageway 1196. Tab 1172 also has a second pump and relief valve assembly 1104 connected with rest of the sole 1170 through air passageway 1194. There is a peripheral seam 1174 around the pumps. There is a fastening hook band 1189 on the tab 1172 and an alternative trimming seam 1188 which can be cut to remove the band if the wearer does not need a fastening hook band. Transverse seam 1037 is extended into seam 1198 to form two air passageways 1194 and 1196 inside the tab 1172. Peripheral seam 1211 of the sole 1170 is integral with peripheral seam 1173 of the tab 1172. There is also a small central metatarsal foot pillow 1166, as additional support for the wearer's foot. The main objective of this inflatable innersole is that wearer is able to adjust air pressure inside arch pillow 1175 as he/she wishes accordingly to the wearer's personal arch contour, independently from the remainder of the inflatable innersole which can be adjusted according to the wearer's weight and activities.

FIG. 221 is a perspective view of an alternative inflatable sole 1170 embodiment described in FIG. 220. It is similar with inflatable sole 1100 previously described in FIGS. 217 and 218. The inflatable sole 1170 is illustrated with tab 1172 folded over sole 1170 and underneath tongue 235 of the shoe 213.

FIG. 222 illustrates an alternative inflatable sole 1200 similar with inflatable soles 1100 and 1170, previously described in FIGS. 217–221. This embodiment has a separate arch pillow 1195 connected with pump and relief valve assembly 1107 on the tab 1203 through air passageway 1206. This embodiment also has front and heel air chambers connected with two separate pump and relief valve assembly 1108 and 1106 heat sealed on the tab 1203 and connected with those inflatable chambers through air passageways 1204 and 1208, which are formed by heat seams 1205 and 1207. There is a peripheral seam 1164 around pumps and an optional transverse seam 1185 beneath the pumps. There is a fastening hook band 1191 on the tab 1203 and an alternative trimming seam 1190 permitting the wearer to remove the band 1191 if not needed. The peripheral seam 1211 of the sole 1200 is integral with the peripheral seam 1163 of the tab 1203. There is also a small central metatarsal foot pillow 1167, as an additional support for the wearer's foot.

FIG. 223 is a perspective view of the alternative inflatable sole 1200 described in FIG. 222. It is similar with inflatable soles 1100 and 1170 previously described in FIGS. 217–221. The inflatable sole 1200 is illustrated with tab 1203 folded over sole 1200 and underneath tongue 235 of the shoe 213.

The inflatable soles described in FIGS. 213–223 are replacement inserts for existing shoes and they may be also produced to fit permanently in custom made shoes.

As previously described in FIG. 211 the first heat sealing cycle attaches the pump and relief valve assembly onto the first plastic film. It can also be used to emboss information such as a trade logo, patent number, size of the insert, etc. By doing so, it saves an additional step of printing information on the sole which would not be so permanent and attractive. On the final product, the information would be visible through the transparent lower polyurethane film. This film is also easy to stick to the inside surface of the shoe sole 85. Upper film is laminated with DRI-LEX® 2-zone comfort lining by Faytex Corp, which has a porous inner layer which is against the foot of the wearer, and an outer layer against the inflatable innersole. The inner layer or zone stays soft, dry and cool against the foot and the outer layer which is formed of #2 Hydrofil® Nylon rapidly pulls and absorbs perspiration. The lining is durable and resists wrinkling, odor and mildew. It is completely breathable. In addition with the channels 155 which are formed underneath inflatable soles and apertures 32 (see FIGS. 19 and 21), which allow air to circulate, it makes superior foot-cooling and quick drying system. The main objectives of these inflatable soles are:

To provide adjustable air pressure to the whole sole or to the arch pillow to alleviate a wearer's flat foot problem by providing gradual adjustment over an extended period of use, or immediate adjustment to custom fit footwear.

By using two inflatable soles in each shoe one can increase the wearer's comfort and height. The use of two inflatable soles in each shoe can also increase jumping abilities for basketball players and improve performance to all athletes.

The inflatable linings are filled with air and they are very light weight.

The universal miniature pump and relief valve assembly is a single unit which is heat sealed to the thermoplastic film in a single heat sealing cycle.

The use of a separate insert also provides the possibility to remove the inflatable insole from a shoe and insert it into another shoe.

The controls of the pump and relief valve assembly are accessible to the wearer.

Since the tab connector between the pumps and inflatable sole is a flat element and is integral with the sole, the wearer will not feel it inside the shoe. It does not have circular tubes and tubes connecting areas, which could irritate the wearer's foot.

FIG. 224 is a plan view of an inflatable bicycle seat 1218. This embodiment is an improvement of the inflatable bicycle seat 618 previously described in FIG. 121. There are three continuous seams 1222, 1224 and 1226, which divide inflatable seat 1218 into six chambers 1221, 1223, 1225, 1227 1229 and 1231. Each air chamber has extended tabs 1233, 1232, 1235, 1230, 1237 and 1228, with miniature pump and relief valve assemblies, 1112, 1111, 1113, 1110, 1114 and 1109, same as previously described in FIGS. 201–212. Each pump and relief valve assembly is connected with corresponding chambers through air passageways 1248, 1246, 1238, 1244, 1240 and 1242. There are discontinuous seams 1234 and 1245 to retain proper thickness of the inflatable seat 1218. There are two additional tabs 1236 and 1239. On end of the tabs 1228, 1230, 1239 and 1232 are attached fastening hook strips 1241, which close underneath seat with corresponding fastening loop strips 1243, which are attached on end of the tabs 1233, 1236, 1235 and 1237. There are also channels formed underneath seams and there are apertures 32, which allow air to circulate through the seat.

The main objectives of this inflatable bicycle seat 1218 are that it is simple and inexpensive to produce, and the multiple chambers prevent transfer of the air from one side to the other.

FIG. 225 illustrates an inflatable back and seat support 1250 with an inflatable back support 1260 surrounded by peripheral seam 1262. There is also an inflatable orthopedic-style chamber 1252 for lumbar support. The chamber 1252 is connected with pump and relief valve assembly 1117 through air passageway 1257. The rest of the back support 1260 is connected with separate pump and relief valve assembly 1118 through air passageway 1258. The passageways are formed by a peripheral seam about coincident tabs of the first and second plastic sheets. There are discontinuous seams 1253 to retain proper thickness of the inflatable back support 1260.

The inflatable seat 1270 has a peripheral seam 1264. There is a continuous seam 1275, which divides inflatable seat into two chambers. The left inflatable chamber 1272 is connected with pump and relief valve assembly 1115 through air passageway 1255.

The right inflatable chamber 1274 of the inflatable seat 1270 is connected with pump and relief valve assembly 1116 through air passageway 1256. The discontinuous seams 1276 retain proper thickness of the inflatable seat 1270. Inflatable back support 1260 has tab 1268 with a fastener loop strip on it, which coincide with fastening hook strip on tab 1267 of the inflatable seat 1270. There are also apertures 32 previously described, for air circulation.

FIG. 226 is a perspective view of an inflatable back and seat support assembly 1250. There are four separate chambers 1260, 1252, 1272 and 1274, each connected with separate pump and relief valve assembly 1118, 1117, 1115 and 1116, which are same as previously described in FIGS. 211 and 212.

The advantages of the back and seat support 1250 include simple and inexpensive production. The support 1250 also provides a portable back support with adjustable air pressure and separate air chambers for lumbar support and back support, each of which has an independently adjustable air pressure. The inflatable seat support has two separate chambers, each with a miniature pump and relief valve assembly permanently mounted on board.

The adjustable back support is removably attached to the inflatable seat support permitting their separation when needed.

FIG. 227 is a perspective view of a football helmet 1280, with an inflatable liner 1300. In this FIGURE are also illustrated a polycarbonate alloy shell 1281, face guard 1282, chin strap 1284, jaw pads 1286, nose bumper 1288, saw tooth back sizer 1290, front sizer 1292, and apertures 1298 on top of the helmet for air circulation. The inflatable liner 1300 is better illustrated in the FIGS. 228–231.

FIG. 228 is a sectional view of the helmet 1280 previously described in FIG. 227. In this figure, face guard 1282 and chin strap 1284 are not illustrated. FIG. 228 also illustrates stabilizer system 1296, which is formed of a foam material to stabilize the inflatable liner 1300. There is also a pump and relief valve assembly 1119, permanently attached on tab 1299 and connected with inflatable liner 1300 through air passageway (not illustrated). The pump and relief valve assembly 1119 are permanently heat sealed on tab 1299 which, is folded over the back edge of the plastic shell 1281 of the helmet 1280, and attached using fastening hooks and loops device, known as VELCRO®. The liner 1300 is made of thermoplastic material laminated with DRI-LEX® material, produced by Faytex Corp. previously described in FIG. 211 and FIG. 212. Also the Faytex Corp produces DRI-lex® with loops which is used in this embodiment to match with hooks fastening strip 1278 permanently secured on the back of the helmet 1280, illustrated in FIG. 231.

FIG. 229 is a perspective view of an inflatable liner 1300, with tab 1299 and pump and relief valve assembly 1119 on board. In this figure the liner 1300 is illustrated isolated out of the helmet but folded as it would be inside the helmet (see FIGS. 227 and 228).

FIG. 230 is a plan view of an unfolded inflatable liner 1300 as is produced under a heat sealing die. There is a horizontal tubular passageway 1294, which forms a ring or head band when folded inside helmet 1280. There are vertical tubular passageways formed by peripheral seams about the coincident prongs 1301, 1302, 1303, 1304, 1305, 1306, 1307 and 1308 of the first and second plastic sheets, which are connected with horizontal, tubular passageway 1294. The inflated prongs form a dome when folded and bent inside helmet 1280 lining the inside crown of the helmet. There are discontinuous seams 1295 which permit liner 1300 to fold and bend.

FIG. 231 is a rear view of the helmet 1280 with fastening hook strip 1278, permanently secured to it, and pump and relief valve assembly 1119 attached to the fastening hook strip 1278.

FIG. 232 is a perspective view of an inflatable liner assembly 1310 similar with liner 1300 previously described in FIGS. 227–231. In this embodiment 1310 there are four air chambers 1311, 1312, 1313 and 1314, each with prongs 1320, 1321, 1323, and 1322, and dependent pump and relief valve assemblies 1120, 1121, 1122 and 1123. Air passageways inside the prongs are not illustrated.

FIG. 233 is a plan view of an unfolded inflatable liner assembly 1310, previously described in FIG. 232. The illustration of this figure is similar to illustration of FIG. 230 previously described. In FIG. 233 inflatable liner assembly 1310 is illustrated as four separate liners, although it may be produced as one liner with four chambers.

FIG. 234 is a rear view of the helmet 1283 which contains inflatable liner assembly 1310 previously described in FIGS. 232 and 233. There is fastening hook strip 1277 permanently secured to the helmet 1283. FIG. 234 also illustrates pump and relief valve assemblies 1120, 1121, 1122 and 1123.

FIG. 235 is a sectional view of an alternative helmet 1285. Inside this helmet 1285 there is no stabilizer system such as liner 1296 previously described in FIG. 228. Instead, there is a liner 1300, previously described in FIGS. 227–231, which is incorporated as an outer liner next to shell 1281 with its own pump and relief valve assembly 1119, also illustrated in FIG. 236. In this helmet 1285 is also incorporated inflatable liner assembly 1310 previously described in FIGS. 232–234, as inner liner 1310 with four chambers, each having its own pump and relief valve assembly. There are stabilizer blocks 1297, crown stabilizer block 1317, front sizer 1292, saw tooth back sizer 1290, nose bumper 1288 and jaw pads 1286.

FIG. 236 is a rear view of the helmet 1285, which contains inflatable liner 1300 as an outer liner next to shell 1281 and inflatable liner assembly 1310 as inner liner slightly smaller to fit underneath outer liner 1300. FIG. 236 illustrates fastening hook strip 1279 permanently secured to the helmet 1285. FIG. 236 also illustrates pump and relief valve assembly 1119 which is a permanent part of the liner 1300 and four other pump and relief valve assemblies 1120, 1121, 1122 and 1123 which are permanent parts of the all chambers of the inflatable liner assembly 1310.

FIGS. 237–243 illustrate baseball helmet 1330 with an inflatable liner assembly 1340, with two inflatable chambers 1342 and 1344, each having its own pump and relief valve assembly 1126 and 1125 permanently on board. There are two inflatable jaw pads 1346 and 1348, each with own pump and relief valve assembly 1124 and 1127.

FIG. 237 is a perspective view of a baseball helmet 1330. FIG. 237 illustrates plastic shell 1331, inflatable pads 1346 and 1348, and saw tooth back sizer 1335.

FIG. 238 is a view from underneath baseball helmet 1330. In this figure are illustrated inflatable front liner 1342 with tab 1356 and its own pump and relief valve assembly 1126. There is also inflatable back liner 1344 with tab 1355 and its own pump and relief valve assembly 1125. Also, are illustrated inflatable jaw pads 1348 and 1346 with their tabs 1354 and 1357 with their own pumps and relief valve assemblies 1124 and 1127. Also are illustrated, beside plastic shell 1331, front foam-molded sizer 1333 and sawtooth back foam molded sizer 1335.

FIG. 239 is a sectional view of a baseball helmet 1330 previously described in FIGS. 237 and 238. FIG. 239 illustrates plastic shell 1331, and underneath it inflatable liner assembly 1340. There are front chamber 1342 and rear chamber 1344. There are front sizer 1333 and saw tooth back sizer 1335 with pump and relief valve assembly 1125. There is also inflatable jaw pad 1348 with pump and relief valve assembly 1124.

FIG. 240 is a plan view of an inflatable jaw pad 1348 for baseball helmet 1330 previously described in FIGS. 237–239. FIG. 240 illustrates an inflatable jaw pad 1348 with unfolded tab 1354, with pump and relief valve assembly 1124, heat sealed on it. In this illustration air passageway 1347, which is formed inside tab 1354 and which connects inflatable jaw pad 1348 and pump and relief valve assembly 1124, is visible.

FIG. 241 is a sectional view along line 241–241' of an inflatable jaw pad 1348 previously described in FIG. 240. To avoid peripheral seams close to wearer's skin, these jaw pads are produced from a soft plastic film 1350 in a vacuum press. The miniature pump and relief valve assembly is sealed to the plastic film 1350 before it is formed in the vacuum press, prior to heat sealing to the second plastic film 1351 which is laminated with proper fabric with loops 1352 for easy attachment with hooks on interior of the plastic shell 1331 of the helmet 1330.

FIG. 242 is a plan view of an unfolded inflatable front liner 1342. There is a horizontal tubular passageway 1359 and three perpendicular tubular passageways in prongs 1361, 1362 and 1363 in communication with horizontal tubular passageway 1359. When installed inside helmet they form a half dome which lines the inside surface of the crown of the helmet. There is a tab 1356 with air passageway inside it (not illustrated) and pump and relief valve assembly 1126 which communicate with central tubular passageway 1362. There is front foam molded sizer 1333 which also could be made inflatable with its own pump and relief valve assembly.

FIG. 243 is a plan view of an unfolded inflatable rear liner 1344, which with front liner 1342 previously described in FIG. 242, forms complete inflatable liner 1340 for baseball helmet 1330. This liner 1344 also has a horizontal tubular passageway 1360, and three perpendicular tubular passageways in prongs 1365, 1366 and 1367 in communication with horizontal tubular passageway 1360. There is a tab 1355 with air passageway inside it (not illustrated) and pump and relief valve assembly 1125 which communicate with horizontal tubular passageway 1360. There is also a saw toothed back sizer 1335 made of foam material to protect neck of the wearer, and is interchangeable.

FIGS. 244–246 illustrate and inflatable multi-purpose pad 1370. It has a circular tubular passageway 1372, formed by two circular seams 1374 and 1376. Circular tubular passageway 1372 form cavity 1378, where pump and relief valve assembly 1128 is located. To avoid peripheral seams being close to wearer's skin, this universal pad 1370 is produced by same method as jaw pad 1348 previously described in FIGS. 240 and 241. In first heat sealing cycle the pump and relief valve assembly 1128 is permanently attached to the first flexible plastic film 1380. After that first plastic film 1380 is put in vacuum press with a special die to be formed as shown in FIGS. 245 and 246, and then placed in heat sealing machine where second plastic film 1381 is added and second heat sealing cycle performed for final shape of the product. There is air passageway 1368 which connects circular tubular passageway 1372 with the pump and relief valve assembly 1128. Second plastic film 1381 is laminated with proper fabric with loops 1382, for easy attachment with hooks on the interior surface of the product in which this pad 1370 is applied. For example, it could be used instead of jaw pad 1348 (see FIGS. 237–241) or instead jaw pad 1286 (see FIGS. 227, 228, 235). Inflatable pad 1370 can be used in numerous applications. For example as padding for shield protective gear in many sports such as baseball, hockey, football, etc., on interior of a knee brace, etc.

The advantages of the inflatable pad 1370 are that it is simple and inexpensive to produce, it has adjustable air pressure to control its firmness, it has the miniature pump and relief valve assembly 1128, permanently attached and hidden inside cavity formed by circular main passageway 1372. It is portable and interchangeable.

FIGS. 247–251 illustrate a bicycle helmet 1400 with an inflatable liner assembly 1410, which contains a front liner 1412 and rear a liner 1420. The front liner 1412 has two independent chambers: front left chamber 1414 and front right chamber 1416. The rear liner 1420 is identical and has also two independent chambers: rear left 1422 and rear right 1424.

FIG. 247 is a perspective view of a bicycle helmet 1400, having a helmet shell 1402, straps 1404, opening for ventilation 1406, tab 1408 of the front liner 1412 and two independent pumps and relief valve assemblies 1130 and 1129.

FIG. 248 is a perspective view of the inside of the bicycle helmet 1400. FIG. 248 illustrates inflatable liner assembly 1410 described in FIGS. 247–251, and also illustrates tab 1408 of the front liner 1412, with two pump and relief valve assemblies 1129 and 1130 and tab 1409 of the rear liner 1420 with two pumps and relief valve assemblies 1131 and 1132. Each pump and relief valve assembly communicates with relevant chamber through air passageways 1429, 1430, 1431 and 1432.

FIG. 249 is a sectional view of a bicycle helmet 1400 previously described in FIGS. 247 and 248.

FIG. 250 is a plan view of an unfolded front inflatable liner 1412 of an inflatable liner assembly 1410 previously described in FIGS. 247–249. FIG. 250 illustrates continuous seam 1418 which divides front line 1412 into two independent chambers 1414 and 1416. Each of those chambers has side tubular passageway 1434 and 1436, and top tubular passageways in prongs 1435 and 1437. Each of those chambers 1414 and 1416 has its own pump and relief valve assembly 1129 and 1130 and they communicate through air passageways 1429 and 1430, which are formed inside tab 1408. Pump and relief valve assembly 1129 and 1130 are heat sealed to the tab 1408.

FIG. 251 is a sectional view along line 251–251' of an inflatable front liner 1412 of the inflatable liner assembly 1410 previously described in FIGS. 247–250.

FIG. 251 illustrates a typical cross-section of the tubular passageways 1434, 1435, 1436, and 1437 of the front inflatable liner 1412 and tubular passageways 1444, 1445, 1446 and 1447 of the rear inflatable liner 1420. To avoid peripheral seams being too close to the wearer's skin, this liner 1410 is produced by the same method as jaw pad 1348 and universal multipurpose pad 1370 previously described in FIGS. 240, 241, and 244–246.

In first heat sealing cycle the pump and relief valve assembly 1129 and 1130 are permanently attached to the first flexible plastic film 1380. The first plastic film 1380 is placed in a vacuum press with a special die to be formed as shown in FIG. 251, and then placed in heat sealing machine where second plastic film 1381 is added and second heat sealing cycle performed for the final shape of the product as shown in FIG. 250. Second plastic film 1381 is laminated with proper fabric with loops 1382, for easy attachment with hooks on the interior surface of helmet 1400. Helmet 1400 also has fastening hook strip on the exterior surface on limited area underneath tabs 1408 and 1409 (not illustrated).

The advantages of the inflatable liners for helmets are simple and inexpensive manufacture, a multiple chamber system with pump and relief valve assemblies on board, and easily interchangeable with existing inflatable liners which do not have a pump and relief valve assembly on board, and thus must be supported by extraneous inflation systems.

I claim:

1. A preform for an air pump and relief valve assembly which comprises:

a. an assembly body having a substantially flat bottom and molded entirely of a flexible plastic;

b. a bulbous extremity on said body adjacent one end thereof and open at said bottom wall;

c. a relief valve recess adjacent the opposite end of said body and open to a valve port in said bottom wall;

d. at least one internal passage open to the interior of said bulbous extremity and extending through said assembly body to a second port open at said bottom wall;

e. said bottom wall including a substantially planar base flange extending about said body and peripherally about said bulbous extremity and said relief valve recess; and f. a through tunnel in said body transverse to said at least one internal passage and located between said internal passage and said bottom wall.

2. The preform of claim 1 including a second internal passage open to the interior of said bulbous extremity and extending through said body to a port open in a wall of said body.

3. The preform of claim 2 including a first check valve disposed in said internal passage to permit air flow from said bulbous extremity to said port open at said bottom wall and a second check valve disposed in said second internal passage and oriented to permit air flow from said port open in a wall of said housing to said bulbous extremity.

4. An inflatable enclosure formed of first and second sheets of plastic film bonded together in a continuous seam about their peripheries to form a sealed interior in combination with the air pump and valve preform of claim 3 having its bottom wall and flange bonded to one of said sheets of plastic film with an opening in said one sheet of plastic open to said valve port and said second port in said bottom wall.

5. The inflatable enclosure of claim 4 including a seam between said bottom wall and said first sheet of plastic which extends coextensively with said tunnel.

6. The inflatable enclosure of claim 4 including a relief valve member mounted in said relief valve recess with a spring to bias said valve member into a closed position seating in said valve port.

7. The inflatable enclosure of claim 6 as an inflatable inner sole for footwear wherein said first and second sheets of plastic film have the shape of a sole of said footwear.

8. The inflatable enclosure of claim 7 including a plurality of discontinuous seams extending transversely across the metatarsal area of said inner sole.

9. The inflatable enclosure of claim 7 including discontinuous longitudinal seams adjacent the lateral edge of said inner sole to form a tubular passage adjacent said lateral edge.

10. The inflatable enclosure of claim 7 including a C-shaped, discontinuous seam in the heel area of said inner sole to form a heel inflatable pillow and a peripheral tubular passageway about the heel of said inflatable inner sole.

11. The inflatable enclosure of claim 7 including a plurality of discontinuous seams encircling the arch area of said inner sole to form an arch pillow.

12. The inflatable enclosure of claim 11 wherein said air pump and valve preform are bonded to said enclosure adjacent said arch pillow.

13. The inflatable enclosure of claim 7 wherein said first and second sheets have coincident tabs which are bonded about their periphery to form a tubular passageway coextensive of said tabs, and wherein said air pump and valve preform are bonded to said one sheet adjacent the end of its tab.

14. The inflatable enclosure of claim 7 including a continuous seam encircling the arch area of said inner sole to form an inflatable arch pillow which is sealed from the remainder of said inflatable inner sole.

15. The inflatable enclosure of claim 14 including two air pump and valve preforms; one preform being located adjacent to and in communication with said inflatable arch pillow and the other being located adjacent to said inflatable arch pillow and open to the remainder of said inflatable inner sole.

16. The inflatable enclosure of claim 14 wherein said first and second sheets have coincident tabs which are bonded about their periphery and along their centers to form two tubular passageways coextensive of said tabs, with one passageway open to said inflatable arch pillow and the other open to the remainder of said inflatable inner sole, and including two air pump and valve preforms located at the end of said tabs; one preform being located adjacent to and in communication with said passageway open to said inflatable arch pillow and the other being located adjacent to said inflatable arch pillow and the other open to said passageway open to the remainder of said inflatable inner sole.

17. The inflatable enclosure of claim 14 including a continuous seam located between the heel and metatarsal regions of said inner sole to form separate heel and metatarsal chambers which are sealed from each other and said inflatable arch pillow.

18. The inflatable enclosure of claim 17 wherein said first and second sheets have coincident tabs which are bonded about their periphery and including two longitudinal seams to form three tubular passageways coextensive of said tabs, with one passageway open to said inflatable arch pillow, a second open to the inflatable heel pillow, and the third open to the metatarsal chambers, and including three air pump and valve preforms located at the end of said tabs; one preform being located adjacent to and in communication with said passageway open to said inflatable arch pillow, a second preform being located adjacent to and in communication with said second passageway open to said heel chamber and the third being located adjacent to said third passageway and open to the metatarsal chamber.

19. The inflatable enclosure of claim 6 as an inflatable seat covering wherein said first and second sheets of plastic film have the shape of a seat and wherein said first and second sheets have coincident tabs which are bonded about their periphery to form tubular passageways coextensive of said tabs, and wherein said air pump and valve preform are bonded to said one sheet adjacent the end of its tab.

20. The inflatable enclosure of claim 19 including a continuous longitudinal seam dividing said inflatable enclosure into separate chambers and including said coincident tabs on each side thereof with an air pump and relief valve preform for each of said chambers.

21. The inflatable enclosure of claim 20 as an inflatable bicycle seat covering wherein said first and second sheets of plastic film have the shape of a bicycle seat.

22. The inflatable enclosure of claim 6 as an inflatable seat back covering wherein said first and second sheets of plastic film have the shape of the back of a seat and wherein said first and second sheets have coincident tabs which are bonded about their periphery to form a tubular passageway coextensive of said tabs, and wherein said air pump and valve preform are bonded to said one sheet adjacent the end of its tab.

23. The inflatable enclosure of claim 22 including a continuous seam surrounding the lumbar area of said seat back to form a lumbar support chamber and a remainder back chamber, and including said coincident tabs adjacent said lumbar area of said seat back and adjacent the remainder of said remainder back chamber with an air pump and relief valve preform for each of said chambers.

24. An inflatable lined helmet comprising a helmet having a top, front, back, and sides, with an inflatable lining received within said helmet as an internal lining for at least one selected interior surface thereof comprising the top, sides, front and back, and combinations thereof, of said helmet wherein said lining includes the inflatable enclosure of claim 9.

25. The helmet of claim 24 wherein said inflatable enclosure is formed with first and second sheets having the shape of a longitudinal band with a plurality of dependent prongs and is received within said helmet with said longitudinal band forming a head band lining and with said dependent prongs extending upwardly along the interior surfaces of the crown of said helmet.

26. The helmet of claim 25 including coincident tab extensions on each of said first and second sheets of plastic which extend exteriorly of said helmet and which are bonded together in a peripheral seam to form a tubular passage coextensive said tabs and wherein said preform is bonded to said tab extensions exteriorly of said helmet.

27. The helmet of claim 25 including at least two of said inflatable enclosures disposed at selected locations within said helmet.

28. The helmet of claim 27 wherein said helmet has jaw projections and including an inflatable enclosure of claim 9 with first and second sheets of the shape of the jaw projection and positioned adjacent the inside of each jaw projection to provide separate inflatable jaw pads.

29. An inflatable cushion of claim 6 wherein said first and second sheets of plastic are bonded together with a peripheral seam and a continuous substantially parallel seam to form an inflatable annular cushion and wherein said air pump and relief valve preform is surrounded by said annular cushion.

30. An inflatable lining of claim 6 wherein said bottom wall and flange of said preform are bonded with a single seam to both said sheets of plastic film.

31. The preform of claim 1 including a check valve disposed in said internal passage to permit air flow from said bulbous extremity to said port open at said bottom wall.

32. The preform of claim 1 including a relief valve member mounted in said relief valve recess with a spring to bias said valve member into a closed position seating in said valve port.

33. The preform of claim 1 including a cover overlying said body and having downwardly dependent side flanges with distal shafts which are seated in the opposite ends of said tunnel to provide a hinged attachment of said cover to said body.

* * * * *